(12) United States Patent
Michael et al.

(10) Patent No.: US 11,700,196 B2
(45) Date of Patent: *Jul. 11, 2023

(54) HIGH PERFORMANCE SOFTWARE-DEFINED CORE NETWORK

(71) Applicant: VMware, Inc., Palo Alto, CA (US)

(72) Inventors: Nithin Michael, San Francisco, CA (US); Ao Tang, San Francisco, CA (US); Victor de Souza Lima e Silva, San Francisco, CA (US); Thiago Sousa Santos, San Francisco, CA (US); Ning Wu, San Francisco, CA (US); Archit Baweja, San Francisco, CA (US); Ki Suh Lee, San Francisco, CA (US); Yao Wang, San Francisco, CA (US); Andrey Gushchin, San Francisco, CA (US); Sakethnath Are, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/240,890

(22) Filed: Apr. 26, 2021

(65) Prior Publication Data

US 2021/0377156 A1 Dec. 2, 2021

Related U.S. Application Data

(63) Continuation of application No. 16/231,527, filed on Dec. 23, 2018, now Pat. No. 10,992,568, which is a
(Continued)

(51) Int. Cl.
*H04L 45/00* (2022.01)
*H04L 43/0864* (2022.01)
(Continued)

(52) U.S. Cl.
CPC .......... *H04L 45/22* (2013.01); *H04L 43/0864* (2013.01); *H04L 43/0876* (2013.01); *H04L 45/24* (2013.01); *H04L 45/745* (2013.01)

(58) Field of Classification Search
CPC . H04L 45/22; H04L 43/0864; H04L 43/0876; H04L 45/24; H04L 45/745
See application file for complete search history.

(56) References Cited

U.S. PATENT DOCUMENTS 5,652,751 A 7/1997 Sharony
5,909,553 A 6/1999 Campbell et al.
(Continued)

FOREIGN PATENT DOCUMENTS

CN 1926809 A 3/2007
CN 102577270 A 7/2012
(Continued)

OTHER PUBLICATIONS

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.
(Continued)

*Primary Examiner* — Deepa Belur
(74) *Attorney, Agent, or Firm* — Adeli LLP

(57) ABSTRACT

A system comprising nodes coupled to a network including virtual links in an overlay network provisioned over an underlay network. The system includes a virtual machine (VM) provisioned at a node and coupled to the network. The VM is configured to receive feedback data of link conditions, and use the feedback data to dynamically determine and adapt an optimal route through the network. The VM is configured to control routing of traffic flows using the
(Continued)

optimal route. The routing includes split routing of a traffic flow from the node via two or more of the virtual links.

20 Claims, 86 Drawing Sheets

Related U.S. Application Data continuation-in-part of application No. 16/216,235, filed on Dec. 11, 2018, now Pat. No. 10,992,558, which is a continuation of application No. 15/803,964, filed on Nov. 6, 2017, now abandoned, said application No. 16/231,527 is a continuation-in-part of application No. 16/017,873, filed on Jun. 25, 2018, now abandoned, which is a continuation of application No. 15/421,409, filed on Jan. 31, 2017, now abandoned, said application No. 16/231,527 is a continuation-in-part of application No. 15/490,952, filed on Apr. 19, 2017, now abandoned, which is a continuation-in-part of application No. 15/421,409, filed on Jan. 31, 2017, now abandoned.

(60) Provisional application No. 62/745,548, filed on Oct. 15, 2018, provisional application No. 62/700,137, filed on Jul. 18, 2018.

(51) Int. Cl.
*H04L 45/745* (2022.01)
*H04L 43/0876* (2022.01)
*H04L 45/24* (2022.01)

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,751,409 B1 | 7/2010 | Carolan |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,566,452 B1 | 10/2013 | Goodwin et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B2 | 1/2019 | Appleby et al. |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |

(56) References Cited

U.S. PATENT DOCUMENTS

| | | |
|---|---|---|
| 10,326,830 B1 | 6/2019 | Singh |
| 10,348,767 B1 | 7/2019 | Lee et al. |
| 10,355,989 B1 | 7/2019 | Panchai et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 | 9/2022 | Ramaswamy et al. |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,533,248 B2 | 12/2022 | Mayya et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Kiessig et al. |

(56) References Cited

U.S. PATENT DOCUMENTS

| | | |
|---|---|---|
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shalzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1* | 4/2015 | Banavalikar .......... G06F 9/5083 718/1 |

(56) References Cited

U.S. PATENT DOCUMENTS

| | | |
|---|---|---|
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155590 A1 | 6/2017 | Dillon et al. |
| 2017/0163473 A1 | 6/2017 | Sadana et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |

(56) References Cited

U.S. PATENT DOCUMENTS

| | | |
|---|---|---|
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0327109 A1 | 10/2019 | Guichard et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |

(56) References Cited

U.S. PATENT DOCUMENTS

| | | |
|---|---|---|
| 2020/0059457 A1 | 2/2020 | Raza et al. |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0092062 A1 | 3/2021 | Dhanabalan et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0166713 A1 | 5/2022 | Markuze et al. |
| 2022/0210041 A1 | 6/2022 | Gandhi et al. |
| 2022/0210042 A1 | 6/2022 | Gandhi et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |

FOREIGN PATENT DOCUMENTS

| | | |
|---|---|---|
| CN | 102811165 A | 12/2012 |
| CN | 104956329 A | 9/2015 |
| CN | 106230650 A * | 12/2016 |

(56) References Cited

FOREIGN PATENT DOCUMENTS

| | | | | |
|---|---|---|---|---|
| CN | 106656847 | A | 5/2017 | |
| CN | 110447209 | A | 11/2019 | |
| CN | 111198764 | A | 5/2020 | |
| EP | 1912381 | A1 | 4/2008 | |
| EP | 2538637 | A2 | 12/2012 | |
| EP | 2763362 | A1 | 8/2014 | |
| EP | 3041178 | A1 | 7/2016 | |
| EP | 3297211 | A1 * | 3/2018 | ......... H04L 41/0816 |
| EP | 3509256 | A1 | 7/2019 | |
| EP | 3346650 | B1 * | 11/2019 | .......... G06F 11/3006 |
| JP | 2010233126 | A | 10/2010 | |
| JP | 2014200010 | A | 10/2014 | |
| JP | 2017059991 | A | 3/2017 | |
| JP | 2017524290 | A | 8/2017 | |
| RU | 2574350 | C2 | 2/2016 | |
| WO | 03073701 | A1 | 9/2003 | |
| WO | 2007016834 | A1 | 2/2007 | |
| WO | 2012167184 | A2 | 12/2012 | |
| WO | 2015092565 | A1 | 6/2015 | |
| WO | 2016061546 | A1 | 4/2016 | |
| WO | 2016123314 | A1 | 8/2016 | |
| WO | 2017083975 | A1 | 5/2017 | |
| WO | 2019070611 | A1 | 4/2019 | |
| WO | 2019094522 | A1 | 5/2019 | |
| WO | 2020012491 | A1 | 1/2020 | |
| WO | 2020018704 | A1 | 1/2020 | |
| WO | 2020091777 | A1 | 5/2020 | |
| WO | 2020101922 | A1 | 5/2020 | |
| WO | 2020112345 | A1 | 6/2020 | |
| WO | 2021040934 | A1 | 3/2021 | |
| WO | 2021118717 | A1 | 6/2021 | |
| WO | 2021150465 | A1 | 7/2021 | |
| WO | 2021211906 | A1 | 10/2021 | |
| WO | 2022005607 | A1 | 1/2022 | |
| WO | 2022154850 | A1 | 7/2022 | |
| WO | 2022159156 | A1 | 7/2022 | |
| WO | 2022231668 | A1 | 11/2022 | |
| WO | 2022235303 | A1 | 11/2022 | |
| WO | 2022265681 | A1 | 12/2022 | |
| WO | 2023009159 | A1 | 2/2023 | |

OTHER PUBLICATIONS

Long, Feng, "Research and Application of Cloud Storage Technology in University Information Service," Chinese Excellent Masters' Theses Full-text Database, Mar. 2013, 72 pages, China Academic Journals Electronic Publishing House, China.

Non-Published Commonly Owned U.S. Appl. No. 17/562,890, filed Dec. 27, 2021, 36 pages, Nicira, Inc.

Non-Published Commonly Owned U.S. Appl. No. 17/572,583, filed Jan. 10, 2022, 33 pages, Nicira, Inc.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Non-Published Commonly Owned U.S. Appl. No. 17/827,972, filed May 30, 2022, 30 pages, Nicira, Inc.

Non-Published Commonly Owned U.S. Appl. No. 17/850,112, filed Jun. 27, 2022, 41 pages, Nicira, Inc.

Guo, Xiangyi, et al., (U.S. Appl. No. 62/925,193), filed Oct. 23, 2019, 26 pages.

Lasserre, Marc, et al., "Framework for Data Center (DC) Network Virtualization," RFC 7365, Oct. 2014, 26 pages, IETF.

Lin, Weidong, et al., "Using Path Label Routing in Wide Area Software-Defined Networks with Open Flow," 2016 International Conference on Networking and Network Applications, Jul. 2016, 6 pages, IEEE.

Non-Published Commonly Owned U.S. Appl. No. 17/240,906, filed Apr. 26, 2021, 18 pages, VMware, Inc.

Non-Published Commonly Owned U.S. Appl. No. 17/467,378, filed Sep. 6, 2021, 157 pages, VMware, Inc.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IEEE, Toronto, ON, Canada.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Huang, Cancan, et al., "Modification of Q.SD-WAN," Rapporteur Group Meeting —Doc, Study Period 2017-2020, Q4/11-DOC1 (190410), Study Group 11, Apr. 10, 2019, 19 pages, International Telecommunication Union, Geneva, Switzerland.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 17/072,764, filed Oct. 16, 2020, 33 pages, VMware, Inc.

Non-Published Commonly Owned U.S. Appl. No. 17/072,774, filed Oct. 16, 2020, 34 pages, VMware, Inc.

Non-Published Commonly Owned U.S. Appl. No. 17/085,893, filed Oct. 30, 2020, 34 pages, VMware, Inc.

(56) References Cited

OTHER PUBLICATIONS

Non-Published Commonly Owned U.S. Appl. No. 17/085,916, filed Oct. 30, 2020, 35 pages, VMware, Inc.
Non-Published Commonly Owned U.S. Appl. No. 17/103,614, filed Nov. 24, 2020, 38 pages, VMware, Inc.
Non-Published Commonly Owned U.S. Appl. No. 17/143,092, filed Jan. 6, 2021, 42 pages, VMware, Inc.
Non-Published Commonly Owned U.S. Appl. No. 17/143,094, filed Jan. 6, 2021, 42 pages, VMware, Inc.
Non-Published Commonly Owned U.S. Appl. No. 17/194,038, filed Mar. 5, 2021, 35 pages, VMware, Inc.
Non-Published Commonly Owned U.S. Appl. No. 17/227,016, filed Apr. 9, 2021, 37 pages, VMware, Inc.
Non-Published Commonly Owned U.S. Appl. No. 17/227,044, filed Apr. 9, 2021, 37 pages, VMware, Inc.
Non-Published Commonly Owned U.S. Appl. No. 17/361,292, filed Jun. 28, 2021, 35 pages, Nicira, Inc.
Non-Published Commonly Owned U.S. Appl. No. 15/803,964, filed Nov. 6, 2017, 15 pages, The Mode Group.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Non-Published Commonly Owned U.S. Appl. No. 18/083,536, filed Dec. 18, 2022, 27 pages, VMware, Inc.
Non-Published Commonly Owned U.S. Appl. No. 18/102,685, filed Jan. 28, 2023, 124 pages, VMware, Inc.
Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.
Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.
Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

\* cited by examiner to FIG. 18B (b) 4 × 4 Mesh network (c) Hierarchical 50 node network (b) 4 × 4 Mesh network

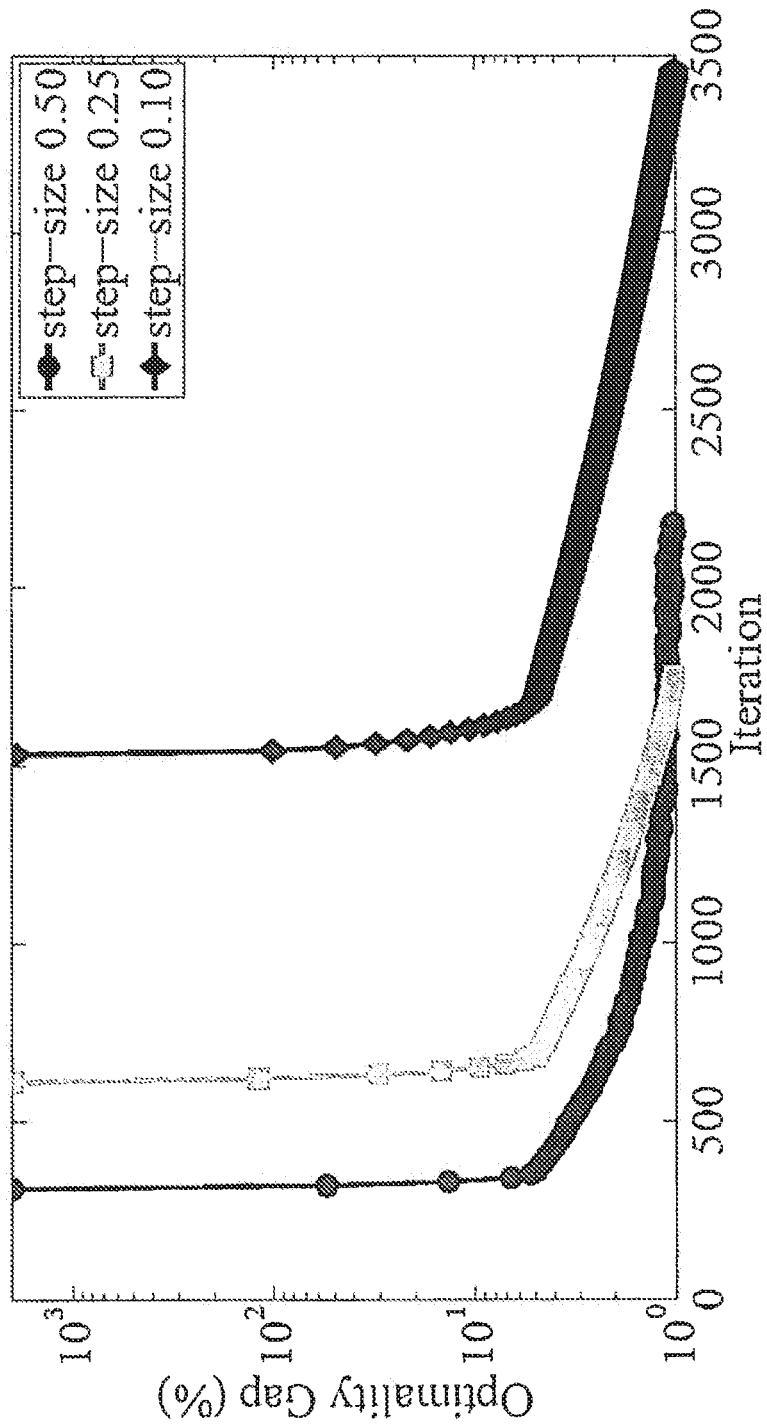
FIG. 57c (c) Hierarchical 50 node network (b) 4 × 4 Mesh Network

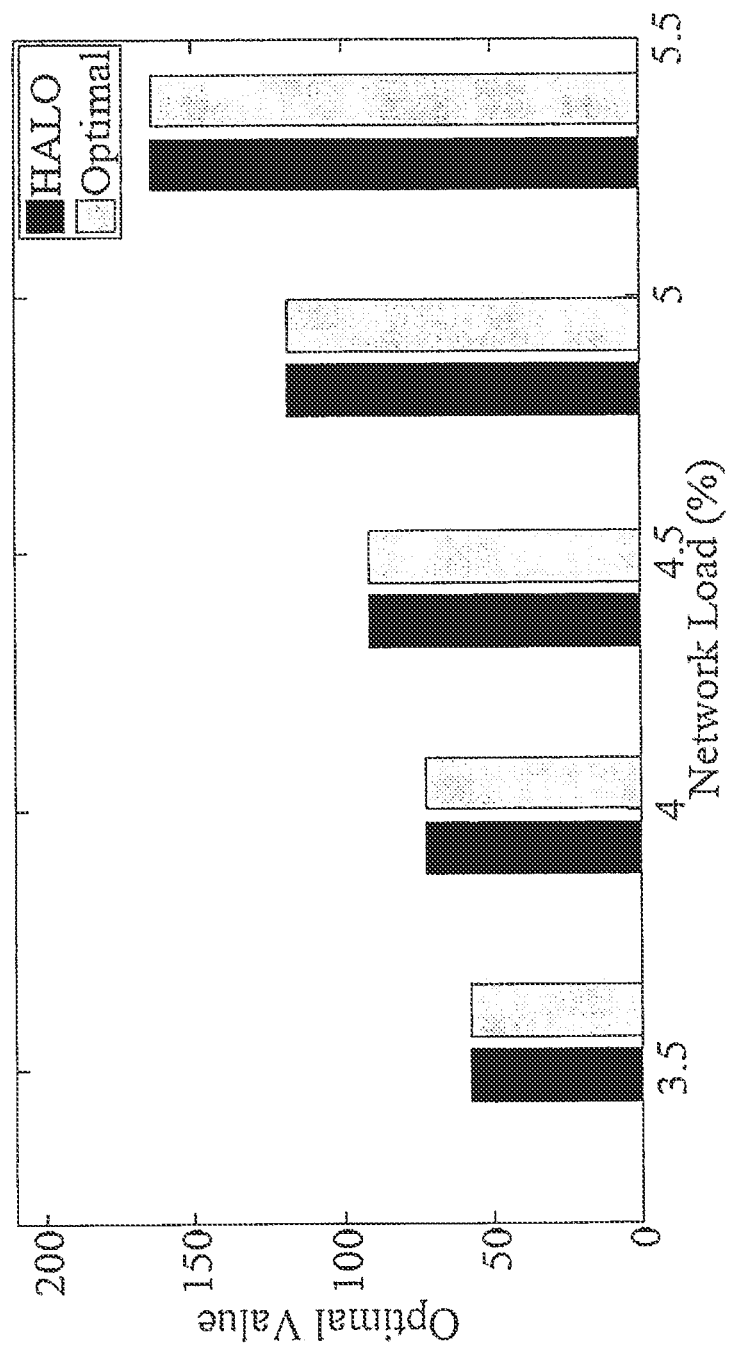
FIG. 58C (c) Hierarchical 50 Node Network (a) Abilene (b) 4 × 4 Mesh Network (c) Hierarchical 50 Node Network

HIGH PERFORMANCE SOFTWARE-DEFINED CORE NETWORK

RELATED APPLICATIONS

This application is a continuation of U.S. patent application Ser. No. 16/231,527, filed Dec. 23, 2018, now published as U.S. Patent Publication 2020/0014616. U.S. Patent Publication 2020/0014616 is incorporated herein by reference.

U.S. patent application Ser. No. 16/231,527 claims the benefit of U.S. Patent Application No. 62/745,548, filed Oct. 15, 2018.

U.S. patent application Ser. No. 16/231,527 claims the benefit of U.S. Patent Application No. 62/700,137, filed Jul. 18, 2018.

U.S. patent application Ser. No. 16/231,527 is a continuation in part of U.S. patent application Ser. No. 16/017,873, filed Jun. 25, 2018, now published as U.S. Patent Publication 2019/0036810, which is a continuation of U.S. patent application Ser. No. 15/421,409, filed Jan. 31, 2017, now published as U.S. Patent Publication 2018/0219765.

U.S. patent application Ser. No. 16/231,527 is a continuation in part of U.S. patent application Ser. No. 15/490,952, filed Apr. 19, 2017, now published as U.S. Patent Publication 2018/0219766.

U.S. patent application Ser. No. 16/231,527 is a continuation in part of U.S. patent application Ser. No. 16/216,235, filed Dec. 11, 2018, which is a continuation of U.S. patent application Ser. No. 15/803,964, filed Nov. 6, 2017.

U.S. patent application Ser. No. 16/231,527 is related to U.S. patent application Ser. No. 16/164,457, filed Oct. 18, 2018, now published as U.S. Patent Publication 2020/0036624.

U.S. patent application Ser. No. 16/231,527 is related to U.S. patent application Ser. No. 16/188,740, filed Nov. 13, 2018, now published as U.S. Patent Publication 2019/0238449.

U.S. patent application Ser. No. 16/231,527 is related to U.S. patent application Ser. No. 16/189,735, filed Nov. 13, 2018, now published as U.S. Patent Publication 2019/0238450.

U.S. patent application Ser. No. 16/231,527 is related to U.S. patent application Ser. No. 16/207,155, filed Dec. 2, 2018, now published as U.S. Patent Publication 2020/0296026.

U.S. patent application Ser. No. 16/231,527 is related to U.S. patent application Ser. No. 16/207,156, filed Dec. 2, 2018, now published as U.S. Patent Publication 2020/0014615.

U.S. patent application Ser. No. 16/231,527 is related to U.S. patent application Ser. No. 16/227,949, filed Dec. 20, 2018, now published as U.S. Patent Publication 2019/0280962.

U.S. patent application Ser. No. 16/231,527 is related to U.S. patent application Ser. No. 16/227,967, filed Dec. 20, 2018, now published as U.S. Patent Publication 2019/0280963.

GOVERNMENT INTEREST STATEMENT

This invention was made with government support under CCF-0835706 awarded by National Science Foundation (NSF). The government has certain rights in the invention.

TECHNICAL FIELD

The embodiments herein relate to networking and, more particularly, to core networks that complement enterprise network deployments to provide the highest levels of network performance.

BACKGROUND

Enterprise applications are moving to a cloud-based environment, referred to herein as the cloud. The dynamic nature of such applications (e.g., Infrastructure as a Service (IaaS), Platform as a Service (PaaS), Software as a Service (SaaS), Unified Communications as a Service (UCaaS), etc.), most of which are performance sensitive, means the Internet, as a best effort network, is inherently not reliable enough to support such mission-critical business applications or applications that require high performance and reliability. Hardware-defined private networks (e.g., MPLS), while being very reliable, are complex, inflexible and costly. Therefore, many enterprises currently bear the burden of managing multiple networks, because no single network offers the adequate combination of reliability, cloud flexibility, and internet affordability. Enterprises therefore need an improved core network alternative.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 57C illustrates a comparison of the optimality gap between an embodiment of the present invention over a number of iterations having different step-sizes in a hierarchical 50 node network.

FIG. 58C illustrates a comparison of the optimal performance and an embodiment of the present invention in a hierarchical 50 node network.

FIG. 60B illustrates evolution of split ratios to Chicago, Kansas City and Atlanta for traffic destined to LA at the Indianapolis node in Abilene network.

DETAILED DESCRIPTION

Figure 1:
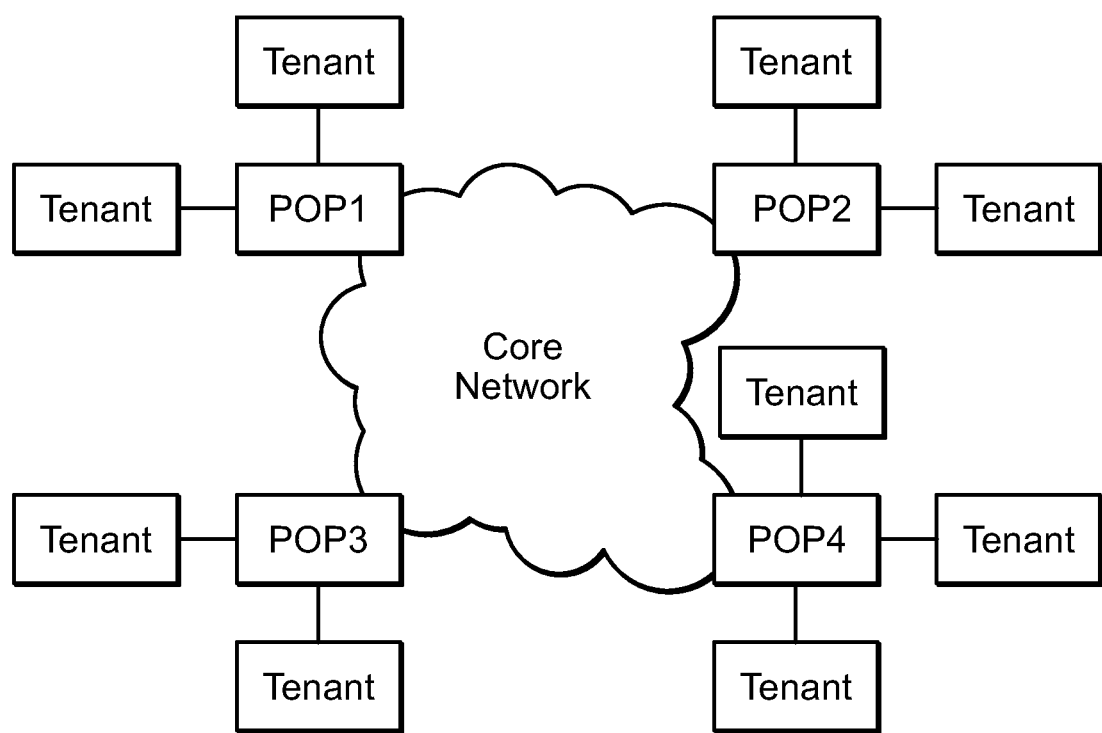
FIG. 1 is an example block diagram of the Mode Core Network (MCN) overlay network, under an embodiment.

Network Overview and General Descriptions of Components

The following terms are intended to have the following general meaning as they may be used herein. The terms are not however limited to the meanings stated herein as the meanings of any term can include other meanings as understood or applied by one skilled in the art.

The term "bandwidth" as used herein includes the count of bits per second across a defined interface point, such as a link. When the packet size is fixed, the bandwidth is the product of the packets per second and the bits per packet.

The term "capacity" as used herein includes the maximum bandwidth across a defined interface point, such as a link.

The term "control plane" as used herein includes the collection of components within the MCN that compose the rules related to the delivery of packets from POP to POP. Control plane may refer to the components within a single overlay network, or across multiple overlay networks depending on the context.

The term "customer" as used herein includes an entity (e.g., enterprise, multi-service provider (MSP), etc.) that is billed for MCN services and controls one or more tenant networks.

The term "data plane" as used herein includes the collection of components within the MCN that directly handle packet forwarding and delivery based on the rules provided by the control plane. Data plane may refer to the components with a single overlay network or across multiple overlay networks depending on the context.

The term "egress destination" as used herein includes that portion of a route that enables tenant traffic be delivered from the MCN to the correct location (e.g., an egress destination is typically tied to an egress POP).

The term "encapsulation" as used herein includes the process of adding headers to a packet in order to have it processed or forwarded by network entities in a specific way. Decapsulation is the process of removing the headers added during encapsulation so that the original packet is restored. GRE, IPsec tunnel mode, and VxLAN are all protocols that perform encapsulation.

The term "ingress attractor" as used herein includes that portion of a route that enables tenant traffic to arrive at the MCN (TIPs and VIPs are examples of ingress attractors).

The term "jitter" as used herein includes the measure of latency variation within a single flow or probing system.

The term "latency" as used herein includes the measure of the time delay between when a packet is sent from one point and when it is received at another point.

The term "latency variation" as used herein includes the change in the latency between two points over time.

The term "link", also referred to as "network link", as used herein includes a physical means of connectivity between two locations (e.g., POPs).

The term "link state" as used herein includes a numerical description of the state of a link.

The term "management plane" as used herein includes the collection of components within the MCN that handle provisioning of control planes and data planes, collecting network statistics, and providing a user interface for customers and tenants. The MCN of an embodiment include one management plane but is not so limited.

The term "MODE Core Network" (MCN) as used herein includes the collection of components and interfaces that make up the MODE service.

The term "managed service provider" (MSP) as used herein includes an entity that resells network devices and services to enterprise customers. An MSP may control multiple tenant networks, which it may assign to its customers.

The term "overlay network" as used herein includes a set of components that provide connectivity between POPs such that packets can be identified separately from those on other overlay networks using the same underlay network.

The term "Point of Presence" (POP) as used herein includes a geographic location that contains components of the MCN.

The term "Round-Trip Time" (RTT) as used herein includes the measure of the time delay between when a packet is sent to another entity and its corresponding response is received, and is typically twice the latency between two entities.

The term "route" as used herein includes a tenant-controlled service that specifies one or more ingress attractors and egress destinations.

The term "route destination" as used herein includes an egress destination without any indication of the specific egress POP.

The term "routing" as used herein includes the process of selecting among two or more pathways for the item(s) to travel through the network.

The term "site administrator" or "site admin" as used herein includes a user role that gives permission for someone to manage all aspects of the MCN.

The term "split ratio" as used herein includes selection of which packets or how many packets follow which path through which nodes of the network.

The term "tenant" as used herein includes the entity that controls one or more routes in a tenant network.

The term "tenant network", also referred to as "network", as used herein includes an entity whose network traffic is isolated and tracked in aggregate for management, reporting and billing an MCN customer.

The term "traffic" as used herein includes IP packets that arrive from or are delivered to the Internet and potentially traverse the MCN.

The term "underlay network" as used herein includes a set of components and links that provide connectivity between POPs such that packets can be delivered from one POP to another and potentially to/from the Internet.

The term "utilization" as used herein includes the ratio of the current bandwidth to the capacity across a defined interface point, such as a link.

The term "virtual gateway", also referred to as "Orca", as used herein includes a gateway controller configured per-tenant, per-network, per-route with ingress attractions, ingress bandwidth limitations, and valid egress destinations. Orca identifies per-tenant, per-network, per-route, per-flow packets and the associated egress destination, and isolates and forwards packets according to the identified parameters.

The term "Virtual IP address" (VIP) as used herein includes an IP address where bare traffic arrives and is mapped to a specific egress destination.

The term "virtual isolation" as used herein includes isolation between tenant networks that prevents modification of packet identification by a third party while packets are en route across the network.

The term "virtual link" as used herein includes virtual connectivity (layer 2) between POPs configured as a component of the overlay network and uses the underlay links for packet delivery.

The term "virtual router", also referred to as "Dolfin", as used herein includes a controller configured to identify per-tenant, per-network, per-route, per-traffic class, per-flow packets and the associated objective functions, and forward the packets based on the objective function to the correct/best virtual link for delivery to an egress destination. Dolfin is also configured to receive per-link metrics or statistics and state for use with the objective functions.

The term "virtual watchdog", also referred to as "Watchdog", as used herein includes a monitoring agent configured to measure per-virtual link statistics, determine link status for all virtual links in a POP, monitor health of Dolfins, deliver data of link statistics to Dolfin, and deliver data of Dolfin health to other MCN components.

Embodiments described herein provide a software-defined core network (SD-CORE) configuration that brings the value of software-defined infrastructure to the network core. In so doing, the SD-CORE, referred to herein as Mode Core Network (MCN), offers the reliability of hardware-defined networks, with the flexibility and elasticity of the cloud in setup, management, bandwidth, transparency, and use. The MCN includes a global overlay, over other networks, which comprises an edge compute network formed in partnership with multiple service providers. The MCN is configured for side-by-side use with MPLS and Internet to realize an autonomous private backbone that complements any enterprise Software Defined Wide Area Network (SD-WAN) deployment while remaining affordable.

The MCN includes routing algorithms that automate traffic routing on each node of the network. The routing algorithms are based on a novel characterization of network traffic dynamics in mathematical terms that includes the use of characteristic equations to define traffic flows in packet-switched networks. The majority of performance degradation such as latency variance in Internet traffic happens in the core, so the MCN changes networking by using the math-based algorithms to replace traditional routing at layers 2 and 3 of the Open Systems Interconnection (OSI) model, and in so doing delivers the theoretical limit of high performance. Further, the MCN is configured to provide closed-loop control for packet-switched networks that quickly adapts to dynamic traffic changes (e.g., jitter, latency, cost, utilization, etc.) without prior knowledge by intelligently shifting traffic in milliseconds, dynamically adjusting to network changes and traffic flows. The routing efficiency enabled by the MCN therefore provides an affordable SD-CORE for cloud access, remote access, site-to-site, SD-WAN, Unified Communications (UC), UC as a service (UCaaS), Iaas, Paas, SaaS, and ultra low latency (ULL) applications, to name a few.

Embodiments of the MCN described herein include systems and methods for global control and optimization of data traffic through or in networks including software-defined networks. The MCN comprises numerous nodes placed in data centers across the world and interconnected using private leased lines to form an overlay network that overlays another network (e.g., public network, private network in the form of private leased lines, etc.), referred to herein as an "underlay network". Components of the MCN are strategically placed in the best locations to provide connectivity to tenants and service application providers across the world. The cloud acceleration realized with use of the MCN provides seamless, accelerated connectivity to tenants from any location, including branch offices and/or distributed or remote locations. The term "tenant" as used herein includes enterprises, clients, customers, and corresponding sites and service applications, to name a few, but is not so limited as it includes all entities and persons using the MCN for routing data traffic.

Each node of the MCN is configured to host a number of virtual machines (VMs), and the MCN optimizes the flow of data traffic in a wide area network (WAN) by configuring the VMs to provide alternate routing in addition to the conventional routing of the underlay network provider. A node running the VMs is referred to herein as a point of presence (POP) server, or POP, and each POP supports traffic of multiple tenants using computing elements dedicated to each tenant. The system of POPs is configured to manage or control data flow by routing data between data origination and destination points via the overlay and underlay networks as described in detail herein.

The MCN includes unique routing algorithms configured to virtualize the network and use multi-path routing of data traffic, thereby providing the best application experience for cloud connectivity at a relatively lower price. The improved experience of these embodiments includes but is not limited to more reliable and consistent throughput, improved network metrics (e.g., latency, jitter, packet loss, throughput, utilization, etc.), unified policy management and accessibility from a remote location, and geographical redundancy and/or independence for access to cloud resources.

The routing algorithms of the MCN are configured to control routing of traffic flows on a hop-by-hop basis by determining at each node a "least cost" path for the next hop. The lowest cost path is determined based on one or more link metrics such as packet loss, jitter, latency, throughput, and utilization as described herein. Traffic routing is then continuously and iteratively adjusted throughout the network, including when the input traffic pattern and network state are not changing. The routing algorithms adjust or reroute traffic as the system iteratively adjusts traffic routes to track the optimal operating point for the network, but is not so limited.

The MCN is configured to provide optimization for all applications accessed via the MCN, irrespective of the tenant location from which the MCN is accessed. The connectivity to such service applications is seamless to users, so they are not required to change the way in which they currently access the service applications, and yet be able to get the best possible user experience accessing such resources (e.g., IaaS, PaaS, SaaS, UCaaS, etc.).

FIG. 1 is an example block diagram of the MCN overlay network, under an embodiment. The overlay network includes a number of POPs coupled to intercommunicate to form the MCN. In this multi-tenant configuration, each POP of an embodiment is configured to support multiple tenants. Each POP generally includes multiple sets of VMs as described herein, and each set of VMs instantiates a set of MCN components configured to correspond to and support a tenant of the POP. Each set of MCN components is configured to control the routing of traffic of its corresponding tenant via the overlay network and utilizing links of the underlay network.

The couplings to each POP comprise the couplings or connections (e.g., Internet) from/to the corresponding tenants. The couplings of each POP, which couples or connects to all other POPs of the overlay network, also include virtual links comprising multiple independent tunnels, each of which corresponds to a tenant supported by the POP. Routing of data traffic via the network therefore generally involves receiving input data at an ingress POP, also referred to as an ingress attractor, from a corresponding originating tenant or source, routing the data via the network to an egress POP, and sending the data from the egress POP over a last mile connection to the egress destination that corresponds to the intended recipient of the data.

Figure 2A:
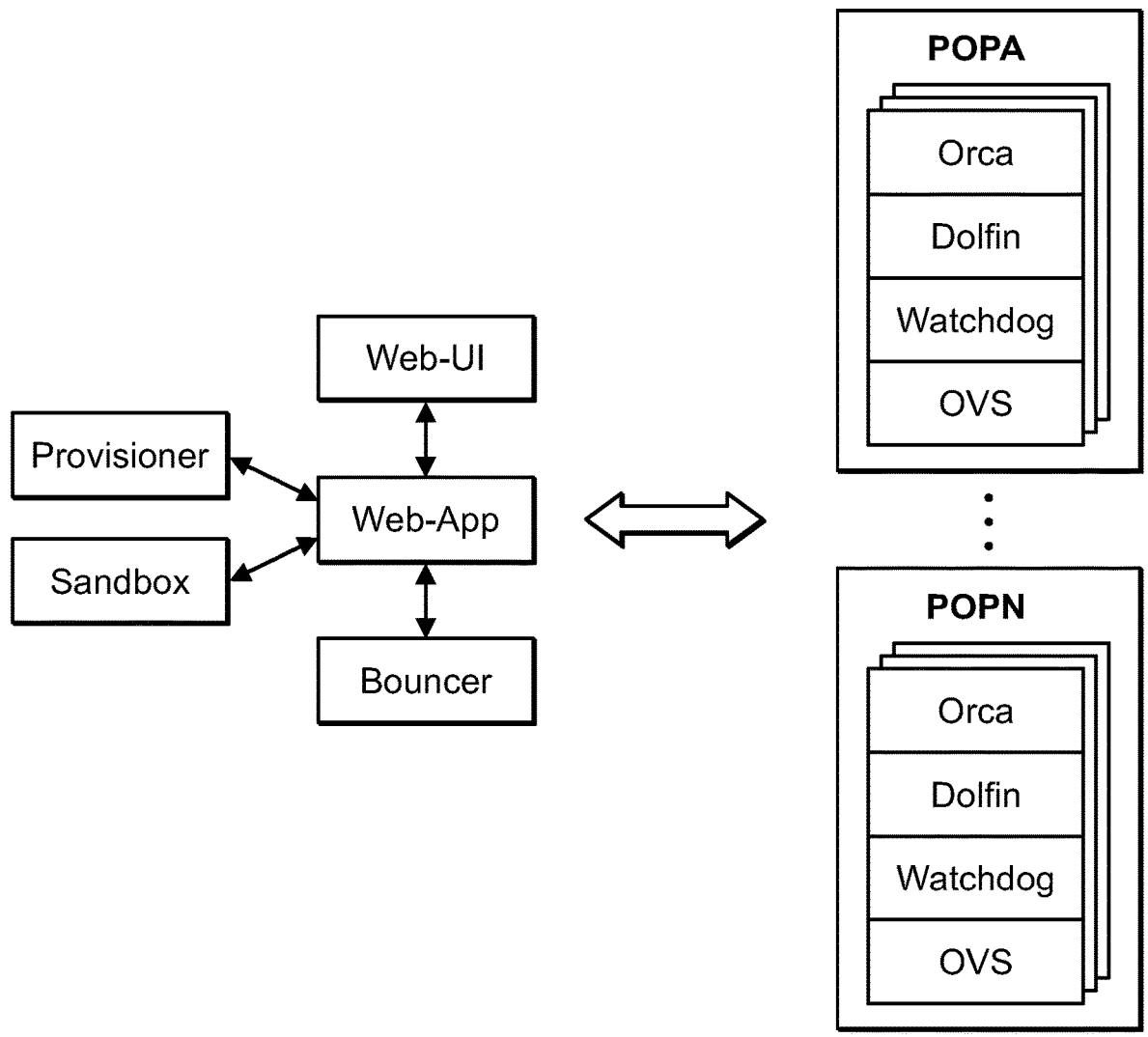
FIG. 2A is a block diagram of MCN components, under an embodiment.
Figure 2B:
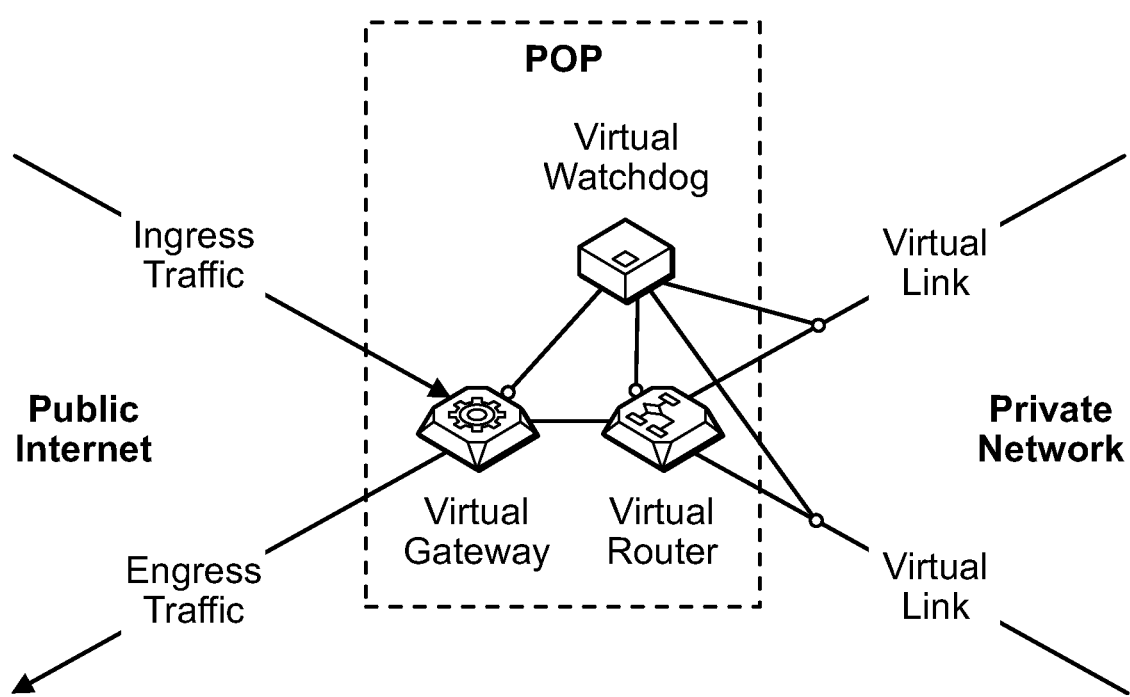
FIG. 2B is a block diagram of MCN components and their couplings or connections to the public Internet and other POPs (Points of Presence) of the MCN, under an embodiment.

Each POP includes a set of computing elements corresponding to each tenant, and each set of computing elements includes instances of a set of MCN components configured to support a corresponding tenant of the POP. FIG. 2A is a block diagram of MCN components, under an embodiment. FIG. 2B is a block diagram of MCN components and their couplings or connections to the public Internet and other POPs (virtual links) of the MCN, under an embodiment. The MCN components include multiple sets of VMs deployed per tenant at each POP, and each set of VMs instantiates a set of MCN components comprising one or more instances (per tenant) of an Orca, Dolfin, Watchdog, and Open Virtual Switch (OVS). Orca functions as a gateway controller ("virtual gateway") for ingress/egress traffic of a tenant to/from the MCN via the public Internet. Dolfin is configured as the controller ("virtual router") that, along with the OVS and corresponding flow rules, routes traffic to/from other POPs of the MCN via the virtual links. Watchdog ("virtual Watchdog") is configured as a monitoring agent to collect link metrics of the virtual links of the MCN. Each of these MCN components is described in detail herein.

In addition to the components hosted at each POP, the MCN components include components that form the management plane of the MCN. The management plane components, which are coupled to the MCN components of the POPs, include but are not limited to tenant-facing web user interfaces (UIs) (WEB-UIs), the web application (WEB-APP), a Bouncer configured for role-based user access, and a provisioner configured to manage configurations of the MCN components as well as other network resources. The MCN also includes components configured for monitoring the health of MCN components and logging data of the monitoring (not shown), along with data stores configured to support the MCN components, as described in detail herein.

Figure 3:
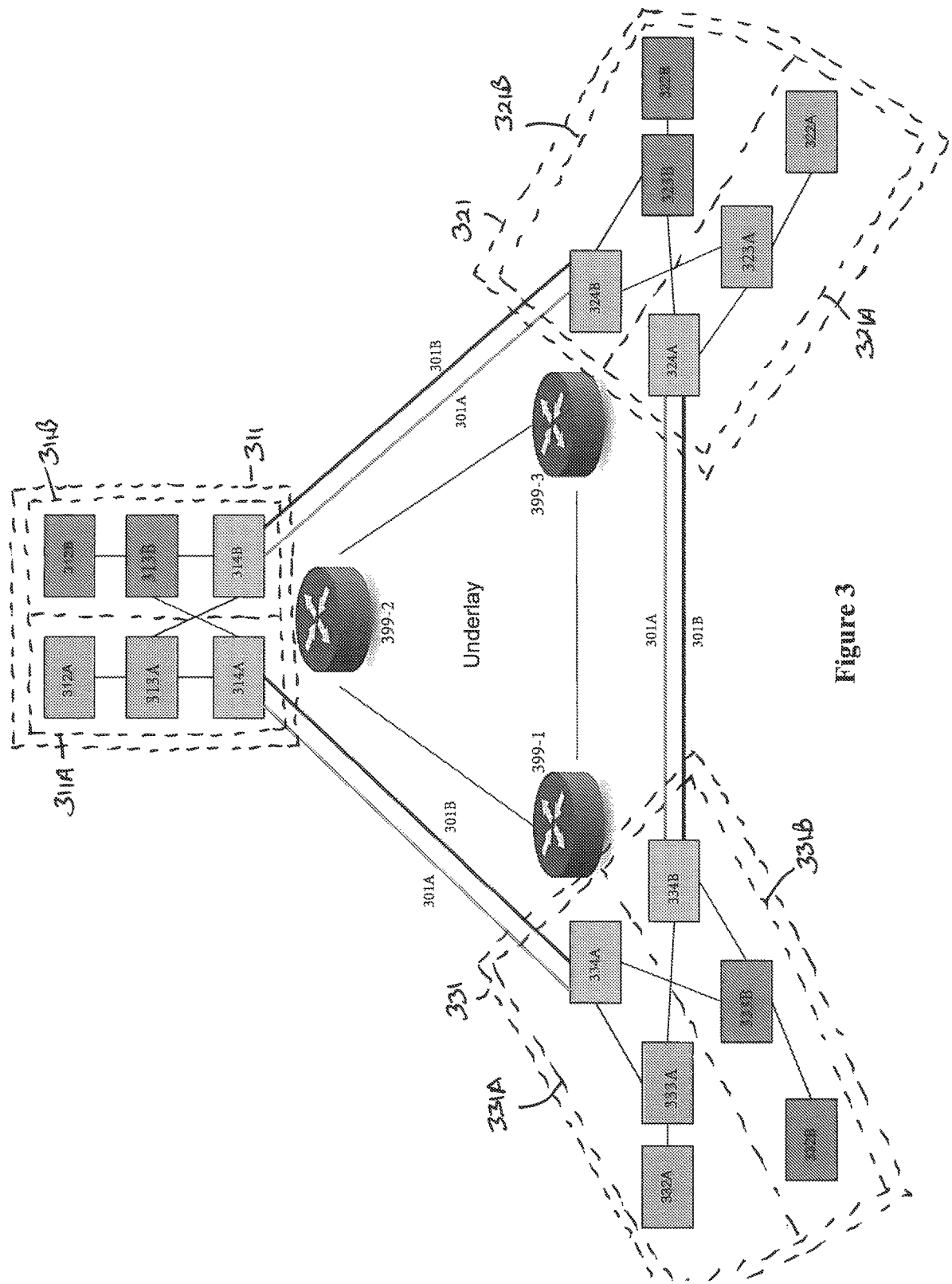
FIG. 3 is a block diagram of an example composite network 300 including the MCN components of the overlay network 301-334 provisioned over an underlay network 399 (collectively 399-1, 399-2, 399-3), under an embodiment.

The MCN comprises numerous POPs provisioned as an overlay onto an underlay network as described herein. FIG. 3 is a block diagram of an example composite network 300 including the MCN components of the overlay network 301-334 provisioned over an underlay network 399 (collectively 399-1, 399-2, 399-3), under an embodiment. The overlay network is independent from the underlay network, and is configurable to operate with any type of underlay network. The underlay network 399 of this example comprises a network including network nodes 399-1, 399-2, 399-3 provided by a corresponding ISP as described herein. While the underlay network 399 is represented in this example as including three nodes for purposes of clarity, it is understood that the underlay network 399 includes numerous nodes, routers, and other network components and resources not shown.

The overlay network of this example includes three POPs 311, 321, 331 coupled to intercommunicate to form the MCN. In the multi-tenant configuration of this example, each POP includes two VMs provisioned over the underlay components, and each VM is configured to control the routing of data traffic of its corresponding tenant. For example, a first VM at each POP is dedicated to tenant A and is configured to route data of tenant A exclusively between enterprise locations of tenant A (not shown). Likewise, a second VM is dedicated to tenant B and is configured to route data of tenant B exclusively between enterprise locations of tenant B (not shown). More specifically, POP 311 includes VM 311A supporting tenant A and VM 311B supporting tenant B, POP 321 includes VM 321A supporting tenant A and VM 321B supporting tenant B, and POP 331 includes VM 331A supporting tenant A and VM 331B supporting tenant B.

The overlay network is further configured to include a dedicated tunnel or virtual link between each VM of a tenant to provide virtual isolation between tenant networks, such that the combination of the VM components and their respective tunnel support multi-tenancy by maintaining separation of multi-tenant traffic throughout the network 300. Therefore, in this example, tunnel 301A supports traffic routed between tenant A VMs 311A, 321A, 331A, and tunnel 301B supports traffic routed between tenant B VMs 311B, 321B, 331B.

The number of tenants supported with the overlay network is horizontally scalable by increasing a number of VM instances at a POP, and each tenant is configured to access each POP using its own IP addresses. While traffic is multiplexed in the underlying links, the MCN is configured as a multi-tenant network and therefore includes multiple independent tunnels (e.g., Virtual Extensible Local Area Network (VXLAN)) to separate the traffic between different entities. In further support of the multi-tenancy, the MCN is configured to isolate the control plane and data plane of each tenant. The MCN is also configured to optimize data routing and dynamically adapt routes per-tenant, per-hop based on link conditions.

Generally, at each POP, the VM corresponding to each tenant generally comprises an Orca, a Dolfin, and an aggregator configured to control the routing of traffic of that tenant. Therefore, in this example, the tenant A VM 311A at POP 311 includes an Orca 312A, a Dolfin 313A, and an aggregator 314A, and the tenant B VM 311B at POP 311 includes an Orca 312B, a Dolfin 313B, and an aggregator 314B. Likewise, the tenant A VM 321A at POP 321 includes an Orca 322A, a Dolfin 323A, and an aggregator 324A, and the tenant B VM 321B at POP 321 includes an Orca 322B, a Dolfin 323B, and an aggregator 324B. Also, the tenant A VM 331A at POP 331 includes an Orca 332A, a Dolfin 333A, and an aggregator 334A, and the tenant B VM 331B at POP 331 includes an Orca 332B, a Dolfin 333B, and an aggregator 334B. While each of the Orca, Dolfin, and aggregator are described in a general manner for purposes of clarity in this example, it is understood that each POP includes additional components per tenant as described in detail herein.

At each VM, the Orca, which is configured as a gateway controller, is coupled to a corresponding tenant via a WAN or public Internet. The Orca is further coupled to the Dolfin via the aggregator as described in detail herein. As a gateway controller, the Orca is configured to attract traffic to the MCN from tenants, and to operate as a virtual gateway for that incoming traffic. Each Dolfin, which is configured as a routing controller or virtual router, is coupled to other POPs of the MCN via the corresponding aggregator and a tenant tunnel of the underlay that corresponds to the tenant supported by the Dolfin. Incoming traffic from a tenant is received at the Orca, and then classified by the corresponding Dolfin. Further, identified traffic is routed under control of the corresponding Dolfin to the aggregator where it is placed into the corresponding tenant tunnel. Traffic addressed to the tenant arriving at the egress POP via the tenant tunnel is routed to the corresponding Orca via the aggregator, and the Orca is configured to send the traffic over the WAN "last mile" coupling or connection to the tenant.

The Dolfin corresponding to a tenant is configured to route the data traffic of that tenant using network information including the network topology data and the link cost data (function of link performance metrics such as utilization or latency). This network information is obtained using control traffic exchanged among the MCN components, as described in detail herein. The topology data, which is maintained at each Dolfin, includes a view of the overlay network for the corresponding tenant. Dolfin is configured to make routing decisions by determining the appropriate aggregator output port from which its traffic is placed on the underlay network, thereby avoiding the requirement for Dolfin to maintain knowledge of the tunneling via the underlay network.

Figure 4:
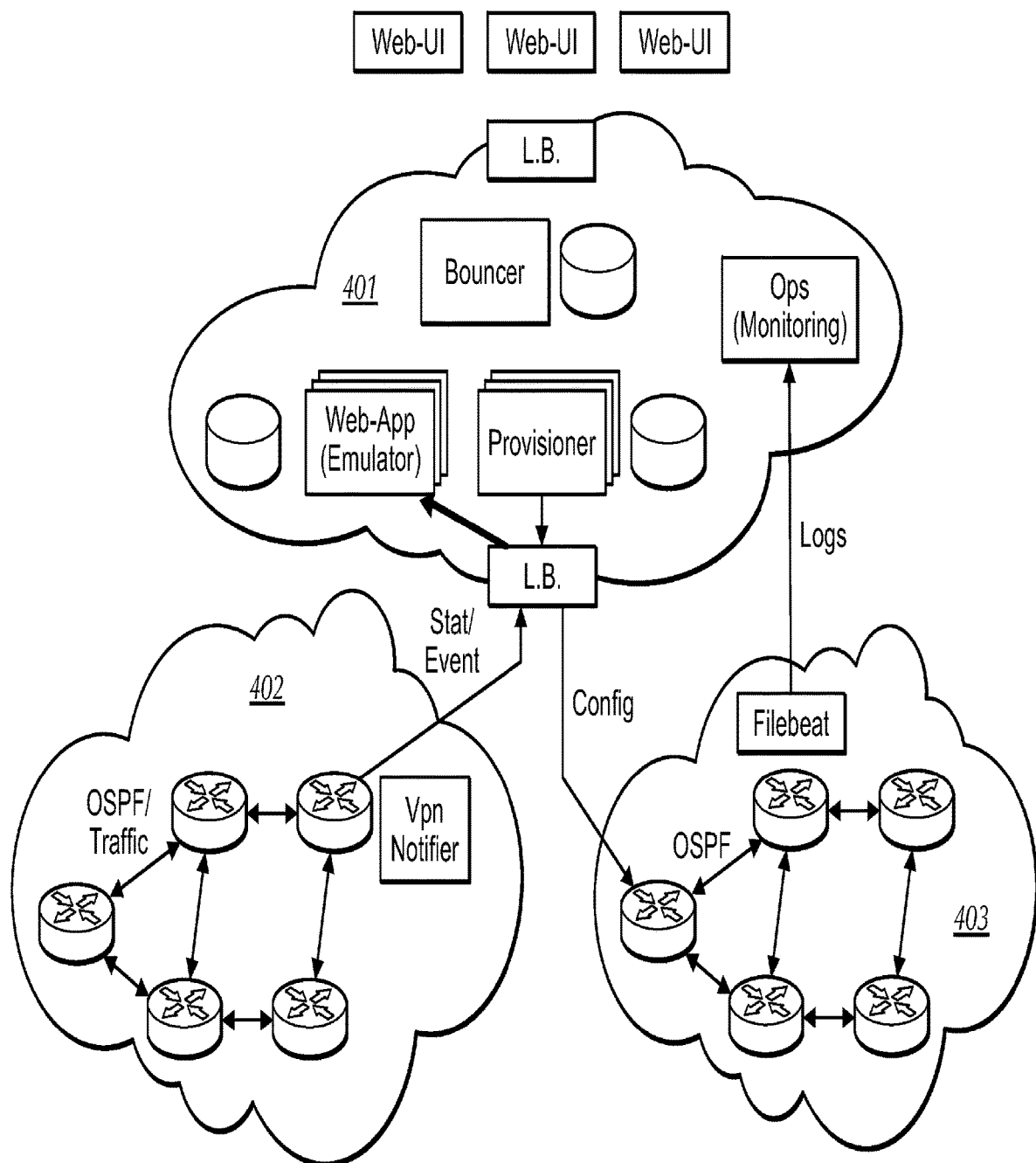
FIG. 4 is a block diagram of an example multi-cloud configuration including components of the MCN, under an embodiment.

More particularly, FIG. 4 is a block diagram of an example multi-cloud configuration including components of the MCN, under an embodiment. While the MCN of this example embodiment includes components distributed among multiple independent cloud environments, embodiments are not so limited. The first cloud environment 401 comprises components of the MCN management plane. The management plane components include but are not limited to tenant-facing WEB-UIs, the WEB-APP, Bouncer, provisioner, one or more load balancers (LBs), components configured for monitoring the health of MCN components and logging data of the monitoring, and one or more data stores or databases supporting the WEB-APP, Bouncer, provisioner, and monitoring/logging components.

The second cloud environment 402 includes an underlay network of a first provider over which MCN components are deployed to form a first overlay network. The MCN components comprising the first overlay network include a set of components deployed per tenant at each POP, and the set of components deployed per tenant include but are not limited to Orcas, Dolfins, Watchdogs, aggregators, and OVSs. The Orcas, Dolfins, and Watchdogs comprise the control plane, and the OVS comprises the data plane, but embodiments are not so limited as described in detail herein. The MCN overlay network components also include monitoring and logging components configured for monitoring the health of MCN components and logging data of the monitoring (e.g., Filebeat) as described in detail herein. The MCN overlay network components are coupled to the management plane components via a load balancer, but are not so limited.

The third cloud environment 403 includes an underlay network of a second provider over which MCN components are deployed to form a second overlay network. The MCN components comprising the second overlay network include a set of components deployed per tenant at each POP, and the set of components deployed per tenant include but are not limited to Orcas, Dolfins, Watchdogs, aggregators, and OVSs. The MCN overlay network components also include monitoring and logging components (e.g., Filebeat) as described herein. The MCN overlay network components are coupled to the management plane components via a load balancer, but are not so limited.

Figure 5:
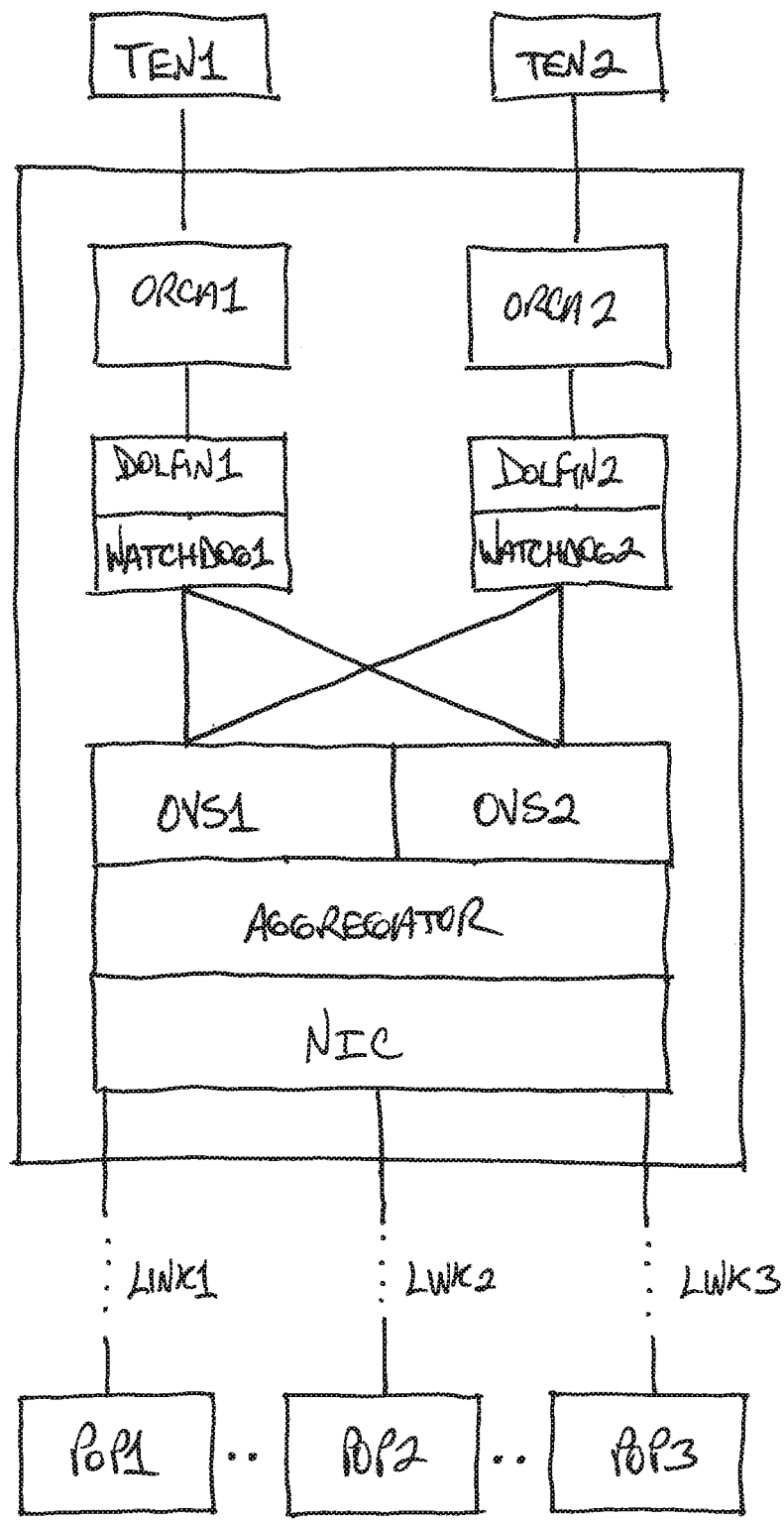
FIG. 5 is a block diagram showing components of a POP, under an embodiment.

The MCN comprises multiple POPs coupled via network links and forming an overlay network configured to exchange network configuration data and route data traffic of tenants, as described in detail herein. FIG. 5 is a block diagram showing components of a POP, under an embodiment. The POP of this example embodiment includes a software-enabled server coupled to support multi-tenant traffic routing of two tenants TEN1/TEN2 and other POPs or components in the MCN and/or WAN. In this example embodiment, the POP includes two Orcas ORCA1/ORCA2 configured to support each of two tenants TEN1/TEN2, respectively. The first Orca ORCA1 corresponding to the first tenant TEN1 is coupled to a first Dolfin Dolfin1, and the second Orca ORCA2 corresponding to the second tenant TEN2 is coupled to a second Dolfin Dolfin2. Embodiments are not limited to having an Orca dedicated to a tenant and instead may support multiple tenants using a single Orca.

Tenant traffic routing functionality of an embodiment comprises two components Orca and Dolfin in the control layer of the MCN. Orca is configured to transfer or pass tenant traffic from/to the tenant via the tunnel or last mile connection (e.g., public network, VPN, etc.), and from/to the MCN via the corresponding Dolfin. Each of the Dolfins Dolfin1/Dolfin2 includes a container (e.g., Docker container) configured to support each of the respective tenants TEN1/TEN2 but is not so limited. Each Dolfin is configured as a control agent and includes routing control algorithms, and generates the routing table of the POP. Each Dolfin is also coupled to a component configured as a monitoring agent and referred to herein as Watchdog (not shown).

Each Dolfin is also coupled to an OVS OVS1/OVS2, and the OVS couples or connects to the underlay network via an aggregator and physical links, as described herein. Embodiments include a rate limiter (output rate limiting) (not shown) dedicated to each tenant and configured to rate limit the data traffic of the corresponding tenant prior to transmission of the traffic over the MCN. The rate limiter is configured to determine the capacity of data handled (e.g., received, sent) by its corresponding tenant. Embodiments can include the rate limiter as a component of the OVS when the OVS is dedicated to a tenant, however alternative embodiments can rate limit the traffic elsewhere in the POP prior to the traffic reaching the OVS. In this manner the POP structure further supports multi-tenancy by rate limiting the access to network capacity by other components of the overlay network. Embodiments include cross-connections between the OVSs of a POP, and the cross-connections are configured so in the event of a failure of an OVS, at least one other OVS of the POP is configured to replace the functionality of the failed OVS.

While Orca is configured to control entry of traffic into the core network, Dolfin controls traffic routing and flow through the core network such that when each Dolfin receives packets, it controls the routing of those packets via the underlay network to another Dolfin in the core network. When the egress POP is reached, the Dolfin of that egress POP sends those packets to the corresponding Orca, which sends them to the egress destination via the Internet.

Each POP supports each tenant with a dedicated OVS, and the OVSs of each tenant couple to an aggregator. Each POP includes a hypervisor configured as its master operating system, and the hypervisor of an embodiment comprises the OVS configured to include the aggregator as described in detail herein. The aggregator is configured as an agent communicating with and controlling the POP switching fabric that includes the network interface card (NIC), which is the routing data plane of the overlay network. Consequently, as the connection or bridge between the overlay and underlay networks, the aggregator is configured as a software router managing the connections of the Dolfins to the underlay network via the NIC and POP outputs, and in this manner configures each POP to operate as a router.

The aggregator inputs include the outputs of the OVS instances hosted at the POP, and the aggregator output includes a physical link to the underlay network. The underlay network that links POPs includes multiple single-hop tunnels configured to separate the traffic of multiple tenants of the MCN and, similarly, the aggregator outputs from a POP include numerous ports corresponding to the tenants served by that POP. The routing of an embodiment therefore maintains separation between tenant traffic using single-hop links (e.g., VXLAN) over the tunnel that corresponds to the tenant.

Each Dolfin of the POP is configured to provide its data traffic to each aggregator, and each aggregator controls routing of its data traffic to neighboring POPs via the respective link to the neighboring POPs. More particularly, each aggregator receives an input from each Dolfin Dolfin1/Dolfin2 of the host POP, and is coupled to output data traffic to the network links as described in detail herein. Each aggregator is configured to control routing of the data of its corresponding tenant using information of a tenant routing table corresponding to the tenant. The tenant routing table of each tenant is generated by the corresponding Dolfin Dolfin1/Dolfin2 and maintained at data plane OVS elements of the corresponding Orca and Dolfin, where it is used as the routing table to control traffic routing, as described in detail herein. With this configuration, Orca is configured to manage incoming connections with the corresponding tenant and security, Dolfin is configured to manage routing of traffic, and the aggregator is configured to control virtualization of output links to the MCN, thereby realizing multi-tenancy at the aggregator layer through the use of aggregator configured to support each outside link of the POP.

Figure 6:
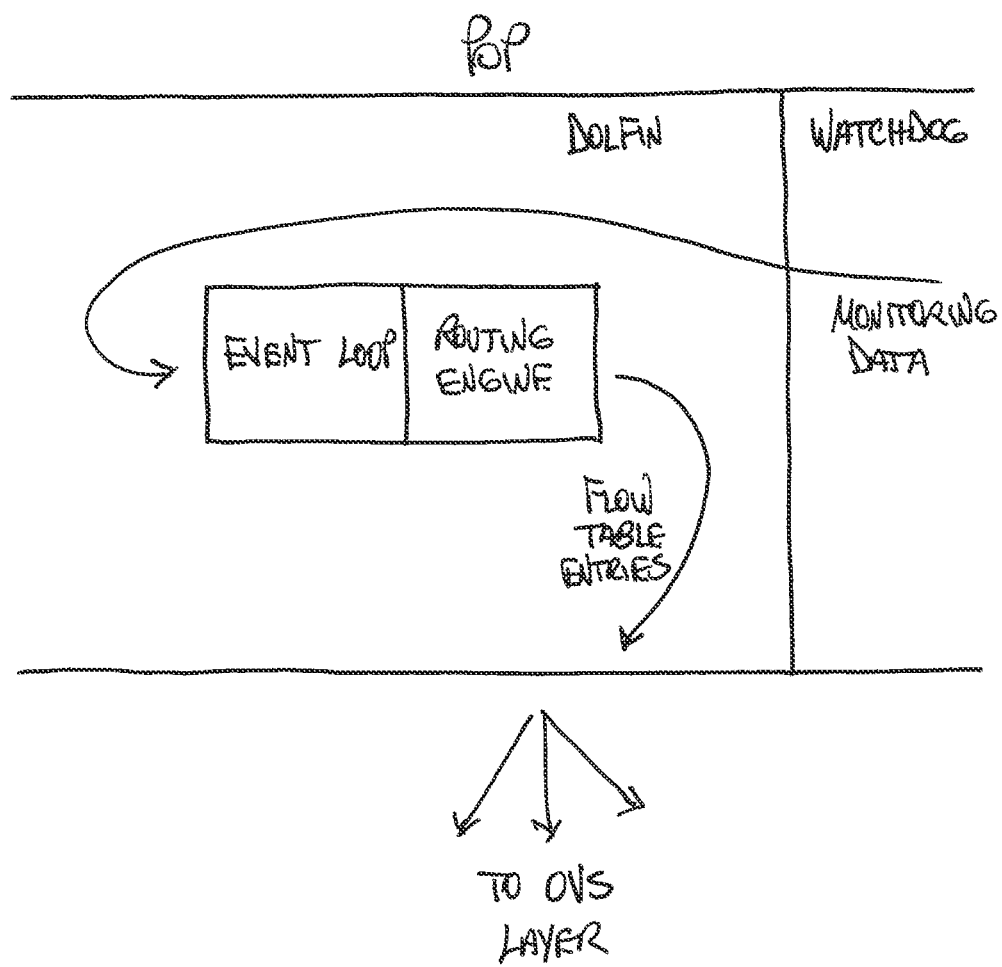
FIG. 6 is a flow diagram for operations of the Dolfin, under an embodiment.

Each POP includes, for each tenant, a Dolfin configured as a control agent, and a Watchdog configured as a monitoring agent as described in detail herein. FIG. 6 is a flow diagram for operations of the Dolfin, under an embodiment. Generally, the Watchdog collects link metrics data for its local links and provides the metrics data in turn to Dolfin, which operates to process the data and generate link state data. For clarity, this example shows a single Dolfin of a POP, but embodiments are not so limited as each POP includes a number of Dolfins corresponding to a number of tenants or tenants for which it routes data traffic.

Regarding communications between the Dolfin and the Watchdog, the Watchdog is configured to establish a TCP connection to the Dolfin during network provisioning or setup. Following establishment of the connection, the Dolfin receives a registration message from the Watchdog and replies to the Watchdog with a configuration message configured to define a tick rate and a timeout. The Watchdog continues to send the latest measurement data to the Dolfin at the defined rate through the established TCP connection. The Watchdog is configured to continue attempts to reconnect with the Dolfin if the connection is lost.

The Dolfin, which comprises an input/output (I/O) system or component, includes or is running an event loop. The event loop of an embodiment includes an event loop of the Open Network Operating System (ONOS), but is not so limited. ONOS is a framework configured to receive other software plugins, and an embodiment includes as a plugin a routing engine program or algorithm that controls real-time data routing through the MCN. The real time distributed autonomous feedback control system for data routing of an embodiment is referred to herein as Hop-by-hop Adaptive Link-state Optimal (HALO), and includes multiple routing behaviors as described in detail herein.

An input of the Dolfin includes monitoring information, including per-link metrics. The monitoring information is input to the Dolfin from the Watchdog, which is configured to collect and/or generate this information as described in detail herein. The input of an embodiment is provided to the Dolfin (from the Watchdog) at a rate (Delta t-monitoring) of approximately every 10 milliseconds (ms), but is not so limited. The Dolfin receives and writes ("fires") the input information into a single server at a rate (Delta t-control) of approximately 250 ms, but is not so limited as alternatives receive and write the input information at a rate of up to approximately 100 milliseconds. The durations described herein are exemplars only, and both Delta t-monitoring and Delta t-control values are tunable and can be changed as appropriate to a system configuration. An output of Dolfin includes flow table entries.

Upon receipt by the Dolfin of the link metrics data and, additionally receipt of link state information from other Dolfins in the MCN, the routing engine is configured to determine "best paths" for routing data based on policy or objective functions, as described in detail herein. Embodiments define the "best" path in terms of "distance" using available link state data and an objective function that corresponds to a traffic class of the data. Different link state data can be applied to different objective function types, resulting in numerous different definitions of distance, or "best path". For example, application of loss rate data to a corresponding objective function results in a best path that is a loss "distance", and application of latency data to a corresponding objective function results in a different best path that is a latency "distance". Thus, while link state based on each of the two different link metrics results in a distance-based path, the best path corresponding to each link metric is different. In an alternative embodiment, distance is defined using a combination of link metrics, in which case one or more weightings is applied to the link metrics.

The Dolfin "defines" distance ("best" or "shortest path") using the link state data received from the Dolfins of the MCN as applied to the objective function corresponding to the traffic class of the tenant. The routing engine determines or generates a route for tenant data, and the route is generated based on a routing policy or performance objectives corresponding to that tenant. The routing engine then pushes the generated route, comprising flow table entries, to the corresponding OVS. The OVS generates a routing table using the flow table entries, and uses the routing table to control routing of data over the corresponding POP link. Real-time rerouting of data involves generating and inserting or publishing new flow table entries corresponding to a new route. In alternative embodiments, the Dolfin can generate and push out/insert/publish routing data for multiple POPs, or routing data can be generated in one or more other components of the MCN.

Components of the MCN are configured to generate end-to-end route statistics or metrics and provide the metrics to the control plane. The POPs consider and therefore gather data (e.g., real-time, static, pre-specified intervals or periods, etc.) relating to numerous metrics when determining the state of network. As described in detail herein, each Watchdog is configured to probe or gather the monitoring data for links to which it is coupled or connected, but embodiments are not so limited. The POPs measure loss rate of each link at a pre-specified rate, and maintain an average or moving average of the measured loss rate over a period of time. The POPs also measure latency of each link in the network and, using the latency data, determine or calculate a latency variation, also referred to as jitter. When the POPs are routing data via the underlying public network (internet), embodiments measure or determine available bandwidth between points in the network. Link state data are collected or determined on a per-tenant basis, but are not so limited and could be collected per link regardless of tenant.

Figure 7:
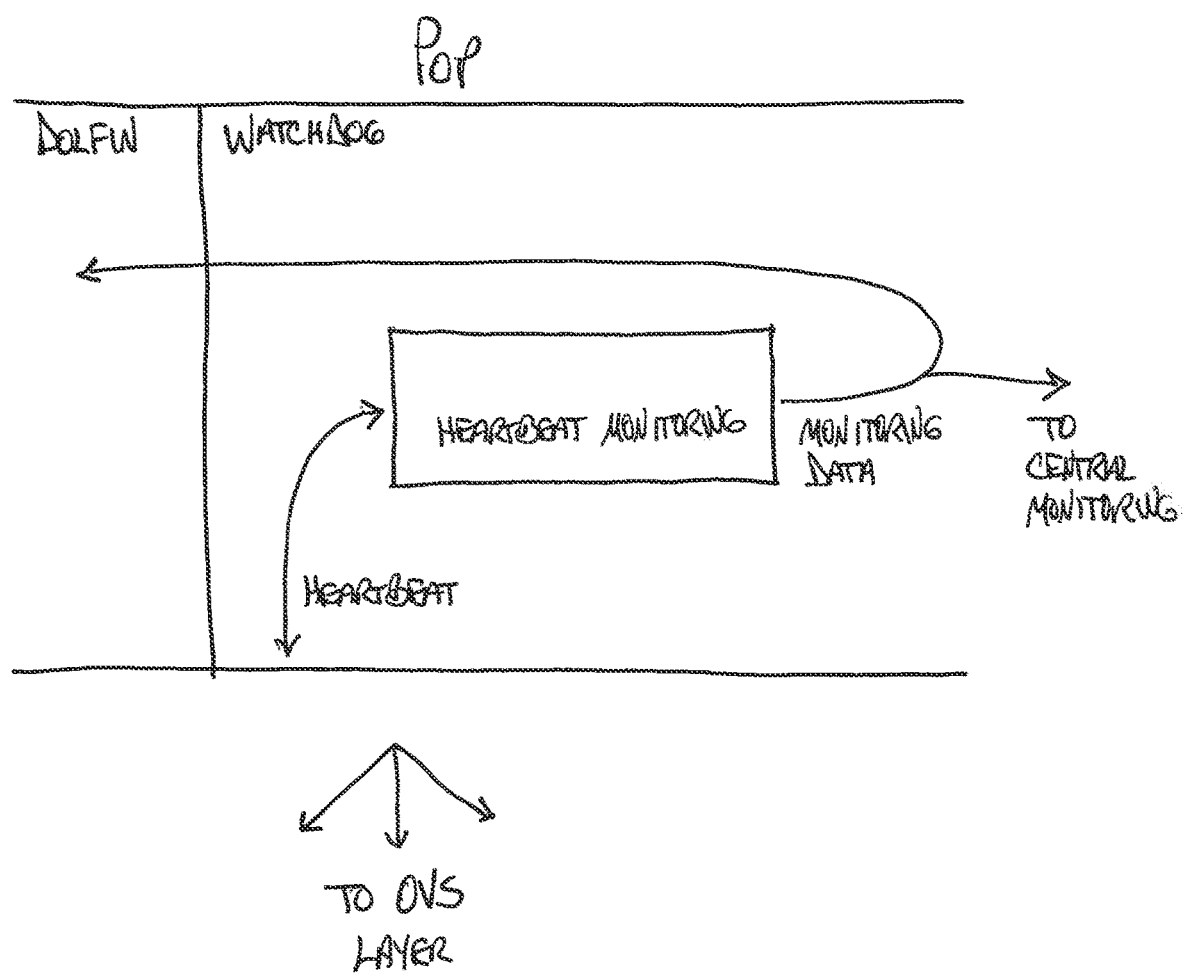
FIG. 7 is a flow diagram for operations of the Watchdog, under an embodiment.

FIG. 7 is a flow diagram for operations of the Watchdog, under an embodiment. For clarity, this example shows a single Watchdog of a POP, but embodiments are not so limited as each POP can include multiple Watchdogs corresponding to multiple tenants for which it routes data traffic. Therefore, while an embodiment can include a Watchdog corresponding to each tenant, an alternative embodiment can include a single Watchdog configured to support multiple tenants. Regardless of the Watchdog configuration, the output of the Watchdog includes link metrics (per link) related to corresponding link(s) and utilization, and is output to the corresponding Dolfin(s) and to central monitoring as described in detail herein. The central monitoring infrastructure of an embodiment is implemented using the ELK stack, also referred to as Elasticsearch, Logstash, and Kibana (ELK) stack, as described in detail herein, but is not so limited.

The Watchdog of an embodiment is plugged into or coupled to the aggregator, and configured to perform heartbeat monitoring across the overlay network assets. The heartbeat monitoring comprises sending or transmitting a heartbeat signal or packet at a pre-specified rate (Delta-t) across all connected links. The pre-specified rate at which the heartbeat signal of an embodiment is sent is approximately 10 ms, for example, but this rate is tunable and can be changed to alternative rate(s) as appropriate to a system configuration. The heartbeat packet is sent across a single hop and, in response, data regarding or representing latency of the link is collected and/or returned from the packet recipient. While the heartbeat signal of an embodiment is a single-hop signal, embodiments are not so limited and can include multiple hop packets that traverse and/or collect or result in return of data across multiple hops or links. As such, the Watchdogs throughout the MCN overlay are continuously sending and receiving packets corresponding to the links to which they are connected.

The Watchdog performs processing operations on the collected or received data. The processing includes data averaging (e.g., moving average, etc.) or smoothing routines, but is not so limited. One or more components of the processed data are provided to the Dolfin as described in detail herein. In an embodiment, the Watchdog is configured to push data to the Dolfin. Alternatively, the Watchdog is configured as an event-driven system that pushes data according to an event-response model. For example, latency data is pushed to the Dolfin by the Watchdog when the latency is determined by the Watchdog to exceed a pre-specified or pre-defined latency threshold or "event". The control plane (Dolfin) uses the link state data of each Watchdog to determine algorithmically the link metrics for the entire network.

To provide the per-link statistics in real time, embodiments are configured to monitor probe metrics continuously at a certain rate. The Watchdog includes parameters that define the tick rate and timeouts. The Watchdog sends data to the Dolfin at a specified tick rate, which is controlled by the Dolfin. The Dolfin is configured to change or update the tick rate by sending a configuration message to the Watchdog through the TCP connection.

The Watchdog is configured for relatively high-speed probing. An embodiment includes a dedicated processor running the Watchdog and controlling probing operations of MCN components. This probing container is separated from routing control and forwarding functions, both of which are performed by the Dolfin running under another dedicated container configured to control data routing and forwarding.

Further, computation operations of the corresponding Dolfin and packet management (input/output (I/O)) operations of the Watchdog are separated in an embodiment in order to improve system operation and reduce or eliminate the risk of system failure resulting from computational overload of either of these components. This POP configuration prevents a failure of the Dolfin in the event of a failure of the Watchdog. The Watchdog collects latency data using the heartbeat signals, and that information is in turn output to the Dolfin, which operates to process the data and generate link metrics data. In the event of failure of the Watchdog, the Dolfin continues routing operations using data previously received from the Watchdog.

Embodiments include a provisioner configured to manage configurations of the MCN components along with configuration of other network resources, as described in detail herein. In this role the provisioner is configured to control network provisioning involving the underlying infrastructures of the underlay network providers, and to control network configuration involving deploying MCN components to operate over the underlying network according to configuration parameters of the corresponding tenant. The provisioning of the underlay and overlay networks includes use of network configuration information provided by the tenants but is not so limited.

The MCN configuration of an embodiment provisions and configures the overlay network to operate independently of any underlying network or network assets. However, the MCN configuration, when operating in a public cloud infrastructure, does have some reliance on underlying networks of the public infrastructure for routing data. An issue that can arise is that initiating operations of and provisioning the network of an embodiment operating or running in a public cloud infrastructure can take significantly more time than when operating exclusively on dedicated private servers. This additional provisioning time is a result of the reliance on the public cloud infrastructure provider to provision and/or start up the infrastructure assets (e.g., APIs, VMs, rule setup on the backbone, etc.) in order to provide the underlying connectivity used by the overlay network. In order to avoid any significant wait-time, the provisioner of an embodiment includes or couples to a pre-provisioned queue of networks. Using this pre-provisioned queue, and in response to a user request for a network, embodiments initiate operations of the overlay network with a pre-provisioned network identified from the pre-provisioned queue. In this manner, embodiments minimize or eliminate any additional provisioning delay required as a result of use of public cloud assets.

In addition to the provisioner of an embodiment, the overlay network system includes a web application (WEB-APP) configured to include a tenant-facing web or web-based user interface (WEB-UI). While the provisioner initializes or configures components of the MCN as described herein, it is generally configured to provision the assets of the overlay network using information provided by an authorized user via the UI. The WEB-UI, which is generated by the web application and presented to a user, is configured to receive login credentials of an authorized tenant or user. At the first instance of tenant login, the WEB-UI prompts the user to name the network, and to input or specify network configuration information. The network is configured to use the configuration information or data, as described in detail herein. The MCN further includes a Bouncer that is configured to validate a user based on the login credentials by checking or determining permissions of an authorized user, and determining that the user belongs to an tenant group with authorization to access the overlay network.

A Bouncer of the MCN is configured to register users, perform authorization of users, and manage security and access to the MCN. The Bouncer is also configured to manage users, organizations, roles, permissions, and resources. Moreover, the Bouncer is configured to authenticate communications between the WEB-APP and other service users (e.g., Dolfin, Orca, etc.) of the MCN.

Further detailed descriptions of MCN components follow below. These components interact to provide a global autonomous private core network including global control and optimization of data traffic through or in networks including software-defined networks. Although the detailed description of these components includes many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Web User Interface

The system includes a web user interface (UI) (WEB-UI) that is configured as a web portal by which tenants configure and monitor their networks. In operation, a user logs in through their web portal to manage the network(s) of their organization and users, and navigates to the URL of the web portal. The system is configured to fetch an index file (e.g., from S3), and the web-UI is rendered from the index file. The WEB-UI interacts with a web application (WEB-APP), and with a load balancer, such that API calls and data rendered for the WEB-UI is exchanged between the WEB-UI and the WEB-APP. The WEB-UI, which in an embodiment is written in JavaScript using the Ember.j s framework, includes one or more plug-in components configured to render the pages of the WEB-UI, but is not so limited.

Following login by a user, the WEB-UI is served to the user from the content delivery network (CDN). The WEB-APP serves the base page to the WEB-UI upon login, and the base page crosslinks to the CDN assets. The WEB-UI makes REST calls to the WEB-APP via a live websocket coupling to the WEB-APP, and maintains the connection for pushing metrics. The various pages of the WEB-UI are subsequently displayed via REST queries to the WEB-APP, which displays the corresponding pages as appropriate.

The WEB-UI is configured for use in accessing live network metrics, historical network metrics, editing network topology (e.g., drag-and-drop), and providing alerts and notifications. The WEB-UI is also configured for use in managing tenant network assets including but not limited to organizations, users, networks, routes, alerts, notifications, traffic classes, and roles. The WEB-UI is further configured for use in accessing or working in the sandbox environment, and accessing an optimization tool configured to compute solutions comprising inputs including a demand matrix and topology matrix, and outputs including routing recommendation or distribution weights. This information is accessed via the WEB-APP, which is configured as an application gateway, API gateway, and authorization gateway configured to manage authentication and authorization between the WEB-UI and components that receive information input via the WEB-UI, as described in detail herein.

Embodiments include one or more of graphs, maps, and dashboards configured for presentation of network data via the WEB-APP. Live network metrics, which are accessed via a web socket connection, comprise network metrics such as packet loss, jitter, latency, throughput (per link, per traffic class), utilization, connection metrics, and link status. The metrics including jitter, latency, and throughput are provided from Watchdog through Dolfin, and the connection metrics, or metrics related to users connected to the MCN (e.g., number of connected users, number of live sessions), are provided by Orca, as described in detail herein. Historical metrics include aggregate data metrics/usage over a period of time (e.g., minute, hour, day). The WEB-APP is further configured as the ingest for control plane metrics and, as such, saves the control plane metrics to the data store, and pushes the metrics out to the live connections at a pre-specified interval (e.g., push-based per second, etc.).

The WEB-UI is configured to enable a user to manage organizations, users, networks, routes, traffic classes, alerts, notifications, and roles. Regarding management of organizations, the WEB-UI is configured for use in creating, updating, and listing organizations. Within a list of organizations, the user can sort organizations, get organizations, and mark organizations as favorites. The WEB-UI is configured to manage users, including listing, creating, updating, deleting, assigning and listing roles, sending emails (invite, password reset), sorting (on role), filtering, and searching.

The WEB-UI is configured to enable a user to manage networks, including provisioning or creating a new network, and listing networks. During the provisioning of a network, a user specifies network parameters like name and bandwidth via the WEB-UI. Network management via the WEB-UI also includes updating network capacity, and controlling dynamic capacity assignment as described herein. Network management via the WEB-UI includes enabling a user to access a network diagram or topology editor. The network topology editor includes a drag-and-drop interface by which a user can edit both operational and simulated networks. The editing functionality enables users to create nodes, name nodes, connect links between nodes, move nodes, delete nodes, and specify link capacity.

The WEB-UI is further configured to enable a user to manage routes, including listing, creating, deleting, and updating routes. Route management also includes but is not limited to enabling a user to specify route type (virtual private network (VPN) (secure sockets layer (SSL), Internet Protocol security (IPsec)), and cloud-based applications (Salesforce, Office 365, Workday), etc.).

The WEB-UI is configured to enable a user to manage traffic classes, which is a feature of the core routers (Dolfin). The management of traffic classes via the WEB-UI includes creating, modifying, listing, and deleting traffic classes. Embodiments also report traffic-related metrics by traffic class, as described in detail herein.

The WEB-UI is configured to enable a user to manage alerts through REST APIs with the WEB-APP. The management of alerts includes creating, modifying, updating, listing, and deleting. Additionally, the WEB-UI is configured to enable a user to manage notifications, including creating notification in the WEB-APP, and listing notifications in the WEB-UI.

The WEB-UI is configured to enable users to access and work in a sandbox environment of the MCN as described in detail herein. The sandbox, which is created using the network editor, is configured to enable users to run simulated networks, run simulated traffic (including providing live network metrics), run speed tests (on selected source/destination pair) and dynamically push throughput, and compare other network types with MCN. The sandbox of an embodiment uses the Mininet network emulator, but is not so limited.

In addition to the network views described herein as available via the WEB-UI, the WEB-UI includes a high availability view for access and use by site administrators. The high availability view includes a display of each VM, stack (Orca, Dolfin, Watchdog, etc.), and link for each physical location. This is in contrast to other views that consolidate the assets of each physical location into a single-asset view. In this manner, the high availability view provides a relatively finer-grained view for use in debugging, for example.

The WEB-UI is configured to enable users to access a matrix computation calculator. This calculator is configured to receive inputs comprising an adjacency matrix and demand matrix, and in turn to generate distribution weights.

The WEB-UI includes a disruptor UI configured for access by network administrators. The disruptor UI functions as the interface for a disruptor that is a submodule of the provisioner. The disruptor UI is configured to enable users to enable/disable HALO, bring links up/down, add latency and packet loss, inject traffic, turn on/off containers/components (Dolfin, Orca, Watchdog), and restart a POP.

Core Login Service

Figure 8:
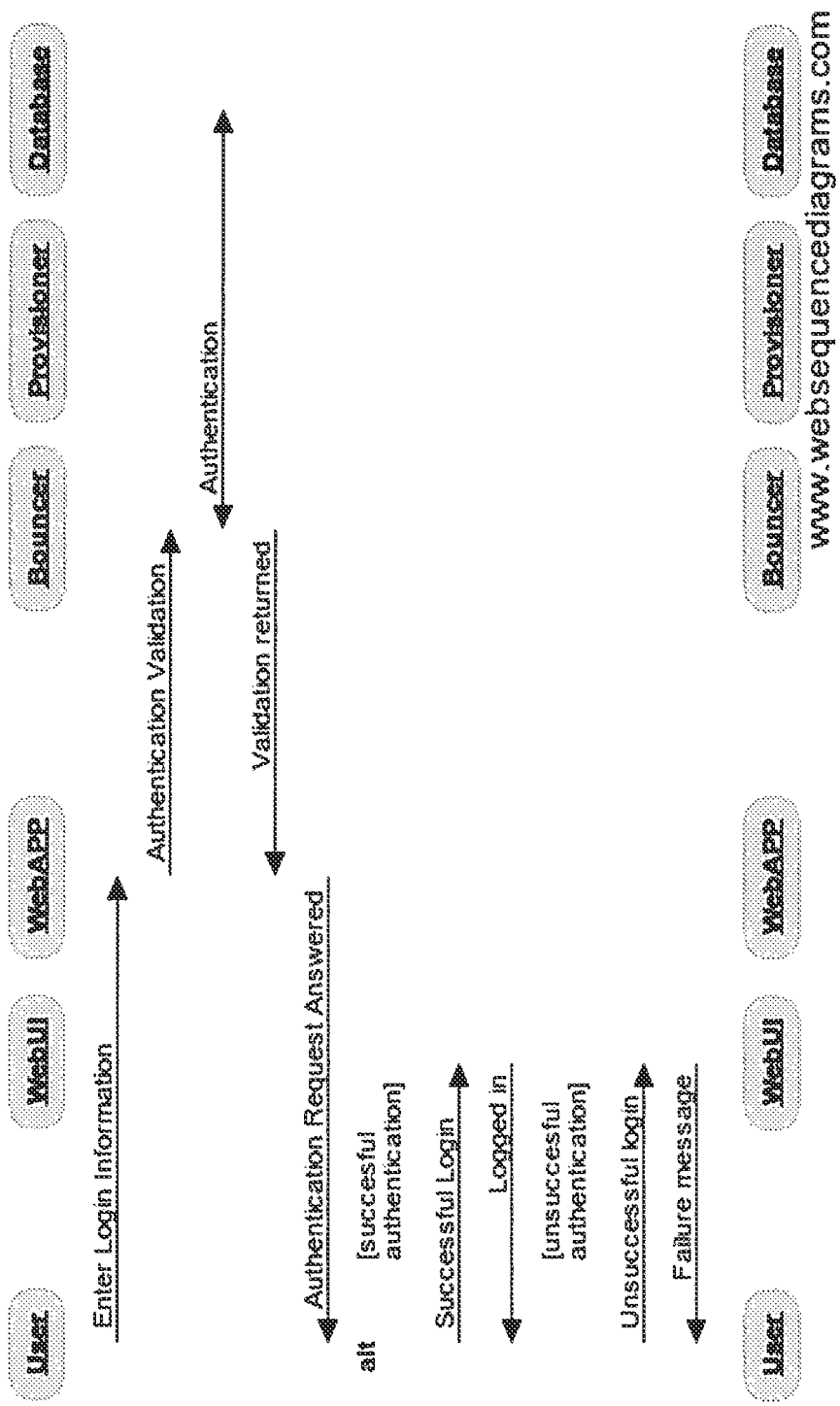
FIG. 8 is a flow diagram for log in and authentication of the MCN, under an embodiment.

The MCN is configured to include a web-based login service by which a tenant or user logs into the MCN to manage the network(s) of their organization and users, and navigates to the URL of the web. FIG. 8 is a flow diagram for log in and authentication of the MCN, under an embodiment. Once an end-user enters her credentials via the WEB-UI, she can gain access to make a connection through to her VPN server. Because of the transfer of credentials over the Internet, this service is HTTPS-based (e.g., HTTP and TLS) but is not so limited. Each POP includes and runs multiple copies of the login service, referred to as a service-pool, with a front-end load-balancer so as to provide high availability and fault tolerance in the event of a single POP being unavailable. This service-pool is multi-tenant, in that it is backed by a read-replica relational database management system (RDBMS) database instance comprising the end-user credentials for all the end-users of all the tenants.

The login service is configured for use by a tenant in provisioning end-user credentials so that the login service can authenticate against a list of pre-approved end-users. Further, the read-replica is configured to synchronize credentials with the main Bouncer database. The tenant administrator is enabled to set up end-user logins in the main Bouncer database and, once these logins are created, they are synchronized via a secure connection (e.g., TLS) to all the read-replicas in all POPs of the MCN.

When an end-user successfully authenticates with the login service, the service installs rules (e.g., Openflow) in the Orca of the ingress POP corresponding to the tenant. These rules only allow traffic from the source IP address detected by HTTP service.

The login service is accessible behind a well-defined, and pre-established domain name (e.g., https://login.modecore-.net/), which is geographically load balanced using DNS to send the end-user to the nearest geographic instance of the service-pool as described in detail herein. The login service is distributed in order to allow the user to authenticate her use of the MCN via the nearest geographic POP. In the event that a POP is unavailable, the health check for the POP will fail, and the DNS routing layer will redirect the user's login request, and subsequent VPN traffic to another POP.

While the login service end-user credentials of an embodiment are distributed to each POP in order to minimize latency when contacting a central authentication server, the service includes knowledge of the source IP address distribution of all incoming VPN connections. This information, along with enabling a source IP address firewall, reduces the attack surface of DDoS attacks on a tenant data-plane.

Web Application

The WEB-UI interacts with a WEB-APP of the management plane, as described herein. The WEB-APP includes an application server configured to serve and manage connections to the WEB-UI, and to control login, registration, and password recovery processes. Additionally, the WEB-APP is configured as an application gateway, API gateway, and authorization gateway to manage authentication and authorization between the WEB-UI and components that receive information input via the WEB-UI. As an example, the WEB-APP is an intermediary between the WEB-UI and the Bouncer for information regarding core network access. In another example, the WEB-APP is the intermediary between the WEB-UI and the provisioner for provisioning requests and related information input via the WEB-UI. The Bouncer and provisioner and their corresponding interactions are described in detail herein.

Figure 9:
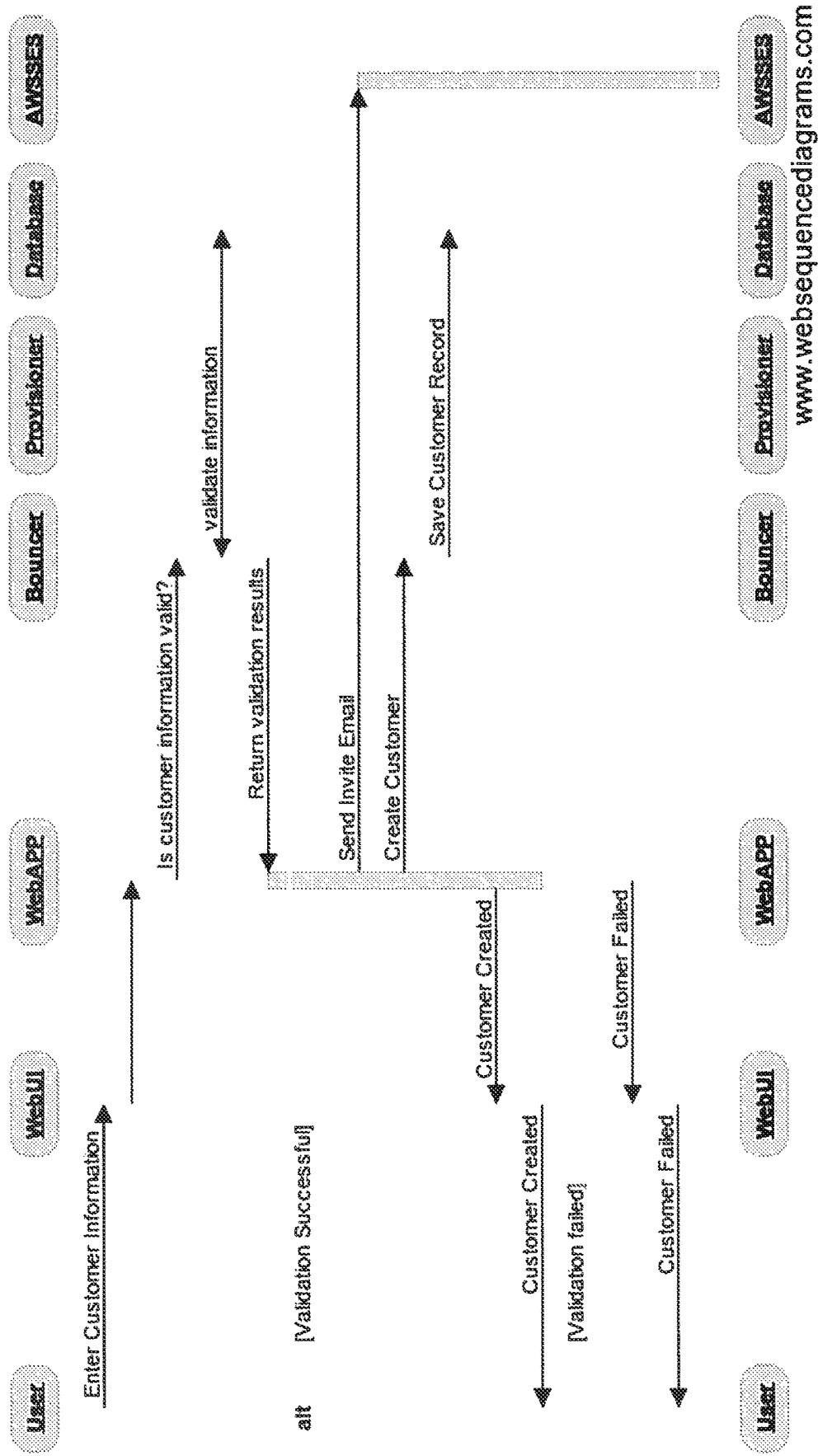
FIG. 9 is a flow diagram showing components and information flow for onboarding a new client, under an embodiment.
Figure 10:
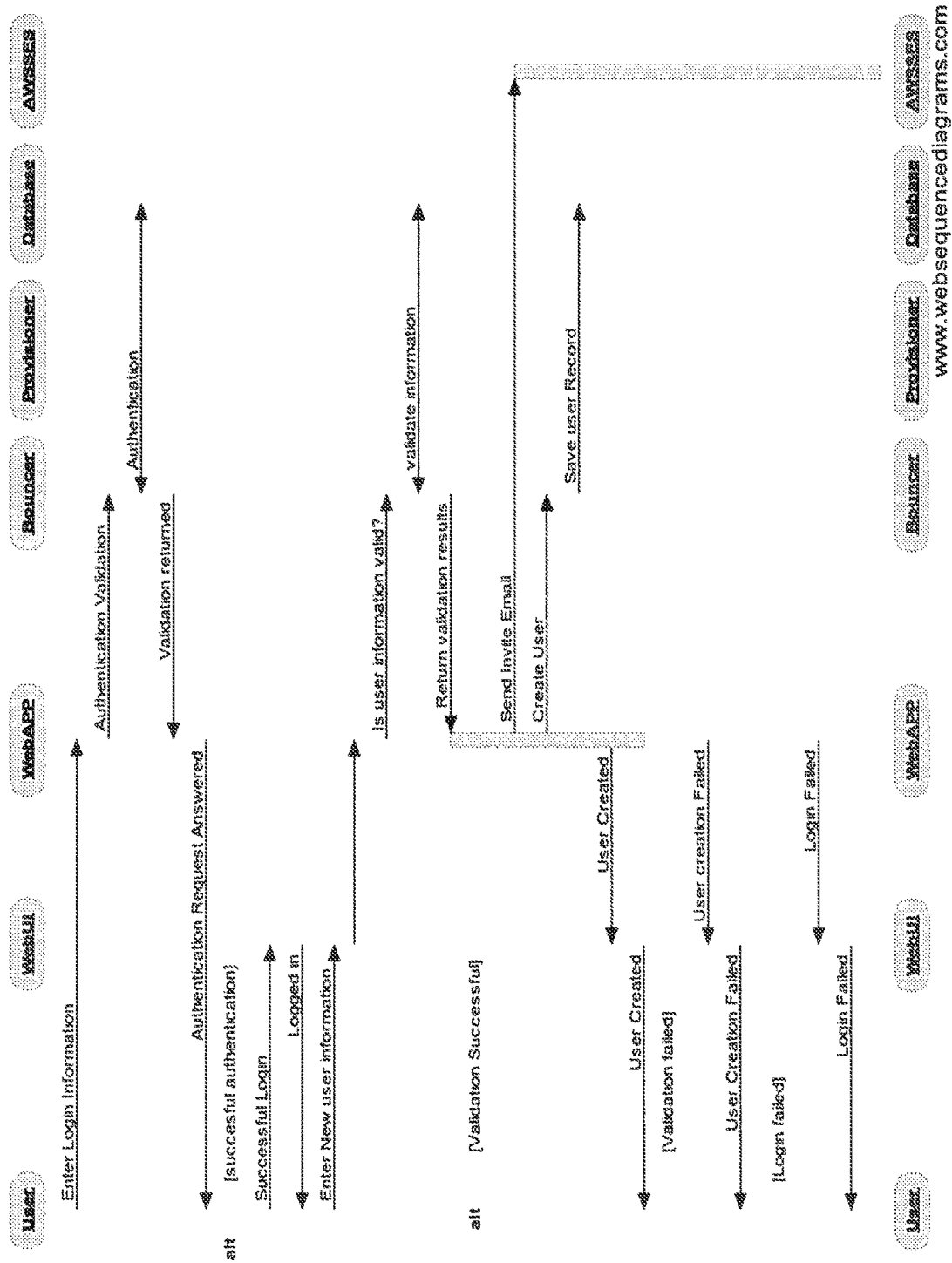
FIG. 10 is a flow diagram showing components and information flow for creating and inviting other uses in an enterprise, under an embodiment.

Additionally, the WEB-APP is configured to be the intermediary between the WEB-UI and other components of the MCN. For example, the WEB-APP is an intermediary in the process for onboarding a new client. FIG. 9 is a flow diagram showing components and information flow for onboarding a new client, under an embodiment. In another example, the WEB-APP is an intermediary in the process for creating and inviting other uses in an enterprise (tenant). FIG. 10 is a flow diagram showing components and information flow for creating and inviting other uses in an enterprise, under an embodiment.

The WEB-APP is also configured as a metrics service that receives and pushes network metrics to the WEB-UI. In this role, the WEB-APP receives and collects network metrics data reported by the Dolfins and Orcas of the MCN, and indexes the collected data in a corresponding database (e.g., Couchbase). Further, the WEB-APP manages connections to the WEB-UI (e.g., Redis) and pushes the metrics to the WEB-UI, which is configured to present the metrics to an authorized user via a dashboard, for example.

Additionally, because the WEB-APP is collecting network metrics data, it includes and manages an alerts engine that manages alerts (e.g., create, update, delete, etc.) and corresponding notifications. The alerts and notifications correspond to the link metrics as described herein. The alerts engine, upon receipt of an alert, determines if there is a corresponding notification and, if so, generates the notification and provides it to the WEB-UI.

Bouncer

Another component of the management plane, or middleware, is Bouncer, which encapsulates and centralizes the features of the MCN around authentication and authorization. In its role managing security and access to the MCN, the Bouncer provides an API (e.g., private facing, REST) to other MCN components accessing the service. In this role Bouncer performs all authorization, and stores a collection of all resource types and identification so that it can determine if users are authorized to execute operations involving the resources.

Bouncer encapsulates its data store for managing users, organizations, roles, permissions, and resources, and supports multi-tenancy with use of a relational database that includes tables for organizations, and for binding users to organizations, and roles to users. Bouncer is configured for use in creating organizations and, additionally, updating and listing organizations. Within an organization list the user can sort organizations, get organizations, and mark organizations as favorites.

Additionally, Bouncer is configured to register users and perform authorization of users. Further, Bouncer manages users, including managing creation, removal, and update of users and their related information, including creating new users, removing users, updating details of a user, returning a list of all users, returning detailed information about users, returning the roles associated with a user, adding a new role to a specified user, and removing a role from a user. Bouncer is further configured to use tokens for sessions with authenticated users, but is not so limited.

Figure 11:
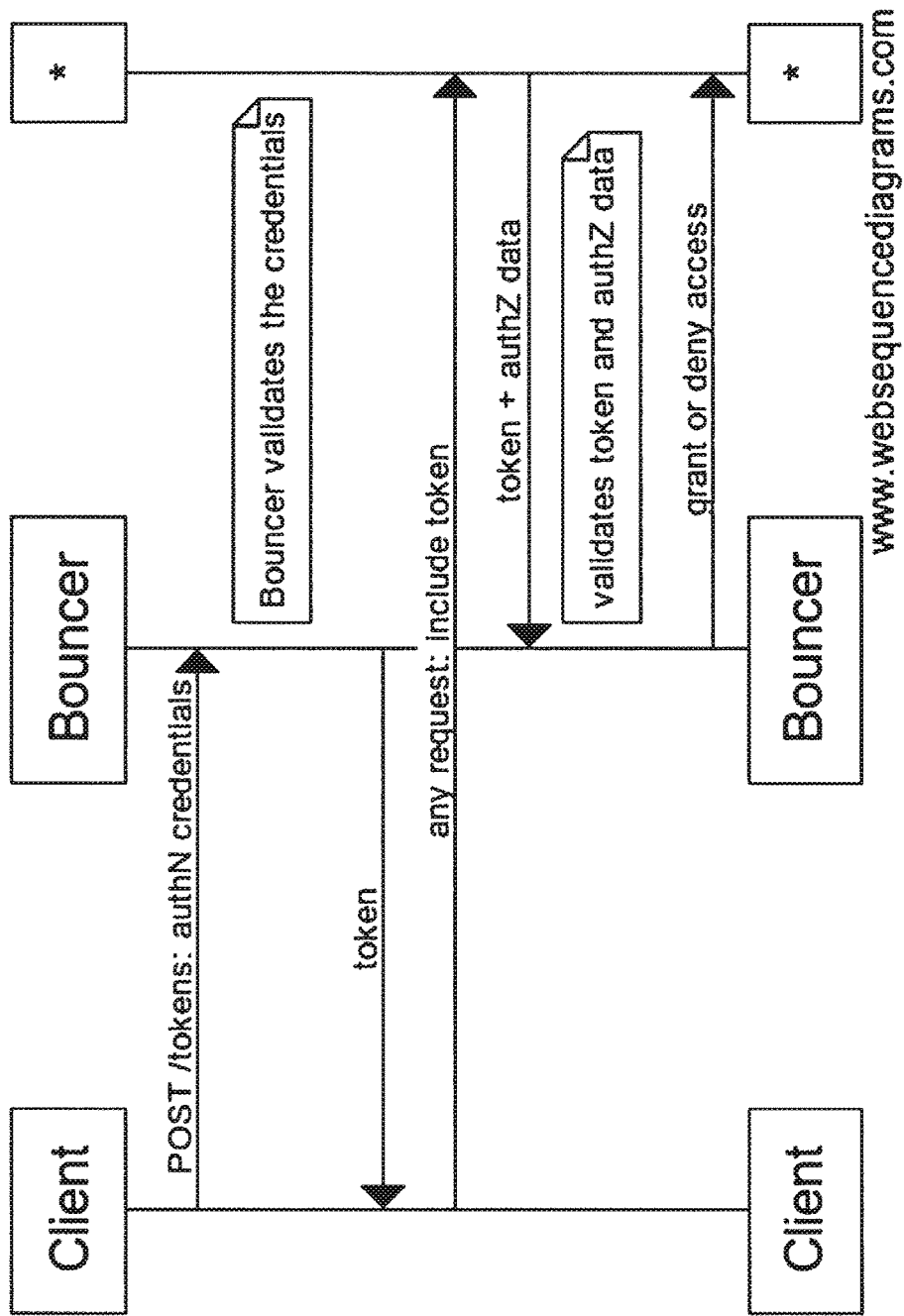
FIG. 11 is a flow diagram for an authentication of Bouncer including use of tokens, under an embodiment.

FIG. 11 is a flow diagram for an authentication of Bouncer including use of tokens, under an embodiment. Prior to any action, a user first requests a token from Bouncer. In response, Bouncer validates the user credentials, stores a token with some "session" information, and returns the token to the user. This token is used for any subsequent calls to the system. The token of an embodiment includes identification data, and can include one or more of user_id, organization_id (tenant_id), roles, permissions, expiration time, and audit_id, for example.

In addition to authenticating users, Bouncer also authenticates communications between the WEB-APP and other service users (e.g., Dolfin, Orca, etc.) of the MCN. In so doing, tokens are used between the WEB-APP and each service user needing to provide data to the WEB-UI via the WEB-APP. Embodiments cache these tokens at the WEB-APP in order to avoid overloading the WEB-APP with authentication requests.

Provisioner

Embodiments include a provisioner configured as the orchestration system of the MCN to manage configurations of the MCN components along with configuration of other network resources (e.g., underlay network components). In this role the provisioner is configured to control network provisioning and network configuration. Generally, the network provisioning operations involve the underlying infrastructures of the underlay network providers, while the network configuration operations involve deploying MCN components to operate over the underlying network according to configuration parameters of the corresponding tenant.

As the orchestration system, the provisioner controls the interplay between the management plane and the control plane to create or provision underlay networks. The provisioner also provisions or configures networks over ("overlay networks") the underlay networks by deploying (through APIs) components of the MCN (e.g., Dolfins, Orcas, Watchdogs) in the overlay network. The provisioner is further configured to create routes for existing networks, and to store data representing the underlay networks, overlay networks, and route configurations. Dolfins and Orcas communicate with the provisioner to receive information representing network configuration, routes, and traffic classes. The provisioner code of an embodiment is written in Python, and Ansible is used to run tables, but embodiments are not so limited.

Figure 12:
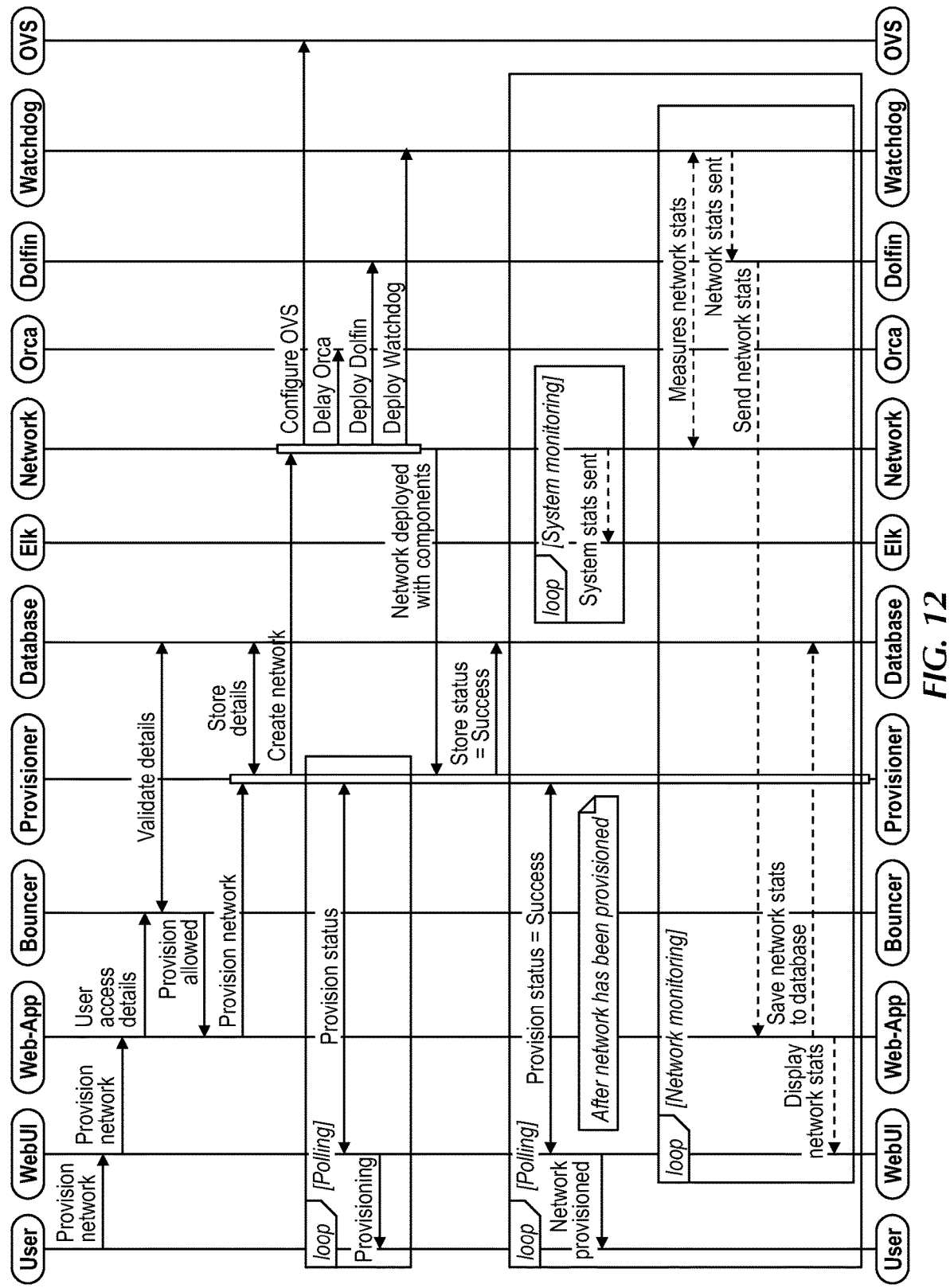
FIG. 12 is a flow diagram for network provisioning, under an embodiment.

FIG. 12 is a flow diagram for network provisioning, under an embodiment. The provisioning of underlay networks generally comprises interactions between the provisioner and one or more APIs in order to create networks. The provisioner identifies the cloud type and the topology, and controls network preparation in accordance with the identified type and topology. When a network is identified as being available and having a matching topology and the capacity for accommodating components of the MCN, then the provisioner uses the identified network for deployment of the components. If no such network is available, the provisioner uses its cloud-type specific API to request creation of a network. Following preparation of the network, the provisioner deploys the MCN components (e.g., bridges, containers, etc.) over the network. The network information or data is consolidated and stored in a network table.

The provisioner of an embodiment is configured to manage the network provisioning requests (e.g., creation, modification, deletion, etc.) of each tenant by provisioning (e.g., creating, modifying, deconstructing, etc.) networks in one or more cloud networks (e.g., Azure, Ericsson, etc.). Further, the provisioner is configured to deploy MCN components (e.g., OVS, Dolfin, etc.) in the provisioned network, test the provisioned network, and/or notify a tenant of the provisioning result (failure/success).

The provisioning of a network is initiated with a provisioning request API request) that is generated by a user at the WEB-UI, and provided to the provisioner via the WEB-APP. In response to receipt of the provisioning request, the provisioner analyzes the request to determine data of the cloud type requested for the network, network topology (e.g., number of locations, etc.), network capacity, and high availability factor (specifies if created network is to have the high-availability configuration). The provisioner next accesses its database (e.g., PostgreSQL), which includes data of the underlay and overlay networks, to determine if a provisioned underlay network is available.

If a provisioned underlay network is available, then the provisioner determines the remaining link capacity of this underlay network, and determines a number of overlay networks currently running over the underlay network. If the existing underlay network has adequate capacity to host a new overlay network, then the provisioner creates the new overlay network over the existing underlay network, adds the new overlay to the database, and provisions the MCN components (e.g., Dolfins, Orcas, Watchdogs) in the new overlay network. In contrast, if the existing underlay does not have adequate capacity, then the provisioner creates or provisions a new underlay network via an API of the underlay network provider API.

The provisioner is configured to provide private APIs (e.g., REST API) to the tenants, but is not so limited. The provisioner, which in an embodiment is a component of the middleware or management plane, also includes and/or is coupled to a data store at which it maintains data of provisioned networks, but is not so limited. More particularly, the MCN is configured to store at the provisioner multiple topologies for each tenant, along with a provisioning status file, a topology file, VPN profiles (routes in general), SD-WAN profile data (e.g., IPs/locations of CPE devices, access information for SD-WAN master director, etc.), error files for each topology, and an overall time recording file, to name a few. Because the provisioner maintains access to the clouds where networks can be provisioned, it also maintains corresponding cloud authentication information.

Regarding integration of the MCN with an SD-WAN, the provisioner is configured with a portal configured to access (with use of appropriate access credentials) and establish communication with an SD-WAN portal of an SD-WAN provider. Once communication is established, the provisioner is configured to provide information to the SD-WAN provider (e.g., identity of the MCN POP closest (geo-location) to the SD-WAN portal, method to contact the closest POP, etc.) via a template, and install the template at the SD-WAN CPE. Following installation the template is committed, which applies the MCN settings at the SD-WAN CPEs, thereby configuring the SD-WAN to communicate with the MCN via the closest POP.

Figure 13:
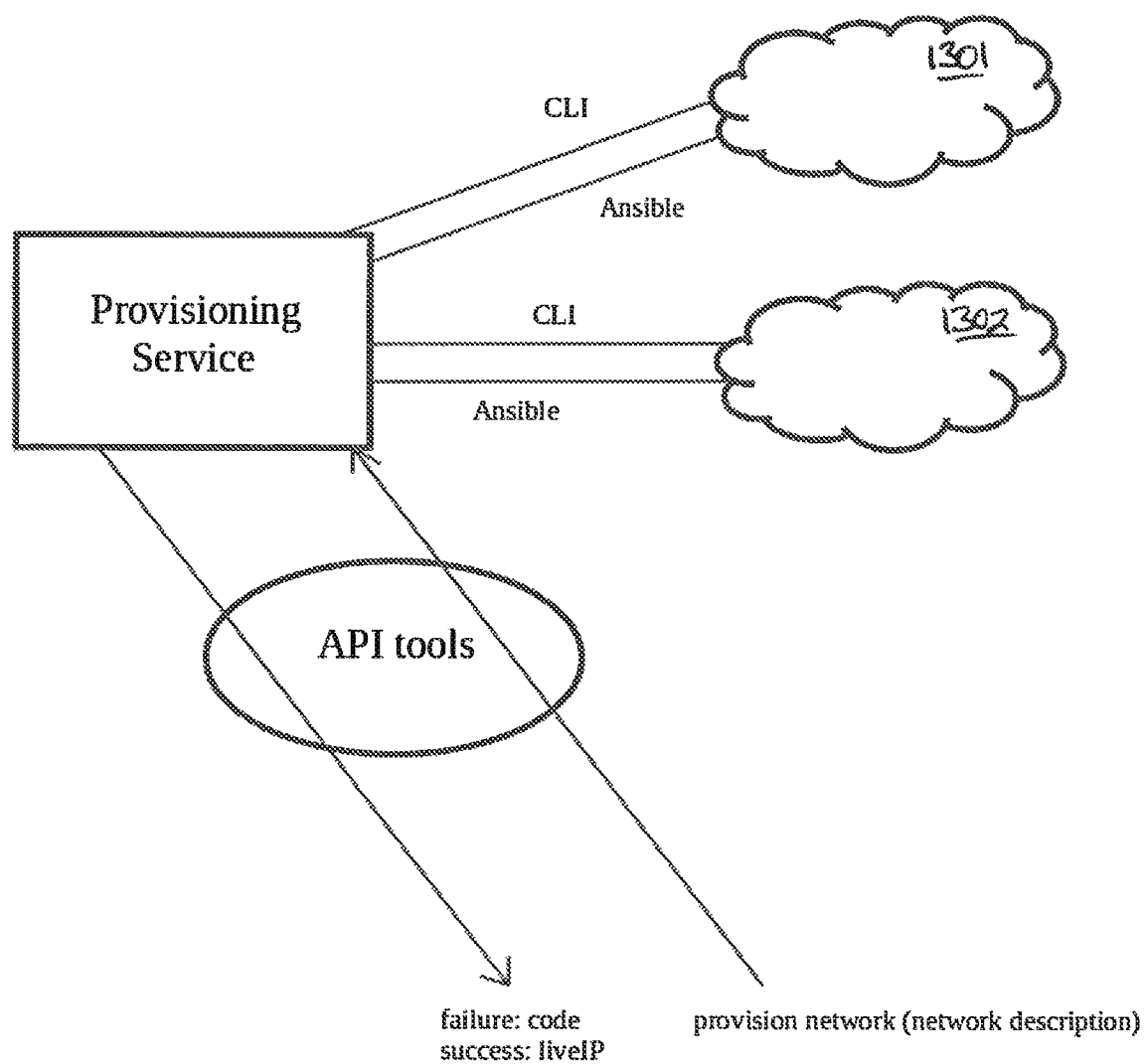
FIG. 13 is a flow diagram of a provisioning example, under an embodiment.

FIG. 13 is a flow diagram of a provisioning example, under an embodiment. The provisioner communicates with components of the middleware (not shown) via the API tools. This example shows the provisioner receiving via an API a provisioning request including a network description, provisioning networks in two different cloud networks 1301/1302 in response to the request, and returning via the API information representing a result of the provisioning, but embodiments are not so limited. The provisioning requests are generated by a user, or network administrator of the corresponding tenant. Embodiments include a load balancer and/or a queueing system for use in handling multiple provisioning requests, but are not so limited.

The provisioning request includes information about the network topology, type of cloud, tenant identification (ID), and network topology ID. The "provision network" request of an embodiment arrives in a form of a request (e.g., HTTP POST), and the body of each request includes a file (e.g., JSON) comprising the information necessary to provision the network (e.g., network_topology_id, tenant_id, cloud type, etc.), but embodiments are not so limited. The provisioner first checks its data store to determine if the provided network topology ID of the provided tenant ID already exists. This involves the API determining if a pre-provisioned network is available for immediate dedication to the requesting tenant. If there is an available pre-provisioned network, the API returns a message and/or code so indicating (e.g., "provisioned network available" with status code 200).

If a pre-provisioned network is not available, then the API starts a network provisioning process by checking if the network topology requested by the tenant has already been provisioned in response to a previous request, or was in error. This checking of network topology in an embodiment comprises checking for the existence of both the status file and the topology file as well as the content of the status file, but is not so limited. If only one of the two files exist, then it is categorized as an error, and the corresponding data is moved to a specific "error" folder and the provisioning is re-accomplished. If both files exist, and the status file indicates "SUCCESS" or "IN PROGRESS", then an error is returned, and the re-provisioning request is rejected. If both files exist, and the status file indicates "ERROR", then the current data is moved to an "error" folder and the provisioning is re-accomplished.

If neither of the two files is present, then the provisioner determines the requested topology has never been provisioned, and provisioning is initiated in response to the request. The provisioner generates a configuration file specific to the requested topology, including all variables used by the command line interface (CLI) command script of the requested cloud type. The provisioner executes the CLI commands for provisioning a network in the cloud specified by the request.

In addition to provisioning underlay networks, the provisioner configures MCN components over the underlay networks. Network configuration operations of the provisioner involve configuring MCN components by manipulating database models and creating, updating, and/or removing entries in those models and/or corresponding data tables in accordance with the user-specified configuration data. This user-specified configuration data includes traffic class and route configuration data, but is not so limited. The traffic class configuration data identifies traffic classes, and configures MCN behavior corresponding to each traffic class. The route configuration data includes data of the service the tenant traffic will access.

Configuration of the MCN components comprises the provisioner executing provisioning scripts, for example, for deploying MCN components in the provisioned network. The provisioner also executes test scripts to check that all necessary MCN components were successfully deployed, and that basic packet forwarding can be performed. The provisioner responds to the middleware with the provisioning status upon receiving the "status" GET request. The status returned includes but is not limited to "in progress", "failure" with a corresponding code or description, and success with a corresponding code or description, but is not so limited.

The provisioner maintains information of its underlay and overlay networks, and provides the information in response to a request. The WEB-UI is configured for use by a tenant to generate a request for information of networks corresponding to the tenant's organization, and the WEB-UI sends the request to the provisioner via the WEB-APP. The provisioner in turn responds by providing the requested network information via the WEB-APP, and the information is presented to the user via the WEB-UI.

Figure 14:
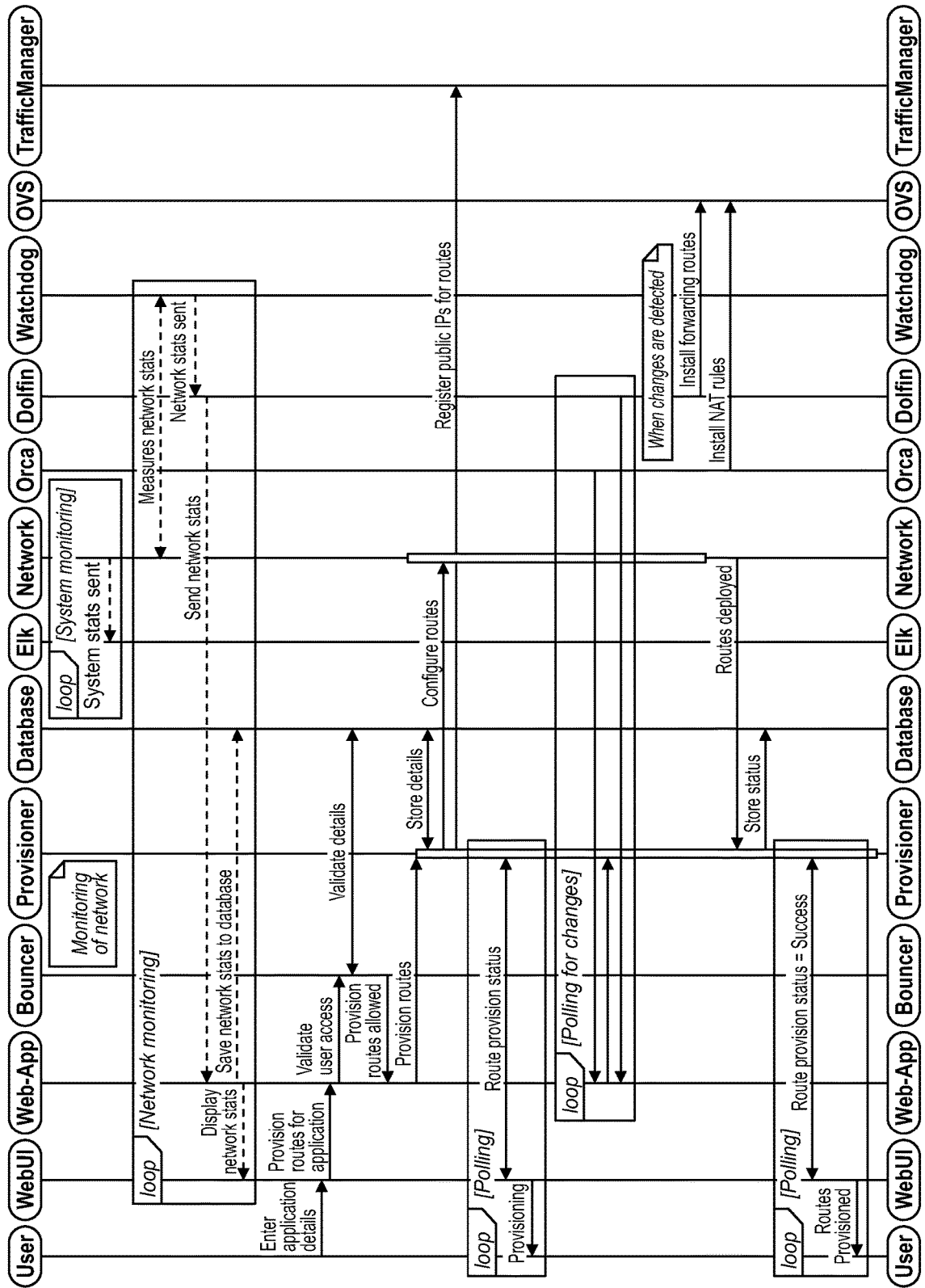
FIG. 14 is a flow diagram for configuring a network including setting up a route, under an embodiment.

Routes are created to attract tenant traffic, and the provisioner is configured to create the routes. In addition to creating routes, the provisioner is configured to change routes, delete routes, and store route information in its database for retrieval and use by other core network components. The WEB-UI is configured to include a page for route creation, and a user navigates to this page to create routes. To create a route, a user inputs a URL for a service application (e.g., Salesforce, SaaS, etc.) with which their organization has an account or exchanges data. The provisioner in turn creates a Canonical Name (CNAME) corresponding to the service application URL. The organization creates a CNAME entry in its local DNS server such that when a user in the organization inputs the service application URL, the local DNS server translates the input URL to the CNAME. The CNAME URL then redirects traffic to the ingress POP of the MCN instead of to the public Internet. FIG. 14 is a flow diagram for configuring a network including setting up a route, under an embodiment.

Figure 15:
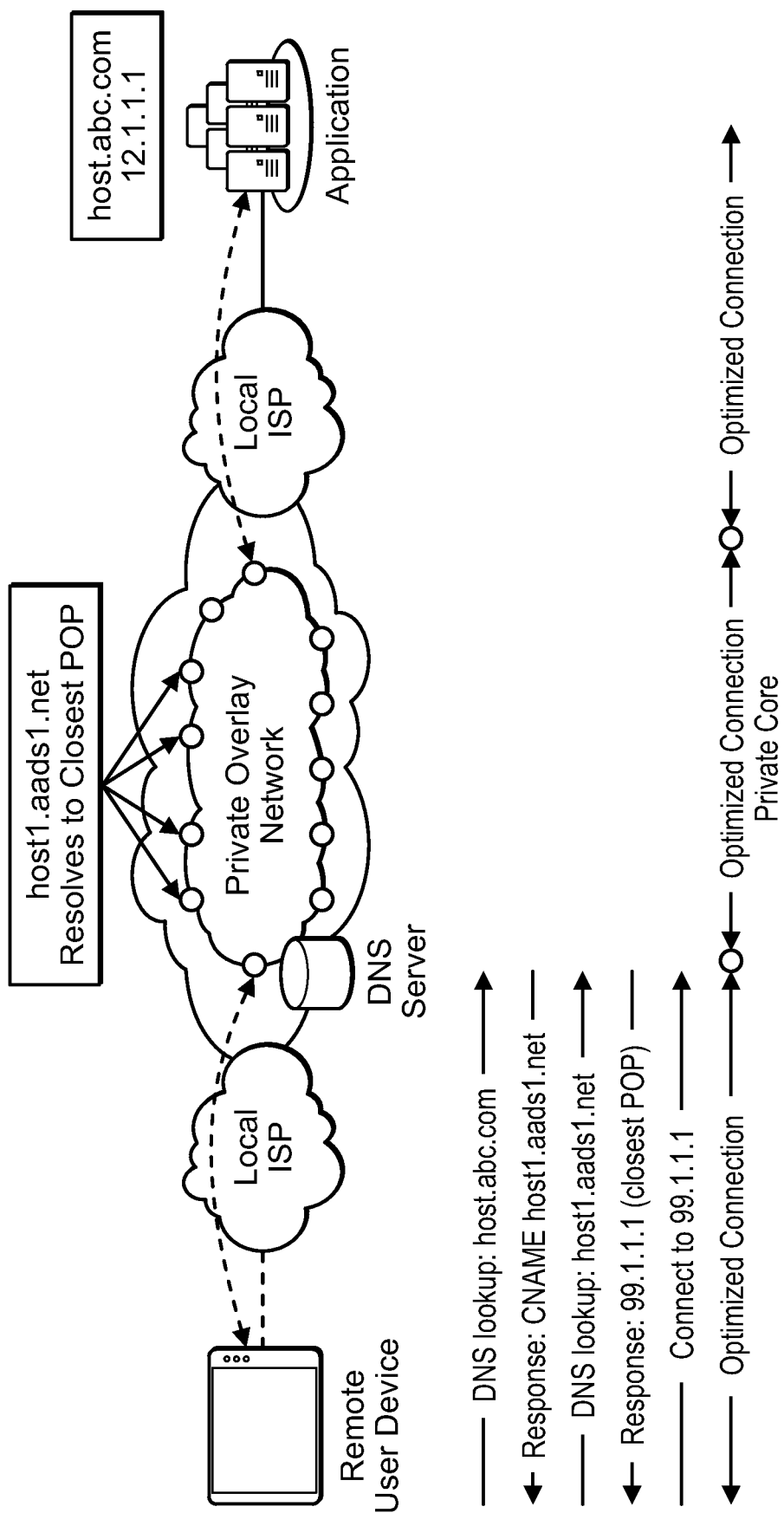
FIG. 15 is a flow diagram for a traffic flow example using DNS redirection, under an embodiment.

The MCN is configured to attract traffic to the POPs using this DNS redirection, thereby avoiding specialized route exchange mechanisms. For example, FIG. 15 is a flow diagram for a traffic flow example using DNS redirection, under an embodiment. A DNS server at the tenant site is updated with the CNAME record entry for a specific cloud-based service application, where CNAME records are used to alias one name to another. For example, the tenant of an embodiment sends a request to "host.abc.com" and the DNS server for the tenant is configured to change it to "client1-abc.mode.com" since the DNS server will have a CNAME record changed to "client1-abc.mode.com" for "host.abc.com." When the DNS query goes out, the DNS service at which the MCN is registered assists in redirecting the traffic to the correct ingress POP (based on the location). When the ingress POP corresponding to the tenant receives the traffic, it is configured to route the traffic to the egress POP corresponding to the public IP address for the egress destination service via the best possible path within the MCN. The egress POP then forwards the traffic along with the original tenant information to the egress destination service.

The ingress POP of an embodiment is the closest POP to the user, as described in detail herein. A cloud network traffic manager is used to determine the closest POP of an embodiment to serve as the ingress POP, but embodiments are not so limited. In so doing, the cloud network traffic manager determines the location (geographical) at which the request originated, and maps the traffic to a specific IP address of the POP nearest that location. Traffic from the user is subsequently routed to the ingress POP using the mapped IP address of the POP.

A scenario can arise where the traffic source is located in the same geographical region as the egress destination. Under this scenario, traffic may be more efficiently routed outside of the MCN. To optimize routing in this scenario, embodiments are configured to directly route the traffic to the egress destination server instead of routing it to the ingress POP.

Multiple components corresponding to each tenant are deployed at each POP, including Dolfins, Orcas, and Watchdogs. Each component is deployed in a container (e.g., Docker container), and has a corresponding version number. The provisioner includes APIs configured to track version numbers of the components, and to deploy a specific version number of each component on a specific network.

The provisioner communicates with WEB-APP, Dolfins, and Orcas. The WEB-APP communicates with the provisioner to obtain information about existing network resources. Dolfins and Orcas obtain from the provisioner information of network configuration, routes, and traffic classes for use in their operations. In so doing, for example, Orcas send a request for route information to the provisioner at some pre-specified frequency or interval and, in response, the provisioner reads the information from the database and returns the route information to the requesting Orca.

Figure 16:
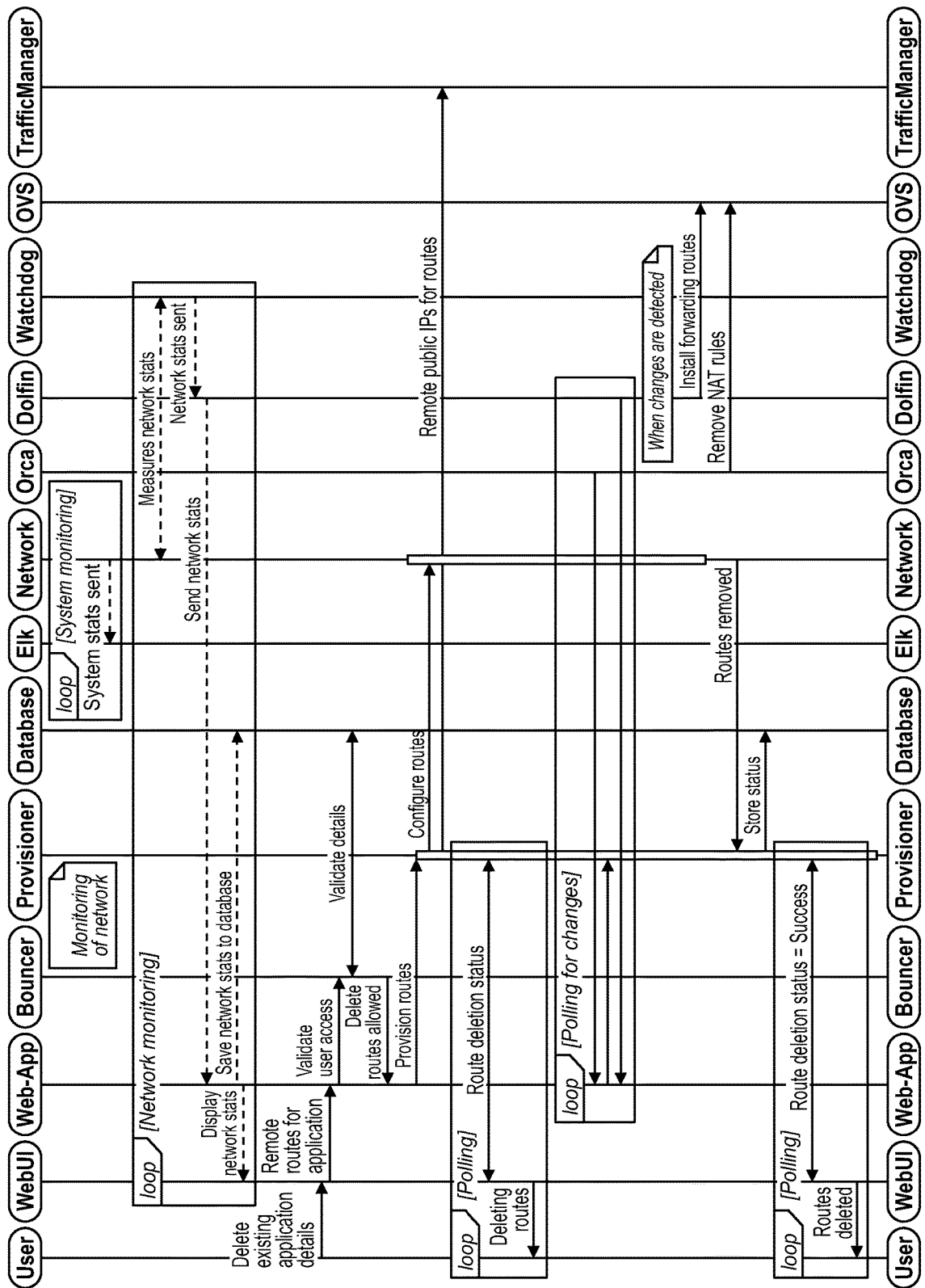
FIG. 16 is a flow diagram for removing network configuration data and removing routes, under an embodiment, under an embodiment.
Figure 17:
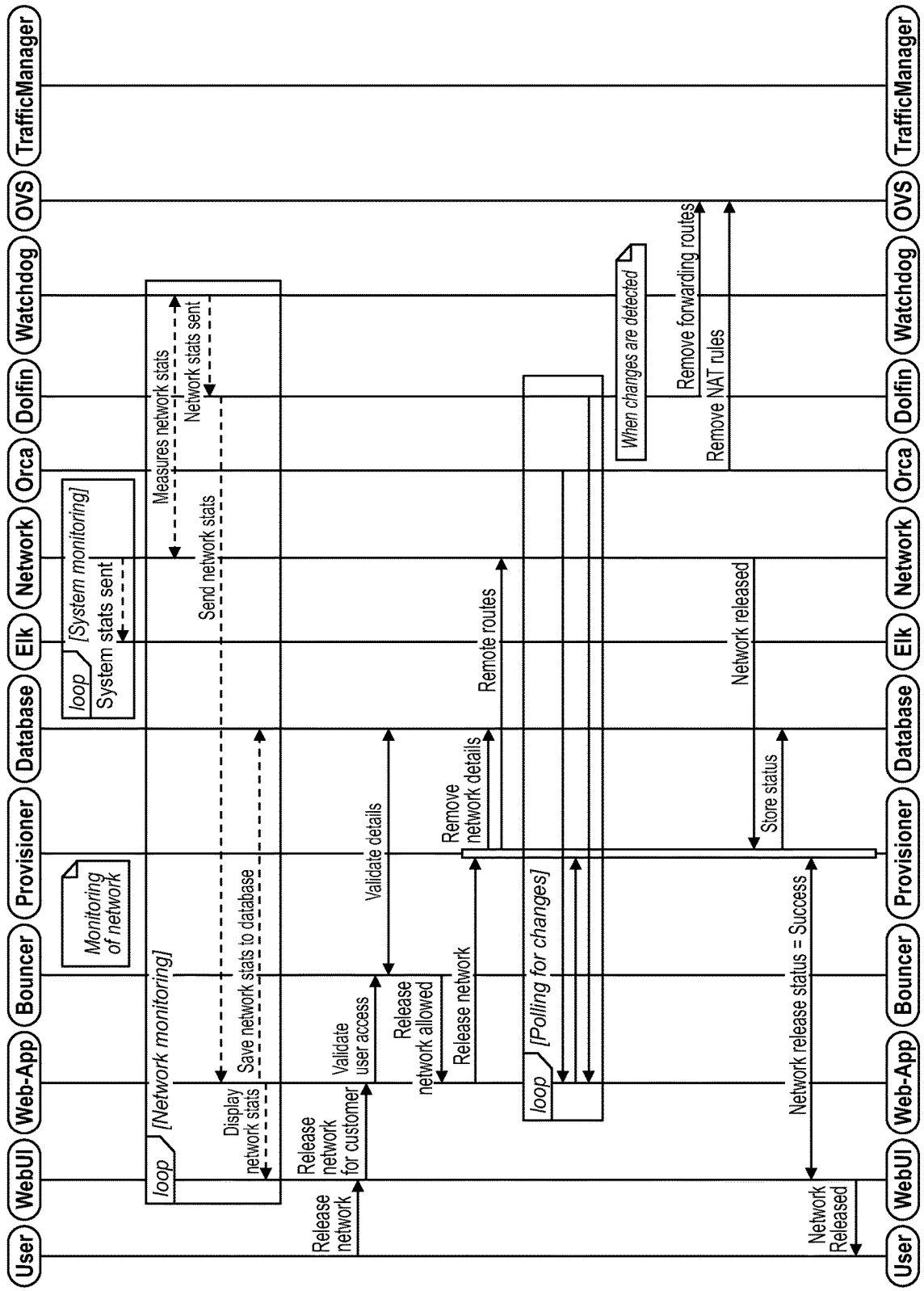
FIG. 17 is a flow diagram for releasing an existing network, under an embodiment, under an embodiment.

While the provisioner controls the interplay between the management plane and the control plane to create or provision underlay and overlay networks, the provisioner is also an intermediary in the process for removing or deleting network configurations and related information. For example, FIG. 16 is a flow diagram for removing network configuration data and removing routes, under an embodiment, under an embodiment. As another example, FIG. 17 is a flow diagram for releasing an existing network, under an embodiment.

The MCN management plane components are implemented in multiple environments, including but not limited to staging, production, beta, quality assurance, and demonstration. Each environment includes two provisioner containers in separate VMs (in AWS), where two provisioner containers provide high availability. A load balancer operates to balance the load between the provisioner containers.

Figure 18A:
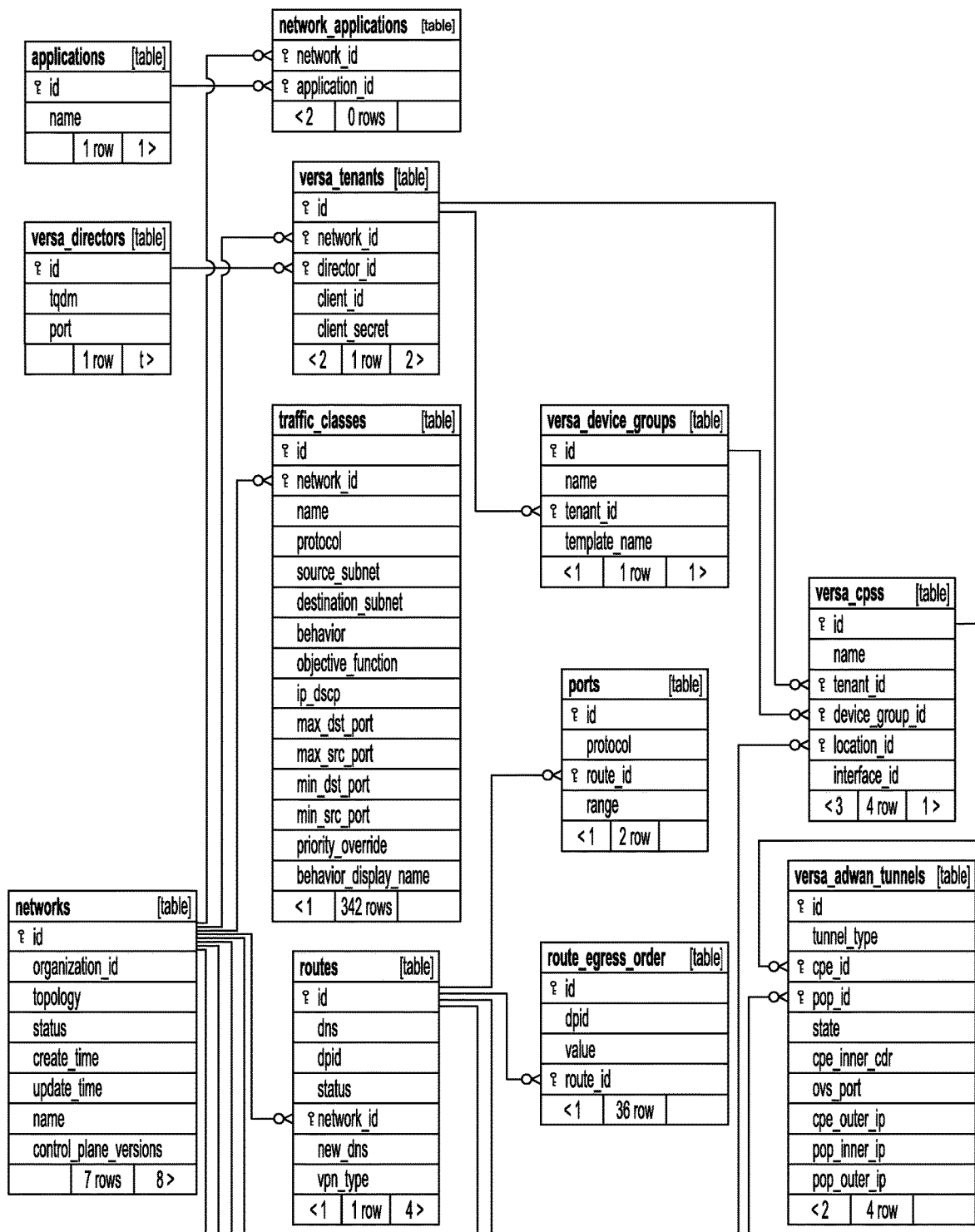
FIGS. 18A and 18B (collectively referred to herein as FIG. 18) show a block diagram of the provisioner database structure comprising numerous tables, under an embodiment.
Figure 18B:
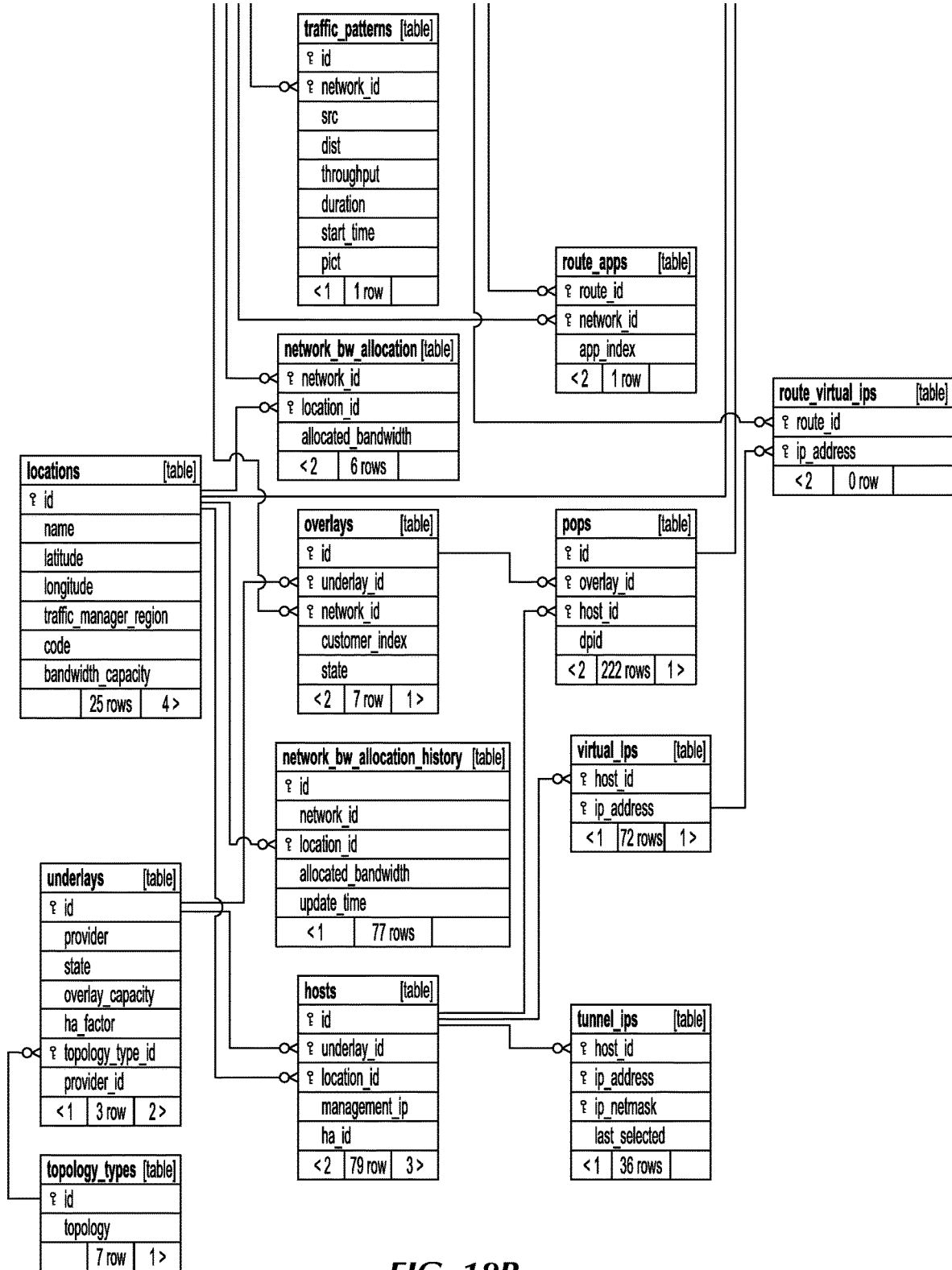

The provisioner also includes a database container in a separate database, and the two provisioner containers communicate with the database container. Data representing provisioned underlay and overlay networks as well as route data is stored in the provisioner database and, additionally, uploaded to remote cloud storage. FIG. 18 is a block diagram of the provisioner database structure comprising numerous tables, under an embodiment.

Orca

Figure 19:
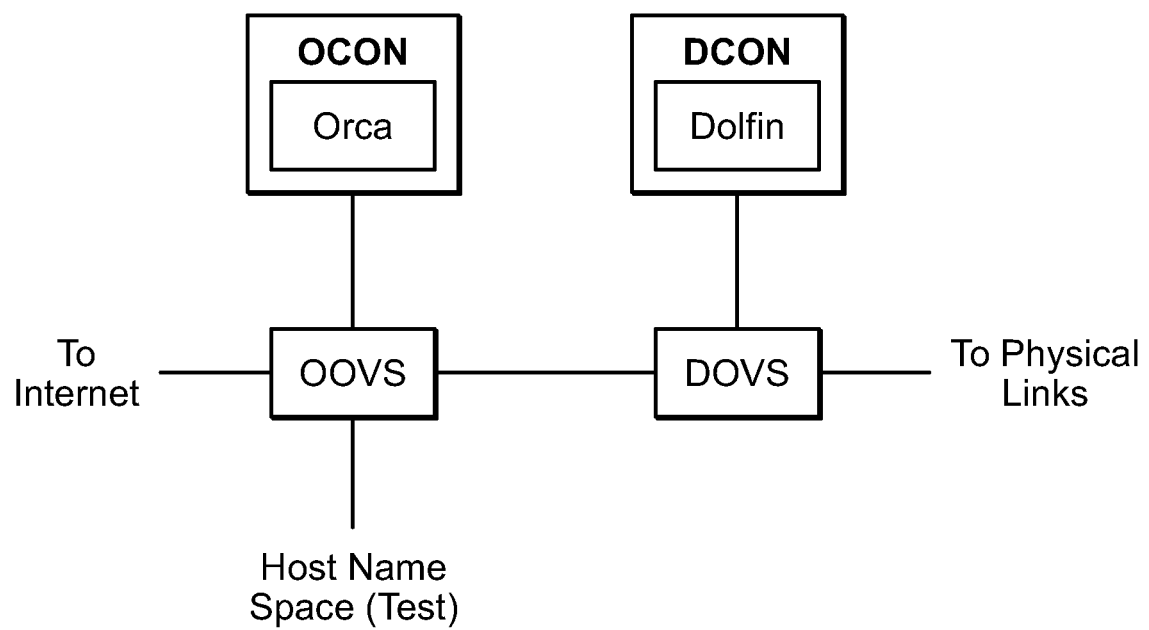
FIG. 19 is a block diagram of a POP, under an embodiment.

Each POP includes a set of Dolfins and Orcas corresponding to each of one or more tenants. FIG. 19 is a block diagram of a POP, under an embodiment. While only a single Orca and Dolfin are shown in this example, each POP includes a number of Orca/Dolfin pairs that corresponds to the number of tenants served by the POP as described in detail herein. Each Orca, which includes a corresponding container, is configured as a gateway router that controls entry of data into the network. Each Dolfin, which also includes a corresponding container, is configured as a core router that controls routing of data through the MCN. Each Orca/Dolfin pair is provisioned per tenant in their respective containers. Each of the Orca and Dolfin components is monitoring and controlling an OVS bridge, which is a corresponding instance of a virtual switch in the operating system, and a coupling or connection links the two OVS bridges. The Orca, Dolfin, and corresponding OVSs function together to form the overlay network as described herein.

Generally, Orca is configured as the gateway of an embodiment to serve as a bridge between the public network (e.g., Internet, WAN) and MCN. As such, Orca, which is scalable to support large numbers of traffic flows, is configured to receive or accept traffic flows from the tenant via the ingress attractor ("ingress"), and to transmit traffic flows to the tenant via the public network ("egress"). Orca is configured with VMs to decouple network functions (e.g., network address translation (NAT), firewalls, domain name service (DNS), caching, etc.) from gateway components so they can run in software. Orca is further configured to perform NAT, when attracting traffic of the core network tenants, in order to control routing of packets between the MCN and the first and last mile couplings or connections. Orca secures the core network by allowing only legitimate traffic flows to the MCN and, additionally, forwards legitimate packets between the public network and the MCN while reducing or eliminating additional latency and/or performance penalty.

As the gateway router Orca controls the OVS (Orca OVS, or OOVS) that is coupled or connected to the Internet, and this is the entry/exit point for data traffic to/from the core network. As such, Orca functions as a gateway or bridge between the public Internet or wide area network (WAN) and the MCN. As the gateway for traffic entering the core network, Orca is configured as a 'firewall' and only allows traffic into the core network that is addressed to or otherwise configured for the core network and originating from an expected address of a tenant, and in this manner limits access to the core network to only authorized tenants. Thus, packets received at a POP from an IP address not recognized as a MCN tenant address are dropped. The OOVS also connects to the host name space, which is a test component used to inject data into the core network that is generated for testing and debugging operations, for example.

The Dolfin OVS (DOVS) includes a first port connected to the gateway router via the OOVS. DOVS also includes an output port that connects to the underlay network via an aggregator OVS ("aggregator") and physical links as described herein. DOVS also includes a rate limiter (output rate limiting) configured to rate limit outgoing traffic of the corresponding tenant. While Orca is configured to control ingress/egress of traffic into/from the core network, Dolfin controls traffic routing and flow through the core network such that when each Dolfin receives data traffic, it controls the routing of the traffic via the underlay network to another Dolfin in the core network. When the egress POP is reached, the Dolfin of that egress POP sends the traffic to the corresponding Orca, which sends it to the egress destination via the last mile coupling or connection (e.g., Internet).

An embodiment includes multiple overlay networks on a single underlay network, so that a set of POPs, and their hosted VMs, distributed among various geographical locations supports multiple isolated overlay networks. Each of the multiple overlay networks has a configuration that is independent of any other overlay network and is controlled according to the configurations of its one or more corresponding tenants. Thus, multi-tenancy is realized in embodiments through the use of multiple Orca and Dolfin containers in a POP, each of which is provisioned per tenant, and additionally through use of the aggregator as described herein.

Each POP supports multiple tenants and, as such, the output of each DOVS corresponding to each tenant connects to an aggregator. The aggregator comprises an OVS, referred to as the aggregator OVS (AOVS). More particularly, an embodiment includes a single instance of OVS running in hypervisor, and this instance of the OVS comprises the AOVS as well as the OOVS and the DOVS (logical separation). The aggregator is configured as the connection or bridge between the overlay and underlay networks.

Figure 20:
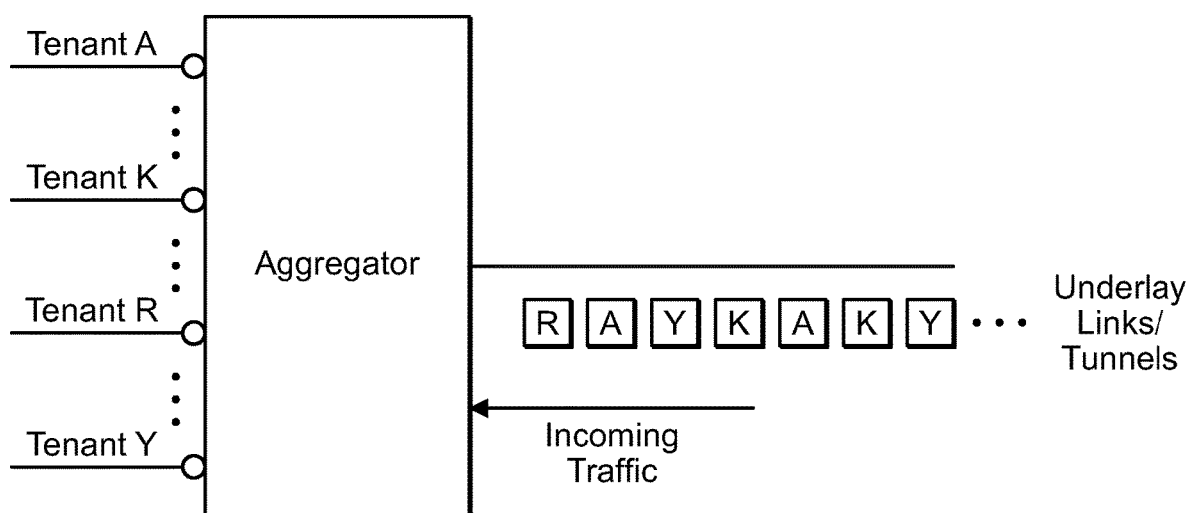
FIG. 20 is a block diagram of an aggregator, under an embodiment.

FIG. 20 is a block diagram of an aggregator, under an embodiment. The aggregator inputs include the outputs of the DOVSs instances hosted at the POP, and the aggregator output includes a physical link to the underlay network. The underlay network that links POPs includes multiple single-hop tunnels configured to separate the traffic of multiple tenants of the MCN and, similarly, the aggregator outputs from a POP include numerous tunnels corresponding to the tenants served by that POP. Thus, embodiments include a tunnel corresponding to each tenant of the MCN. Outgoing data traffic of each tenant is tagged with a tag that corresponds to the originating tenant. The traffic is then routed to the destination POP according to the tag. The routing of an embodiment therefore maintains separation between tenant traffic using single-hop links over the tunnel that corresponds to the tenant. Upon arrival at the aggregator of the destination POP, the data is routed by the aggregator to the Dolfin that corresponds to the tenant associated with the tag.

Figure 21:
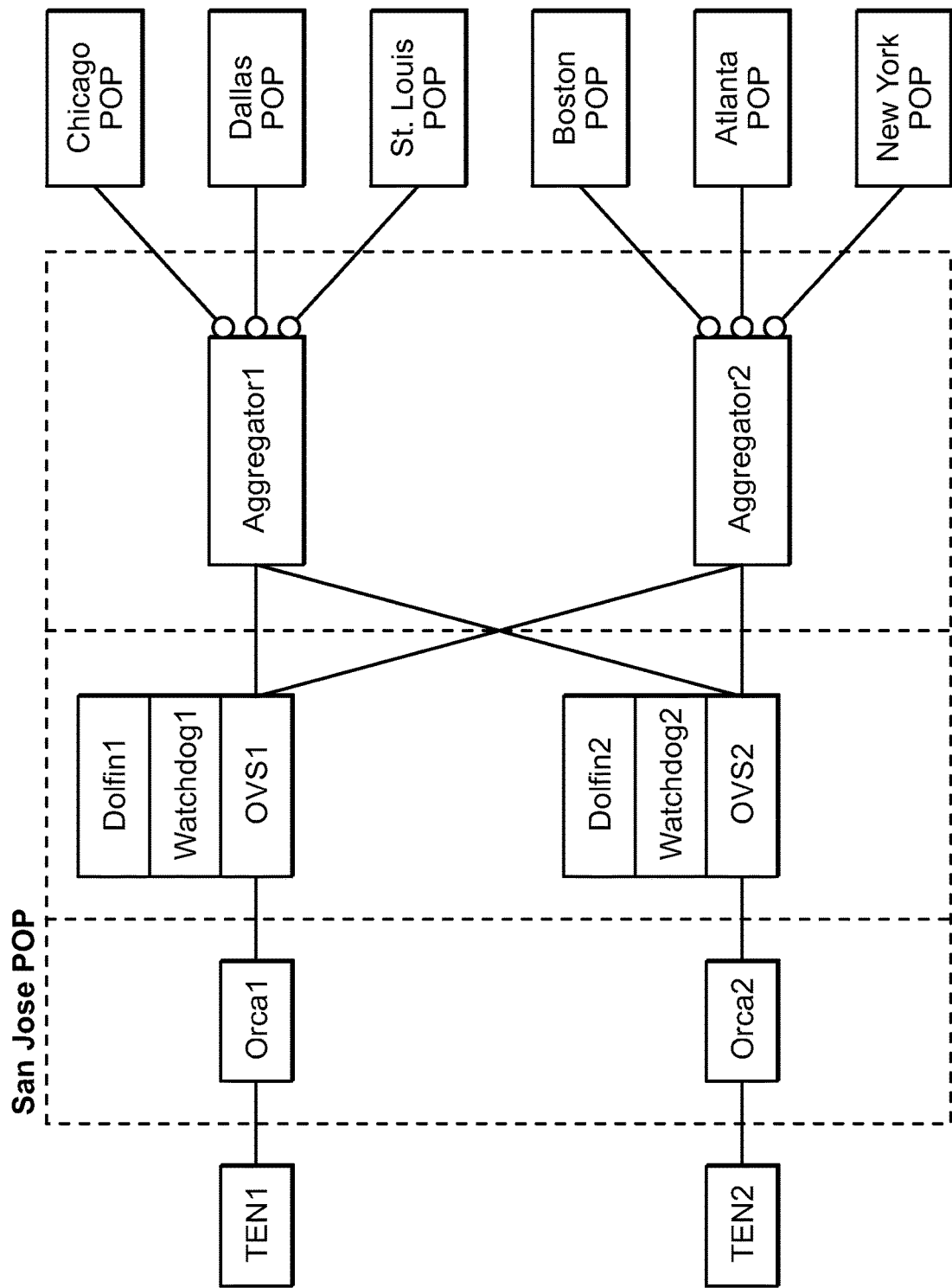
FIG. 21 is a block diagram of example aggregator couplings or connections, under an embodiment.

More specifically, FIG. 21 is a block diagram of example aggregator couplings or connections, under an embodiment. The aggregator comprises multiple aggregator bridges, and each aggregator bridge is connected to a corresponding Dolfin/DOVS pair of the host POP. Each aggregator bridge further includes a set of ports that connect via the underlay link to a set of MCN POPs. Each port of each aggregator bridge connects to a different POP of the MCN, such that the aggregator bridges of each aggregator collectively link to all other POPs in the MCN. Consequently, traffic addressed to a specific destination POP in the MCN is sent to that POP by the aggregator bridge/port corresponding to that destination POP. The links between the aggregators of the MCN servers comprise tunnels (e.g., VXLAN, Generic Routing Encapsulation (GRE), etc.) in the underlay network, and the tunnels each correspond to a separate tenant of the MCN as described in detail herein. Upon arrival at the destination POP, the aggregator of the destination POP routes the traffic to the tenant (via the Dolfin) corresponding to the destination address of the traffic.

Using this network configuration, a traffic flow enters the MCN from a tenant via the gateway router or bridge (Orca), which routes the traffic to a tenant bridge that includes the Dolfin corresponding to the tenant. Based on the destination address of the incoming traffic, the Dolfin routes the traffic via its DOVS to the aggregator bridge having the port corresponding to the destination address. The aggregator bridge then transmits the traffic to the appropriate destination POP via a corresponding tenant tunnel in the underlay. Therefore, for example, data traffic from Tenant1 addressed to a tenant served by the Dallas POP is routed to aggregator bridge1 via gateway1 and OVS1, and aggregator bridge1 outputs the traffic on its port corresponding to the Dallas POP.

Data from a tenant is received at an ingress POP, and the MCN routes that incoming data to an egress POP from which it is transmitted to the egress destination. More specifically, the Orca at the ingress POP receives traffic from the tenant, and the Orca at the egress POP outputs the traffic to the egress destination. Network configuration involves a tenant creating a network, including specifying configuration information relating to intended use of the network. For example, the tenant intends for its users to access one or more particular remote services (e.g., SaaS, SalesForce, etc.) via the network, so the tenant provides or inputs configuration information representing or relating to the remote service (egress destination) (e.g., domain name, IP address, etc.) in order to configure the network for use in accessing that service. For example, the tenant might input information of a domain name corresponding to the remote service.

In response to receipt of the network configuration information, each Orca in the network receives the domain name of this service and determines its distance (in terms of latency) to the service as described herein. The Orcas are configured to share their latency information to the service on the network, and this shared latency information is used by the Orcas to determine the closest POP to the egress destination. The 'closest' POP is then designated as the current egress POP for that service. Subsequently, traffic received at any POP having the service as its egress destination is routed to the designated egress POP for provision to the service.

Figure 22:
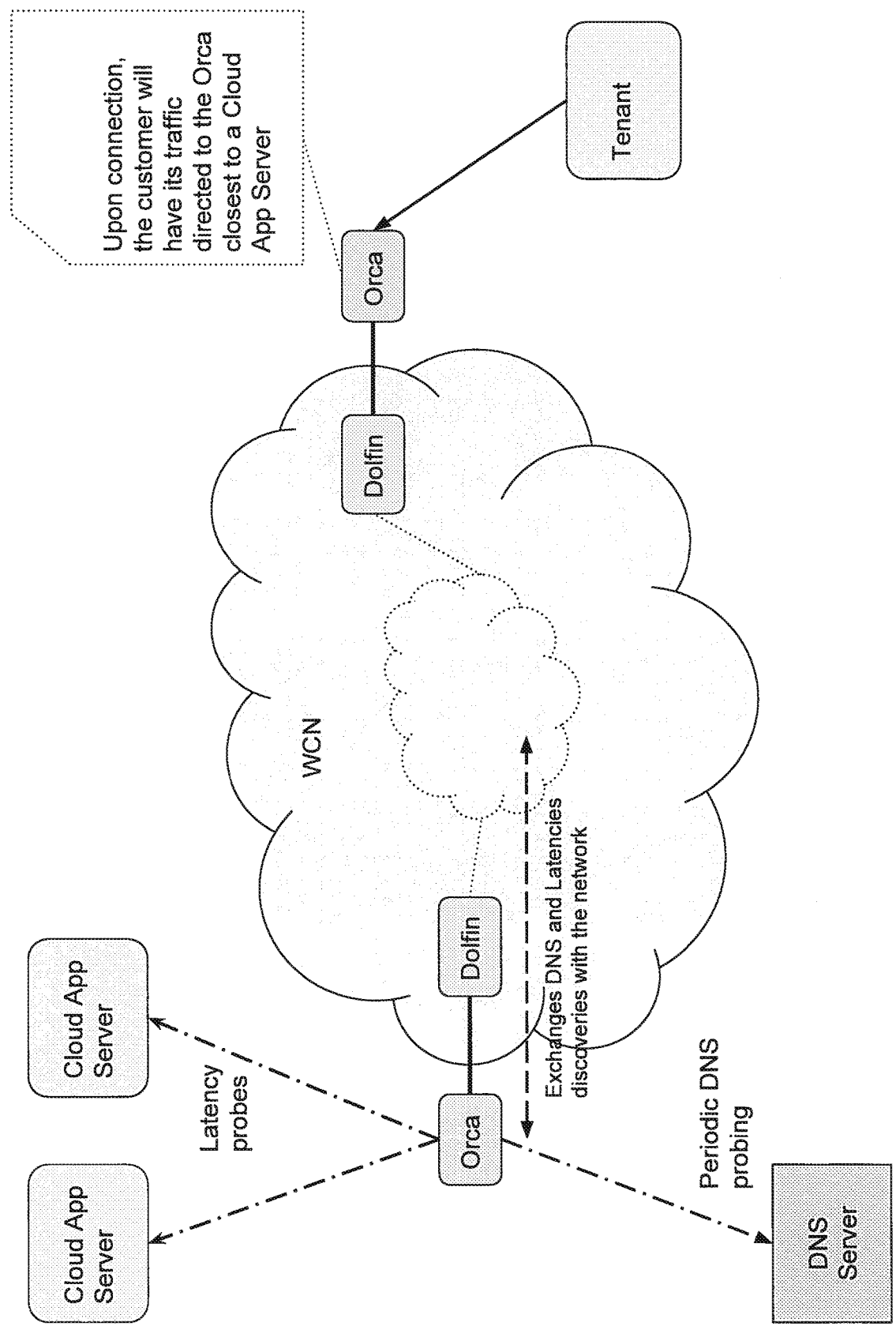
FIG. 22 is a block diagram showing probing operations of Orca, under an embodiment.

Orca is configured to include a probing agent configured for performance metric-based probing, but is not so limited. FIG. 22 is a block diagram showing probing operations of Orca, under an embodiment. The performance metric-based probing includes for example DNS probing to translate every route domain name into an IP address, and advertise its results. The performance metric-based probing also includes a latency probing agent configured to probe discovered IP addresses and report the latency for each of those addresses as described in detail herein. Orca is configured to only probe the IP addresses it has discovered, and the probing period is configurable, but is not so limited. Orca is configured to parse and write link state routing protocol messages in order to announce its DNS and latency data to other MCN components. The messages are sent in a single message, and Dolfins are configured to pass them to neighboring Dolfins to ensure they are received by other Orcas in the MCN.

Figure 23:
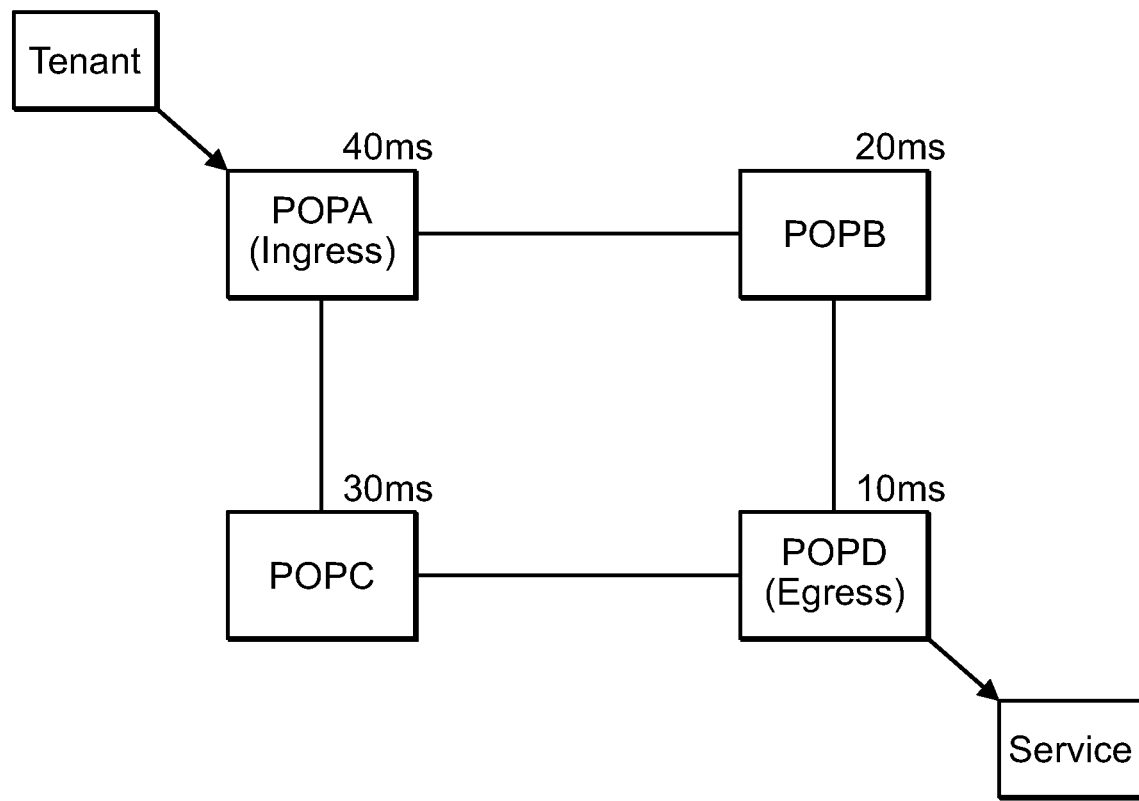
FIG. 23 is a block diagram showing an example determination of a designated egress POP, under an embodiment.

The shared latency information is used by the Orcas to determine the closest POP to the egress destination, and the 'closest' POP is designated as the new egress POP for that service. The closest POP is determined as the POP having the shortest latency value relative to the egress destination, but is not so limited. Subsequently, traffic received at any POP having the service as its egress destination is routed via the MCN to the designated egress POP for provision to the service. FIG. 23 is a block diagram showing an example determination of a designated egress POP, under an embodiment. In this example, configuration information provided by the tenant includes data representing the "service" that is used by the tenant. A distance (latency) of each POP relative to the "service" is determined by each Orca in the network, and then exchanged among Orcas. In this example, the latency determined from POP A is 40 ms, the latency determined from POP B is 20 ms, the latency determined from POP C is 30 ms, and the latency determined from POP D is 10 ms. Using this information, the closest POP to the "service" is POP D, and it is therefore selected as the egress POP for the "service".

While a POP is designated as the current egress POP for an egress destination, the network is reactive and continuously monitors status of the POPs at a pre-specified frequency. In the event the current egress POP goes down, the POPs are configured to determine and designate a next-closest POP (to the service) as the new egress POP and reroute to the new egress POP the data destined for the service. Similarly, when the original egress POP returns to service, the POPs are configured to re-evaluate the distance of the POPs to the egress destination in response to this network topology change. Thus, the original egress POP may be re-designated as the current egress POP causing traffic destined for the service to be re-routed to the original egress POP.

Figure 24:
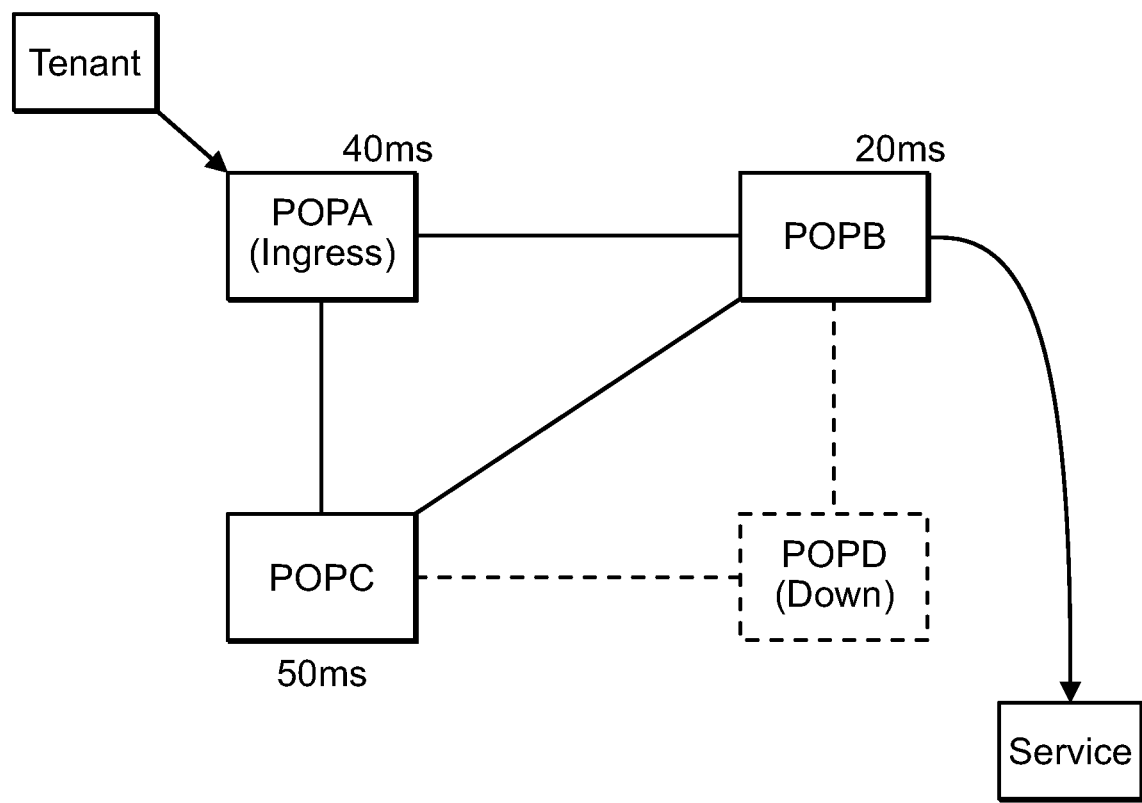
FIG. 24 is a block diagram showing an example determination of a new egress POP in response to failure of a current egress POP, under an embodiment.

FIG. 24 is a block diagram showing an example determination of a new egress POP in response to failure of a current egress POP, under an embodiment. In this example the current egress POP (POPD) goes down. The POPs are configured to designate a next-closest POP (to the service) as the new egress POP and reroute to the new egress POP the data destined for the service. In so doing, the remaining POPS re-evaluate distance (latency) of each POP relative to the "service". For example, a new latency determined from POP A is 40 ms, a new latency determined from POP B is 20 ms, and a new latency determined from POP C is 50 ms. Therefore, the closest POP to the "service" is POP B, and it is therefore designated as the new egress POP for the "service".

Each POP is configured to function as both an ingress POP and an egress POP. Consequently, in order to reconfigure tenant traffic for routing via the MCN instead of the public network on which it originated, the Orcas of an embodiment are configured to perform source network address translation (NAT) (SNAT) and destination NAT (DNAT). This is because, while the first and last mile couplings or connections use public IP addresses at the tenants and the POPs, the POPs use private IP addresses within the MCN. Therefore, the ingress POP is configured to perform DNAT that changes the destination address of ingress traffic from the public IP address of the egress destination to the private IP address of the egress POP corresponding to the egress destination. The ingress POP is also configured to perform SNAT comprising changing the source address of ingress traffic from the public IP address of the source tenant to the private IP address of the ingress POP.

Following transmission via the MCN, and upon arrival of tenant traffic at the egress POP, the egress POP is configured to perform DNAT in order to change the destination address of the received traffic from the private IP address of the egress POP to the public IP address of the egress destination. The egress POP is also configured to perform SNAT to change the source address of the received traffic from the private IP address of the ingress POP to the public IP address of the egress POP.

In order to reconfigure return traffic from a service for routing to a tenant via the MCN instead of the public network on which it originated, the ingress POP is configured to perform DNAT that changes the destination address of ingress traffic from the public IP address of the tenant to the private IP address of the egress POP corresponding to the tenant. The ingress POP is also configured to perform SNAT comprising changing the source address of ingress traffic from the public IP address of the service to the private IP address of the ingress POP.

Following transmission via the MCN, and upon arrival of service traffic at the egress POP, the egress POP is configured to perform DNAT in order to change the destination address of the received traffic from the private IP address of the egress POP to the public IP address of the tenant. The egress POP is also configured to perform SNAT to change the source address of the received traffic from the private IP address of the ingress POP to the public IP address of the egress POP.

Figure 25:
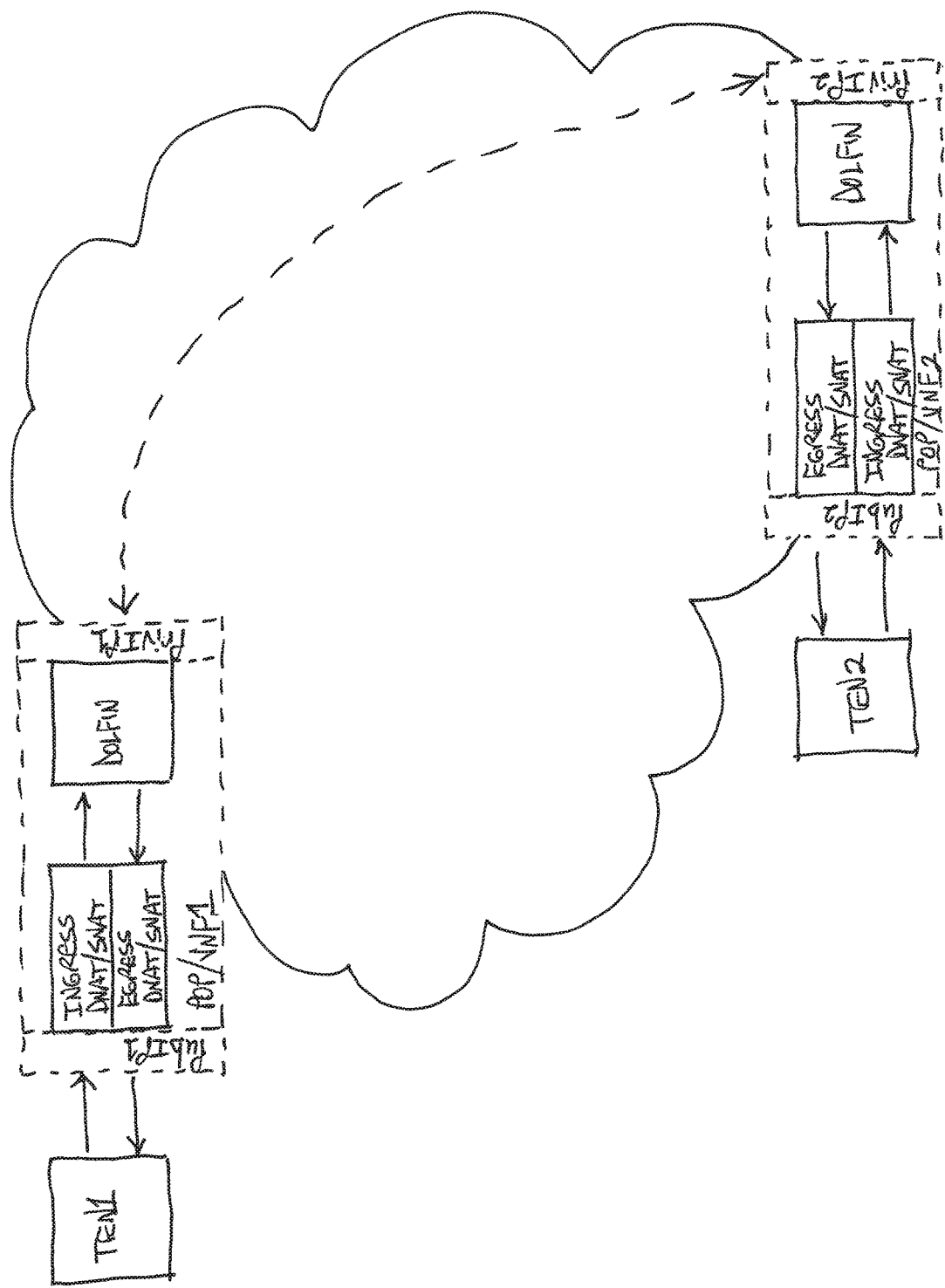
FIG. 25 is a block diagram of an example traffic routing using address translation by Orcas at the ingress and egress POPs, under an embodiment.

FIG. 25 is a block diagram of an example traffic routing using address translation by Orcas at the ingress and egress POPs, under an embodiment. The term "PubIP" as used in this example includes public IP address, and "PrivIP" as used herein includes private IP address.

When a source tenant TEN1 is sending traffic to a destination TEN2, the source tenant TEN1 has knowledge of the public IP address of the nearest POP POP1, and it is configured to send traffic to this nearest POP (ingress POP) POP1 using the public IP address (pubIP1) of the ingress POP POP1. The Orca at the ingress POP POP1 is configured to receive the traffic from the tenant TEN1 and perform DNAT to change the destination address of the ingress traffic from the public IP address of the egress destination to the private IP address of the egress POP (privIP2) POP2 corresponding to the egress destination. The Orca is also configured to perform SNAT to change the source address of ingress traffic from the public IP address of the source tenant TEN1 to the private IP address of the ingress POP (privIP1) POP1. The Dolfin of the ingress POP POP1 then routes the traffic via the MCN to the egress POP POP2, as described herein.

When the traffic reaches the egress POP POP2, the Orca of the egress POP POP2 is configured to perform DNAT in order to change the destination address of the received traffic from the private IP address of the egress POP (privIP2) POP2 to the public IP address of the egress destination TEN2. The egress POP POP2 is also configured to perform SNAT to change the source address of the received traffic from the private IP address of the ingress POP (privIP1) POP1 to the public IP address of the egress POP (pubIP2) POP2. The traffic is then sent to the egress destination TEN2 via the WAN.

When the original egress destination TEN2 is sending return traffic to the original source tenant TEN1, the current source tenant TEN2 has knowledge of the public IP address of the nearest POP POP2, and it is configured to send traffic to this nearest POP (ingress POP) POP2 using the public IP address (pubIP2) of the ingress POP POP2. The Orca at the ingress POP POP2 is configured to receive the traffic from the tenant TEN2 and perform DNAT to change the destination address of the ingress traffic from the public IP address of the egress destination TEN1 to the private IP address of the egress POP (privIP1) POP1 corresponding to the egress destination TEN1. The Orca is also configured to perform SNAT to change the source address of ingress traffic from the public IP address of the source tenant TEN2 to the private IP address of the ingress POP (privIP2) POP2. The Dolfin of the ingress POP POP2 then routes the traffic via the MCN to the egress POP POP1, as described herein.

When the traffic reaches the egress POP POP1, the Orca of the egress POP POP1 is configured to perform DNAT in order to change the destination address of the received traffic from the private IP address of the egress POP (privIP1) POP1 to the public IP address of the egress destination TEN1. The egress POP POP1 is also configured to perform SNAT to change the source address of the received traffic from the private IP address of the ingress POP (privIP2) POP2 to the public IP address of the egress POP (pubIP1) POP1. The traffic is then sent to the egress destination TEN1 via the WAN.

Figure 26:
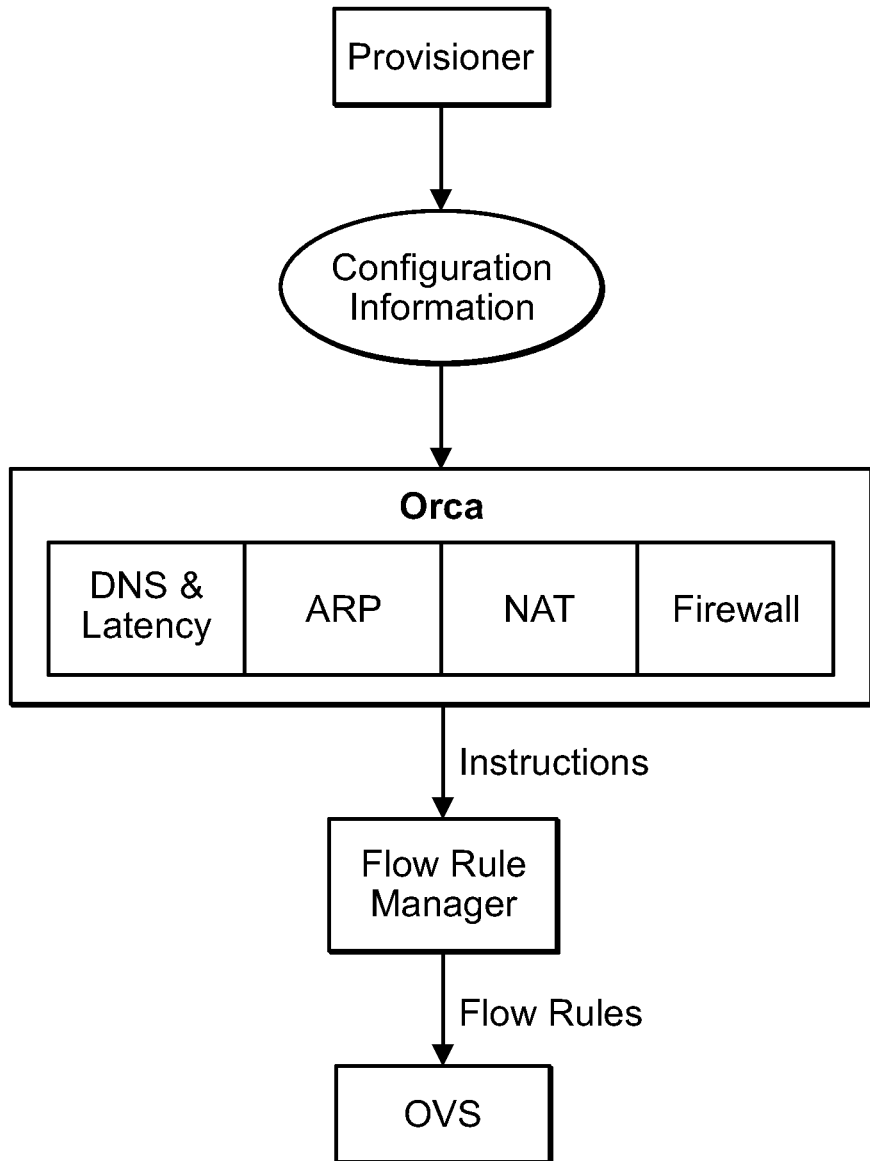
FIG. 26 is a block diagram showing Orca components, under an embodiment.

Orca runs in a container (e.g., Docker container) as described herein, and the container is built or configured on top of the Open Network Operating System (ONOS), thus Orca is an ONOS application but is not so limited. Orca is a component-based architecture that includes multiple components hosted in and supporting services of an application. FIG. 26 is a block diagram showing Orca components, under an embodiment. The Orca components include but are not limited to a DNS and latency component, a configuration component (also referred to as an Address Resolution Protocol (ARP) component), a NAT component, and a firewall component. These components communicate with the provisioner to receive information of configured routes from the provisioner. The Orca components then process the set of configured routes to generate flow rules. The Orca components provide the flow rules to the flow rule manager.

When Orca begins operations, the Orca configuration component communicates with the provisioner to receive configured routes for the corresponding network. In response to the query for route information, the configuration component receives a set of routes (e.g., r.vpn.com), and advertises the route information to the other Orca components. The DNS/latency component performs DNS resolution to obtain the IP addresses corresponding to the routes, and measures or determines latency of the routes to the IP addresses. The DNS/latency component also advertises the latency data of the IP addresses to the other Orcas of the MCN as well as to other MCN components (e.g., middleware, etc.), as described herein.

As routing in the MCN is reactive and dynamic, each POP is configured at any time to function as both ingress POP and egress POP. In response to the receipt of the configured route information, however, the Orca NAT component performs the SNAT/DNAT operations corresponding to the routes of the IP address. These operations include generating rules to perform DNAT operations that configure the POP as an egress POP for the destination address by changing the destination address of received traffic to be the public IP address of the egress destination. The Orca will establish its own IP address as the source IP address. Subsequently, when the Orca receives from another POP traffic directed to a destination address for which the Orca serves as the egress POP, the NAT is configured as the egress POP to route the received traffic to that egress destination.

In response to a change in network routing that changes the egress POP to a different POP, the SNAT/DNAT operations include generating rules to perform address translations (DNAT) that now configure the POP as an egress POP for routing traffic within the MCN. These operations include the Orca establishing its own IP address as the source address, and performing DNAT in order to change the destination address of received traffic to be the private IP address of the new egress POP corresponding to the egress destination.

The firewall component of the Orca does not include any initial configuration information, and upon startup operates to block all incoming traffic attempting to access the MCN from public IP addresses. Upon receiving route configuration information, which includes public IP addresses associated with MCN tenants and their services, it maintains a list of the public IP addresses. The firewall component subsequently allows traffic from the listed IP addresses to pass through the firewall into the MCN, while continuing to block traffic from all other IP addresses.

Operations of the Orca components generate instructions representing traffic flow rules, which are provided by Orca to a flow rule manager. The flow rule manager, which is a component of ONOS, is configured to translate the instructions received from Orca into OVS-defined rules and write the translated flow rules to the OVS (e.g., using OpenFlow messages to the OVS). The OVS installs the rules in tables, referred to as flow tables. Within each flow table of an embodiment the rules are prioritized so that, during routing operations, the rules are traversed according to the priority, but embodiments are not so limited. The OVS subsequently uses the rules to control routing of corresponding data traffic as described in detail herein.

As an example of routing operations of the OVS, an incoming packet is first evaluated using the flow rules as embodied in a first flow table controlled by the firewall. The parameters of the incoming packet are evaluated by traversing the rules in the first flow table, and when the parameters match the conditions of a particular rule then the packet parameters are forwarded to another OVS flow rule table specified by the matched rule. This process is then repeated at each of a set of downstream tables as determined by the parameters of the incoming packet until routing parameters of the packet have been fully specified by the OVS flow rule tables.

Figure 27:
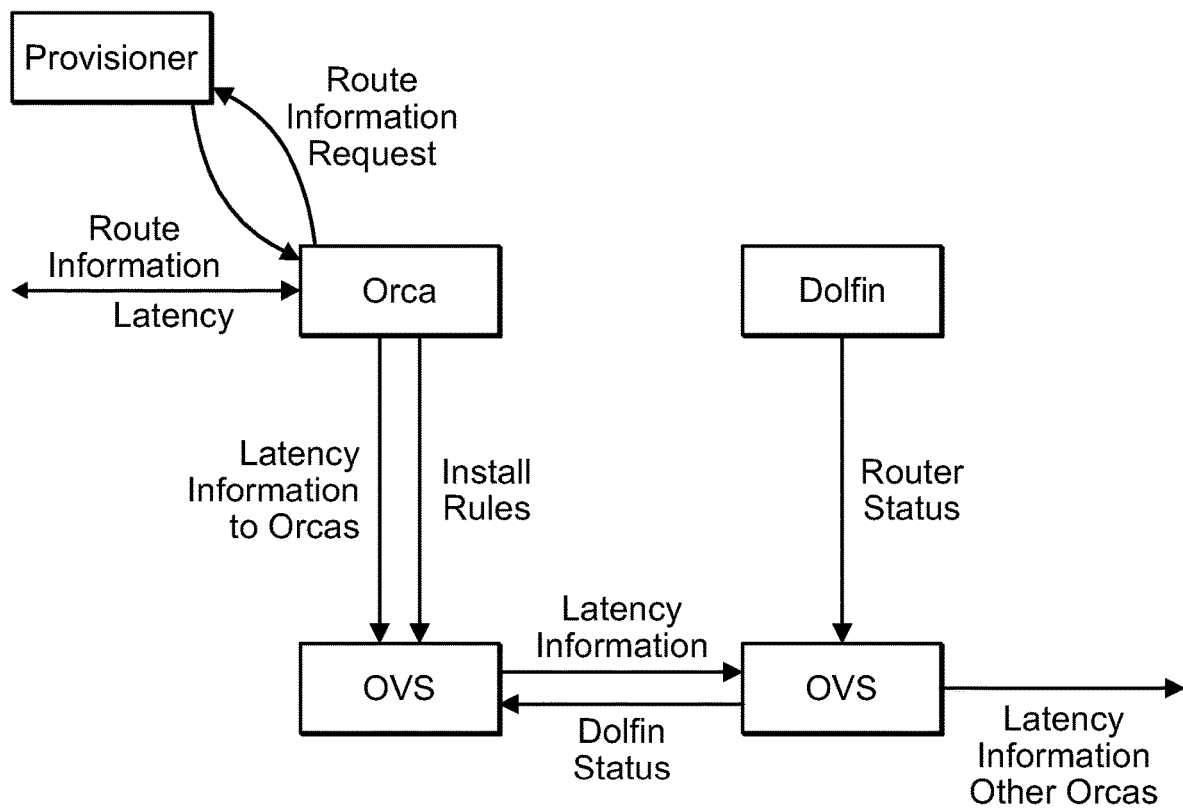
FIG. 27 is a flow diagram of communications between Orca and other MCN components, under an embodiment.

Orca interacts with numerous MCN components, including but not limited to the provisioner, OVS, and Dolfin, as described in detail herein. FIG. 27 is a flow diagram of communications between Orca and other MCN components, under an embodiment. More particularly, Orca communicates with the provisioner to request route information of the network. Upon receiving the route information, Orca performs DNS resolution to obtain the IP addresses corresponding to the routes, measures or determines latency of the routes to the IP addresses, and instructs the OVS to send or propagate the latency data to other Orcas in the MCN.

Orca receives from the other Orcas in the MCN their latency data, and generates a table comprising the latency information of all Orcas in the network. This latency table, which is a dynamic table that is maintained and updated as data is received from other Orcas, is used by the Orca in making its determination of closest POP to an egress destination to be designated as the egress POP.

Additionally Orca communicates with the OVS (e.g., OOVS, DOVS) and Dolfin. Regarding communications with the OVS, Orca is configured to generate instructions representing traffic flow rules using route data received from the provisioner. Orca is configured to cause the flow rules to be written to the OVS. Communications between Orca and Dolfin comprise Orca receiving router status messages from its corresponding Dolfin. These router status messages include information regarding the status (e.g., up/down) of the other POPs in the MCN, but are not so limited.

In operation, Orca performs numerous functions according to pre-specified intervals. For example, Orca contacts a provisioner, in accordance with a polling interval T1, and pulls routes as described herein. The routes are subsequently used to install/maintain the ingress/egress NAT table. Orca is also configured to obtain a number of active data flows per tenant per route and, in accordance with a pushing interval T2, push the number of active flows to the web application. Further, Orca is configured to perform a status check of Dolfin, Watchdog, and the underlay network links according to a health check interval T4. Orca sends a message or notification to the provisioner if the status check indicates any of the components are not functioning.

The Orca of an embodiment is configured with a probing interval T3. In accordance with the probing interval T3, Orca generates probe packets to each of the public network routes and MCN routes, and the probe packets are configured to measure network parameters including one or more of latency, jitter, packet loss, and available bandwidth to name a few. If Orca determines, using data collected with the probe packets, that the public network has the best network performance, then it changes the NAT rules to forward packets via the public network instead of the MCN by changing output port. Conversely, if Orca determines that the MCN network has the best network performance, then it changes the NAT rules to forward packets via the MCN by changing output port.

Figure 28:
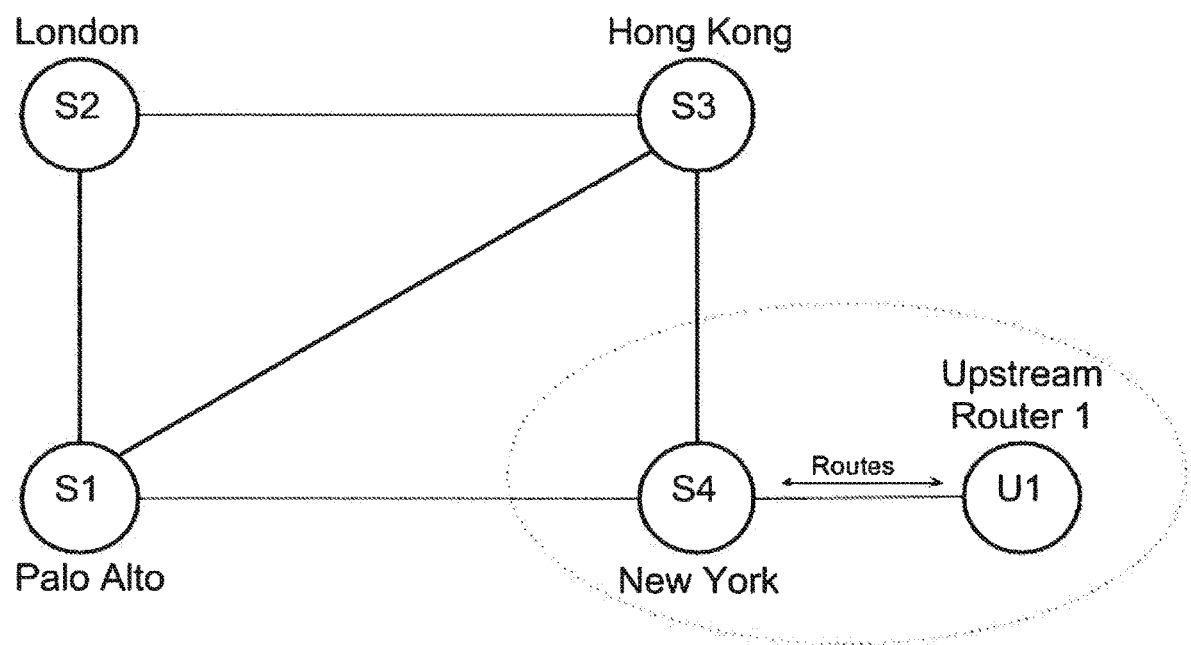
FIG. 28 is a block diagram showing POPs (e.g., S1-S4) coupled to communicate with an upstream (e.g., tenant) router, under an embodiment.

The MCN components of an embodiment peer or provide connectivity with tenant networks or other components (e.g., routers, switches, routers, etc.) outside the MCN using route information learned from the tenant. The MCN components are therefore configured to peer with external routers using existing protocols and automatically perform the route exchange. FIG. 28 is a block diagram showing POPs (e.g., S1-S4) coupled to communicate with an upstream (e.g., tenant) router, under an embodiment. The POPs peer with external routers in the POP locations to form the geographically distributed topology.

Figure 29:
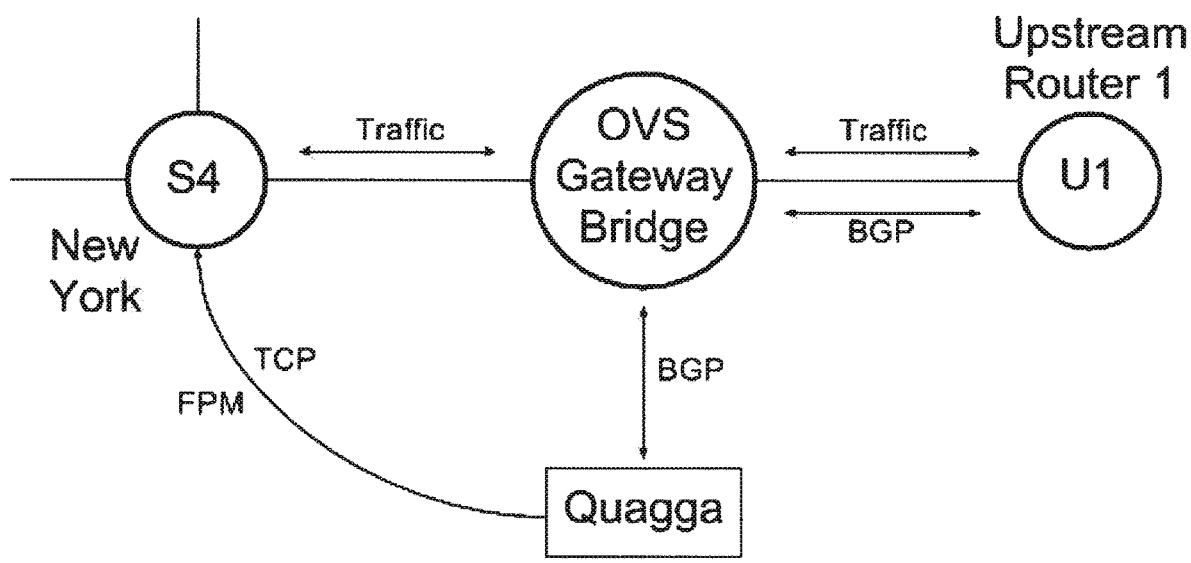
FIG. 29 is a block diagram showing Orca comprising routing software (e.g., Quagga) coupled to communicate with the MCN and a tenant router, under an embodiment.

More particularly, Orca includes routing software that configures it as a Forwarding Plane Manager (FPM). The routing software of an embodiment comprises Quagga, which is a routing software suite that provides implementations of Open Shortest Path First (OSPF) version 2 (OSPFv2), OSPFv3, and Border Gateway Protocol (BGP), among others, but embodiments are not so limited. FIG. 29 is a block diagram showing Orca comprising routing software (e.g., Quagga) coupled to communicate with the MCN and a tenant router, under an embodiment. The use of Quagga along with ONOS (CON1), which includes applications and components that receive and use Quagga-transmitted routes, configures the controller as an FPM component. The infrastructure daemon of Quagga connects to the FPM on a predefined TCP port over a stream socket and transfers route change information over the connection. Route entries from Quagga are broadcast to one ONOS and then to others (e.g., route advertisement from first gateway to first Quagga, to MCN, to second Quagga, to second gateway, etc.). Each ONOS has knowledge of all IPs outside the MCN, and uses that information to route packets to the appropriate destination ONOS. In this manner Quagga is used to exchange routes between external networks and ONOS clusters. The Orca performs NAT accordingly.

Dolfin

Dolfin is a core router or controller configured to make data routing decisions, and includes routing information regarding the egress destinations to which received data traffic is to be routed, and the routing protocol used to route the traffic to those egress destinations. In operation, Dolfin receives a packet from a corresponding Orca gateway router. The packet includes a private IP address of the egress POP corresponding to the egress destination of the packet, and this private IP address was provided by Orca prior to transmission of the packet to Dolfin. Dolfin maintains a table including IP addresses and corresponding egress POPs, and uses the table to match the private IP address of the packet to a destination POP.

Following determination of the destination POP, Dolfin determines the routing algorithm or behavior to be used for the packet as described in detail herein. Dolfin includes numerous routing behaviors for use in routing different types of traffic such that a routing behavior can be specified for each traffic class. The traffic classes of embodiments are configured by each tenant based on attributes of the traffic in each class, but embodiments are not so limited. Using the configured traffic classes, Dolfin analyzes one or more parameters of the packet header information, and uses one or more of the parameters to determine the packet type (e.g., video, file transfer, etc.). Based on the determination of the packet type, Dolfin determines a routing behavior and a metric for use in routing the packet.

The routing behavior is determined using an objective function in combination with a link metric. Dolfin periodically receives from its local Watchdog, link metrics that characterize its local links. The link metrics corresponding to links of the MCN include but are not limited to one or more of latency, jitter, packet loss, and link utilization. Dolfin propagates the link state of its local links to the other Dolfins of the network using link state update (LSU) messages that are periodically transmitted to the other Dolfins. Dolfin also receives link state data of the links corresponding to all other network Dolfins via LSU messages received from those other network Dolfins. In this manner, each Dolfin comprising the MCN has information of all links of the MCN. Using this link state information of all links in the network, each Dolfin generates and maintains its local version of the network topology corresponding to each link metric measured by the Watchdogs. Additionally, metrics can be combined (e.g., latency plus packet loss, etc.) in various combinations to produce combination link metrics, and network topologies can also be generated using the combination link metrics.

Routing behavior determinations of an embodiment are therefore based on two parameters or inputs, as described in detail herein. A first input parameter includes an objective function, which is a mathematical combination of one or more metrics that produces a quantity representative of the quality of a link (e.g., latency, latency plus packet loss, etc.). The second input parameter considered in the routing decision includes desired routing behavior. The routing behaviors of an embodiment include but are not limited to routing packets via multiple-paths, routing packets directly via the shortest path, routing packets on a single-path and maintain the packets on that route unless there is a topology change or a variation in link qualities that exceeds a pre-specified threshold, and dropping packets. Therefore, as an example, the routing of an embodiment is shortest path routing based on latency. In another example, the routing is multi-path routing based on latency.

Each Dolfin separately controls routing of each traffic flow according to the data type of that flow and the routing behavior corresponding to that data type as described herein. Further, each Dolfin uses information of its view of the network topology to control traffic routing through the network for each traffic flow. When considering routing for each data flow, each Dolfin is configured to only control routing of traffic flows to the next hop in the network. Dolfin uses its view of the network topology to determine the current best route to the egress destination through the network, and then determines the optimal next hop from the current best route. Each successive Dolfin along the route traversed by the traffic flow similarly uses its view of the network topology to determine its optimal next hop node for routing the traffic flow.

Dolfin continuously reacts to new traffic flows by determining a traffic class for each traffic flow, deciding how to route the traffic based on the traffic class, and installing in the DOVS the flow rules to route that new traffic flow. Following installation of the flow rules, subsequent packets of this flow are routed directly by the DOVS, instead of Dolfin, in accordance with the installed flow rules.

Figure 30A:
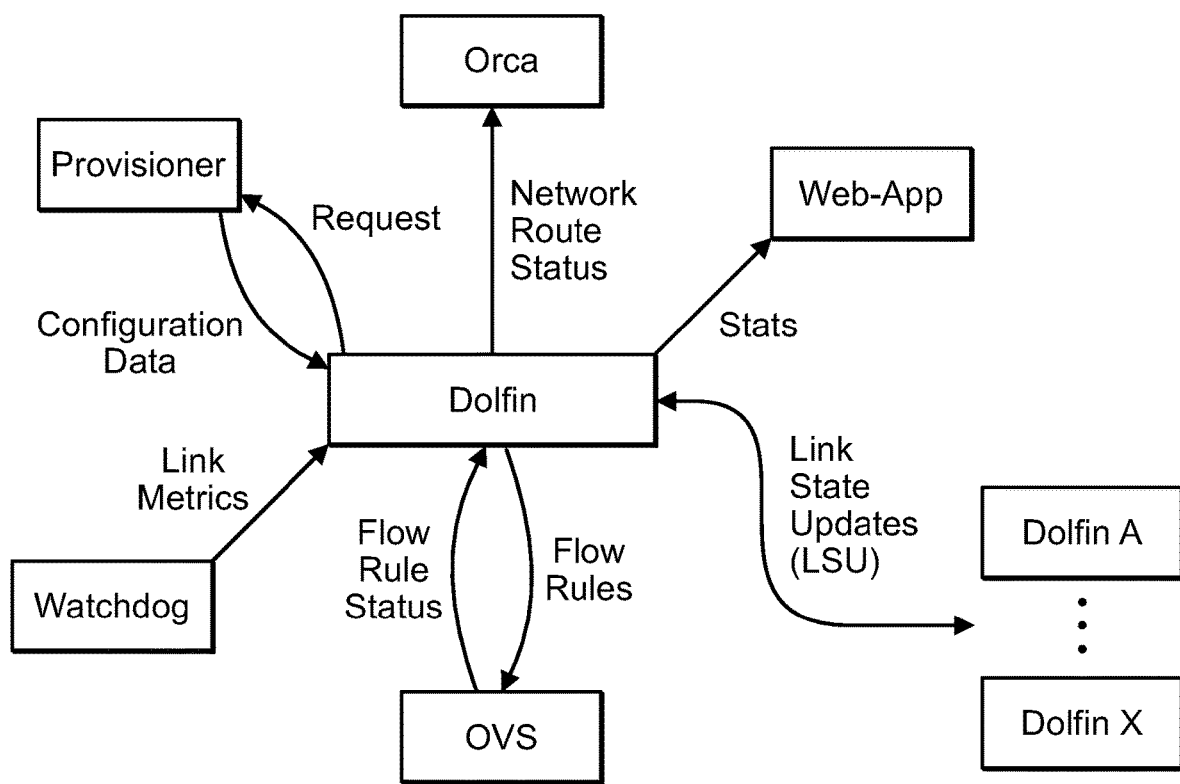
FIG. 30A is a flow diagram of communications between Dolfin and other MCN components, under an embodiment.

Dolfin includes multiple components or subsystems, each of which communicates with various components of the MCN in configuring Dolfin to operate as the core router. FIG. 30A is a flow diagram of communications between Dolfin and other MCN components, under an embodiment. A Dolfin configuration component communicates with the provisioner and, in response, receives the network configuration information for the corresponding tenant as well as the traffic class information configured for that tenant. A routes component of Dolfin receives the IP addresses of the configuration information, and performs IP address matching in order to determine the private IP address of the egress POP corresponding to the egress destination of a traffic flow.

Dolfin further includes a traffic class component that receives the traffic class configuration information, and evaluates incoming traffic flows in order to match each flow to a configured traffic class. Based on the traffic classes, the traffic class component generates a set of routing behaviors that are translated into flow rules that are provided to the OVS (e.g., via OpenFlow). Because the flow rules are dynamic as a result of network topology changes, Dolfin continuously monitors the network topology and updates the flow rule information sent to OVS in response to network topology changes in order to ensure OVS includes the current instantiation of the flow rules. Dolfin also receives flow rule information from its OVS, and this flow rule information includes data on amounts of traffic (e.g., packets, bytes, throughput, etc.) routed by each OVS flow rule. Thus, Dolfin is configured to iteratively update flow rules of its local OVS and these updates, which occur periodically at a configurable frequency, are performed by each Dolfin for all rules installed by that Dolfin in its local OVS, but are not so limited.

Dolfin also includes a link quality component that is configured to communicate with Watchdog to receive and store the local link metrics or quality data (e.g., latency, jitter, packet loss, link utilization, etc.), and to update and maintain the link metrics data. An OSPF component is configured to generate link state update (LSU) messages to propagate the local link metrics data to other Dolfins in the network, and to receive LSUs from the other network Dolfins. Additionally, the OSPF component of Dolfin provides to the link quality and topology components (e.g., management plane, web app, WEB-UI, etc.), the route status or network link metrics information received from the other network Dolfins. In an alternative embodiment, Dolfin is configurable to control Watchdog to report network metrics directly to other components, thereby relieving Dolfin of the responsibility of reporting metrics received from Watchdog.

Figure 30B:
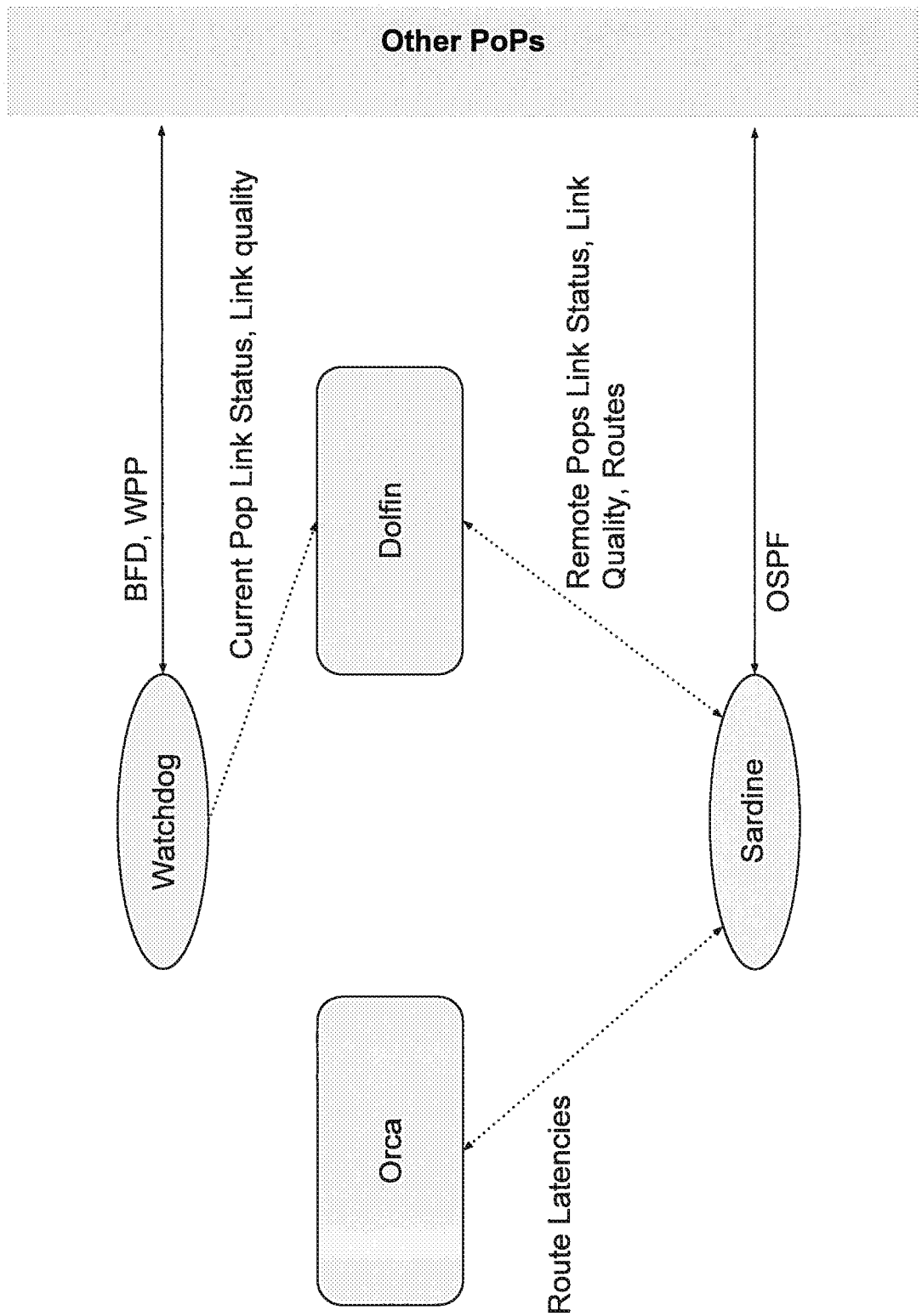
FIG. 30B shows a POP configuration including Sardine, under an embodiment.
Figure 30C:
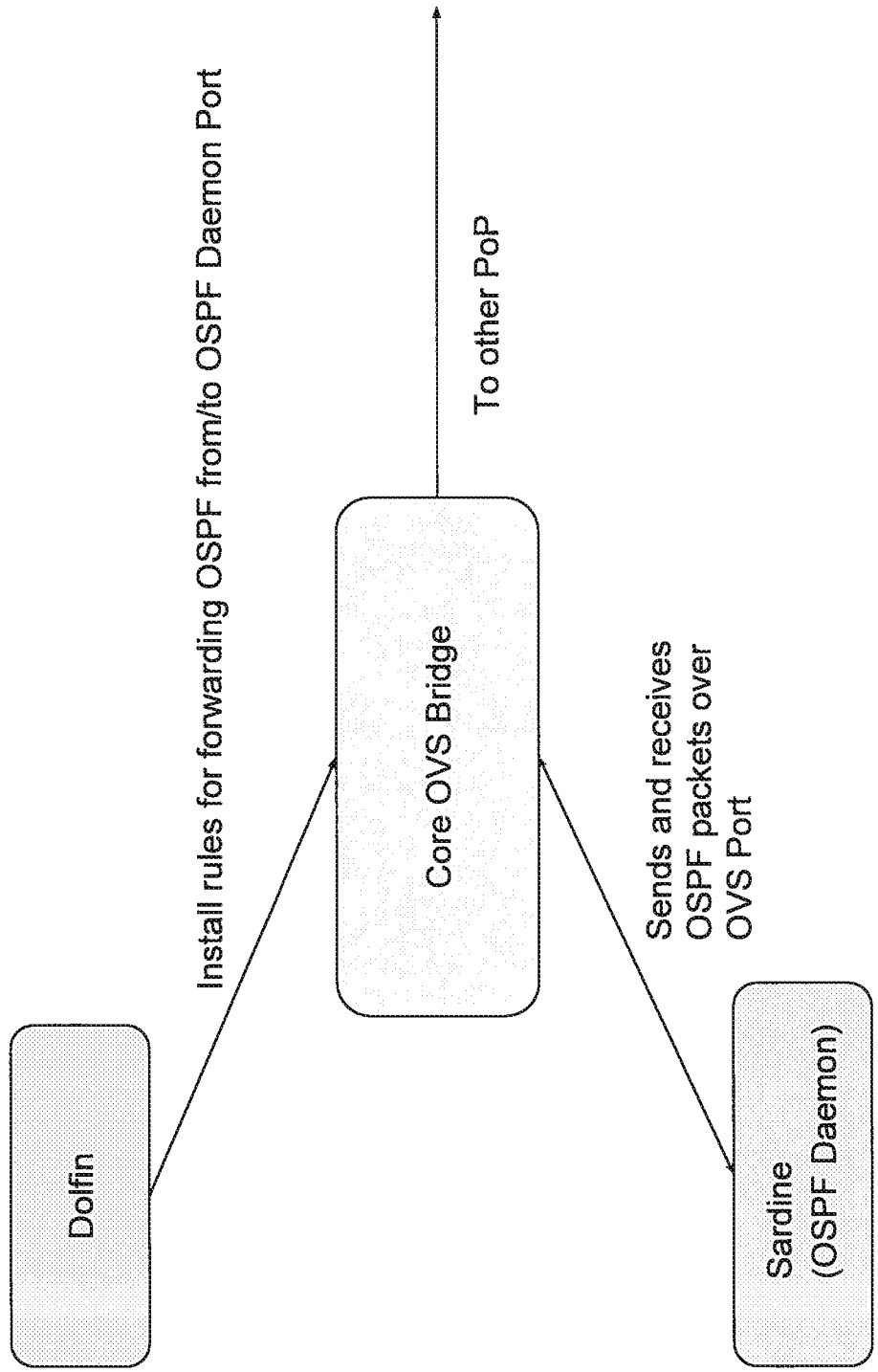
FIG. 30C shows information flows involving the OVS bridge, Dolfin, and Sardine, under an embodiment.

An alternative embodiment moves the OSPF message sending and receiving from Dolfin and Orca to an external daemon, referred to herein as Sardine, which is configured for dedicated handling of OSPF messages. Sardine is configured to run its own process and centralize the OSPF message creation, sending and parsing. FIG. 30B shows a POP configuration including Sardine, under an embodiment. FIG. 30C shows information flows involving the OVS bridge, Dolfin, and Sardine, under an embodiment.

Each POP includes its own Sardine, but is not so limited. Sardine runs inside a container on a per-network (overlay) basis and sends all OSPF messages for that POP into the network. Sardine is configured to expose an API to be used from Orca and Dolfin, which are configured to couple to and exchange messages with Sardine. Orca and Dolfin provide local information (status of links and routes) and receive information from other POPs. (status of links and routes). Dolfin is configured to install rules for OSPF packet forwarding so that the packets are sent to Sardine.

Dolfin includes a topology component that is configured to generate a network topology snapshot using the link metrics data of the network. Dolfin uses the topology snapshot, which is continuously updated by the topology component, to make routing decisions. A stats component of Dolfin collects from the Dolfin components data or information representing network behavior or state, and reports this information to one or more components of the management plane (e.g., monitoring subsystem, web app, user interface). The network behavior information obtained from the Dolfin components and includes but is not limited to link status, link utilization, and full state of network. This information is displayed on the WEB-UI.

Distributed Network Configuration

The network topology is the configuration associated with a MCN, and includes information of the Dolfins in the network, such as identifier, interfaces IP, subnets, ports and neighbor adjacency (hosts and routers), to name a few. Because every Dolfin on the network needs information about the network configuration, a global static topology file is sent to all Dolfins on startup. In addition to the network topology, the MCN components of embodiments share data of link state globally across the components of the network by exchanging messages, thereby enabling a link state view of the network. The routing of traffic through the network includes use of an autonomous feedback control algorithm that is distributed among the network Dolfins and, as such, can be thought of as 'distributed' because the operations and traffic routing decisions of each Dolfin are independent of those of every other Dolfin in the network. Further, given the link-state information, each router may independently perform the relevant routing computations.

Dolfins include data about the entire network topology because, for packet routing through the MCN, data of the destination Dolfin or POP is needed for a given incoming packet received at the corresponding ORCA, and this requires knowledge of the MCN routes over which each Dolfin on the network is responsible for delivery. Further, while links (sourceId, destinationId) and link state (utilization, latency, packet loss) are advertised using a dynamic link state routing protocol, Dolfins use knowledge of the subnets from source and destination in order to fully identify the link ports. Additionally, link capacity and interior gateway protocol (IGP) information is used by some routing behaviors during shortest path tree computations, and this data is dynamically distributed to support link updates.

Figure 31:
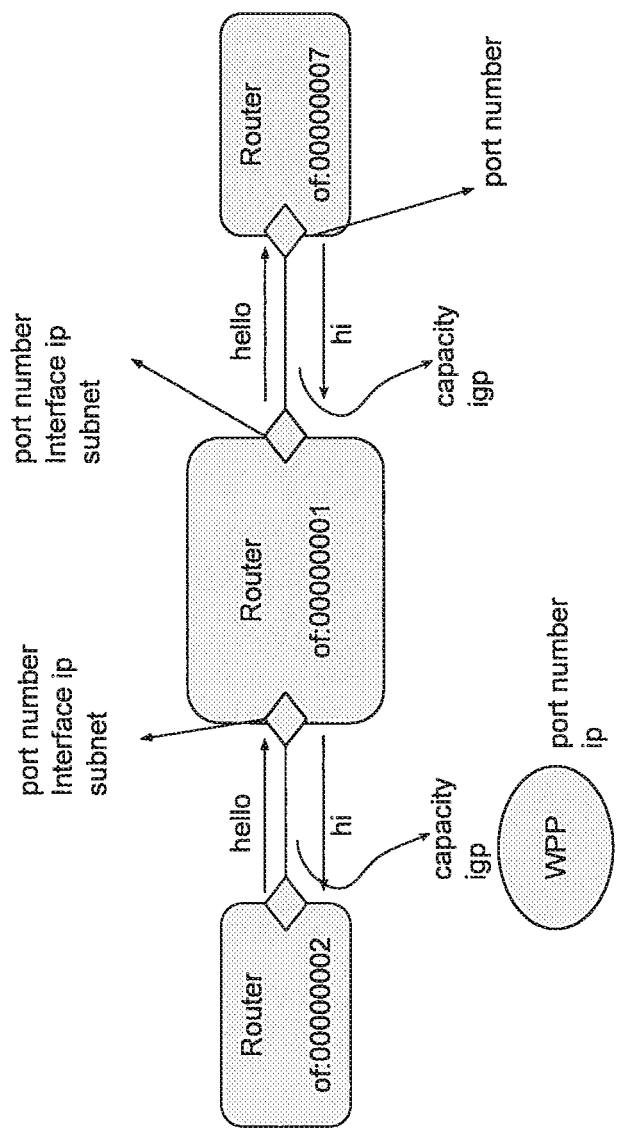
FIG. 31 is a flow diagram of link discovery by Dolfins to discover ingress and egress links to neighbor Dolfins, under an embodiment.

Identification of adjacent Dolfins of an embodiment is realized using an exchange of hello messages between Dolfins, as described in detail herein. Through the exchange of hello messages, each Dolfin discovers its neighbor nodes and corresponding links. FIG. 31 is a flow diagram of link discovery by Dolfins to discover ingress and egress links to neighbor Dolfins, under an embodiment. Each Dolfin sends Hello messages to its links in order to discover neighboring nodes and to add the corresponding links of the neighboring nodes to its infrastructure. Each Hello message includes an empty neighborList. The Dolfin then adds an ingress link for each Hello message received from neighbor Dolfins, and adds those neighbors to their neighborsList. Upon receiving a Hello message, a Dolfin determines if it is included on the neighborList of the received message, and if it is on the neighborList then is adds an egress link to the neighbor Dolfin corresponding to the Hello message.

In the alternative embodiment described herein in which Sardine handles the OSPF message sending and receiving, the identification of adjacent Dolfins is realized using an exchange of Hello messages between the corresponding Sardines. Through the exchange of Hello messages, each Dolfin discovers its neighbor nodes and corresponding links. While each Sardine sends the Hello messages to its links in order to discover neighboring nodes, its corresponding Dolfin adds an ingress link for each Hello message received from Sardines of neighboring Dolfins, and adds those neighbors to their neighborsList. Upon receipt of a Hello message by its Sardine, a Dolfin determines if it is included on the neighborList of the received message, and if it is on the neighborList then is adds an egress link to the neighbor Dolfin corresponding to the Hello message.

Dolfins send Route Updates to their discovered links, and Dolfins only accept these link-state updates (LSUs) from known devices. Each Dolfin stores incoming and accepted LSUs, as well as its locally generated LSUs. Upon receiving a Route Update from a new device, the data structure is created for the new device and added to the configuration data. The stored LSUs for all devices are evaluated, and checked to determine if any link-state advertisement (LSA) has this new device as its destination. If positive, a new link is created from this stored LSU so LSUs will be accepted from this device.

Dolfins then start receiving Route Updates from each known device and add the route updates to their configuration. As LSUs can include links to unknown devices, these unknown devices are stored, and links are added only when link source and destination are known. When a new device is discovered, the stored LSUs are evaluated and links are added from known devices to the new device.

Figure 32:
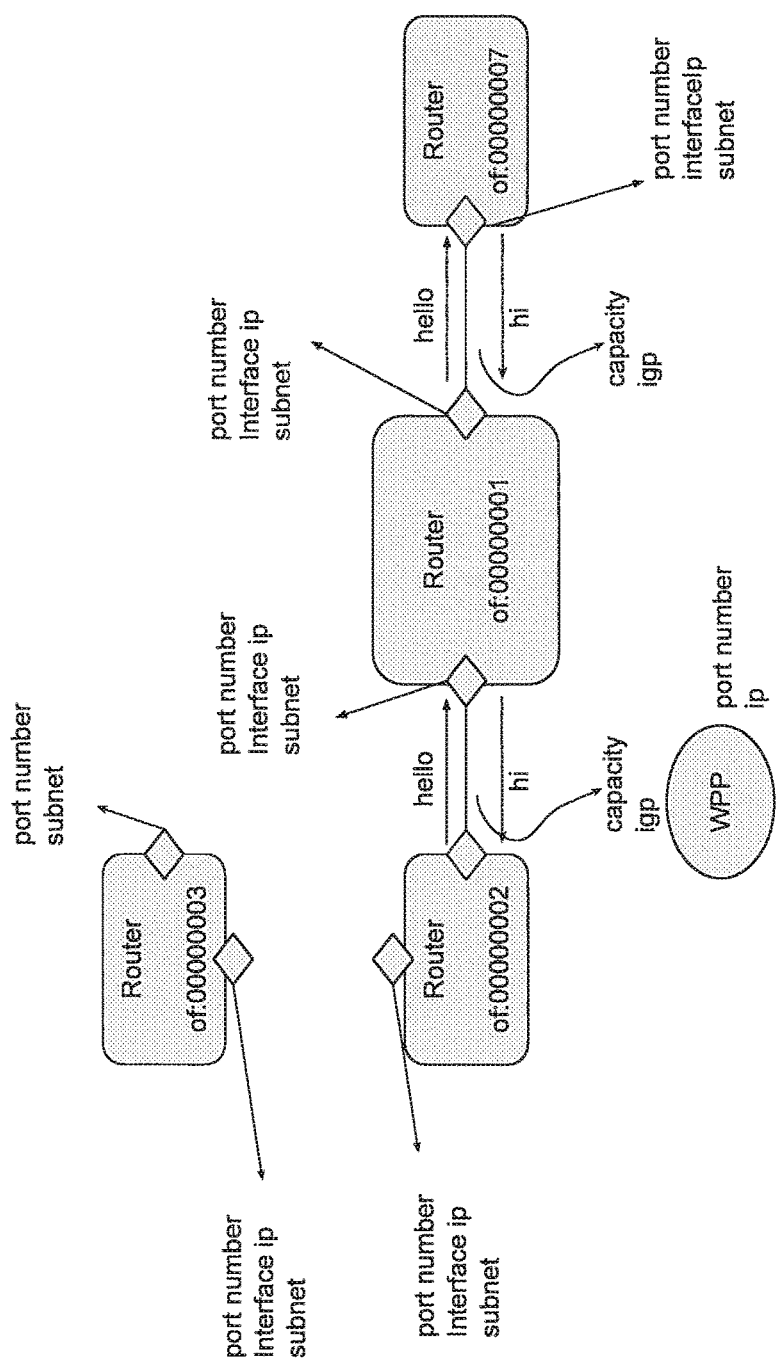
FIG. 32 shows route advertisement among Dolfins, under an embodiment.

Each Dolfin is configured to advertise to the entire network the subnets they route directly through their ports. In this manner each Dolfin starts to discover routes. FIG. 32 shows route advertisement among Dolfins, under an embodiment. A route advertisement of an embodiment includes but is not limited to the RouterId, NetworkIp, Subnet and Port. The RouterId can route through its port to the subnet. If the NetworkIp is a host address, then that is also the InterfaceIp of the Dolfin on that port.

As Dolfins begin to learn or gather information about links of neighboring Dolfins, information of those links is advertised throughout the MCN. Consequently, any active ingress link (to only neighbors) is advertised through link state advertisements (LSAs). LSAs are received from other Dolfins as well so that information of neighbor Dolfins is also updated using the LSAs. LSA packets are dropped for Dolfins from which a Route Advertisement has not been received.

LSAs also advertise Link Subnets. Each link endpoint (router interface) has an IP assigned to that subnet. The subnet of an embodiment includes a point-to-point network, having at most two (2) host IPs (e.g., prefix length /30 or /31) including one for each router interface.

LSAs include information of SourceRouterId, DestinationRouterId and LinkSubnet. Both SourcePort and DestinationPort are used to create a link, so these are derived through determining (e.g., look up) for each Dolfin the port that is assigned to that LinkSubnet.

Figure 33:
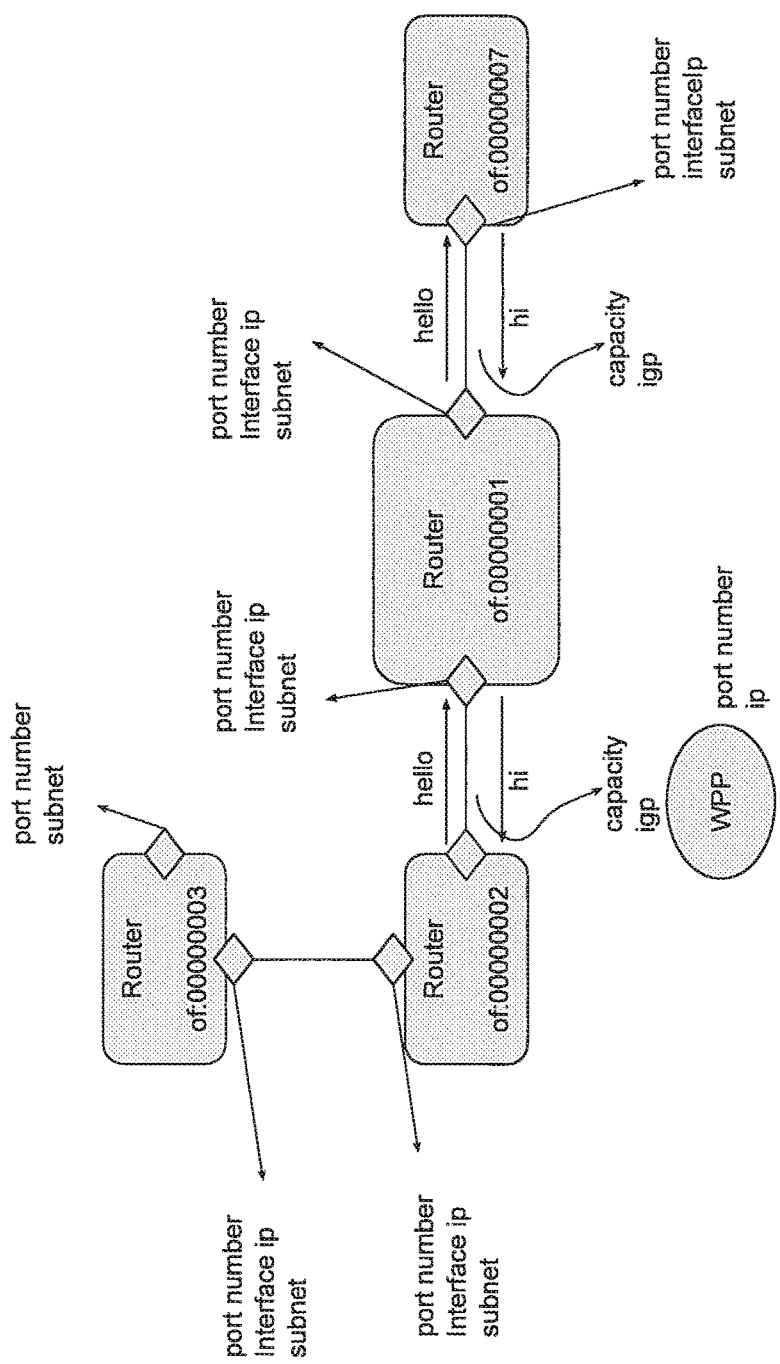
FIG. 33 shows link property advertisement among Dolfins, under an embodiment.

Each Dolfin of an embodiment advertises to the network its link properties, such as capacity and IGP. FIG. 33 shows link property advertisement among Dolfins, under an embodiment. The Infrastructure Link Advertisement provides information of the RouterId, Port and the properties. Receiving Dolfins add these properties to the Neighbor information that RouterId knows.

Each Dolfin is provided with only the network configuration associated with that Dolfin. The local network configuration data sent to a Dolfin therefore includes RouterId, Interfaces (Port, IP, Subnet), link to neighbor nodes (Link Infra Properties (Capacity, IGP), Link Port), and probing protocol packet Daemon (IP, Port).

Every Dolfin of the MCN is aware of every route. Routes are updated when a new host/switch connects to a Dolfin or when a routing table of a Dolfin is manually updated. Routes are advertised only when needed (e.g., new Dolfin added to the network, routing table updated on local Dolfin, following elapsing of a pre-specified period of time), but are not so limited. Route Packets are issued periodically.

A routing protocol packet (e.g., OSPF) is generated with a RouteUpdate type, and this packet floods the network. A RouteUpdate includes a list of Route Advertisements for each subnet and IP on the routing table. The receiving Dolfins update their routing tables using data of the packet, and forward the packet. While flooding in an embodiment happens to new Route Updates (related to packet sequence number, age and previously seen Route Update packets), flooding is optional because other methods can be used to provide the Route Updates information to the Dolfins.

Each Dolfin is aware of the qualities for its links. Infrastructure Link Packets are issued periodically. A routing protocol packet (e.g., OSPF) packet is generated with a InfraLinkUpdate type, and this packet floods the network.

An InfraLinkUpdate includes a list of Infrastructure Link Advertises for each link on the Dolfin interfaces. The receiving Dolfins update the link qualities using the packet InfraLinkAdvertisement, and forward the packet. Flooding in an embodiment happens to new Infra Link Updates (related to packet sequence number, age and previously seen Infra Link Update packets), but is not so limited. Flooding is not needed if the triggering event is a new Dolfin added to the network (packet can be sent to the new router, which results in receipt of an acknowledgement).

Every Dolfin maintains a map of Dolfin-to-Dolfin information. Every Dolfin generates or builds and updates a RoutingTable. The RoutingTable data structure is used to help the handling of incoming packets so that, given an IP destination address, the Dolfin to which the packet is to be forwarded is known. The RoutingTable is updated after each RouteUpdate packet. DeviceConfigurationManager also updates the RoutingTable for Hosts subnets connected to the switch.

Network Traffic Classification and Routing

The Dolfins of an embodiment are configured to control a routing pipeline to achieve both network traffic flow classification for statistics generation, and routing with different behaviors and one or more metrics based on the traffic classification result, as described herein. While HALO is used to control packet routing, an embodiment applies the most suitable routing behavior of HALO by classifying the packet as pertaining to a certain user-defined class of network traffic.

A traffic class is a configuration input into the system that specifies how a certain type of traffic should be routed. A traffic class includes two components, selector and behavior. Selector specifies the characteristics of the flow that would match this traffic class. The selector also specifies different patterns to be matched to classify a flow as part of this traffic class. Those patterns can be either 5-tuple like matching or DSCP code values.

Behavior, which specifies how to route the traffic classified as this traffic class, includes two components, a routing algorithm and an objective function. Embodiments of HALO include multiple routing algorithms, which define the different ways flows can be routed, including routing packets via multiple-paths, routing packets directly via the shortest path, routing packets on a single-path and maintain the packets on that route unless there is a topology change or a variation in link qualities that exceeds a pre-specified threshold, and dropping packets.

These routing algorithms (with the exception of dropping packets) rely on having a corresponding objective function that provides a metric to evaluate a link weight and build the topology shortest paths trees. The mathematical objective function takes link quality metrics as input and provides a weight as an output. The objective functions use the available metrics (e.g., link utilization, latency, jitter, packet loss, IGP), and combine them in different ways to the objective functions provided to be used on the behaviors.

The Dolfin traffic class subsystem is configured to determine the traffic class of received traffic, and to generate the OVS tables and flow rules to ensure that the different flows are routed as specified by their corresponding traffic class. As the network routes data of different applications using different routing algorithms and corresponding metrics, the traffic classes for each tenant are derived from information of applications accessed by that tenant over the core network. Each tenant configures the MCN by adding or specifying information or data of the different data traffic and applications they want to classify, and the way in which they want their traffic or packets handled. A class of an embodiment is defined by specifying a protocol, ports, and the type of routing used for the class. Additionally a name can be included for ease of identification. An example of a class definition is as follows: name "video conference"; protocol "UDP"; ports "4000-5000"; handling "low latency path"). Another example of a class definition is as follows: name "file transfer"; protocol "TCP"; ports "22"; handling "high throughput"). Based on the specified traffic class definitions, embodiments generate and configure traffic flow rules to identify and apply different routing to traffic matching the parameters of the class definition.

The traffic flow rules are configured to follow a pipeline processing-based approach (e.g., OpenFlow). Each flow of traffic in the MCN is controlled using a flow rule dedicated to that flow, which leads to a large number of rules that can be a burden on network memory. Embodiments therefore include traffic class table trees (TTTs) to manage the OVS rules used in making routing decision while reducing a size of the rule set. The TTTs, which are implemented in the OVS, enable a large number of rules to be implemented in a hierarchical series of smaller tables, instead of a single table housing all rules. Using the TTTs, a traffic flow is pipelined through a series of tables, and the resulting flow rule is obtained as the Cartesian product of a single matching entry from each tree. This pipelining of packets through the TTTs therefore provides the equivalent of a single flow rule while requiring the network to maintain fewer flow rules, thereby enabling implementation of relatively larger rule set with significantly less processing overhead.

The traffic flow rules are placed into the OVS in multiple tables, and a rule comprises its table number, a selector, and a set of actions, but is not limited to these parameters. The table number of a rule includes an identifier of the table to which the rule should be installed. The selector of the rule defines the packets that match the rule, and can also specify different expected parameters for a packet (e.g., L4 protocol, L4 ports, ethernet packet type, source subnet, destination subnet, etc.). The action of the rule includes the operation or sequence of operations to be performed on the packet. The operations include, for example, modifying the packet values, pushing the packet out on a physical port, and/or dropping or sending the packet to another table where it is matched with rules from that table, but are not so limited.

Figure 34:
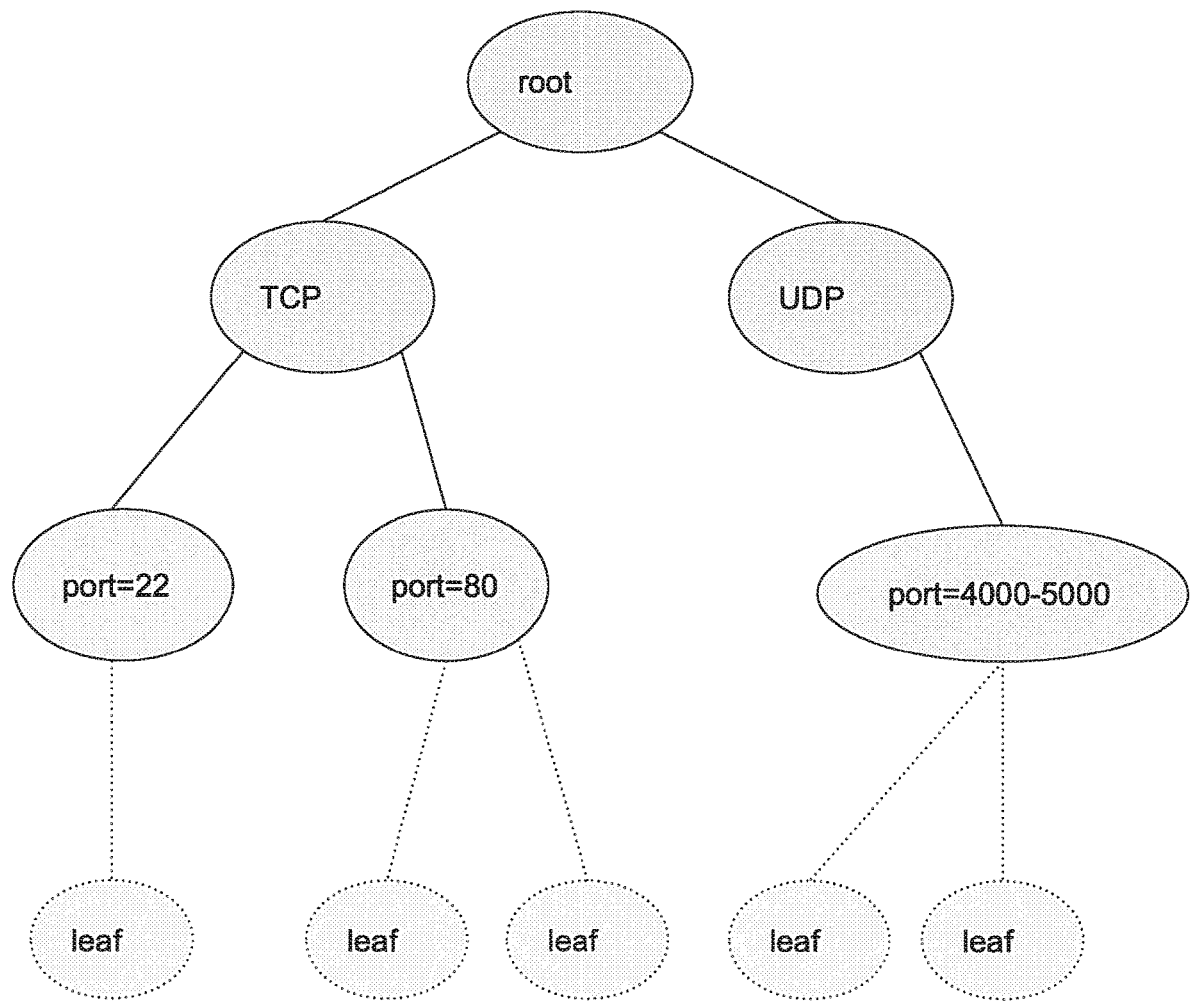
FIG. 34 is an example rule tree, under an embodiment.
Figure 35:
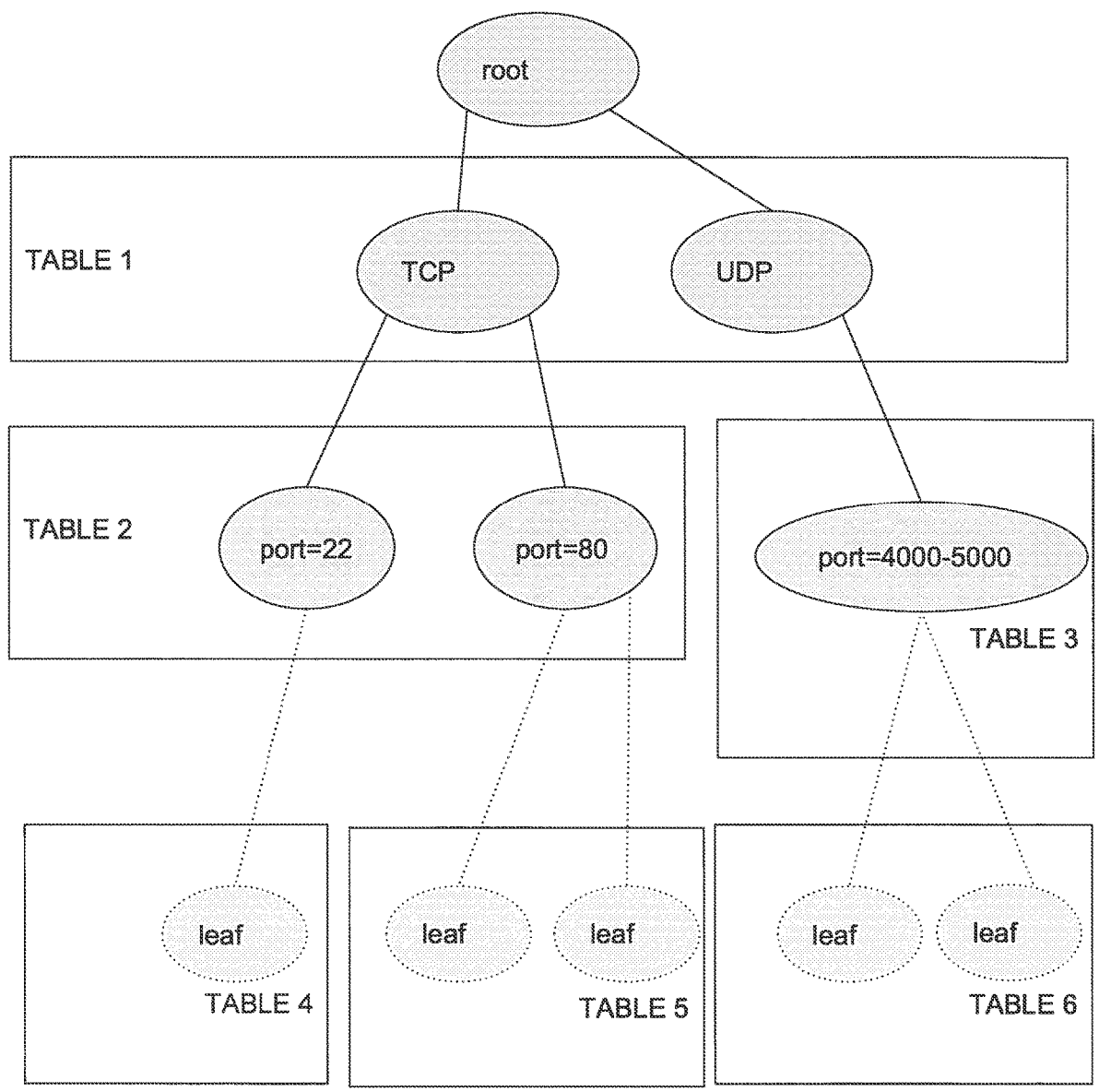
FIG. 35 is an example rule tree, under an embodiment.

Embodiments organize the traffic flow rules by generating a tree to include the user-configured classes, thereby reducing the number of required rules as well as making it easier to generate statistics for all classes. FIG. 34 is an example rule tree, under an embodiment. An embodiment further generates a table tree that includes multiple tables of rules arranged in a tree structure, as described in detail herein. Matching on the tree comprises use of multiple rules spread across different tables, so an embodiment places or divides the rules into tables as described herein. FIG. 35 is an example rule tree, under an embodiment. Through use of multiple tables, and configuring rules to forward packets from table to table, embodiments simplify computations used to classify and generate statistics for the flows.

For example, if a TCP packet on port 22 is received, it is forwarded to Table 1 and match according to the TCP flow, which forwards the packet to Table 2. At Table 2, the packet matches port=22 rule, which forwards the packet to Table 4. On the leaf tables the system is configured to write rules with source and destination subnets, and the leaf rules on the same table generally follow the same type of behavior. These leaf rules route the packet according to the desired behavior.

Embodiments track the rules installed for each traffic class and, further, make use of flow statistic messages received (periodically) from the OVS to generate and retain per-class metrics. More specifically, each rule tracks the number of bytes and packets on which it operates (e.g., matches), and is thus configured to identify the statistics about the different protocols and ports. For example, to check how many TCP packets were routed the system analyzes data of the Table 1 TCP rule, as all TCP packets passed through that rule. Further, to check on how many TCP packets were routed via port 22, the system analyzes data of the Table 2 port 22 rule.

The tree of tables of an embodiment, in addition to maintaining the capability to route using different approaches, simplifies the identification and classification of the different network flows being routed. Organization of the flows into tables also greatly simplifies the addition and removal of new classes of network traffic, which can be performed by simply adding or removing new tables and nodes linking to those tables.

Traffic Identification and Objective Function

Dolfin controls routing of traffic using HALO and its routing behaviors along with information of numerous different traffic classes as described herein, and in so doing it associates with each traffic class a specific objective function that models the routing behavior of that particular traffic class. The objective function operates using one or more particular link metrics to identify least-cost paths in the network, and the link metric(s) to which each particular objective function is applied is therefore based on the sensitivity of the corresponding routing behavior to that metric(s). In controlling traffic routing through the network, Dolfin performs traffic identification and classification, and implements the objective functions corresponding to the traffic classification.

Dolfin comprises four traffic classes including Expedited Forwarding (EF), Assured Forwarding (AF), Best Effort (BE), and Network Control (NC), but is not so limited. The objective function of each traffic class operates on a prioritized hierarchy of link metrics to identify the least-cost paths in the network.

The prioritized link metric hierarchy (default) for the Expedited Forwarding traffic class is latency, jitter, loss, utilization, and cost, but is not so limited. The routing behavior of the expedited forwarding traffic class is aimed at latency-sensitive traffic. The shortest path routing behavior is dynamic and reacts quickly to network changes, thereby ensuring that the flows stay on the best path while avoiding unrestrained or uncontrolled oscillations in routing. Using the link cost function (Latency+k*Jitter), traffic is routed along the path of least latency, adding a penalty for jitter on the links. The weight k placed on jitter is configurable.

The prioritized link metric hierarchy (default) for the Assured Forwarding traffic class is loss, latency, jitter, utilization, and cost, but is not so limited. The routing behavior of the assured forwarding traffic class is aimed at minimizing loss in order to support loss-sensitive traffic. The Sticky routing behavior is used to avoid moving the flow, which can induce temporary loss. Setting the link cost to the negative log of packet survival rate (1−loss rate) (link cost function−ln(1−Loss100)), traffic is routed along a route with the minimum cumulative loss rate. Loss accumulates multiplicatively, while the MCN algorithms evaluate sequences of links additively. Therefore, the least-cost path ends up being the path that maximizes the cumulative survival probability for transmitted packets. Packet loss rate can be noisy, so an embodiment considers an average of samples from a pre-specified time interval (e.g., one (1) second, etc.), weighted by packet count.

The prioritized link metric hierarchy (default) for the Best Effort traffic class is cost, utilization, loss, latency, and jitter, but is not so limited. The routing behavior of the best effort traffic class is configured for lower-priority bulk traffic. An embodiment balances the traffic over multiple network paths. Cost plays a role in incentivizing routing that avoids premium links, so embodiments use a link cost function (Cost*Capacity/(Capacity−Utilization)) but do not consider the link quality metrics loss, latency, and jitter for bulk traffic. The utilization factor, which in an embodiment represents the M/M/1 queue delay, incentivizes the routing to avoid congesting paths, and to avoid adding bulk traffic to the paths already in use by higher-priority traffic.

The prioritized link metric hierarchy (default) for the Network Control traffic class is latency, loss, jitter, utilization, and cost, but is not so limited.

The WEB-UI is configured to enable a tenant to input or change (from the default) a priority order of link metrics for one or more of the different traffic classes. Further, the MCN of an embodiment can be configured to enable a tenant to assign a weight to one or more link metrics, where the weights are used in lieu of the link metric priorities. In this manner embodiments differentiate "premium" links in the network in a manner configurable by the tenant.

The routing process for incoming traffic involves Dolfin determining a class of the traffic using one of user-defined classification parameters, Differentiated Services Code Point (DSCP)-based parameters, or automatic classification. When a tenant has opted to provide traffic classification parameters, Dolfin is configured to identify traffic classes by applying the user-defined traffic classification parameters. The user-defined parameters include, for example, IP range (e.g., source IP, destination IP), port range, and protocol identifying information, but are not so limited.

The WEB-UI is configured for use by a tenant to input configuration data relating to supported traffic classifications, including providing a combination of five-tuple values (e.g., source IP address, destination IP address, source port, destination port, protocol), and in advanced cases, the Layer 7 application or URL. In cases where the tenant-configured DSCP code point values differ from the DSCP values in incoming traffic, the tenant-configured DSCP values take precedence in classifying traffic, but embodiments are not so limited.

The WEB-UI further includes a setting to disable the default classification so that the traffic is routed using the DSCP value of the packet. The WEB-UI can also be configured for use in setting whether the traffic default classification is to be applied permanently, or if it is to be applied only while the traffic is traversing the MCN such that the original DSCP value is restored when the traffic egresses the MCN.

The determination of traffic class using user-defined parameters comprises classifying incoming traffic using information provided by the tenant via the web UI, as described herein. For example, Dolfins are configured via a REST API with traffic class data. The traffic class data is integrated into the ONOS API, but embodiments are not so limited. Identification of classes is performed based on one or more traffic attributes including protocol (TCP or UDP), ports (range of ports (source and destination)), source (IP of the source originating the packets), destination (final destination IP of packets), and behavior (configured behavior for flows matched by this class). Embodiments extend the configuration fields to include destination port, and differentiated services (DSCP) field, but are not so limited. Upon detecting a new flow, Dolfin is configured to perform a comparison with the configured traffic classes, and a decision is made on how to route the flow. A top-level flow table matches on these fields and forwards traffic to separate tables corresponding to each traffic class, but is not so limited.

Traffic classes are controlled differently based upon tenant configuration data or parameters. In addition to configuring the identification of a class, the tenant also provides the behavior expected for a traffic class. The available routing options of HALO include one or more of multiple-path routing, Sticky (packets are routed via a single path and are not moved unless there is a topology change), shortest path (packets are routed directly through the shortest path), and DROP (packets are dropped), as described herein. Further, HALO uses a corresponding metric (e.g., delay, congestion, latency, etc.) as an input to the selected routing behavior.

Dolfin, in the absence of user-defined traffic classes, is configured to identify traffic classes according to the differentiated services code point (DSCP-based) information in the corresponding traffic header and corresponding protocol/port range. The MCN is configured to check the DSCP values of incoming packets and classify the packet as belonging to a class of traffic with a particular priority. The MCN can also be configured to use additional deep packet inspection-based traffic detection functions to identify a type of traffic, and to verify and mark the DSCP code point values appropriately.

More particularly, the DS field in the packet header specifies a per-hop routing behavior of the corresponding traffic, and Dolfin is configured to use this DSCP information to control routing behavior by assigning corresponding traffic classifications. If the incoming traffic does not have a specific DSCP value marked, the MCN is configured to mark the packet with a default classification based on the following: VPN traffic with source or destination packets with Port numbers 500, 4500, and SSL VPN (443) is marked as Assured Forwarding class; traffic that would be under a data transfer class (e.g., FTP, SCP, SSH, etc.) is marked as Assured Forwarding class; general Internet bound traffic (e.g., HTTP (port 80), and DNS (port 53)) is marked as Best Effort class; real time voice and video traffic with Port numbers for SIP (5060, 5061), RTSP (554), RTP (5004), and RTCP (5005) is marked as Expedited Forwarding class; speedtest type traffic is marked as Expedited Forwarding class so it receives the best preference when traversing the MCN.

The DSCP-based traffic classification comprises mapping traffic into traffic classes according to a hierarchy that includes use of a custom override mapping, differentiated services field mapping, source port field mapping, and default mapping. The hierarchy of an embodiment is a decreasing hierarchy, but is not so limited. The mappings are configurable from the front-end via one or more configuration APIs, as described in detail herein. The MCN specifies or defines routing behavior using a routing algorithm/objection function (link cost) pair, and the Dolfin and the middleware have shared knowledge of the available routing behaviors. The WEB-APP is configured to present via the WEB-UI a list of the behaviors available for use.

The configuration APIs are further configured for use in adding new traffic classification mappings. In response to a new classification mapping, embodiments generate an identifier that specifies the desired routing behavior, and the Dolfin creates a new traffic class configured with the selected algorithm and cost function parameters of the routing behavior.

Classification using the custom override mapping is configured to map traffic to a traffic class using a match on any subset of N-tuple values (where N represents a pre-specified variable). For example, the custom override matches on any subset of 5-tuple values (Source IP, Destination IP, Source Port, Destination Port, Protocol). The N-tuple values are provided by the tenant or administrator, but are not so limited.

Traffic classification using the differentiated services (DSCP) field mapping comprises use of the 6-bit value present in the corresponding packet IP header. Embodiments include a default mapping from DSCP values to traffic classes and, optionally, include a reconfigurable mapping (front-end).

The classification of traffic using the source port field mapping includes use of the 16-bit value in the UDP/TCP packet header. Embodiments include a default mapping from source port to traffic classes and, optionally, include a reconfigurable mapping (front-end).

Default traffic classification is used when a match is not found for a packet in any configured mapping. The default traffic classification comprises routing the flow through the Best Effort class, but is not so limited.

Dolfin is further configured to perform automatic classification of traffic as described herein. Automatic classification is used to determine traffic routing behavior in the absence of user-defined classification parameters and DSCP-based information. This automatic classification is based on IP range (e.g., source IP, destination IP) and port range, for example.

Objective Functions Behavior and Composition

Following determination of the traffic classification for a traffic flow, Dolfin identifies the objective function corresponding to the traffic classification. The objective function models the routing behavior of the traffic, thereby controlling the routing behavior of the traffic. Multiple paths exist between source and egress destination, and the routing of an embodiment is configured to use one or more paths for routing data (e.g., all paths, set of paths, etc.). While an embodiment uses or invokes multi-path data routing, as described in detail herein, embodiments are not so limited as the MCN components are not limited to including or using any particular type of routing.

Regardless of the type of routing used, Dolfins are configured to provide multiple policy-based routing algorithms for use in routing data. For example, a particular user can specify policy-based routing based on latency, so that routes having the lowest latency are used to route the corresponding data. In another example, a particular user can specify policy-based routing based on data throughput, so that routes having the highest throughput are selected for routing the corresponding data. Thus, the POPs of embodiments control routing with user-specified objective functions or policies, or combinations of selected policies.

The traffic routing of embodiments generally operates by finding least-cost paths in the network, where the lowest cost path is determined based on one or more link metrics such as packet loss, jitter, latency, throughput, and utilization as described herein. The cost of a path is defined as the sum of the costs of the links that comprise the path, so each link in a network has an associated numeric or link cost that produces routing behavior matching tenant needs and expectations. Embodiments therefore take into account any combination of link properties when computing the cost of a link, and in response produce a single, positive real-valued cost.

The objective functions are configured to calculate link cost for the links in the network. When applied on a per-link basis, an objective function uses the corresponding link metrics (e.g., packet loss, latency, jitter, etc.) for the particular link to determine or calculate the link cost of that link. Dolfin then evaluates the link costs of all links in the network to determine a "best" path through the network from ingress POP to egress POP for a traffic flow, where the "best" path is the path that minimizes the link cost. The objective functions of an embodiment are configurable or reconfigurable by tenants desiring custom objective functions for use in routing their traffic, but are not so limited.

To compute the cost for a link, embodiments consider a number of properties describing the link. More particularly, components of the MCN are configured to measure a set of link quality metrics for each link, as described in detail herein. The link quality metrics include latency, which as used herein is determined using the round-trip travel time over the link (milliseconds). Link quality metrics also include jitter, which as used herein includes variation in the round-trip travel time over the link (milliseconds (ms)). Further, link quality metrics include loss, which as used herein includes the loss rate on the link, as a percentage of packets lost. Link quality metrics also include utilization, which as used herein includes the traffic rate on the link, specified in terms of a bitrate. Link quality metrics of an example embodiment are reported every 100 ms, with the exception of utilization, which is reported every 250 ms, but the embodiments are not so limited.

In addition to the link quality metrics, static properties of each link are considered in embodiments. The static properties include capacity, which as used herein includes the maximum traffic capacity of the link (bitrate). Static properties also include interior gateway protocol value, which as used herein includes a fixed cost configured for the link. Therefore, while embodiments can take into account any combination of link properties when computing the cost of a link, the resulting output is a single, positive real-valued cost.

The link cost function is paired with a routing algorithm to define routing behavior. The routing algorithms of HALO include multi-path, shortest path, and Sticky routing behaviors. In particular, the shortest path routing behavior is configured to select a least-cost path for the traffic, and the traffic is re-routed to a lower cost path if such a path is subsequently identified. The Sticky routing behavior is configured to select a least-cost path for the traffic at the time when traffic flow starts, and keeps the traffic on the selected path unless a significant network change occurs (e.g., link or node coming up or going down), in which case the least-cost path is recomputed and the traffic is moved to the new least-cost path. The multi-path behavior continuously balances traffic over multiple paths, converging to a state in which all traffic is taking a least-cost path.

HALO

Routing behavior is defined by pairing a routing algorithm with a link cost function as described herein. Traffic routed through the MCN is assigned one of a number of traffic classes, and differentiated treatment of traffic belonging to different traffic classes based on current network conditions provides an important feature in a dynamic real-time network like the MCN. Therefore, to understand the routing behavior produced by the link cost functions, the behavior of the routing algorithms is also considered.

Generally, the HALO routing algorithm continuously balances traffic over multiple paths, converging to a state in which all traffic is taking a least-cost path. The Sticky algorithm, which is a routing behavior of HALO, selects a least-cost path for the traffic at the time the traffic starts flowing, and keeps the traffic on that path until such time as a significant network change occurs (e.g., link or node coming up or going down) at which time the least-cost path is recomputed and the traffic is moved onto the new path. The shortest path routing behavior selects a least-cost path for traffic, and if the selected path changes then the traffic is moved.

The HALO algorithm provides a routing solution that retains the simplicity of link-state, hop-by-hop protocols while iteratively converging to the optimal routing assignment. HALO comprises a novel link-state routing solution with hop-by-hop packet forwarding that minimizes the cost of carrying traffic through packet-switched networks. The term "hop-by-hop" as used herein means that each router, based on the egress destination address, controls only the next hop of a packet as it traverses the core network. "Adaptive" as used herein refers to the algorithm not requiring the traffic demand matrix as an explicit input in order to compute link weights. Specifically, the algorithm seamlessly recognizes and adapts to changes in the network, both topology changes and traffic variations, as inferred from the network states like link flow rates. The term "link state" as used herein means each router receives the state of all network links through periodically flooded link-state updates and makes routing decisions based on the link states. The term "optimal" as used herein refers to the routing algorithm minimizing some objective or cost function (e.g., minimize total delay) determined by the network operator.

At each node (source), for every other node (destination), HALO independently and iteratively updates the fraction of traffic routed to the destination node and leaving the source node on each of its outgoing links. This "fraction of traffic" is represented using "split ratios", as described in detail herein. Embodiments measure time in units of iterations, and each iteration is defined by a cycle comprising the flooding of existing link states through the network followed by updating of split ratios at every POP, which modifies the link states for the next iteration. The updates are calculated per iteration based on the best path to each destination as determined by the marginal costs of the network's links. The marginal link costs used to find the best paths are in turn obtained from link-state updates that are flooded through the network after each iteration. The split ratios for all links converge to a set in which every element of the set achieves the global optimum to the multi-commodity flow problem and accordingly achieves optimal traffic engineering for the network. Thus, HALO converges to the routing configuration that minimizes the cost of the network. Furthermore, HALO is adaptive and automatically converges to the new optimal routing assignment for quasi-static network changes.

The selections at each POP relating to which or how many packets follow a select next hop through select nodes is termed a "split ratio" as described herein. The split ratio determination performed at each POP generally comprises each node checking to see whether it has traffic to a given destination. If it does not already have traffic going to a destination, it forwards all newly received packets to that destination along the shortest path to that destination. If it does already have traffic going to a destination, it adjusts the fraction of traffic it forwards along its different outgoing links according to the split ratio equations. This process is iteratively followed until the optimal solution is obtained.

More specifically, each iteration is defined by the flooding of existing link states through the network followed by every router updating its split ratios, which modifies the link states for the next iteration, as described herein. In the time between network changes when the topology and the input traffic is static, embodiments iteratively adjust the split ratios at each router, and move traffic from one outgoing link to another in accordance with the adjusted split ratios. This only controls the next hop on a packet's path leading to hop-by-hop routing. The split ratio adjustments comprise increasing the split ratio to the link that is part of the shortest path at each iteration, even though the average price via the next-hop router may not be the lowest. Split ratios are also adapted dynamically and incrementally by decreasing a ratio along links that belong to non-shortest paths while increasing a ratio along the link that is part of the currently calculated shortest path at every router.

As a more specific example, the calculation of split ratios at each POP comprises computing or determining the shortest path tree to a destination POP, and then calculating branch cardinality for the shortest path by calculating a product of the number of branches encountered in traversing this shortest path tree. Branch cardinality is used to make sure that nodes that are farther away from a destination node are more conservative in how much traffic they shift to the shortest path leading to the destination. A traffic shift rate is determined at which traffic to the POP will be dynamically shifted from a more 'expensive' link to the link with the lowest cost or shortest path. A split ratio update factor is calculated by dividing the traffic shift rate by the total rate of communication to the POP. The updated split ratio is calculated by multiplying the current split ratio and the split ratio update factor, and dividing the result by the branch cardinality.

Because embodiments measure time in terms of iterations, the physical time needed to complete an iteration generally does not adversely affect the results except in situations in which the network state changes very rapidly within the physical time. However, between iterations, the split ratio updates are made using a step-size selected to allow changes in split ratios to be reflected in the link rates prior to a next iteration.

Step size is the unit of control with which the calculated changes in the split ratios are multiplied to determine how much to vary the split ratios from one time slot to the next, and is generally controlled to enable the network to approach a stable operating point. The step size of an embodiment is generally selected to be inversely proportional to the load. The step size can be decreased as the optimal routing assignment is approached, but embodiments are not so limited, as use of a small enough but constant step-size causes routes to stabilize at a point closely approximating the optimal routing assignment.

In contrast to the small step-sizes, alternative embodiments use larger step-sizes to increase the speed with which the routing approaches or converges to the optimal solution. While larger step-sizes may be prone to oscillations that can possibly slow convergence to optimality, small oscillations are acceptable and have little or no adverse impact on overall network convergence to optimality.

Because time is measured in units of iterations, the time for the network to converge to the optimal routing solution depends upon the step-size used in each iteration and, additionally, the physical time needed to complete an iteration. In fact, the need to converge to the optimal routing assignment before the traffic changes means that routers are restricted in how long they have for each iteration.

The time required to complete an iteration depends at least in part on the frequency of the link state updates throughout the network. The POPs comprising the core network are operating independently or asynchronously in performance of the global link state updates. Therefore, the link state data is shared asynchronously among the POPs such that each POP is sending its link state data and receiving link state data asynchronously relative to the other POPs of the core network. Embodiments therefore consider the asynchronous link state updates when controlling or setting a frequency of link state updates in the core network. While the time needed to flood link states across the network or to update the routes according to split ratio calculations is relatively short, numerous iterations might be needed to converge to the optimal solution depending on the selected step-size. Consequently, embodiments are configured to use relatively high-frequency link-state updates throughout the core network in order to provide adequate convergence times.

A more detailed description of HALO and the split ratio calculations are included below.

Sticky Algorithm

The sticky flow or sticky behavior includes a type of traffic class behavior applied to flows that should stick to the same path until some reaction trigger is activated. The sticky behavior is therefore used to manage flows that could suffer performance loss by switching paths, and is configured to avoid path switching if possible. In managing traffic routing using the sticky algorithm, numerous conditions are considered when determining when the network is considered to have fundamentally changed so that sticky traffic is moved to a recalculated least-cost path. The network is determined to have changed when a latency change is detected that is at least X % (e.g., 10%, etc.) and at least an absolute change of Y ms (e.g., 50 ms, etc.). The network is determined to have changed when a jitter change is detected that is at least X ms (e.g., 15 ms). The network is determined to have changed when a loss change is detected that is at least X percentage points (e.g., two (2) percentage points, etc.).

Sticky flow re-computation is triggered in response to significant latency, jitter, or loss changes. However, re-computation should occur in response to a sustained change in the conditions on some link, and not in response to a single-sample spike or drop in particular metric. An embodiment compares medians of consecutive time intervals. The intervals are configurable, but are not so limited. For example, if X represents the median of samples from a first half of an interval, and Y represents the median of the samples from the second half of the interval, then re-computation would be triggered in response to a significant change between X and Y. The link metrics are reported to a Dolfin by its corresponding Watchdog, but not all data samples are shared with or provided to other Dolfins in the network through the OSPF messaging packets.

Another embodiment compares compute-time conditions by recording for each flow the iteration/timestamp at which its least-cost path was computed. The topology snapshot for each such iteration/timestamp is also maintained in memory. A comparison is performed between the link metrics in each snapshot and the current link metrics. Any snapshot deemed to be significantly different from the current network conditions is cleared out, and all associated flows have their least-cost path recomputed on the current snapshot. This process detects both sudden and gradual significant changes in link metrics, and can also apply some noise-reduction such as working with medians of samples to avoid re-computation in response to single-sample spikes. This process avoids potential scaling issues with the number of flows, since maintenance of old snapshots in memory and comparison of each one with current network conditions could become both time- and memory-intensive.

Another alternative embodiment detects significant changes in path-cost by tracking the path cost associated with each flow, instead of attempting to detect a change in a link metric. If the least-cost path in the current network is cheaper by some configured percentage, then the sticky flow is shifted over to the "cheaper" link. This process detects both sudden and gradual changes in the path cost, and also checks against the median of the path cost over a few successive network snapshots to avoid responding to short-lived spikes or drops.

Deteriorated Link Conditions (Brownout or Blackout)

Upon determining a best path for each traffic flow using link metrics available at the time the flow is assigned to a path, embodiments route the traffic via that best path. Once routed over a particular link, the traffic is maintained on the selected route until occurrence of an event necessitates rerouting of the traffic. Data of routing and routing changes is logged, and this logged data includes information of the full flow, the old path, the new path, and time stamps for flow start and the flow change event. When configured for packet-based routing, the metrics are evaluated for each packet routed or forwarded.

An event that results in rerouting includes deterioration of link conditions (blackout or brownout) as evidenced by the link metrics. Another event that results in rerouting traffic over an alternative link includes the occurrence of a new flow having a higher priority traffic class, where routing of the new flow over the same link as the lower priority flow will exceed the traffic utilization as determined by the corresponding routing algorithm.

Traffic rerouting is also initiated as a result of an increase in utilization of a route. The increased utilization results from changes in throughput on a path among flows sharing that path. This event triggers a re-evaluation of the distribution and flows while attempting to keep higher traffic class/priority on their current path. When rerouting of traffic becomes necessary because of contention between flows of the same traffic class/priority, the MCN components are configured to first move traffic flows having a smaller/lower bandwidth. This reduces the aggregate network impact by moving a lower bandwidth flow to a potentially higher latency path.

MCN components are configured to use link metrics to determine link status regarding blackout and brownout conditions as described herein. Link status of embodiments is probed periodically (e.g., once per second, once every five (5) seconds, etc.) to determine link up/down events, traffic utilization percentage (e.g., separate traffic directions, bidirectional), latency on a link (ms) (e.g., separate directions, RTT), jitter (ms) (e.g., separate directions, RTT), throughput (Mbps) (separate directions, bidirectional), and packet loss (percentage) (e.g., separate directions, bidirectional).

The link probing (e.g., latency, jitter, packet loss) is performed per each traffic class in order to develop hop-to-hop network metrics for each traffic class. The probe frequency and traffic classes to be probed are configurable by the corresponding tenant for a specific network. The MCN is configured to log information or data of all link probes, and the WEB-UI is configured to display or present this probing information using real-time graphs.

Embodiments include a "Quick Probe" setting configured to control a frequency of link probing. When enabled, this setting includes a control for separately setting probe times in sub-second increments (e.g., one (1) ms to one (1) second increments) for each respective traffic class. Therefore, for example, the Quick Probe control is configured to set a faster probe frequency for a first traffic class (e.g., Network Control), while disabling probing of a second traffic class (e.g., Best Effort).

When probing for packet loss, actual packet loss is determined separately from probe protocol data units (PDUs) lost in order to determine average packet loss on a link separately from loss of actual tenant packets on the link. Embodiments include use of an MCN signature on probe packets so that they are distinguishable from actual data traffic.

The metrics determined by link probing are not affected by issues relating to status (e.g., congestion) and/or availability (e.g., process down) of the OVS daemon at a POP. Embodiments also account for packets dropped due to rate limiting functions on a link/at a POP separately from actual link PDU/packet loss. Further, numbers of probe packets as well as throughput/bandwidth consumed by probe packets are separately accounted for in network metric logs and reports.

Links are probed periodically as described herein, and when a change is detected in a link metric that might necessitate rerouting of traffic to an alternative link, the probing of the current link is repeated a specified number of times before the traffic is rerouted. When the detected degradation in the link metric(s) is sustained during the configured number of repeated probes, MCN components trigger rerouting of the traffic from the current link to the next best route. An embodiment includes a default value of three (3) for the number of times to repeat probes, but is not so limited. Alternatively, the number of repeated probes is configurable by a tenant. When the current link is restored, the metrics of the link are re-evaluated over the specified number of probes prior to using the link to route any traffic.

When soft conditions on a link change continuously over the configured number of probes, the link is said to have a "brownout" and the flow (or packet) should be routed using the next best route. The traffic is rerouted, however, only when the link metrics of one or more alternate paths are improved relative to those of the current route. The change in link metrics of an embodiment is calculated using a baseline that is a mean/average link metric value (e.g., latency) over a specified preceding period of time (e.g., past 24 hours, etc.). The period of time used in calculating the baseline value is configurable, but is not so limited. Also, before changing a flow to an alternate route, the link metrics of the alternate path are evaluated to determine that they are in fact improved relative to those of the current route in order to avoid rerouting traffic to a bad link. The evaluation of the link metrics of the alternate route includes link data of at least the configured number of repeated probes, but is not so limited.

Embodiments include default parameters for triggering failovers. The default parameters for failover based on latency include triggering a failover to the best alternate path for any change in latency that exceeds a specified percentage (e.g., ten (10) percent, etc.) of the baseline latency and more than a specified value (e.g., 50 ms, etc.). For example, if the current route latency increases by ten percent, but the increase is less than 50 ms, the traffic is maintained on the current route.

The default parameters for failover based on jitter include triggering a failover to the best alternate path for any change in jitter that exceeds a specified value (e.g., 15 ms, etc.) is configured to trigger a failover to the best alternate path. The default parameters for failover based on packet loss include triggering a failover to the best alternate path for any change in packet loss that exceeds a specified percentage (e.g., two (2) percent, etc.) is configured to trigger a failover to the best alternate path.

The default parameters for triggering failovers in an alternative embodiment are configurable. This configurability option is particularly useful if/when a particular link is expected to experience lossy or jittery conditions, because it enables a tenant to configure the link with link metric values appropriate to those expected link conditions in order to minimize or eliminate flapping of the link.

Loop Control

The MCN components as described herein are configured to share link state data globally across the core network by exchanging messages, thereby enabling a link state view of the network. However, the routing of traffic through the core network includes use of a dynamic link state protocol routing system distributed among multiple Dolfins and, as such, can be thought of as 'distributed' because each Dolfin makes its traffic routing decisions independent of every other Dolfin in the network. However, this 'distributed' routing control can cause routing loops to occur in which a first Dolfin routes traffic to a second Dolfin, and the second Dolfin, which is independently routing its traffic, routes back to the first Dolfin the very traffic received from the first Dolfin. The routing loop can prevent the subject traffic from ever reaching its destination.

Embodiments are configured to perform distributed real-time loop avoidance to prevent routing loops that disrupt tenant traffic, and therefore limit "activated" links to avoid routing loops. Generally, embodiments include distributed algorithms that make activation decisions locally (node), based on a set of values referred to herein as 'intermediate variables' stored at each node. Thus, the loop avoidance algorithm is implemented separately for each traffic destination. Messages are then exchanged between direct neighboring nodes to negotiate updates to the variables. When compared with implementation in a centralized manager, the controlling of activation decisions locally in each node limits communication to communication between neighbor nodes, and is robust to Dolfin failure as it avoids a single point of failure.

Figure 36:
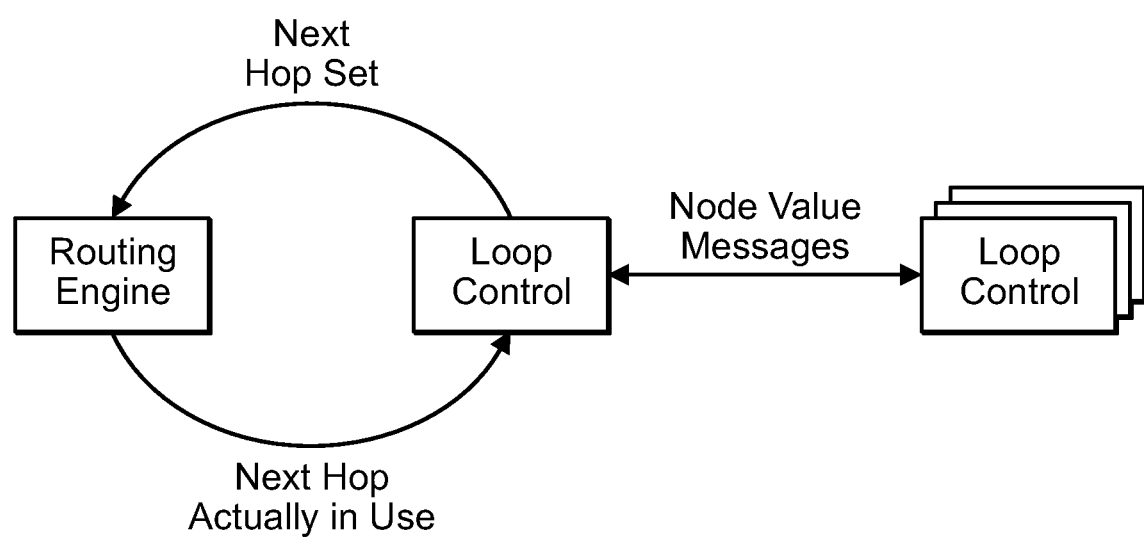
FIG. 36 is a block diagram showing Dolfin components involved in loop avoidance, under an embodiment.

Data routing at each Dolfin comprises two components, but is not so limited. FIG. 36 is a block diagram showing Dolfin components involved in loop avoidance, under an embodiment. The first component comprises the routing engine configured to generate a route between a source and an egress destination, as described in detail herein. The second component includes a loop control component configured to perform loop avoidance analysis on generated routes. Therefore, upon generating routes, the routing engine sends the generated route to the local loop control component, which performs loop avoidance. The routing engine sends the generated route to the loop control component prior to providing or pushing the generated route to the OVS but is not so limited. Upon receiving a message from the loop control component informing that the generated route avoids any loop, the routing engine pushes the generated route, comprising flow table entries, to the corresponding OVSs. This loop avoidance scheme, along with the high frequency measurement of link statistics, enables dynamic, high frequency rerouting of data and/or bandwidth allocation/reallocation, in contrast to relative infrequent rerouting used by conventional data routing equipment.

The loop control component of each Dolfin is configured to communicate with the loop control components in other Dolfins of the network in order to negotiate the node values as described herein. The loop control component of each host Dolfin also communicates with the local routing engine of its Dolfin, because routing decisions of the routing engine are required to comply with the loop avoidance parameters described herein. Therefore, when an iteration (set of network updates) starts, the routing engine requests and receives a next hop set from the loop control component. The next hop set comprises a list of neighboring nodes to which traffic routing is allowed for each destination. The routing engine then executes the routing algorithm using the next hop set to control the list of neighboring nodes available for routing traffic. Upon generating the traffic routing decisions, the routing engine sends to the loop control component a list of next hop nodes actually being used by the routing engine for traffic routing. The loop control component uses the list of next hop nodes actually in use to ensure that flowing traffic is not cut off as a result of operations involving calculation and control of the node value.

In performing loop avoidance, the loop control component is configured to superimpose on the fast-moving link state routing protocol a relatively slower moving distance vector technique that limits "activated" links in order to avoid routing loops. The distance vector method is implemented using a loop avoidance algorithm that limits the activated loops. Generally, the loop avoidance algorithm makes activation decisions locally, based on a set of node values referred to herein as "intermediate variables" generated and stored at each node. Node values are negotiated between neighbor nodes using messages exchanged directly between the nodes. Further, each node is required to track information including its node value, the node values of its neighbors, its neighbors' knowledge of its node value.

The loop avoidance algorithm is implemented separately for each traffic destination and begins by fixing the source and destination nodes for a route in the network, and assigning a node value to the nodes corresponding to the fixed nodes. A single rule governs operations under the loop avoidance algorithm, and that rule states that a node can only send traffic to its neighbor node if the node value of the sending node is higher than the node value of that neighbor node. Loops are therefore avoided under this rule because an attempt by the neighbor node (lower node value) to "return" traffic to the originating node (higher node value) would violate the rule because the neighbor node would have to send (return) traffic to the originating node, which has a higher node value.

A node can decrease its own value, and so doing might require the node to cease routing traffic to one or more of its neighbors for which it now has a lower node value. Further, when a node changes its node value it is configured to communicate the new node value to its neighbor nodes.

A node can also decide that it should increase its own node value. However, once the new higher node value is computed, and before actually changing its node value to the higher value, the node is configured to ensure that neighbor nodes having higher node values are aware of the new higher value and stop routing traffic to the node (since it currently has a lower node value). A series of handshake messages are used between the node needing to increase its node value and each of its neighbor nodes. The handshake series is initiated by the node increasing its value, and includes a message to inform one or more neighbor nodes that its node value is going to be increased. The handshake series also includes a confirmation from the neighbor node that it has updated the node value and stopped routing traffic to the subject node. The subject node is configured to increase its node value only after receipt of the confirmation message from the neighbor node(s).

Figure 37:
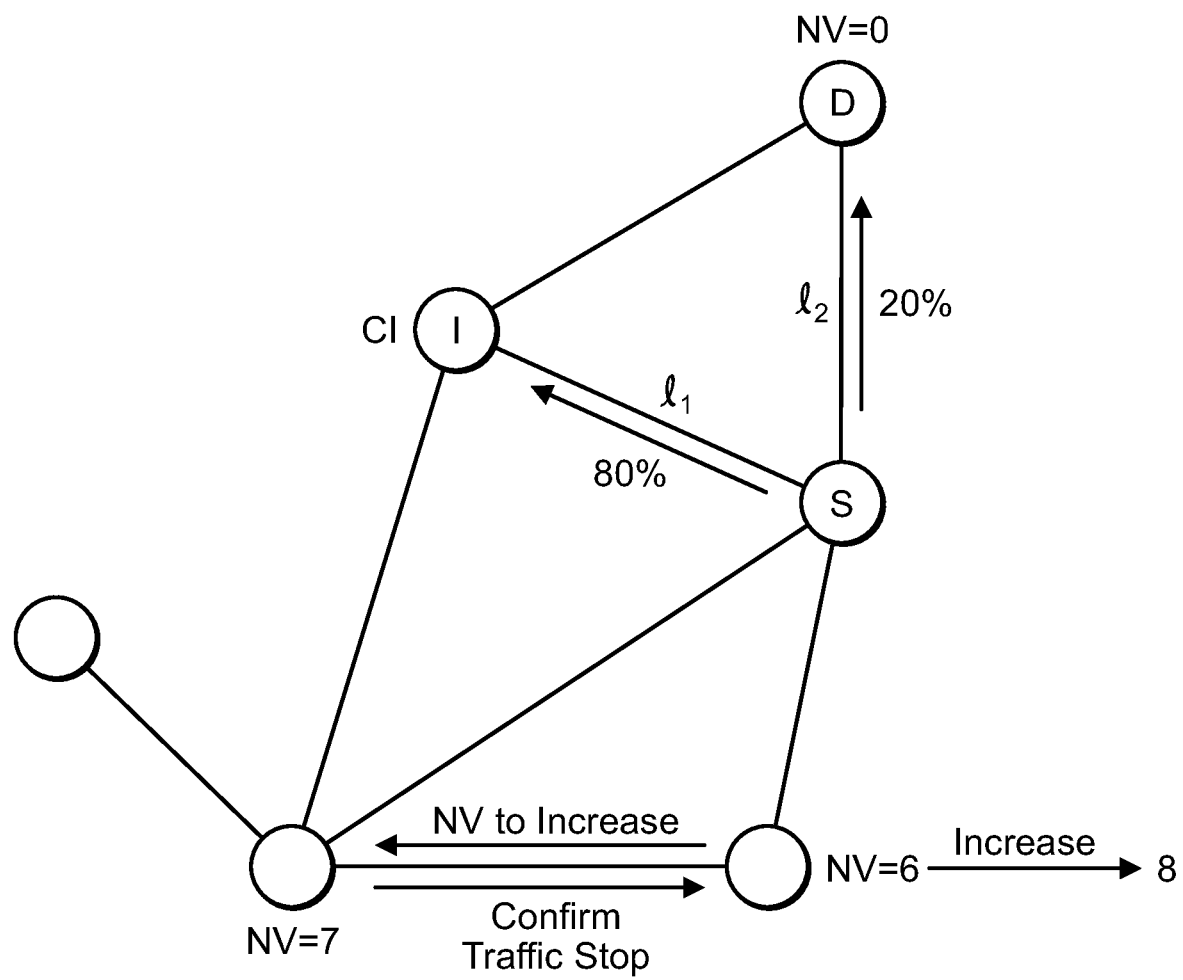
FIG. 37 is an example involving node value calculation in a portion of the core network, under an embodiment.

The node values are generally calculated to be the average cost to get from the source node to the destination node, with cost being determined according to the objective function(s) used in routing particular traffic between the source and destination nodes as described in detail herein. FIG. 37 is an example involving node value calculation in a portion of the core network, under an embodiment. The calculation and assignment of node values begins by assigning a node value or cost of zero to the destination node D. Using an example involving the HALO routing algorithm, a source node S has two available paths to the destination node D. A first path involves a first link directly to an intermediate node I, and a final direct link between the intermediate node I and the destination node D, so the cost corresponding to the first path is computed as the sum of the cost of the first link (L1) (determined from its objective function) and the cost of the intermediate node (CI) (i.e., L1+CI). A second path involves a second link directly from the source node S to the destination node D, and the cost corresponding to this second path is the cost of the second link (L2) determined from its corresponding objective function.

As this example is in the context of the multi-path routing behavior of HALO, it is assumed that for traffic routed between the source node S and destination node D, 80% of the traffic is routed via the first path and 20% of the traffic is routed via the second path. The cost of the source node is therefore calculated as the sum of a first quantity that is the first path cost multiplied by the percentage of traffic routed via the first path (i.e., (L1+CI)*(0.8)), and a second quantity that is the second path cost multiplied by the percentage of traffic routed via the second path (i.e., L2*(0.2)).

More specifically regarding node values, the loop avoidance algorithm is configured to assign a value to each node in the network. Each node tracks knowledge about its own value and the values in its neighbor nodes. An expression (e.g., $V(x; y_i|z)$ is used to denote the value in x, as believed to be known by y, stored in z. Each node x with neighbors $\{y_1, y_2, \ldots y_N\}$ stores its own value ($V(x; x|x)$), the values of its neighbors as known to itself ($V(y_i; x|x)$), and the value of itself as known to its neighbors ($V(x; y_i|x)$).

Regarding a choice of node value, all node values are initially infinity. When routing with HALO for example, and during each HALO iteration, each node initiates an update process to update its value to the shortest path cost to the destination as described in detail herein.

Embodiments maintain invariants on the node values. For example, a first invariant (e.g., $V(x; x|x) \leq V(x; y_i|x)$) is maintained for all neighbors $y_i$ of x. That is, the value of a node is not allowed to exceed the value of itself as known to its neighbors. A second variant (e.g., $V(x; y_i|x) \leq V(x; y_i|y_i)$) is maintained for all neighbors $y_i$ of x. That is, the value of a node as known to its neighbors is not allowed to exceed the value actually known to its neighbors. A third variant represents that a node x can activate a link to neighbor y only if the value of y is less than the value of x (as known by x: $V(x; x|x) > V(y; x|x)$). The result of these invariants is that for any activated link x→y, $V(x; x|x) > V(y; x|x) \geq V(y; x|y) \geq V(y; y|y)$. Since $V(x; x|x) > V(y; y|y)$ for all activated links x→y, there cannot exist a cycle formed by activated links.

A node updates its own value in accordance with a communication procedure configured to negotiate the change with neighbor nodes, while maintaining the invariants described herein. More specifically, when a node x decreases its value to $V_0$, x sets the variables $V(x; x|x)$ and $V(x; y_i|x)$ to $V_0$ simultaneously, x sends a message to each of its neighbors announcing the decrease in x to $V_0$, and each neighbor $y_i$ of x, upon receiving the message, sets $V(x; y_i|y_i)=V_0$.

When a node x increases its value to $V_1$, x sends a message to each of its neighbors announcing the increase in x to $V_1$. Each neighbor $y_i$ of x, upon receiving the increase message, may wait some amount of time before acting upon the message. Once y, decides to act on the increase, it sets $V(x; y_i|y_i)=V_1$. If $V(y_i; y_i|y_i) > V(x; y_i|y_i)$, it removes traffic from any outgoing links to x, and sends an acknowledgment to x. Upon receiving acknowledgment from $y_0$, x sets $V(x; y_0|x)$ to $V_1$, and updates its local value $V(x; x|x)$ to the minimum between the most recent locally computed shortest path cost, and $\min_{\{i\}} V(x; y_i|x)$.

The locally computed shortest path cost is likely to change during each iteration for all nodes except the destination node. For the sake of simplicity, a shortest path cost that stays the same is treated as a decrease, and handled as described in detail herein for decreasing a value.

When a node y receives an increase message from a node x, node y may choose how long to wait before acting on the increase and sending back an acknowledgement. Embodiments choose to always act immediately on the increase as such an approach realizes speed and simplicity. However, it could mean that node y is temporarily left without a route to the destination (due to the third invariant). An alternative procedure allows node y the option of waiting to complete an increase to its own value before acknowledging to node x, in the case that node x is its only valid successor. Further, node y is configured to send back a "partial acknowledgement," allowing node x to increase its value to just below the value of node y. The partial acknowledgement allows node x to make progress towards convergence, without temporarily disallowing the only viable route of node y.

Update messages include sequence numbers, and acknowledgments include the sequence number and value being acknowledged. In this manner out-of-order updates are ignored.

Nodes maintain knowledge of their 'increase' operations that are pending acknowledgment. A timer is used to periodically retransmit pending increase operations, in case of lost packets. A pending operation can be eventually discarded when a later increase operation is successfully acknowledged and processed, a later decrease operation occurs, and/or some timeout is reached.

Every node generates either an increase or a decrease at every iteration. If a node x does not receive any message from its neighbor node y for some number of successive iterations, it assumes node y to have gone down, and updates $V(y; x|x)$ and $V(x; y|x)$ to ∞ in anticipation of re-initialization of the neighbor.

Embodiments set node values by computing average path cost to the destination using a recursive formula. Let c(s, t) denote the average path cost for traffic routed from node s to destination node t. If s has outgoing links $l_i$ to neighboring nodes $v_i$, each carrying a proportion $r_i$ of the traffic, then $$c(s, t) = \sum_i r_i^*(\text{link\_cost}(l_i) + c(v_i, t))$$

The values for $c(v_i, t)$ come from the locally maintained knowledge of neighbor values as described in detail herein.

Further, node t is configured to send back a "partial acknowledgement," allowing node s to increase its value to just below the value of node t. The partial acknowledgement allows node s to make progress towards convergence, without temporarily disallowing the only viable route of node t.

When a Dolfin comes online, it is configured to send an initialization request to all neighboring Dolfins. The neighboring Dolfins send back initialization responses, indicating their own node values and most recent knowledge of the value of the initiating node. This mechanism allows for smooth recovery from Dolfin failures; when the Dolfin (or replacement Dolfin) is brought back online, it can enter the network and recover its state from talking to its neighbors.

The configuration of embodiments in which the loop avoidance algorithm is distributed and separately implemented at each node eliminates the need for complicated acknowledgement tracking. Rather than waiting for all neighbors to acknowledge an 'increase', embodiments instead act on individual acknowledgments as soon as they are received. Eliminated is the need to keep tracking of pending 'increase' operations. Also eliminated is the need to retransmit in case of packet loss; the following iteration will reattempt an update, if it still makes sense to do so.

Watchdog

Watchdog, Dolfin, and OVS interact with each other to control routing of traffic via the MCN. Watchdog is configured to boot and load information about its corresponding Dolfin, and maintain an active connection with the Dolfin to constantly send and receive messages about neighbor IPs, link status and link qualities. For example, embodiments include a coupling between the control packet (Watchdog) userspace daemon and the co-located Dolfin, which transmits measured RTT on each adjacent link. Inter-Dolfin communication transmits the RTT measurements to other Dolfins in the same MCN and in different MCNs. The information for all links in the network is then used (e.g., ONOS) in routing decisions. Watchdog flows are forwarded to the OVS, which is configured to connect the Watchdog container to the Orca and to fill link quality packets with OVS data (TX/RX packet info).

Dolfin is configured to listen through a socket for Watchdog messages. The messages include a LINK_UP message to make a link active, and a LINK_DOWN message to make a link inactive. The messages also include a REGISTER_WPP message, which is a registration message from which Dolfin learns MAC and IP addresses for the Watchdog container, sends parameter configuration to Watchdog (probe rates and timeouts), installs flow rules to allow incoming/outgoing traffic to the Watchdog container port, notifies Watchdog of all neighboring links, and installs flow rules to allow and forward packets to/from this Watchdog to neighbors. Further, the messages include an RTT_MESSAGE with link qualities (e.g., latency, jitter, loss), and a REQUEST_NEIGHBORS message by which Watchdog requests neighbor links.

Figure 38:
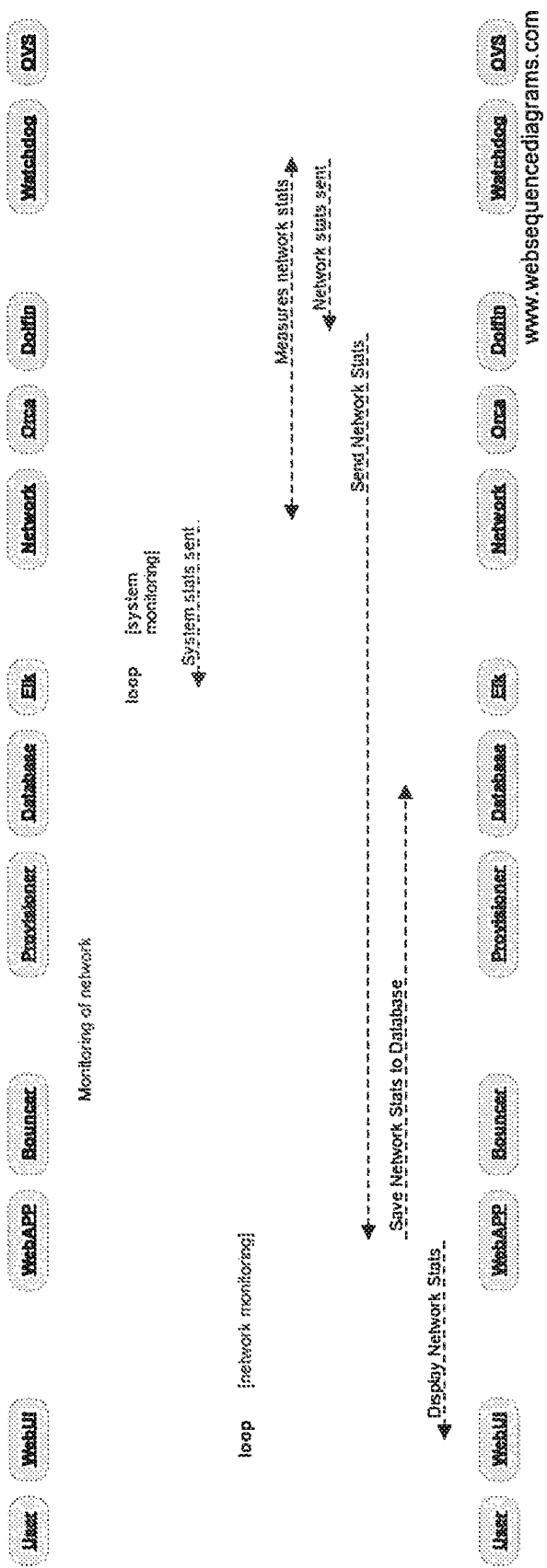
FIG. 38 is a flow diagram for monitoring parameters of the MCN, under an embodiment.

Watchdog is configured to perform network monitoring, and to report monitored data or results as described herein. FIG. 38 is a flow diagram for monitoring parameters of the MCN, under an embodiment. The network monitoring includes but is not limited to monitoring link status, and round-trip time (RTT) and latency, for example. Watchdog comprises configurable parameters that allow setting a speed for probes to neighboring links (e.g., default speed is 10 ms). Watchdog protocol periodically measures RTT on each link in the network by sending a time-stamped packet across the link and back. For each link, the latency value is calculated using the RTT value divided by two. Therefore, Watchdog is configured to measure latency and maintain latency states for each network link connected to the POP and running Watchdog, and provide the latency data to the Dolfins for the purpose of routing latency-sensitive traffic along the minimum latency path. Data of RTT and latency can be shared by sending OSPF or PWOSPF updates, and is also provided to web application for display via the web UI.

Each Watchdog, as a component of the monitoring service of the MCN, is configured to obtain or measure data of the links throughout the network, and to provide the link data to its corresponding Dolfin for use in traffic routing operations. The link data obtained for each link includes, but is not limited to, link state (e.g., up, down), packet loss rate, jitter, and latency (e.g., travel time, variance in travel time). Further, Watchdog is configured to measure link status (bidirectional forwarding detection (BFD)) and link qualities between POPs, and to determine that a link is down when it stops receiving detection packets (BFD) from a neighboring Watchdog over that link.

Figure 39:
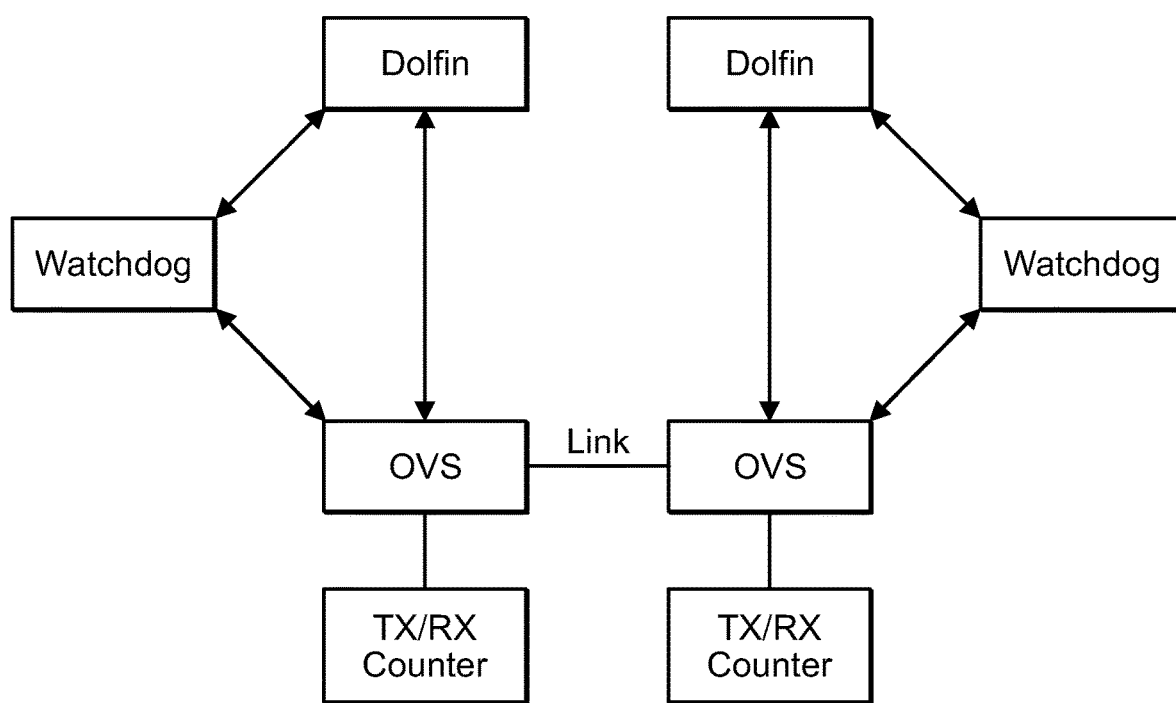
FIG. 39 is a block diagram showing Dolfins and corresponding Watchdogs in an example portion of the core network, under an embodiment.

Each Dolfin in the MCN includes multiple single-hop links to multiple other Dolfins however, for clarity, the example that follows describes a portion of the network including a single link connected between two Dolfins. FIG. 39 is a block diagram showing Dolfins and corresponding Watchdogs in an example portion of the core network, under an embodiment. More specifically, this example portion of the network includes a first Dolfin connected to a corresponding first OVS, and this first OVS includes a port that connects to a first end of a link in the underlay network as described herein. Similarly, a second Dolfin is connected to a corresponding second OVS, and this second OVS includes a port that connects to a second end of the link. A first Watchdog is connected to each of the first Dolfin and the first OVS, and a second Watchdog is connected to each of the second Dolfin and the second OVS. Each of the first Dolfin and the second Dolfin installs rules in its corresponding OVS that enable its corresponding Watchdog to exchange packets across its links. In this manner, the link is configured for use by each Watchdog to obtain link data of the other Watchdog via message exchanges over the link.

Dolfin uses messages (OSPF HELLO) to identify neighboring Dolfins, and then provides information of the neighboring Dolfins to Watchdog. Watchdog receives the status information from its corresponding Dolfin, and this status information includes information of the links the Watchdog is to monitor or probe. Watchdog probes/monitors neighbors as instructed by Dolfin, and updates link status based on detection packets (BFD) responses and timeouts. For each monitored link, the monitoring Watchdog continuously generates and sends probes or probe packets (e.g., bidirectional forwarding detection (BFD)) across the link, so that a receiving Watchdog on the other end of the link can determine a state of the link based on receipt of the probe packets.

Watchdog further determines latency of the link using time-stamped packets. In so doing, the Watchdog generates a time-stamped packet and transmits the packet across the link. Upon receipt of this packet back at the transmitting Dolfin, the round-trip time (RTT) across the link is determined as the difference between the time of receipt and the time of the time stamp. The link latency is then determined from the RTT, and jitter is calculated as the variation of the latency.

In addition to RTT or latency data, the Watchdog of an embodiment is configured to measure packet loss on each network link, and to provide the resulting data to its corresponding Dolfin. When a network link between two endpoints comprises a physical link, there should be no packet loss except for packets lost because of bit corruption. However, when the link is a logical link such as a link on top of a data carrying protocol (e.g., Multiprotocol label switching (MPLS)), packets can be lost at any network device along the link, thereby making detection of packet loss rate difficult.

MCN components of an embodiment are configured to measure packet loss on a link between two endpoints using probing packets and byte counters. Generally, when a probe is transmitted from a first Watchdog to a second Watchdog, the interfaces on the first OVS and second OVS (corresponding to the first Watchdog and second Watchdog, respectively) track cumulative bytes/packets sent and received. The probes are tagged with these values, and from their difference the cumulative bytes/packets lost in transmission are calculated or determined. By comparing two such cumulative values, the bytes/packets lost during the time between the two probes is calculated.

More particularly, the OVS instances are configured to tag (e.g., continuously on a periodic basis) transmitted probing packets with byte counters, such that a transmitting OVS maintains a counter of a number of bytes transmitted by that OVS. Each OVS is also configured to maintain a counter of a number of bytes received at that OVS, so the OVS on the end of the link opposite the transmitting OVS includes a count of the number of bytes received. Over a specified period of time, the information of the transmit counter provides a packet transmit rate, and the information of the receive counter provides a receive rate, and the packet loss rate is determined as the difference between the transmit and receive rates. When packet loss is determined to be greater than a pre-specified threshold, the Dolfin is configured to handle it as a link failure event, but is not so limited.

An issue that can arise involves a Watchdog that stops responding to detection packets (BFD), so that neighboring Watchdogs consider the links to that Watchdog to be down. However, because of the dual detection systems of the Watchdog and the Dolfin, the Dolfin corresponding to the Watchdog eventually receives a HELLO packet from a neighboring Dolfin and reactivates the link to that neighboring Dolfin in response. This causes the link to flap between active (Dolfin) and inactive (Watchdog) states, disrupting routing performance and correctness. Further, the Dolfin corresponding to the failed Watchdog will also continue sending OSPF update packets to its neighbors. Assuming that at the moment Watchdog stopped working all egress links were active, Dolfin retains the view of active links to neighbors, and sends OSPF update packets to them. Upon receipt, neighbors process this information and detect that Dolfin has active egress links and then they will also bring them up.

In order to avoid this link flapping, Dolfin uses messages (e.g., OSPF HELLO) only to discover or identify neighboring Dolfins. Dolfin provides the information of neighboring Dolfins to its Watchdog, which only probes or monitors neighbors as directed by its Dolfin. Further, only Watchdog is configured to update link status based solely on detection packets (BFD) responses and timeouts. As Dolfin messages are configured only to discover links and add the links to the infrastructure and not to make the links active, discovered links start in an inactive state following link discovery. Watchdog also includes a timeout as a component of connection monitoring with its Dolfin, and watchdog is configured to use the timeout to determine that Dolfin is down and stop packet exchange when Dolfin is down. If Watchdog loses connectivity with its Dolfin it means either that Dolfin is down, or that Dolfin is running without link status visibility, possibly leading to incorrect routing. Regardless, a loss of connectivity between Watchdog and Dolfin means information about link status cannot be provided to neighboring POPs.

If Dolfin is down, the corresponding OVS is configured to run in failover mode using backup flow rules, as described herein. This means that existing traffic flows continue using the last defined paths, while new traffic flows use shortest path-computed paths. However, even with its Dolfin down, Watchdog is configured to continue running so neighboring POPs continue to send traffic to the host POP. Because Dolfin is down, neighboring POPs will no longer be receiving OSPF messages from it, and the links between the failed Dolfin and its neighbors will go down after the OSPF expiration time. Watchdog will then stop running after this happens, to prevent neighbors from using the host POP.

If Dolfin is running without link status visibility, then Watchdog can continue running without affecting current routing. However, because it is not known whether Dolfin is actually down, the timeout will occur and cause Watchdog to cease operation, thereby causing the host POP to be down.

OVS Customization

The OVS is configured to use port information as a traffic flow identifier. The OVS is the traffic-forwarding element, and in so doing is configured to take into account the UDP ports when forwarding traffic. Consequently, the OVS of embodiments keep flows together according to source application type (e.g., layer 4 UDP port information) in order to match flows from the same source/destination. This enables traffic flows to be separated into component flows, which facilitates the dynamic load balancing of an embodiment.

The OVS is further configured for traffic routing including splitting of traffic flows for outputting from multiple different ports in support of multi-path routing. In support of this multi-path routing, the OVS is configured to include flow rules that perform either round-robin routing, or routing controlled by group tables. The round-robin routing includes evenly distributing the total traffic throughput among a number of different paths to the destination.

Regarding the group table-based routing, embodiments use a hash function to split traffic among multiple paths to a destination. More particularly, the OVS is configured with group tables that split or distribute outgoing traffic flows among multiple output ports (aggregator) based on the weight of total throughput between a source and a destination. Therefore, as an example, a 60/40 split of flows between two paths would route 60% of the throughput on a first path, and route the remaining 40% of the traffic flows over a second path. Continuing with this example, consider ten (10) traffic flows having total throughput of approximately 100 Mbps between a source and a destination. The use of group tables configured to route the flows using a 60/40 flow split results in routing flows including approximately 60 Mbps of total throughput over a first path, and routing the remaining approximately 40 Mbps over a second path.

The OVS is also configured to support high availability through the inclusion of backup flow rules. The backup flow rules, which are installed in the OVS by Dolfin, are designated for use in the event of Dolfin failure or an absence of the primary flow rules, but are not so limited. The OVS includes a secure mode in which it shuts down if its corresponding Dolfin is not detected, and as part of the shutdown the OVS may delete its flow rules. Further, the flow rules of the OVS have an expiry time, meaning that the rules are not available due to expiration even though the corresponding Dolfin is available. The backup flow rules of an embodiment, however, do not expire through idle or hard timeouts, and they remain constantly present in the case of a Dolfin connection loss, so they are available for routing traffic in the absence of the primary flow rules. Thus, the OVS switches to use of the backup flow rules for traffic routing in the event the corresponding Dolfin is not detected or the primary flow rules have expired. The backup flow rules are configured to route traffic via the shortest path, but are not so limited.

Dolfin is configured to create or add backup flow rules, reactively. When OVS has a connection to a Dolfin, these backup flow rules should be ignored. However, the backup flow rules are used to route packets when the Dolfin is down. The backup rules can be included in a backup flow table, but are not so limited. Through ONOS, embodiments create a new table that includes backup flow rules that route based on shortest path. These backup flow rules match on a destination IP address, and have an aggregator (link) output port corresponding to the shortest path determined by OSPF.

Monitoring and Logging

Figure 40:
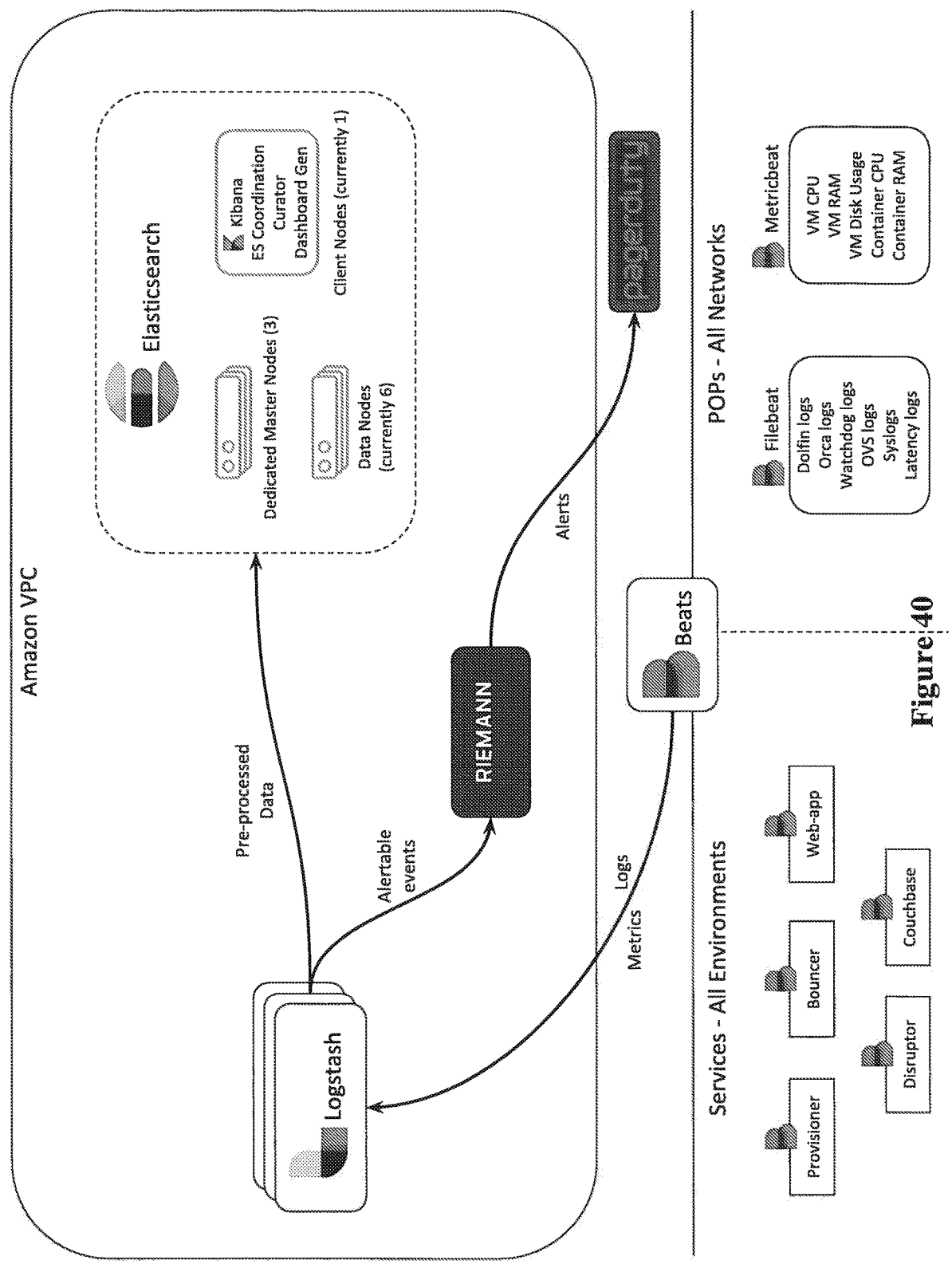
FIG. 40 is a block diagram of the central monitoring, under an embodiment.

Embodiments include components configured for monitoring the health of MCN components and logging data of the monitoring. The monitoring and logging components, referred to herein as central monitoring, comprise the Elastic Stack log management platform, which is configured for log analysis, business intelligence, and web analytics, in addition to monitoring. FIG. 40 is a block diagram of the central monitoring, under an embodiment. The central monitoring includes Elasticsearch and Logstash running in a Virtual Private Cloud environment (e.g., Amazon, etc.), and Beats distributed among the POPs and MCN services. Additionally, the central monitoring includes but is not limited to Riemann and Pagerduty. The central monitoring components are described in detail below.

Elasticsearch includes a distributed search and analytics engine configured for log analytics, full-text search, and operational intelligence use cases. Beats comprises lightweight agents configured as data shippers, and these agents are configured to send data to Logstash. Beats agents are deployed at management plane or middleware components (e.g., provisioner, Bouncer, WEB-APP, disruptor, Couchbase). Further, an embodiment includes two additional types of Beats agents, namely Filebeat for log files (e.g., dolfin logs, orca logs, Watchdog logs, OVS logs, syslogs, and latency logs), and Metricbeat for metrics (e.g., VM CPU, VM RAM, VM disk usage, container CPU, container RAM), but is not so limited.

Logstash is configured to ingest data from multiple sources simultaneously, process the data, and send the processed data to Elasticsearch and/or Riemann. Logstash functions to process a data pipeline in a stateless manner, and an embodiment scales it horizontally so that each instance of Logstash is present in its own node.

Elasticsearch in an embodiment includes numerous plugins, and can be configured to provide near-real time analytics and monitoring using large volumes of data. More particularly, Elasticsearch includes Kibana, Curator, and Dashboard Generator. Kibana is configured to enable visualization of Elasticsearch data and quick browsing and analysis of logs, thereby enabling a rich overview of any component and resource of the Elastic Stack. The Curator is a tool configured to manage the Elasticsearch indices and snapshots. The Dashboard Generator is configured to generate dashboards (including visualizations and searches) from the provisioned networks.

Elasticsearch further includes some number of data nodes, master nodes, and tenant/coordinating nodes, but is not so limited. The data nodes are configured to hold data and perform data-related operations such as search and aggregations. The data nodes can be horizontally scaled if overloaded. The master nodes are configured to be responsible for lightweight cluster-wide actions. An embodiment allocates dedicated master nodes that do not perform data operations, but are not so limited.

The tenant/coordinating nodes of Elasticsearch are configured to receive tenant requests and coordinate them among different data nodes, as these requests may involve data spread throughout multiple nodes of the cluster. While each Elasticsearch node is a coordinating node, an embodiment runs a coordinating-only node along with Kibana in order to load balance requests. The coordinating node processes incoming HTTP requests and redirects operations to other nodes in the cluster as needed.

Riemann is an event stream processor configured to filter, combine, and act on flows of events. Riemann comprises a centralized alerting tool that single-handedly accounts for large distributed systems and, in an embodiment, is deployed as a single instance per monitoring cluster. The action on event flows of an embodiment includes communicating with PagerDuty to generate alerts. PagerDuty is configured as an alert management system, which receives notifications from Riemann and contacts the responsible team member according to pre-specified parameters.

The monitoring and logging includes health checks that are condition checks on system components. The health checks are configured to provide notifications regarding whether a monitored component is functioning properly. Health checking is related to monitoring because it is monitoring with focus on component health. Health checks increase visibility of the MCN components by exposing component failures and warnings to dashboards accessible by a tenant or network operator. Further, automatic health checks constantly monitor and handle possible component failures in order to improve availability and resiliency of the MCN by speeding up component repair or replacement.

Figure 41:
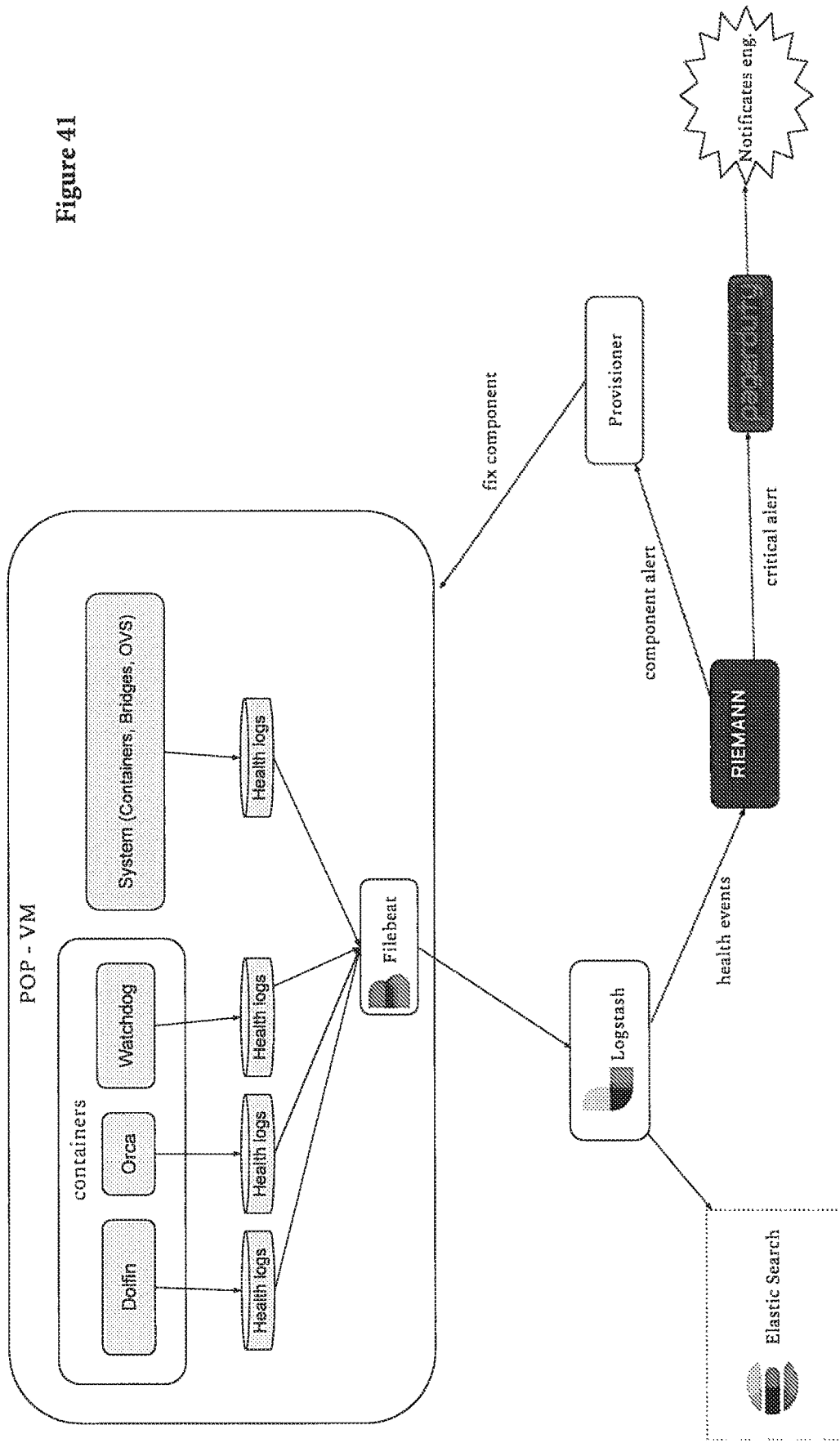
FIG. 41 is a flow diagram for system health checks, under an embodiment.

FIG. 41 is a flow diagram for system health checks, under an embodiment. Monitored components generate health logs that are collected through the monitoring stack pipeline. In particular, each component is configured to generate a health check log file (e.g., through white monitoring), and write the log file to storage. The components configured to generate the log files include but are not limited to Dolfins, Orcas, Watchdogs, OVSs, containers, and bridges. The generation of the log files by each component includes the gathering of metrics and logs necessary to decide about system health, and append the health status based on data from log file generation, and generate the health log. Filebeat is configured to obtain the health logs from their corresponding storage, and send the health logs to Logstash.

Logstash is configured to ingest data from multiple sources simultaneously, process the date, and send the processed data to Elasticsearch. Elasticsearch includes a distributed search and analytics engine configured for log analytics, full-text search, and operational intelligence use cases. Logstash also sends the processed stream of health events to Riemann.

Riemann is configured to process the events data and rapidly check for 'status: "error"', and generate and send component alerts to PagerDuty. Riemann is also configured to make requests to the provisioner to solve the issue. The provisioner is configured to take actions to fix unhealthy components based on events data and detailed error messages received from Riemann.

Embodiments include a dashboard generator configured to generate monitoring dashboards. The monitoring dashboards are configured to present monitored data of MCN components but are not so limited. The monitoring components of embodiments are based in the ELK (Elasticsearch, Logstash and Kibana) stack as described herein, and Kibana is configured to display Elasticsearch data, such as log aggregates and/or dashboards. The dashboards include but are not limited to graphs configured to display general information and summaries about different components or aspects of the system. More particularly, the dashboards are configured to present data for use in identifying services/components that are near failure due to one or more of resource exhaustion and infrastructure issues, thereby enabling users to identify and react to problems before they actually occur. Further, the dashboards are configured to enable more efficient problem diagnosis when troubleshooting or debugging a system through presentation of MCN data in a manner leading to quick elimination of suspected causes by just checking the graphs for the given system.

The monitoring and storage of data or logs used in operation of the dashboards comprises component data or logs organized according to an environment of a set of environments, and the plane in which the component resides. The MCN includes a fixed set of environments including, but not limited to a staging environment, demo environment, quality assurance (QA) environment, beta environment, and production environment. The MCN includes the management plane and the data plane. Components of the management plane include the Bouncer, provisioner, WEB-APP, and WEB-UI, while components of the data plane include Orca, Dolfin, Watchdog, and OVS.

Components of the MCN also include the underlay network and the overlay network, as described in detail herein. The underlay network components include but are not limited to a set of VMs within an environment, where embodiments include multiple VMs in the same location of an underlay (due to high availability features), and each VM includes multiple Orcas, Dolfins and Watchdogs along with a single OVS deployment. The overlay network includes a tenant deployment (tenant) within an underlay, and each overlay includes one each Orca, Dolfin and Watchdog deployment.

Figure 42:
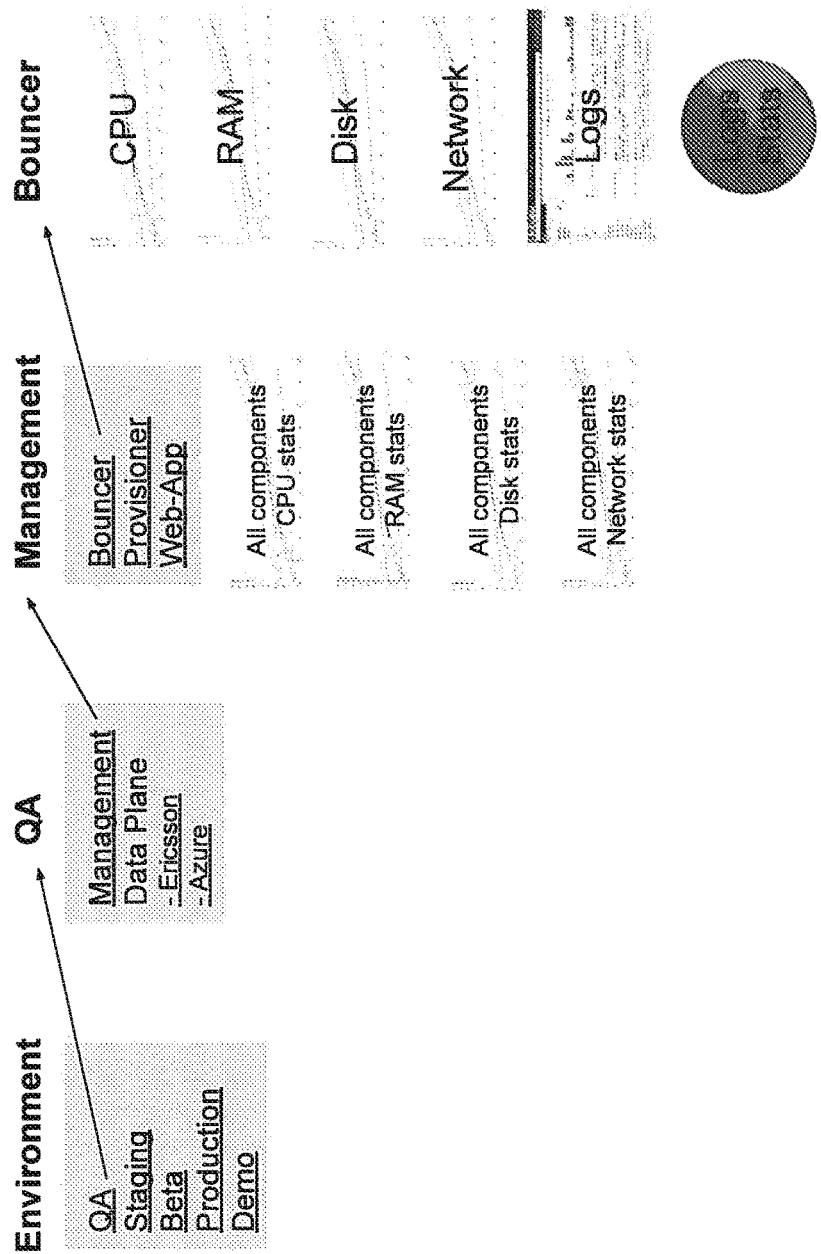
FIG. 42 shows a flow example involving a hierarchy for selecting a dashboard, under an embodiment.

FIG. 42 shows an example involving selection of a dashboard using a hierarchy of dashboards, under an embodiment. Dashboard selection in this example comprises a flow in which a list of environments is presented (e.g., QA, staging, beta, production, demo) for selection. Upon receiving a selection of an environment (e.g., QA), a list of planes corresponding to the environment is presented (e.g., management, data, underlay network (e.g., "Ericsson", "Azure")) for selection. Upon receiving a selection of a plane (e.g., Management), a list of components (e.g., Bouncer, provisioner, WEB-APP) corresponding to the selected plane is presented. In addition to the list of components, a number of dashboards or graphs is presented (e.g., All components CPU stats, All components RAM stats, All components Disk stats, All components Network stats) corresponding to all management plane components. Upon receiving a selection of a component (e.g., Bouncer), dashboards or graphs are presented (e.g., CPU, RAM, Disk, Network, Logs, Log Stats) corresponding to the selected component.

Figure 43:
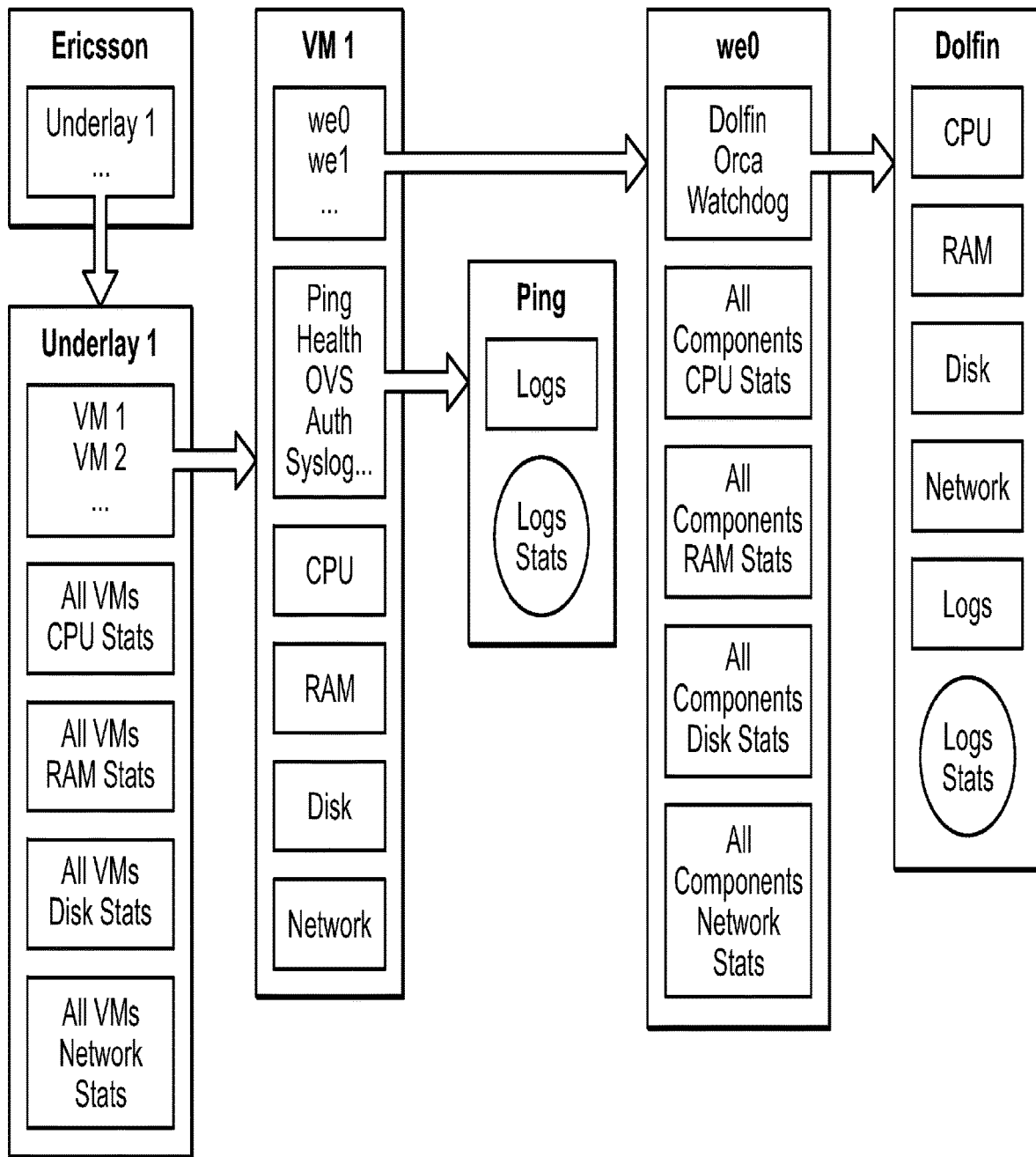
FIG. 43 shows a flow example involving a hierarchy for selecting another dashboard, under an embodiment.

FIG. 43 shows an example involving selection of another dashboard using the hierarchy of dashboards, under an embodiment. With further reference to FIG. 42, dashboard selection in this example comprises a flow in which a list of environments is presented (e.g., QA, staging, beta, production, demo) for selection. Upon receiving a selection of an environment (e.g., QA), a list of planes corresponding to the environment is presented (e.g., management, data, underlay network (e.g., "Ericsson", "Azure")) for selection. Upon receiving a selection of an underlay network provider (e.g., Ericsson), a list of underlay networks (e.g., Underlay 1) corresponding to the selected provider is presented. Upon receiving a selection of an underlay network (e.g., Underlay 1), a list of VMs is presented (e.g., VM 1, VM 2) corresponding to the selected underlay network. In addition to the list of VMs, numerous dashboards or graphs are presented (e.g., All VMs CPU stats, All VMs RAM stats, All VMs Disk stats, All VMs Network stats) corresponding to all available VMs.

Upon receiving a selection of a VM (e.g., VM 1), a list of tenant bridges is presented (e.g., we0, we1) corresponding to the selected VM. In addition to the list of tenant bridges, numerous dashboards or graphs are presented for selection (e.g., CPU stats, RAM, Disk, Network) corresponding to the selected VM. Further, a list of dashboards or graphs (e.g., Ping, Health, OVS, Auth, Syslog) is also presented relating to other health parameters of the selected VM.

Upon receiving a selection of a tenant bridge (e.g., we0), a list of components is presented (e.g., Dolfin, Orca, Watchdog) corresponding to the selected tenant bridge. In addition to the list of components, numerous dashboards or graphs are presented for selection (e.g., All components CPU stats, All components RAM stats, All components Disk stats, All components Network stats) corresponding to the selected tenant bridge. Upon receiving a selection of a component (e.g., Dolfin), dashboards or graphs are presented (e.g., CPU, RAM, Disk, Network, Logs, Log Stats) corresponding to the selected component.

Figure 44:
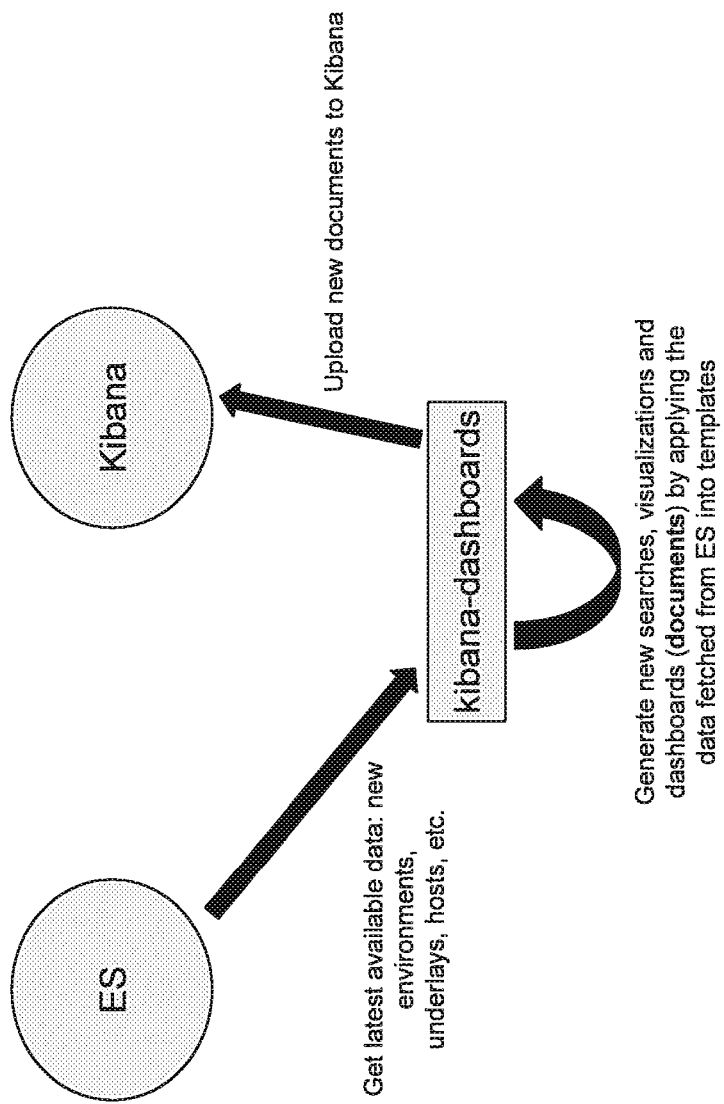
FIG. 44 is a flow diagram for updating dashboards, under an embodiment.

FIG. 44 is a flow diagram for updating dashboards, under an embodiment. The Kibana dashboards comprise one or more agents running within the same VM as Elasticsearch and Kibana, but are not so limited. The dashboards include the templates from all searches, visualizations and dashboards. The dashboards periodically receive or fetch new information stored in Elasticsearch, such as new hosts and new underlays. The new information is received or fetched hierarchically (receive information of environments, then receive information of underlays within an environment, etc.) in an embodiment, but is not so limited. The dashboards apply the new information from Elasticsearch into templates to generate new searches, visualizations and dashboards (documents). The dashboards then upload the new set of documents to Kibana.

Health monitoring of MCN components further includes passive monitoring. The MCN components of embodiments are configured to include passive measurement (e.g., TCP connections) of data flow rates across last mile connections, and outside of the controlled overlay network, in order to identify data loss across these last mile connections. The passive monitoring or measurement of network performance comprises use of a set of simultaneous equations but is not so limited. This passive measurement includes the tracking of data flow rates across all routes of the MCN to determine fluctuations in data rates resulting from loss. In so doing, components measure across the entire MCN the data flow rate statistics of all routes between their source and destination endpoints, and evaluate the data flow rate statistics using a system of simultaneous equations. When a determination is made that MCN components are not the cause of the data loss over a route, it is assumed that one or both of the last mile connections on the ends of that route are causing the data loss. However, embodiments do not have sufficient information regarding each last mile connection to determine the exact source of the data loss.

As a method of generating additional information regarding the source of the data loss, embodiments analyze the flow rate statistics using a system of simultaneous equations in order to passively identify last mile connections related to or responsible for the data loss. The continuous evaluation during network operations of the flow rate data using the simultaneous equations enables identification of last mile connections potentially responsible for any detected collapse in throughput or anomalous data losses. Upon identification of a last mile connection that is the likely source of data loss, an embodiment is configured to "move" that last mile connection from a current port to a different output port on its corresponding POP in an attempt to route the traffic using a different last mile connection.

Figure 48:
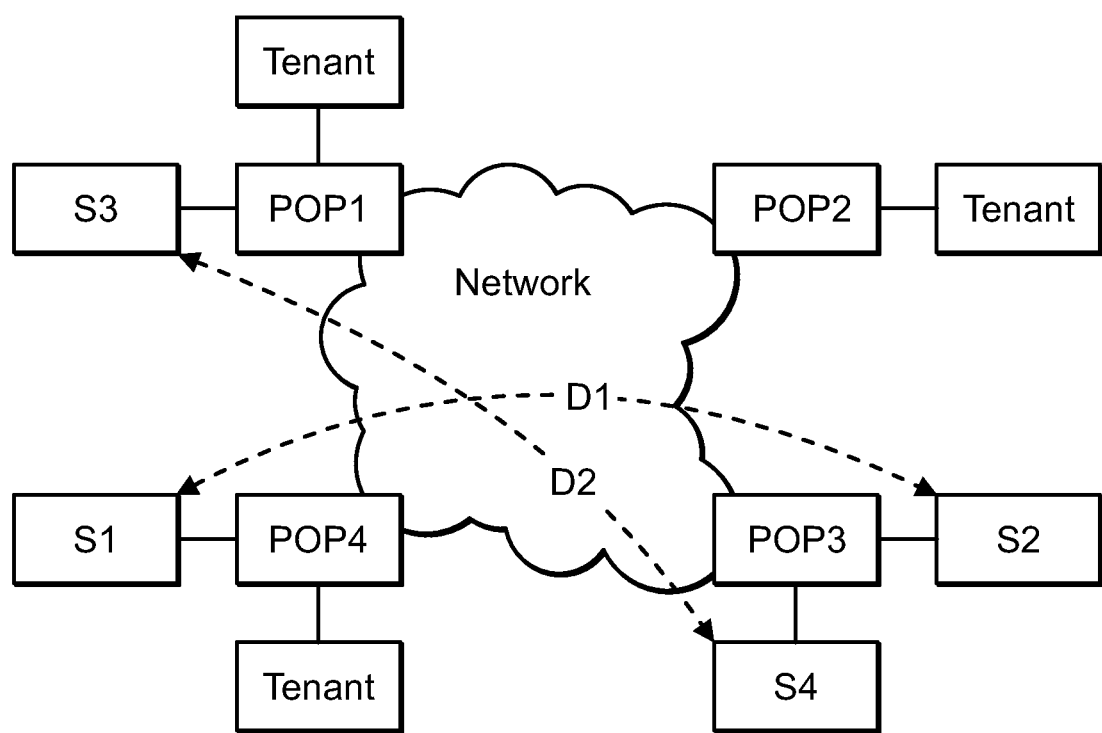
FIG. 48 is a flow diagram showing, under an embodiment.

For example, FIG. 48 is a flow diagram showing, under an embodiment. This example involves a first data flow D1 through the MCN between a first tenant site S1 and a second site S2, and a second data flow D2 through the MCN between a third site S3 and a fourth site S4. The second tenant site S2 and fourth tenant site S4 share a common POP (e.g., POP 3). It is determined that the flow rates of both data flows D1/D2 are experiencing data loss, and it is further determined that the loss is not occurring within the MCN. Therefore, it is assumed that the data loss is occurring in one of the last mile connections, but the MCN is not able to access specific data of each last mile connection in order to determine which one might be causing the data loss. However, the MCN does have sufficient statistical information of the data flows D1/D2 to passively determine that the source of the flow rate problem is likely in the last mile connections that share a common MCN endpoint POP 3. Thus, an embodiment can "move" the last mile connections on the POP to a different output port of the POP in an attempt to route the traffic using a different last mile connection.

In addition to moving the last mile connection to an alternative route, embodiments include multiple alternative methods for controlling last mile connections in the face of data loss suspected over those connections. One alternative method includes DNS-based redirection to redirect traffic from a current POP to a different POP, and the change in POP causes a change in last mile connections. Another alternative method involves a CPE-based solution that instructs the CPE to use an alternative route for the last mile connection to the corresponding POP. These alternative methods involving last mile connects are described in detail herein.

Management Plane High Availability

Figure 45:
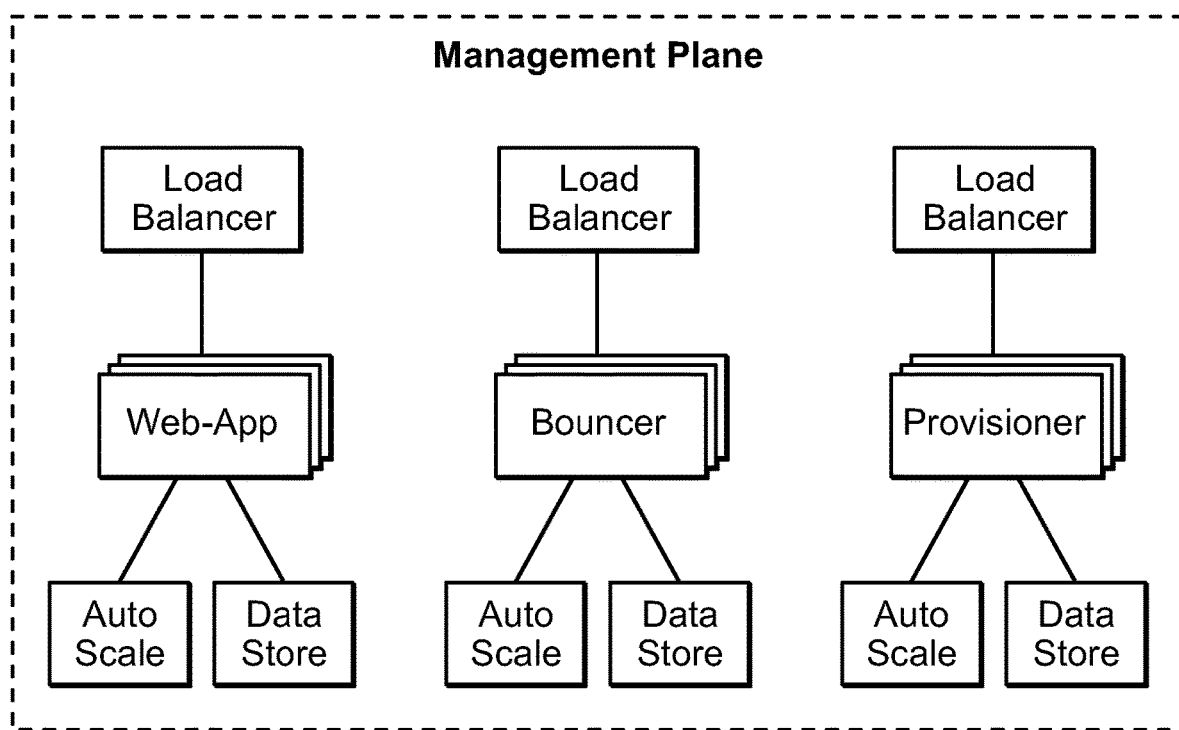
FIG. 45 is a block diagram of the management plane, under an embodiment.

The term "high availability" as used herein includes maintaining availability and functionality of the MCN and preventing an interruption in service in the event of a failure of one or more components of the MCN. The management plane components comprise the WEB-APP, Bouncer, and provisioner, as described in detail herein. FIG. 45 is a block diagram of the management plane, under an embodiment. Each of the web app, Bouncer, and provisioner is coupled or connected to a corresponding load balancer and data store. Further, an auto-scaling component is coupled to each of these components. The auto-scaling component of an embodiment is configured to maintain a pre-specified number (e.g., two, three, etc.) of instances of its corresponding component. The description herein includes embodiments having two instances of each component, but the embodiments are not limited to two instances and can have any number of instances as appropriate to a configuration of the MCN.

High availability of the management plane is realized by operating multiple instances of each management plane component. The load balancer of each component is configured to balance the load between the multiple instances of each component. Each load balancer uses a round-robin process for balancing requests (e.g., TCP request) from its corresponding component, but embodiments are not so limited. When deploying a new version of a component in a high-availability network configuration that includes at least two instances of each component, embodiments generate two new instances of the component, and connect these new instances to the load balancer. Following generation of the new instances, the load balancer is configured to route new connections to the new instances, and to drain existing connections to the previously used set of components or let them expire as described herein. The connections to the previously used set of components are disabled subsequent to the corresponding drain count being zero, meaning no connections are being handled by the components.

The MCN includes a logical division of workspaces or "environments" each operating its own MCN. The environments include but are not limited to development, quality assurance, alpha, beta, staging, and production environments, and high availability of the management plane is further supported in embodiments through the inclusion of failover instances of each of the environments. The environments are maintained in logically separate or isolated regions of a cloud service of the web services cloud in a given geographical region (e.g., Europe North 1, US West 3, etc.), and but are not so limited. Each environment includes a corresponding management plane, and therefore includes multiple instances of each of the management plane components. Embodiments include failover instances of each of the environments, and the failover instances are located in a different geographical region of the cloud service than the primary instances (e.g., primary instance hosted in US West 3 cloud server, failover instance hosted in Europe North 1 cloud server). Further, the data stores of the primary environment are synchronized to data stores in the failover environment. In the event the primary version of an environment goes down, the DNS handles the switchover from the primary environment to the failover environment, and the synchronized data stores eliminate or at least minimize any data loss during the failover process.

High availability of the management plane further includes operating multiple instances of monitoring and logging components (e.g., Elastic, Logstash, Kibana, Rieman, etc.), and load balancing between the multiple instances of each component as described herein. In addition, monitoring and logging components of each environment are included in the failover instances of that environment as described herein.

Control Plane High Availability

The MCN control plane components include Orca, Dolfin, Watchdog, and aggregator as described in detail herein, and high availability of the control plane generally comprises the use of multiple containers. High availability of the control plane includes preventing Dolfin failures from causing interruption of service, where Dolfin failures include Dolfin restart due to software crash, Dolfin full restart due to software crash with data loss, and Dolfin overload. High availability additionally includes enabling Dolfins to automatically recover from failures, and enabling upgrading of Dolfin versions without interruption of service.

In order to perform its routing duties, Dolfin requires routing data be available that includes routes, traffic classes, and network configuration information. Therefore, recovering from a restart first requires making the routing data available. For soft restarts, this routing data is retrieved from the existing stores that are persisted to local storage so that all necessary information is available immediately upon activation of the components. Full restarts comprise retrieving the routing data again from the provisioner prior to performing any routing iterations.

Regardless of the type of restart (with or without data loss), such an event always causes ephemeral information (e.g., split ratios, existing flow rules, groups, etc.) to be lost. Ratios are recomputed on the fly, but the resulting flow rules and groups do not necessarily match the data previously installed at the OVS. Embodiments are configured to claim existing rules according to the existing routing data (routes, traffic classes, network configuration) in order to overcome this issue.

More particularly, given a set of preinstalled flow rules/groups, a device configuration, a set of routes and a set of traffic classes, Dolfin is configured to read existing rules from the OVS and match their selectors to the corresponding traffic classes. Dolfin is configured to use that existing information to organize its ephemeral traffic class table tree and incorporate those rules into the ONOS flow and group store. Therefore, the claiming of existing flow rules avoids having to erase and completely rebuild all rules, as rules are expected to be claimed according to the existing routing data (routes, traffic classes, network configuration), and those that are not a perfect match are erased as not claimable.

While embodiments are configured to retain or claim some of the existing flow rules, the claiming of existing rules across Dolfin instances does not enable the Dolfins to control new traffic flows not accounted for in the existing rules. As the Dolfins are configured to install rules on demand, new flows are expected to hit a pre-specified rule (e.g., SEND_TO_CONTROLLER rule) so that in a failure scenario packets of new flows would be dropped.

High availability of the control plane therefore includes the use of backup rules as described herein. The backup flow rules, which are installed in the OVS by Dolfin, are designated for use in the event of Dolfin failure or an absence of the primary flow rules, but are not so limited. When OVS has a connection to its Dolfin, the backup flow rules are ignored. However, the backup flow rules are used to route packets when the Dolfin is down. The backup flow rules are configured to prevent interruption of service until the corresponding Dolfin returns to service.

In order to use the backup flow rules, embodiments include alternative processes for handling unmatched packets. For example, in response to losing a connection to its Dolfin, an embodiment includes a modified OVS that is configured to not send new flows to the pre-specified rule for new flows (e.g., SEND_TO_CONTROLLER). In this configuration, instead of sending unmatched flows to the Dolfin where they are dropped (as the Dolfin is not operational), unmatched flows are routed according to pre-computed static shortest path metrics (e.g., latency). Therefore, for example, when new traffic arrives from a tenant and primary flow rules for this new traffic are not yet installed in the OVS, the new traffic is routed using the backup rules until such time as the primary flow rules are available.

Alternatively, embodiments include a modified OVS that is configured to send new flows both to the pre-specified rule for new flows, and to a set of alternative or fallback flow rules. In this configuration, new flows would not hit the Dolfin, thereby avoiding any routing delay and/or packet drops.

Maintaining high availability of the control plane also includes the use of health checks that include condition checks on control plane components, as described in detail herein. The health checks are configured to provide notifications regarding whether a monitored component is functioning properly, thereby exposing component failures and warnings in advance of a failure. The health checks are configured for external queries. If a health check indicates a component is in poor or failing health, then the component can be "repaired" or restarted. Further, embodiments are configured to create a new container instance that is hot-swapped with the component exhibiting poor/failing health.

Data Plane High Availability

Components having operations that impact the data plane include but are not limited to Dolfins, Orcas, OVSs, Watchdogs, servers, underlay network, traffic managers, and the last mile connections. The Dolfins are configured to handle rule installations for new connections and, while failure of a Dolfin does not affect existing traffic flows, it results in new connections not being forwarded, as described herein. The Orcas are configured to install SNAT/DNAT rules for end-to-end connections, and receive health check responses from the traffic manager (or DNS Health Check). Failure of an Orca, while not affecting existing traffic flows, results in failure of the health check response, and prevents new connections from being able to reach the corresponding POP. The OVSs are configured to forward packets, so OVS failure results in failure of packet forwarding.

The Watchdogs are configured to perform probing (e.g., latency, jitter, packet loss, etc.) and bidirectional forwarding detection (BFD), and failure of a Watchdog renders the corresponding Dolfin unable to forward traffic to neighbors. The POPs are configured to host the containers and forward packets, and failure of a POP causes packets to not be received/forwarded by the POP. The underlay network or link functions to provide interconnectivity between POPs, and failure of the underlay network means packets cannot be forwarded through the link. The traffic manager functions to return the latency-based DNS entry (return the IP of the nearest available POP to the tenant), and failure causes the tenant to not be able to reach the POP. The last mile functions as the connection between the tenant and the POP (ingress), and between the POP (egress) and the egress destination. If last mile between tenant and ingress POP fails, there is a high likelihood the tenant Internet connection is down. If last mile between egress POP and egress destination fails, components of the MCN reconfigure the route to use other egress points.

Figure 46:
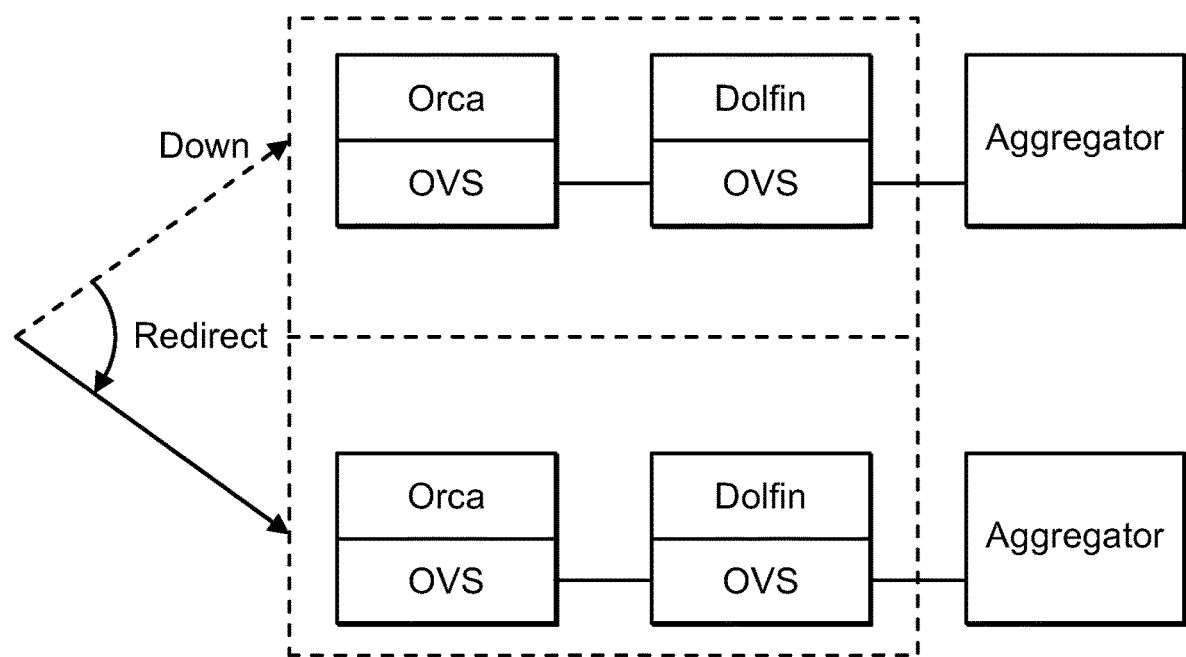
FIG. 46 is a block diagram showing a high availability configuration involving replicated tenant stacks at a POP, under an embodiment.

Considering the components that affect functioning of the data plane, high availability in the data plane is achieved by replicating at each POP the stack corresponding to a tenant (Active-Active). FIG. 46 is a block diagram showing a high availability configuration involving replicated tenant stacks at a POP, under an embodiment. This configuration involves a first stack (e.g., orca, dolfin, OVS) and a second stack (e.g., orca, dolfin, OVS) corresponding to and supporting a tenant. Using this configuration, if one stack goes down or becomes unavailable for any reason, then embodiments redirect (DNS) the tenant traffic to the other stack. Health check periodically (e.g., 10 seconds, etc.) checks the health of the stack components, and provides the metrics used by components to redirect traffic to another active tenant stack when conditions warrant.

Figure 47:
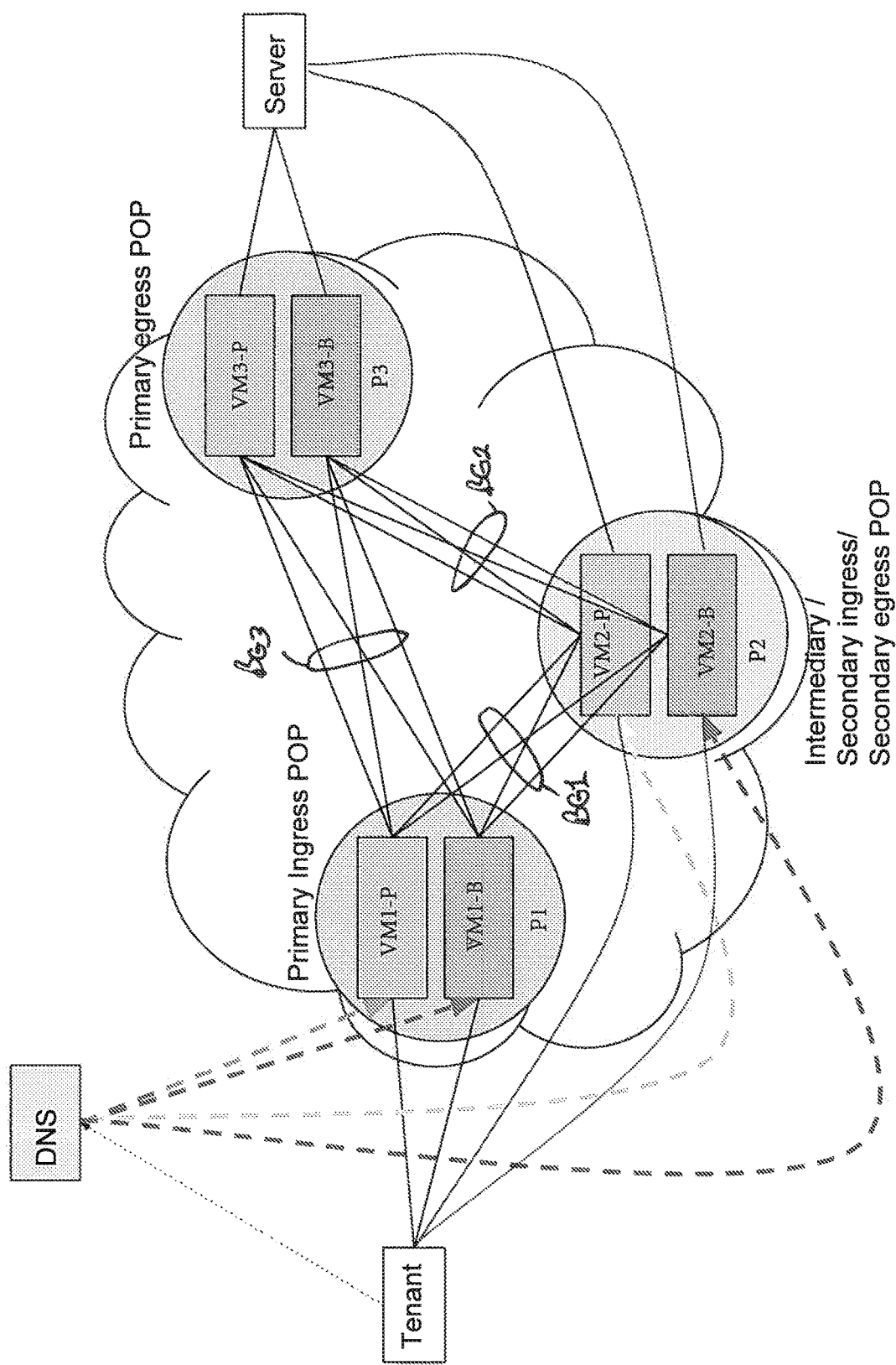
FIG. 47 is a block diagram showing an example high availability configuration involving the data plane of a portion of the MCN, under an embodiment.

More specifically, FIG. 47 is a block diagram showing an example high availability configuration involving the data plane of a portion of the MCN, under an embodiment. Redundant VM instances at each POP run in active-active mode to provide high availability for the data plane. This example embodiment includes redundant VM instances VM1-P, VM1-B at a first POP P1, redundant VM instances VM2-P, VM2-B at a second POP P2, and redundant VM instances VM3-P, VM3-B at a third POP P3, but are not so limited. The primary and backup VM instances do not share the same underlay network, but are not so limited. Between any two locations on the MCN, the primary/backup VM pairs create a complete bipartite graph BG1, BG2, BG3 through Dolfin bridges. Thus, each Dolfin maintains a complete bipartite graph of the primary/backup pairs for communication of control messages to neighboring POPs. The DNS service responsible for attracting traffic to the MCN checks the health status of all VM instances, and any detected failure of a primary VM instance results in a fast failover to the backup VM instance. While the terms "primary" and "backup" are used herein to distinguish between two VMs at the same location, both VMs function as primary VMs in active-active mode.

In further support of high availability of the data plane, embodiments include pre-installed backup flow rules in each OVS, as described herein. The backup flow rules are configured with traffic forwarding instructions in the event a control plane component fails as described in detail herein. Generally, upon failure of a control plane component, traffic is forwarded through the data path defined by the backup rules until the control plane is recovered.

More particularly, during operation the primary/backup pair at each POP is in active-active mode. The DNS (Traffic Manager) checks the health of every primary and backup (e.g., checks health of each POP every 10 seconds, each tenant caches DNS with TTL every 30 seconds). When the primary ingress POP P1 is down, the secondary ingress POP P2 (DNS) is used. When the primary egress POP P3 is down, the secondary egress POP P2 is used. When any Dolfin is down, the corresponding OVS backup rules are used. When OVS/VM is down, other POPs are used.

The active-active mode comprises, at each POP, two VMs that are both active (e.g., ready to forward traffic). The two VMs are not collocated, but embodiments are not so limited. Each VM comprises all running data plane components (Dolfin, Orca, OVS, Watchdog) such that, between two locations, the pairs of (primary, backup) create a complete bipartite graph through the Dolfin bridges. Each Dolfin knows its neighbor primary/backup, and communicates (e.g., OSPF/probing protocol packets) between both of them. The topology includes all primaries and all interfaces.

Embodiments provide high availability of the data plane and also the control plane by configuring MCN components to address failures in the path from tenant to egress destination, including primary ingress POP, intermediary POP, and primary egress POP. A detailed description follows of failure points within each of the primary ingress POP, intermediary POP, and primary egress POP, and configurations for providing high availability at the failure points.

At the primary ingress POP, embodiments handle failure of the primary Dolfin, as well as the backup Dolfin, by using OVS backup flow rules to forward traffic to the corresponding Orca. Failure of the primary ORCA results in failure of the DNS health check to the primary, in which case the DNS returns the backup IP, and the secondary Orca is used. When the backup Orca is down, the DNS health check fails for the POP and returns the IP of the next closest available POP.

In response to failure of the primary Watchdog, Dolfin sends traffic via the Internet. Additionally, in response to failure of the backup Watchdog, Dolfin also sends traffic to the Internet.

Failure of the primary OVS is indicated by failure of the DNS health check (due to Orca bridge failure), in which case the DNS returns the backup IP, and the secondary Orca is used. Failure of the backup OVS is also indicated by failure of the DNS health check (due to Orca bridge failure), in which case the DNS returns the IP of the next closest available POP.

When an outgoing link of the primary fails, Dolfin is configured to use other available links. When all primary outgoing links are down, Dolfin is configured to send traffic out over the Internet. In an alternative embodiment, Orca detects that all primary links are down, and stops responding to DNS, causing the backup to be utilized.

When an outgoing link of the backup fails, Dolfin is configured to use other available links. When all backup outgoing links are down, Dolfin is configured to send traffic out over the Internet.

At the intermediary POP, embodiments handle failure of the Dolfin using OVS backup rules to forward traffic to the Dolfin at the next POP (next hop) in the route. Failure of Orca does not affect operations. When any of the OVS data plane bridge (kernel module), VM, Watchdog, and links is down, the intermediary POP is unreachable and will not be used by the neighbor POPs.

At the primary egress POP, embodiments handle failure of the primary Dolfin, as well as the backup Dolfin, by using OVS backup rules to forward traffic to Orca. Failure of both primary and backup Orca controllers does not affect operations.

When any of the primary OVS data plane bridge (kernel module), VM, and Watchdog is down, the corresponding backup OVS, VM, and Watchdog is used by the neighbors. The secondary egress POP is used by neighboring POPs (selecting egress POP logic) when any of the backup OVS kernel module, VM, and Watchdog is unavailable or down.

An alternative embodiment achieves high availability of the data plane with two VMs at each POP. A first VM is configured as active, and the second VM is configured as standby. The standby VM is isolated from other neighbors, i.e. does not send/receive OSPF and WPP packets, and is idle except that it replicates traffic classes, routes and gateway configurations. The provisioner is configured to maintain a database for primaries and backups. Upon detecting that the active VM is no longer available, the provisioner re-configures the standby VM, and the traffic manager (or any DNS services) is updated to point to the standby VM. Previous VXLAN tunnels are deleted, and VXLAN tunnels are created between the standby VM and neighbor POPs. The standby (now active) VM is reconfigured to push statistics to the WEB-APP, and the provisioner database is updated. When the original VM is subsequently revived it is reconfigured as the standby VM.

Last Mile High Availability

As described in detail herein, tenant traffic is generally attracted to one of the edge POPs of the MCN as the ingress POP, transmitted through the MCN to an egress POP, and forwarded to an egress destination or endpoint from the egress POP. Traffic of a tenant is directed to the MCN by providing a latency-based DNS entry to the tenant. The control plane of the MCN decides the routes for packets forwarded between the ingress and egress POPs. Failures inside the MCN between the ingress POP and egress POP are detected and handled by the control plane, as described in detail herein. While the MCN is required to perform reliably at any time, it is equivalently important to achieve the high availability for the last mile connectivity. Following is a description of failure scenarios for the last mile between end-users and edge POPs, along with methods for detecting and recovering from the failures.

When attracting traffic of a tenant to the MCN, the ingress POP for a given tenant is determined using latency-based routing of the associated DNS service. Among the regions of the DNS record sets associated with the specific application, the one providing lowest latency to the tenant DNS resolver is selected, as described herein. The DNS service includes a health check feature in the process resource record set selection, and the health check feature continuously sends health check messages to the endpoints specified for the resource record sets. The health check messages are sent at pre-specified intervals but are not so limited. These health check messages are used to achieve high availability using the DNS redirections, because MCN components are configured to associate the resource record sets with health checks to redirect traffic from failed/failing POPs to healthy POPs. More particularly, the health check messages are continuously sent to the specified endpoints, and the health status is determined from the health check messages based on string matching. The endpoint monitors the health status at each POP locally and provides corresponding replies to the health check messages. As a DNS query arrives, the POP public IP with the least latency to the resolver is selected first. The DNS checks the current status of the health check associated with that selected POP, and if the POP status is not healthy, the POP with the next best (lowest) latency is selected.

Embodiments of the MCN also include failure detection, including failure detection of POPs, connectivity between an ingress POP and tenant, and connectivity between an egress POP and server. Regarding failure detection of a POP, status of POPs is monitored locally. Additionally, embodiments collect interface statistics of the POPs. The health status of the POP is determined using these measurements.

Unlike POP failures, Internet connectivity issues between the tenant and its ingress POP cannot be detected by monitoring the system status of the POPs. Further, active measurements involving transmission of probing packets from ingress POP to the tenant may not be feasible. However, a connectivity check can be performed using, for example, a web page provided for use by the tenant in accessing the MCN. Embodiments use active measurements between the end-user web pages and their corresponding POP for link performance monitoring. The measurements include use of a JavaScript beacon injected into the response by MCN components during the authentication process between the web UI and the web application. The beacon instructs the tenant to continuously fetch a URL which is associated with the ingress POP or a set of candidate POPs. Consequently, the tenant continuously checks the connectivity between itself and each POP, and reports the results to the web application. The beacon of an embodiment is also configured to measure the latency and goodput to the POPs by downloading the resources pointed to by the URL, which can be used in performance-aware mapping between tenant and POPs.

Similar to the process for detecting failure of connectivity between ingress POP and tenant, embodiments detect failure of connectivity between an egress POP and service application using a web page that is available at the server. If the web page is not supported at the server, then the connectivity between the egress POP and the server is actively monitored by periodically sending probing packets to the server periodically.

When a failure of a primary ingress POP is detected, the MCN is configured to select a secondary ingress POP as described in detail herein. The traffic incoming from tenants corresponding to the failed primary POP is then redirected to the secondary ingress POPs. The secondary ingress POP is selected according to latency measurements as described herein, but is not so limited.

Connectivity failure between the tenant and the ingress POP is determined when a tenant fails to connect to an assigned ingress POP. Embodiments either disable the POP for the particular tenant, or temporarily avoid using the POP for all tenants and applications.

The failure of a primary egress POP can be recovered by changing the routing decision of the MCN, so the control plane in the core networks is therefore notified of this failure and traffic is rerouted to a secondary egress POP. The Dolfins are configured to communicate to select a secondary egress POP for any application involved, and the Orcas are notified of the change by the secondary egress POP.

If the connectivity between an egress POP and a particular application service (egress destination) fails, it is handled in a manner similar to that of the egress POP failure described herein, except that the secondary egress POP is only used for the particular service corresponding to the failed last mile connection. Therefore, traffic destined for that particular service is rerouted by the MCN to a secondary egress POP, while traffic addressed to other application services using the same primary egress POP will not be rerouted.

High Availability (Last Mile) with End-User Control

Soft failures represent situations in which each component of the MCN is operating properly but the current performance is below the expectation, for example, some metrics in the service-level agreement are not satisfied or the bandwidth of the Internet (last mile) is not sufficient. The MCN of an embodiment monitors the performance in real time and adapts to new routes for performance improvement. The high availability of the last mile can be broken down into monitoring and route control.

While the DNS approach has limitations in monitoring the end-to-end performance of a specific user, embodiments include control of the end user that makes it possible to monitor the status of end-to-end connectivity as well as the performance of the connections in real time in the end user. The performance metrics considered include latency, jitter, loss and throughput, but are not so limited. Embodiments include two methods of end-user monitoring, web-based active measurement, and agent-based active measurement.

The web-based active measurement method for monitoring the connectivity status assumes that a web page is provided at the tenant for login in order to use the MCN, as described in detail herein. During the authentication process between the web page and the web application, an embodiment injects a JavaScript beacon into the response. The beacon instructs the tenant to fetch a set of URLs that are associated with candidate POPs, perform a health check of the POPs, and monitor the connectivity status of the last mile. The beacon also measures the latency and goodput to the POPs by downloading the resources pointed to by the URLs. The beacon approach therefore enables measurement of not only the performance of the existing path, but also all alternate paths not being used by current connections, so that the optimal path for recovery can be quickly determined in the event the current path encounters failure or performance degradation.

Web-based monitoring may not be applicable for route control because the web-based server is not able to manipulate the operating system. To control the route for the specific end user, embodiments implement a MCN DNS server that handles the DNS request from the end user. As described herein, the DNS request contains only the DNS local resolver IP, so the MCN DNS server is configured to maintain a mapping between the DNS resolver and the end user ahead of the DNS request. This enables coarse-grained route control because all end users using the same DNS local resolver and aiming at the same egress destination will be controlled identically.

Agent-based active measurement comprises deployment of an agent in the end user. When using the deployed agent, the monitoring mechanism for agent-based active measurement is similar to the web-based active measurement method.

The routing control component of the last mile high availability comprises an agent deployed in the tenant device. The agent is configured to control the route by modifying the DNS entry in the host file of the end user so that the new DNS entry is applicable when the existing connection fails and expires, or when there is new connection to be established.

Alternative embodiments of the MCN include consumer premises equipment (CPE) installed at the tenant site. The CPE is configured to provide control of the routes by modifying the next hop of specific flows in the routing table. This enables real time changes to the route and for arbitrary traffic, not bounded by DNS cache timeout and not limited to only new connections. In particular, the traffic of current connections can be detoured to a better path, instead of suffering from the worse performance or disconnection timeout.

External Routes High Availability

An external route is a publicly routable IP address configured by the tenant as one of the intended targets for traffic routed via the MCN. Traffic received at the MCN and addressed to the intended target IP address is routed via the MCN to the egress POP "closest" to the target address. The traffic is then routed from the egress POP to the target address over the Internet. Embodiments provide high availability for egress failover by configuring all POPs as egress POPs.

Tenants configure their external routes (via the web UI and web application) by providing the domain name of the service they intend to access through the MCN, and the MCN components determine the best egress POP corresponding to the service. The MCN middleware (e.g., provisioner) receives the domain name, and in response creates an alternative domain name (e.g., CNAME) that redirects to the MCN, as described in detail herein. Upon receipt of the traffic at the MCN, it is known that the traffic is to be sent to the original domain name. This information is accessed or received by Dolfins and used to route the traffic to that domain name by routing the traffic to the egress POP. The egress POP in turn routes the traffic to the intended egress destination via the Internet.

All POPs in an embodiment are configured to act as ingress POPs for a route. Additionally, embodiments provide high availability of external routes and thus avoid creating a single point of failure by configuring all POPs as egress POPs. Configuring all POPs as egress POPs enables any POP of the MCN to function as an available route to the Internet and, thus, a route to any publicly accessible service. In this manner, every POP of the MCN is configurable as an egress point to any route, and the POPs are controlled across all nodes on the network so they all route to the same egress POP while it is designated as the egress POP for an Internet route to an egress destination.

Figure 49:
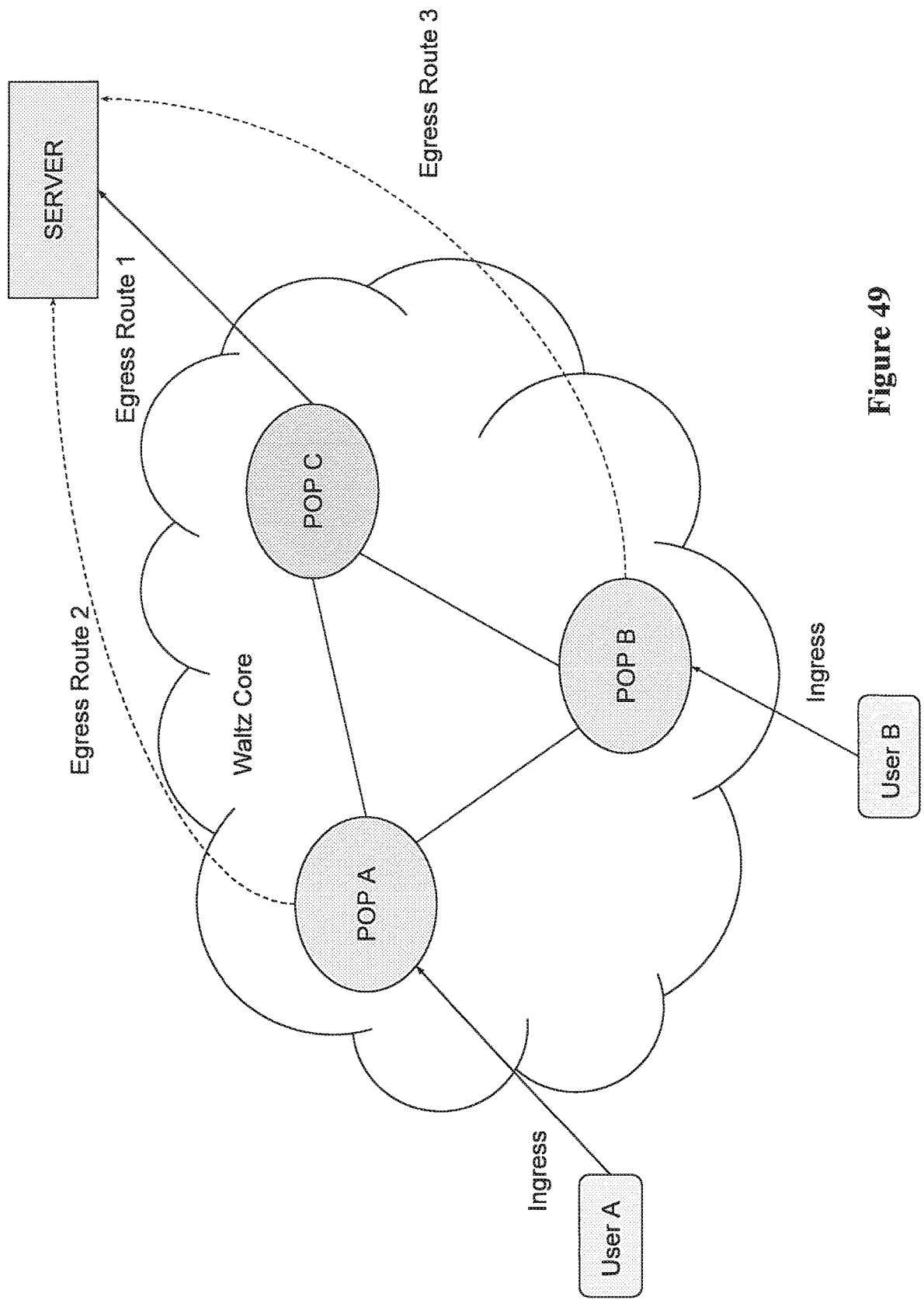
FIG. 49 is a flow diagram showing egress routes when all POPs of the MCN are configured as egress POPs, under an embodiment.

FIG. 49 is a flow diagram showing egress routes when all POPs of the MCN are configured as egress POPs, under an embodiment. In this example embodiment, POP A is configured as the ingress POP for user A, POP B is configured as the ingress POP for user B, and POP C is configured as the egress POP for the egress destination because it has the lowest cost relative to the egress destination, as described herein. Egress route 1 is the last mile coupling between the egress POP POP C and the egress destination.

The traffic of user A is routed from user A to the egress destination via POP A, POP C, and egress route 1. In the event POP C goes down or otherwise becomes unavailable, the POP with the next lowest cost relative to the egress destination is configured as the egress POP for routing traffic to the egress destination. In this example, the MCN determines that POP B has the lowest cost relative to the egress destination, and configures POP B as the new egress POP. The MCN is configured to then reroute traffic of user A to the egress destination via POP A, POP B, and egress route 3.

Further, the traffic of user B is routed from user B to the egress destination via POP B, POP C, and egress route 1. In the event POP C goes down or otherwise becomes unavailable, the POP with the next lowest cost relative to the egress destination is configured as the egress POP for routing traffic to the egress destination. In this example, the MCN determines that POP A has the lowest cost relative to the egress destination, and configures POP A as the new egress POP. The MCN is configured to then reroute traffic of user B to the egress destination via POP B, POP A, and egress route 2.

With all POPs configured to act as egress POPs, and when polling for routes, the Dolfins receive a list of egress POPs for a route, instead of receiving a single POP. Dolfins of an embodiment are configured to receive an ordered list of POPs to use as egress for a route. When a new packet for a route is received, the receiving Dolfin evaluates or traverses the list of egress POPs to identify the first reachable POP in the list. A Dolfin is configured to react when it detects a change in a POP status (e.g., active, down, etc.) in order to modify its flow rules in the event the change in POP status has any effects on routes corresponding to its traffic.

The list of egress POPs is ordered based on geographical location. The provisioner database of an embodiment includes geo-positioning information, and the list of egress POPs is generated or determined based on the distance to the POPs as determined using the positioning information. The provisioner is configured to provide the Dolfins with information of the list so that all Dolfins comprise the same order of egress POPs for a route. Once the tenant selects the egress POP during registration of a route, the Provisioner automatically generates the list of backups in order and distributes the list to the Dolfins on the next Route update.

Claimable Public IP Addresses for Routes

Each POP is generally configured to use one public IP address per each tenant application supported by the POP as described herein. Components of the MCN are configured to track the public IP addresses allocated to the MCN by a cloud service provider (e.g., Azure, Ericsson, etc.), and to map the IP addresses to specific routes. Further, the MCN components are configured to perform the corresponding changes on the networking stack of the host service provider to forward tenant traffic to the Orca that corresponds to the tenant. The components involved in managing the public IP addresses include the provisioner database, as well as the provisioner and Orca, but are not so limited.

The provisioner database is configured to include a table to track public IP addresses as they are provided by a cloud service provider, and track their usage as public IP addresses for routes. This comprises the provisioner database being configured to include two tables to track the public IP addresses as they are dynamically received for the POPs. These tables include an IP address data table (public_ips table) that includes data of the IP addresses, and an IP address-mapping table (route_public_ips). The IP address data table includes the IP address string and the corresponding host identification string that specifies the specific host corresponding to the IP address.

The IP address-mapping table, which is used to create a mapping between a route and IP address, includes a route identification data string, and an IP address string. This table can be used by an API, to get a list of all the public IP addresses currently claimed for a certain route on a network. The route identification data is not unique because a route can be associated with multiple IP addresses, but is not so limited. Once a route claims the public IP addresses required on all the POPs of the route, it then adds the addresses to this table.

The provisioner is configured to include an API that enables updating of the IP address list as more public IP addresses are received. This API configures the provisioner to read the list of public IP addresses (which can be filtered based on POP, network, etc.) from the IP address mapping table. Orca is configured to use these APIs to poll accordingly for public IP addresses. Additionally, the API is configured to automatically update the public IP tables.

The provisioner is further configured to modify the existing routes functionality to select public IP addresses accordingly and claim them for routes. This modifying of the existing routes functionality to select public IP addresses comprises determining if all the nodes on the underlay network have at least one claimable public IP address and, if so, claiming one public IP address on each node for the route and creating the route mapping.

Each Orca is configured to ensure that packets intended for a specific egress destination address are correctly forwarded to the Orca that corresponds to that address and, in so doing comprises appropriate forwarding rules, address resolution protocol (ARP) entries, and iptables entries to allow packets coming into POPs of the MCN to be forwarded to the corresponding orca. Alternatively, the forwarding rules are hosted at another MCN component or agent instead of Orca. Embodiments use the existing polling framework to poll for the specific public IP addresses of this network/POP. Based on the public IP addresses currently being tracked, a "diff" mechanism is used to detect deletions or additions. Each polling iteration is performed using a filter including network identification and host identification, so that each Orca only receives a list of the public IP addresses for which it is responsible. When a new public IP address is discovered, Orca is configured to add an 'iproute' entry forwarding packets destined to this new IP address to the corresponding Orca. Orca is further configured to add an 'iptables' entry enabling packets destined to the new IP address to be forwarded to the corresponding Orca. Additionally, Orca is configured to add a proxy ARP entry for the new IP address.

Orca also periodically checks currently existing routes/iptable entries/proxy ARPs as a backup measure to ensure the routing table and host networking state are consistent with what is expected given the entries currently being tracked. Consequently, Orca is configured to periodically (e.g., every x seconds) determine that the routing table, iptables, and ARP entries exist for each known public IP address that is mapped to its corresponding tenant, and to add any information found to be missing.

Development and Testing Environment

Embodiments include a development pipeline for developing and fielding the software of the MCN. The development pipeline comprises a sequence of environments including one or more of development, quality assurance, alpha, beta, staging, and production environments, as described herein. The development of the MCN software flows through this sequence of environments prior to being fielded as a software-defined core network. The software development also includes a variety of types of tests applied to the software, including one or more of functional testing, system/solutions testing, stress testing, performance testing, usability testing, acceptance testing, regression testing, and beta testing.

Embodiments include a self-care portal configured as a graphical user interface (GUI) for tenants to evaluate and deploy the infrastructure of the MCN. For example, embodiments include a sandbox component configured to simulate a copy of a network by creating network components and interconnecting them to form a large-scale simulated or virtual network. The sandbox of an embodiment is based on Mininet, which is used to simulate a network by creating network components and interconnecting them to form a large-scale simulated or virtual network, but is not so limited. The sandbox component is configured to enable a user to construct a network from scratch using the tools provided in the GUI. The sandbox GUI is configured for users to add one or more cities that are close to their offices. Each added city comes with one default office, and the GUI enable users to also specify the number of offices attached to the city.

The sandbox GUI is configured to enable a user to then add links between the added cities. The cities and the links can also be deleted. When a city or an office is selected using the GUI, a user can change the label of the selected element using a pop-up editor. Similarly, when a link is selected in the GUI, the user can change the capacity of that link.

Following completion of the network topology, the GUI is configured to enable the user to select source and destination pairs to simulate the network, and send traffic using the selected source and destination pairs to test the network throughput. The traffic in these simulations is routed via the MCN using the routing algorithms described herein, but is not so limited. A component of the GUI is configured to display the dynamic throughput of all destination offices, and the maximum throughput is recorded for comparison.

In addition to simulations, development of the control plane and management plane entities that control the MCN include running and testing the components of these planes on top of a portion of a live network of a corresponding tenant. Therefore, the GUI is configured to enable a user to evaluate MCN components (software) using at least a portion of a live network. For example, embodiments use an integration test suite for integration testing of the control plane and management plane entities in a portion of a live network. In an alternative example, embodiments implement a small-scale version of an actual network on in-house servers, and use this implementation for scale and performance testing. Statistics of the live network operations reported by the control plane and management plane are monitored, and the statistics include but are not limited to latency, packet loss, throughput, jitter, top application, individual flows, number of sessions, and tunnel availability.

The GUI is configured to enable a user to create or trigger one or more network condition events on a running portion of the live network. The network condition events include but are not limited to bringing down a link, changing latentcy of a link, changing capacity of a link, introducing packet loss on a link, and introducing jitter on a link. For example, when a user selects a link then a utility is presented that enables the user to bring down the link. As another example, when a user selects a link then a link editor is presented that enables the user to specify new link latency and/or capacity. For an example involving a packet loss event, when a user selects a link then a link editor is presented that enables the user to specify the packet-loss (or jitter) for that link.

The GUI is further configured to enable a user to specify security policies. For this capability, the GUI enables a user to select a packet type to be blocked on a running portion of the live network.

Detailed Description of HALO

Networks are typically formed with one or more interconnected pathways. In a network, items may travel along the various pathways. A network may include more than one pathway from a first location to a second location. The process of selecting among the two or more pathways for the item(s) to travel is termed "routing" for the purposes of this application. Routing may be performed for many kinds of networks, including a telephone network, transportation networks, and an electronic data network (such as a local area network, wide area network, intranet, extranet, or Internet).

For the purposes of this application, the present invention is discussed in reference to routing certain types of items—specifically, information items—through certain types of networks—specifically, electronic data networks—, but the discussion is merely exemplary. The present invention is applicable to routing movement of any type of item through any type of network. For example, certain embodiments of the present invention may be configured to address other multi-commodity flow problems such as traffic engineering road networks and commodity flow in the economy.

As indicated above, certain embodiments of the present invention are directed to routing information in electronic data networks. Electronic data networks may be comprised of at least a group of two or more nodes. An example of a node is a physical electronic device (e.g., a router, computer, or switch). A node also may be a virtual manifestation of such a device. For the purposes of this application, the term "node" is interchangeable with the term "router".

Typically, information is transferred between nodes in a formatted unit of data, such as a packet, byte, character, datagram, or bit. Certain embodiments of the present invention will be discussed with reference to transfer of information packets, but this discussion is non-limiting and merely exemplary. Generally, any formatted unit of data may be transferred among nodes according to the present invention, or more generally, any commodity may be transferred along pathways in a network.

An information packet may be routed from a source node to a destination node. More specifically, the information packet may travel from a source node directly to a destination node or may travel from a source node to one or more intermediate nodes and then reach a destination node. For the purposes of this application, the portion of the route between each node and a second node is termed a "link".

The specific nodes through which the information packet travels—which form the "pathway"—may be selected based on some criteria, such as shortest distance between source node and destination node or most bandwidth availability along the pathway. Certain criteria information—e.g., distance between certain nodes—may be obtained and stored in a storage component. Examples of a storage component include a routing table, a topology map, a main memory, or secondary memory (the latter two of which are described in more detail below).

In certain embodiments, each node has its own storage component, which contains information regarding that node's links to other nodes. For example, a storage component for a single node may include the information such as the distance between that single node and each other neighboring node. For the purposes of this application, a "neighboring node" is a node to which a source node can directly transfer information without need for an intermediate node.

Various procedures for routing information packets through the pathways of an electronic data network existed before the present invention. Certain types of earlier known routing procedures are called "link-state routing procedures". Such procedures are configured to select pathways for the information packets based on the state of the links between nodes. For purposes of this application, the term "link state" refers to a numerical description of the state of the link. It could be a number 1 to indicate a functioning link vs. a number 0 to indicate an inactive link. In another embodiment, the link state could be a valuation of the amount of traffic on the link.

Typically, the shortest distance between a source node and each other node in the network is calculated. The distance may be considered a "price" for the purposes of the calculation. A higher distance has a higher price, and a shorter distance has a lower price. The procedure may seek to minimize the overall price of the set of links that form the pathway. Then, when an information packet travels through the selected pathway, it does so by traveling the shortest distance.

However, such procedures have certain disadvantages in that the pathway with the shortest distance may not be the most efficient pathway. For example, the most efficient pathway may get overburdened and become unable to support the quantity of information packets routed through that pathway. Accordingly, more advanced systems and methods added additional criteria to calculate the "price" of the respective links and overall pathway. For example, such criteria may include available bandwidth between nodes, expected delay in communicating between nodes, pathway reliability, or pathway availability.

In certain known procedures, the route for the information packet is re-analyzed at each node. For example, at a source node, an evaluation is done to assess the "lowest price" second node in light of the ultimate destination node. A second assessment is done at the second node to determine the "lowest price" subsequent node in order to reach the destination node. The analysis is done at every subsequent node until the information packet reaches the destination node. This type of process is called "hop-by-hop" routing because a separate analysis is done relative to each node to determine each subsequent "hop" over a link.

Each network may include more than one packet travelling through the system. In the analysis step done at each node (in systems using the hop-by-hop approach), the selection of which packets or how many packets follow which pathway through which nodes is termed a "split ratio".

Figure 50:
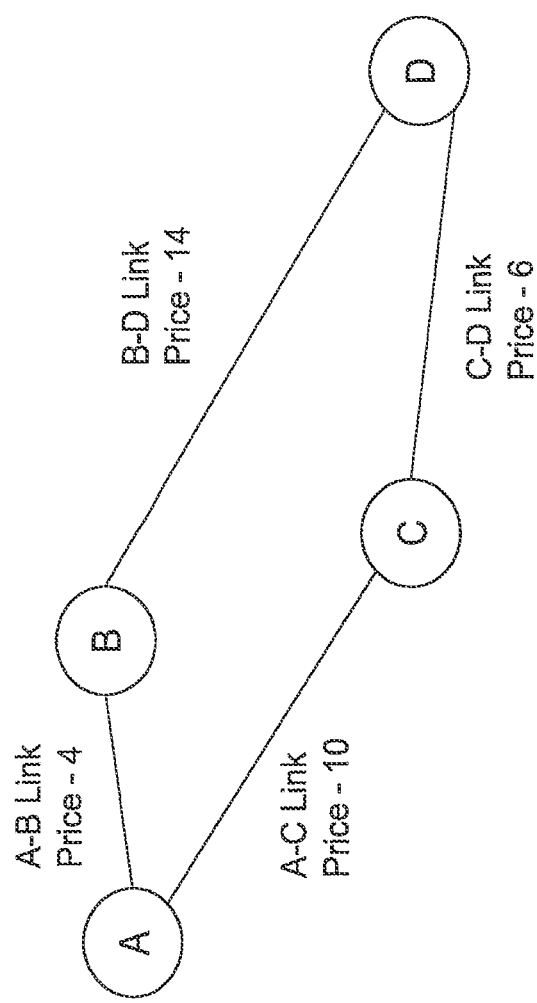
FIG. 50 illustrates an example of a network.

Generally, the "hop-by-hop" routing procedures are limited in that they do not always achieve the optimal route over the entire pathway. For example, in the network illustrated in FIG. 50, if node A is the source node and node D is the destination node, the analysis at node A includes an assessment whether node B or node C has a lower price. The price of the link between node A and node B is rated 4, while the price of the link between node A and node C is rated 10. Accordingly, the analysis will identify node B as the lowest price subsequent node. Then, the analysis at node B will identify node D as the best subsequent node. The overall price will be 18 (calculated by adding link price A-B, 4, and the price of link B to D, 14). However, if the analysis at node A could have all the information about the network analyzed appropriately, it would have calculated that the route from node A-C-D actually has a lower price of 16—calculated by adding A-C Link price of 10 plus C-D Link price of 6—relative to the A-B-D price of 18. The route A-C-D would have optimized the objective of using the lowest price route over the entire network.

In general, "optimized" or "optimal" routing procedures may include a method configured to achieve the most efficient mathematically/physically possible result for any identified objective (e.g. minimize total delay, maximize use of network resources, minimize distance traveled) or combination of objectives determined by a network operator. Alternatively, the objectives may be prioritized by the system either in real-time as the system is processing the routes or by a list of priorities identified before the route processing begins. The problem of optimizing network traffic is termed "traffic engineering" or "TE" for the purposes of this application.

Overall, known routing procedures configured to achieve optimal or near-optimal traffic engineering over a network are associated with many disadvantages. In general, such procedures are typically difficult to implement or manage and may not take into account any change in the conditions of a link in the network. (The ability to recognize and respond to changes in the state of the link or state of the network is called being "adaptive". More specifically, an "adaptive" routing method is configured to recognize and respond to changes in the state of the network such as the traffic demand of the commodities or packets—as recognized from the input to the method—automatically.) Certain known routing procedures and their respective disadvantages are discussed below.

An alternative to "hop-by-hop" routing is termed "source routing", in which the entire route from the source node to the destination node is calculated by the source node. Source routing can be difficult to implement, because the source node has to encode, in the information packet, the entire pathway that it must take through the network. This could potentially be more information than the payload of the packet.

Examples of source routing include the flow deviation technique, the gradient projection approach, and proximal decomposition methods. However, these optimization procedures require the network to establish end-to-end virtual circuits or to encode the entire pathway each packet should take at the origin of that packet. As the traffic patterns change, the established circuits become less useful and performance levels decrease.

Instead of using source routing, efforts have been made to improve the optimality of traffic engineering in known hop-by-hop link-state procedures. For example, techniques have been shown to improve the performance of certain hop-by-hop link-state procedures—e.g., Open Shortest Path First (OSPF)—significantly by finding better weight settings for the procedure. However, the results are still far from optimal traffic engineering. Typically, these efforts also assume that a good estimate of the traffic demand in the form of a traffic matrix is available. For the purposes of this application, a "traffic matrix" is a matrix representation of the current traffic demand between the nodes in a network. While work has been done on traffic matrix estimation, even the best results have errors in the elements of the estimated traffic matrix on the order of 20%—difficulties which can lead to potentially bad traffic engineering.

Oblivious routing has been proposed to circumvent the need for estimating the traffic matrix for improved traffic engineering. Such procedures seek to perform well regardless of the traffic demand by comparing the 'oblivious performance ratio' of the routing, i.e., the worst case performance of the routing for a given network over all possible demands. Examples of such procedures are a linear programming method to determine the best oblivious routing solution for the special case of minimizing maximum channel utilization and another procedure configured to maximize throughput for the special case of two phase routing. Some clear limitations of these procedures are that the oblivious routing solutions do not adapt well to changes in the network topology and that, by not taking advantage of actual traffic information, the routing still incurs possibly significant performance losses.

Other hop-by-hop routing procedures are based on distance-vector methods. Distance vector methods call for each router to send all or some portion of its routing table to other nodes, but only to its neighboring nodes.

As long as a node has access to the "average price" (e.g., "average distance") to each destination at each of its neighbors, such as the averages calculated in Equation 1 below, it has enough information to make optimal forwarding decisions. From an optimization standpoint, the main ideas follow directly from the decomposition of the dual of the traffic engineering optimization problem. Such decompositions, which have been very successful for problems of this type, can be used to yield updating rules for both primal and dual variables (split ratios and node prices) that can be shown to converge to optimal solutions. Similar node-based ideas have also been applied to cross-layer optimization of networks.

However, such distance-vector procedures are often difficult to scale up in large networks and lack robustness. More specifically, in one example of the lack of robustness in distance-vector systems, one router started advertising to its neighboring nodes that it has essentially zero distance to all destinations. The neighboring nodes started shifting traffic to this router followed by the neighboring nodes' respective neighboring nodes. Eventually the router went down under the traffic load but many routers in the Internet were still pointing or trying to point towards this router.

Also, distance-vector procedures can converge slowly as packets need to be passed in a step-by-step manner from one end of the network to another for route computations to take place.

Clearly, there are challenges associated with implementing procedures configured to provide optimized traffic engineering in a network. While procedures have been developed to implement optimized procedures of certain portions of a network, the challenges associated with scaling such procedures to appropriate size for certain networks has limited the usefulness of such procedures.

Accordingly, hop-by-hop link-state routing procedures that are not optimized are commonly used in many networks, despite not resulting in optimal use of network resources. Examples of such non-optimized procedures include the Open Shortest Path First (OSPF) procedure and the Intermediate System-Intermediate System (IS-IS) procedure. Such procedures are relatively easy to implement, manage, and scale up, and, accordingly, have been widely applied, but lack optimality.

Therefore, a demand exists for a hop-by-hop, link-state, routing system and methods for optimal traffic routing through a network. Certain embodiments of the present invention include a system and methods for routing items through a network. Generally, the problem of how to route items through a network is considered a multi-commodity flow problem (MCF). The Karush-Kuhn-Tucker (KKT) conditions of the MCF problem are what permit focusing on shortest paths based on the price and to show optimality of the method.

Certain embodiments of the present invention are configured to implement an adaptive, traffic-optimized, hop-by-hop, and link-state approach to solving the MCF problem in a network.

Advantageously, since the hop-by-hop approach is incorporated, the system does not have to set up virtual circuits, end-to-end tunnels or encode the pathway the packet should follow at the origin. By optimizing the traffic, some criteria or combination of criteria—e.g., speed, reliability, or availability of the path—is maximized or minimized for the network or some portion of the network.

Advantageously, since the link-state approach is incorporated, each node has access to the state of each link and a single node cannot take down the network as with distance-vector implementations. There are two efficient ways to calculate the shortest path through the network: using a link-state implementation or a distance-vector implementation. Given the disadvantage of distance-vector, the link-state approach is preferred.

Certain embodiments of the present invention are also adaptive, and accordingly, configured to receive and process information regarding the changing state of links among nodes in the network.

In certain embodiments, the system and methods of the present invention may be configured to implement the method in a "distributed" manner. More specifically, given the link-state information, each router may independently perform the relevant computations. However, this is a feature and not a requirement. The same calculations could be performed at any place with access to all the local node information such as the inflow rate and the split ratios.

Certain embodiments of the present invention include routing more than one information packet through a pathway in the network. In such embodiments, the optimal routing may include sending all the packets on the same pathway through the network—termed "single-path routing"—or sending certain packets on different pathways through the network—termed "multi-path routing". An optimal solution typically uses multiple paths between the source node and the destination node.

Certain embodiments of the present invention are configured to be implemented on a network running various types of routing systems and methods. Such embodiments may be configured to co-function with one or more single-path routers or multi-path routers in the same network. In other words, each router in a network may be configured to implement a routing method according to the present invention or routing methods outside the scope of the present invention. Advantageously, even if the system and methods of the present invention is implemented in only a portion of the routers in a network, the performance of the network improves.

Certain embodiments of the present invention are configured to be "iterative", which means that the system and methods are configured to dynamically adjust the traffic forwarding successfully at each node to seek the most optimal pathway.

The system may be understood by comparison to an example of another type of network—that is, a road network during rush hour. Each driver may intend to drive their car from work to home, which is comparable to an information packet that needs to go from a source node to a destination node. Car drivers typically prefer to use the shortest path back home to minimize their commute. However, at rush hour there are many car drivers following the same strategy. Consequently, the major expressways get overcrowded and backed up, even though under non-rush hour circumstances those expressways would have indeed represented the fastest path for each driver to get home.

During rush hour, drivers may tune in to the radio and listen to the traffic report detailing the status of different roads that they can take to their destination. The traffic report is comparable to the "link states" in embodiments of the present invention. Then, the car driver adaptively chooses which road to take at each junction of certain roads ("hop-by-hop" in the present invention) based on the incoming radio report so that they can get home quickly. Since multiple drivers are likely getting the same road traffic reports, a lot of car drivers might all choose to leave the expressway and take back roads to their destinations, which only makes traffic and delay significantly worse on those back roads. In the present invention, this problem is managed by a method step that splits the traffic at junctions based on their destination so that not everybody piles onto the same alternative route. The exact splits are determined iteratively and dynamically to optimize the traffic flow based on the traffic conditions reported via the radio reports/link states.

As discussed above, many networks, including the Internet already use link states (e.g., comparable to the radio traffic reports). Specifically, OSPF, which controls routing on over 95% of the Internet, relies on these link-state updates. However, OSPF relies on reports that include pre-computed weights that are operator specific. The weights may be an inverse of the link bandwidth, or some number assigned based on statistical/historical knowledge of the traffic conditions on the link.

In contrast, certain embodiments of the present invention use reports improved relative to the OSPF reports. For instance, one type of improved report may indicate the number of packets (e.g., cars in the road example) between two junctions (e.g., intersections in the car example), while another type of improved report may indicate the number of packets per unit of distance (or cars per mile) between two junctions. Each report conveys different information. In the present invention, the link-state is reported to achieve optimal performance.

In general, certain embodiments of the present invention include a number of method steps. A method may begin with ascertaining one or more links between two nodes in a network. A price value may be assigned to each link between the one or more nodes. The price value of the respective links may be shared among certain or all nodes in the network. When the system receives a request for routing one or more packets through the network, the optimal subsequent node (i.e., next hop) for each packet may be calculated. The calculation is repeated at each subsequent node until the destination node is reached. In certain embodiments, each node includes its own processor and main memory (each of which is described in more detail later in the application) configured to implement the entire method. In other embodiments, certain steps are done in one processor and information about those steps is communicated to processors in one or more nodes.

One object of certain embodiments of the present invention is improved performance relative to known procedures for optimized traffic engineering.

Another object of certain embodiments of the present invention is improved performance by upwards of 1000% relative to known procedures for optimized traffic engineering.

Another object of certain embodiments of the present invention is easier implementation of the system and methods relative to known procedures for optimized traffic engineering.

Another object of certain embodiments of the present invention is easier management of the system and methods relative to known procedures for optimized traffic engineering.

Another object of certain embodiments of the present invention is improved overall traffic engineering relative to known hop-by-hop procedures, link-state procedures, or hop-by-hop and link-state procedures.

Yet another object of certain embodiments of the present invention is that it does not require estimating a traffic matrix.

Yet another object of certain embodiments of the present invention is that it does not require source routing.

Yet another object of certain embodiments of the present invention is easier scalability, e.g., scaling up or scaling down as needed for the size of a network, relative to known procedures.

Yet another object of certain embodiments of the present invention is to use the same inputs used in OSPF or IS-IS to facilitate easier transition between networks currently utilizing OSPF or IS-IS procedures.

A difference between certain embodiments of the invention and existing link-state procedures is an argument for how to control the ratio according to which an internet router splits traffic to a destination across its outgoing links. Since it needs no additional input and can work with existing infrastructure, implementing embodiments of the invention would include modifying the component of the router running OSPF to run such embodiments of the invention. For practical implementation, a discrete-time version of the continuous-time argument is necessary. However, since the continuous time argument has been shown to be valid, it is only a question of selecting a small enough step-size to implement the present invention. In other words, the step-size includes using discrete time steps instead of continuous time. A digital implementation requires time steps to operate, whereas an analog implementation does not require time steps to operate. Since computers are digital, discrete time steps are typically required.

In certain embodiments, the invention can be distributed as a software service, a hardware component configured to implement the method, or as a full-scale router.

The question of how to route information packets through an electronic data network can be defined more generally as a multi-commodity flow ("MCF") problem. For a given directed graph, G=(V,E) with node/router set V and edge/link, set E with link capacities $c_{u,v}$; $\forall(u,v) \in E$, and demands D(s,t) defined as the rate required for communication from s to t, the MCF problem can been summarized below.

$$\min_{f_{u,v}^t} \Phi(f)$$

$$\text{s.t.} \sum_{v:(s,v)\in E} f_{s,v}^t - \sum_{u:(u,s)\in E} f_{u,s}^t = D(s, t), \forall s \neq t$$

$$f_{u,v} = \sum_{t \in V} f_{u,v}^t \leq c_{u,v}, \forall(u, v)$$

$$f_{u,v}^t \geq 0$$

Commodities are defined in terms of their final destination t. $f_{u,v}^t$ is the flow on link (u,v) corresponding to commodity t and $f_{u,v}$ is the total flow on link (u,v). The cost function, $\Phi$, is typically selected to be a convex function of the link rate vector f={$f_{u,v}$}, $\forall(u,v) \in$ E. For example, if the M/M/1 delay formula is used for the cost function, then $\Phi(f)=\Sigma_{u,v}\Phi_{u,v}(f_{u,v})=\Sigma_{u,v}f_{u,v}/(c_{u,v}-f_{u,v})$. Throughout this application, this cost function will be used unless specified otherwise. It is also assumed that $\Phi'_{u,v}(f_{u,v})\to\infty$ when $f_{u,v}\to c_{u,v}$. This element captures the common practice of not allowing links to operate too close to their capacity. For the purposes of this application, given a function $\gamma(\chi(\tau))$, the character $\gamma'$ to represent the derivative of $\chi$ with respect to $\chi$ and $\dot{\gamma}$ to represent the time ($\tau$) derivative of $\gamma$.

Using the first derivative of the cost function as the price of a link in distance calculations permits the achievement of an optimal solution. The price of the link (u,v) is defined as $w_{u,v}=\Phi'_{u,v}(f_{u,v})$, the price of a path p as $\Sigma_{u,v \in p} w_{u,v}$ and the price at a node u to a destination t as, $$q_u^t = \sum_{v:(u,v)\in E} \alpha_{u,v}^t [w_{u,v} + q_v^t] \quad (1)$$

where $q_t^t=0$. The price at a node can be interpreted as the average price to the destination from that node where the average is taken over all outgoing edges to the destination weighted by the split ratios along those edges. If instead the average is done over all possible paths, Equation (1) can be stated without recursion as, $$q_u^t = \sum_{p \in P_{u,t}} d_p \prod_{(i,j)\in p} \alpha_{i,j}^t \quad (2)$$

where $P_{u,t}$ is the set of paths from u to t and $d_p = \Sigma_{(u,v) \in p} w_{u,v}$.

As identified above, the selection of which packets or how many packets follow which path through which nodes is termed a "split ratio". A split ratio may be determined for each commodity (e.g., information packet) at every node. More specifically, each router's split ratios are adjusted and traffic is moved from one outgoing link to another. Such embodiments only control the next hop on a packet path, which is hop-by-hop routing. If the entire path rate was controlled, the system would be using source routing. Also, the split ratio determination may include favoring links that form the shortest pathway, even though the average price via the next hop node may not be the lowest. If the lowest average price was prioritized, this is termed "Gallager's approach", which is a distance vector solution (Gallager's approach is compared with an embodiment of the present invention in FIG. 52. The dashed line represents Gallager's approach and the solid line represents an embodiment of the present invention.)

In addition, the split ratio determination may include adapting the split ratios dynamically and incrementally by decreasing the packet traffic along links that belong to non-shortest paths while increasing along the link that is part of the shortest path at every router. In contrast, if split ratios are set to send packets only to the links leading to the currently calculated shortest path, then the result is OSPF with weights, $w_{u,v}$.

Figure 51A:
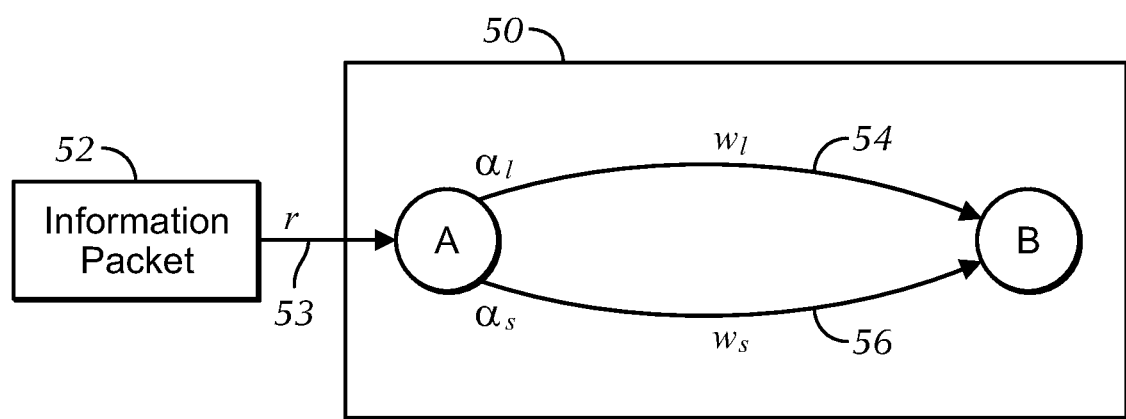
FIG. 51A illustrates an example of a network having two nodes according to the present invention.

Certain portions of certain embodiments of the present invention are configured to address specific scenarios that may occur in a network. One scenario is illustrated in FIG. 51A. One or more information packets 52 are available for routing through the network 50. The rate of demand 53 for routing information packets 52 may be represented by "r". Upon reaching node A, the one or more information packets 52 may be sent along a first link 54 or a second link 56. In the illustrated embodiment, the first link 54 has a more expensive "price" according to some criteria (e.g., longer distance, lower reliability, etc.). The more expensive price is represented by the character "$w_l$". The second link 56 has a less expensive price and is represented by the character "$w_s$".

Given $w_l > w_s$, a strategy to reach optimal use of the first link and the second link might be to dynamically shift traffic from the more expensive link to the cheaper link at some rate $\delta > 0$ until the prices of the two links become the same. The split ratio for the first link 54 at node A is represented by $\alpha_l$ and the split ratio for the second link 56 is represented by $\alpha_s$. In certain embodiments, the traffic over the first link 54 is decreased and traffic at the second link is increased. The $\alpha_l$ value may be decreased while the $\alpha_s$ value is increased at rate $\delta/r$. In such embodiments, the first link price is $w_l = \Phi_l'(\alpha_l r)$ and the second link price $w_s = \Phi_s'(\alpha_s r)$.

There are at least two ways to interpret and generalize the intuition gained from this scenario. Both give the same solution for this very simple example but in general will lead to different dynamics and possibly different split ratios. One interpretation, which forms the basis of procedures used in certain known methods, is that the router shifts traffic headed to neighbor nodes with higher average price to the neighbor node with the lowest average price.

A second interpretation, which is the basis of certain embodiments of the present invention, is that the router shifts traffic from links along more expensive paths to the link along the path with the lowest price. Mathematically, the following update rule for the split ratios is:

$$\alpha_{u,v}^t = -\frac{\delta}{r_u^t} \tag{3}$$

where $(u, v) \in E$ but is not on the shortest path from u to destination t and $r_u^t$ is the incoming rate at node u at destination t.

Figure 51B:
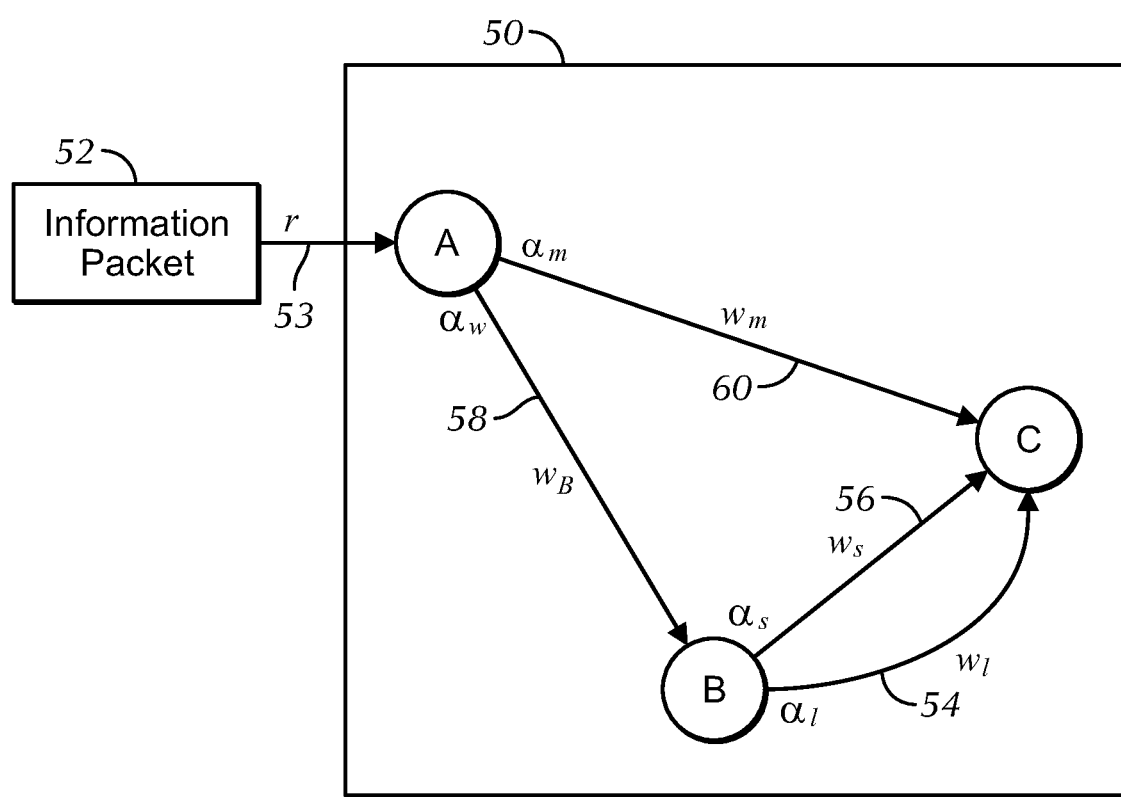
FIG. 51B illustrates an example of a network having three nodes according to the present invention.

However, as a potential counter-example to this interpretation, some version of the scenario described in FIG. 51B may be relevant. FIG. 51B illustrates traffic demand of rate r from node A to node C. In the network, there is a first node (node A), a second node (node B), and a third node (node C). There is a first link 54 between node B and node C, a second link 56 between node B and node C, a third link 58 between node A and node B, and a fourth link 60 between node A and node C. The initial splits at node A are represented by $\alpha_m$ for the fourth link along an intermediate price link with price $W_m$ and $\alpha_w$ along the more expensive route with price $w_B + w_l$ for the third link, assuming $\alpha_l = 1$ initially. The relationship between the initial link prices are assumed to be $w_l > w_m > w_s + w_B$, i.e., the third link (A,B) is along the shortest path from node A to node C, but node B also has the most expensive way to reach node C. The concern is that, if node A shifts traffic from the intermediate price link to the link with price $w_B$, the cost might increase as node B currently routes traffic only through the most expensive link ($\alpha_l = 1$). But because the selection at node B decreases $\alpha_l$ and increases $\alpha_s$ (in conjunction with the changes at node A), the total cost does in fact decrease. More precisely, the cost derivative can be calculated as follows, $$\Phi = -r \times \frac{\delta}{r} \times w_m + r \times \frac{\delta}{r} \times (w_B + w_l) - r_B \times \frac{\delta}{r_B} \times w_l + r_B \times \frac{\delta}{r_B} \times w_s =$$
$$-\delta(w_m - w_B - w_s) \leq 0$$

where $r_B$ is the incoming rate to C at B and the inequality follows from the relationship between the prices.

Figure 52:
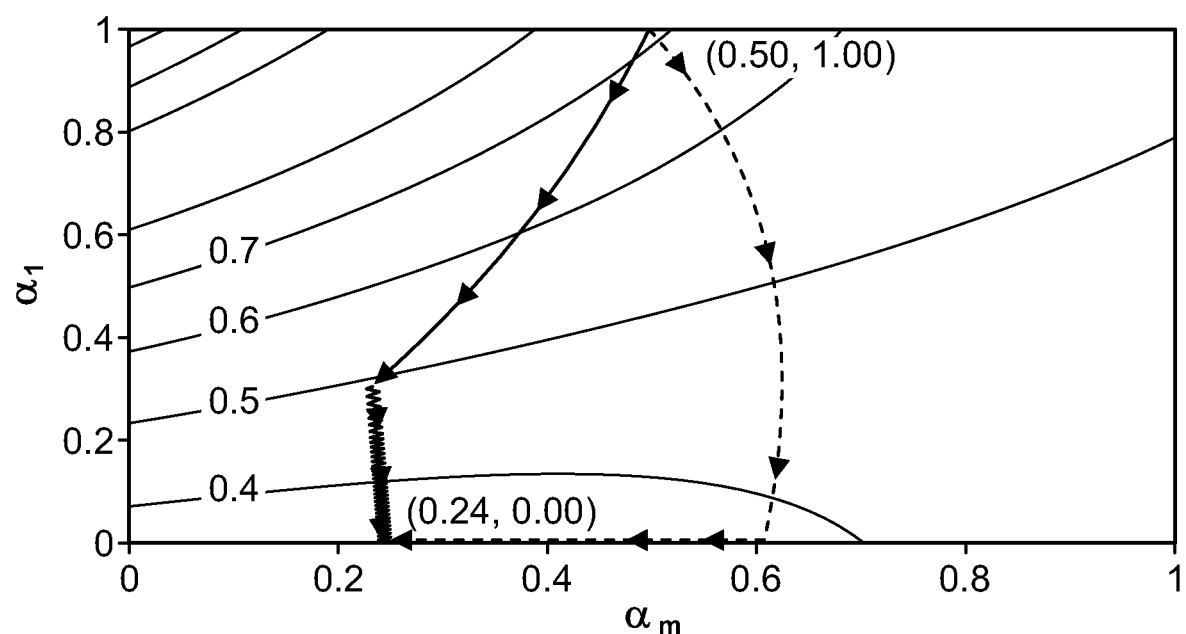
FIG. 52 illustrates a comparison of an embodiment of the present invention with Gallager's distance-vector approach known in the art.

The scenario illustrated in FIG. 51B can be used to illustrate the difference between certain embodiments of the present invention and Gallager's technique which arises from the fact that the link leading to the neighbor with the lowest average price (path A-C with price $w_m$) may not lead to the cheapest path (path A-B-C with price $w_B + w_s$). FIG. 52 shows the trajectories taken by the two different methods to converge to the optimal solution for the illustrated topology. To simulate the long link between node B and node C, an intermediate dummy node D may be introduced that splits the bottom link between B and C into two equal capacity links. The capacities used could be (A,B)=5, (B,C)=10, (A,C)=(B,D)=(D,C)=3. The single demand is D(A,C)=r. The rate r=1 and initially $\alpha_w = \alpha_m = 0.5$ and $\alpha_l = 1$. At each node, the split ratios to a given destination have to add up to the value 1. Accordingly, only one split ratio is calculated at each node because the value of that split ratio automatically defines the value of the other at each node. Using Gallager's method, initially, as can be seen, following the lowest average price path to the destination (A,C), there is an increase in the value of $\alpha_m$. Also, the trajectory of the method (gradient descent) is perpendicular to the objective function contour curves. On the other hand, using an embodiment of the present invention, both split ratios are decreased initially. The trajectory based on an embodiment of the present invention is usually not perpendicular to the contour curves, which represent the cost of the network. However, the trajectory still goes along a descent direction and drives the total cost down.

Figure 51C:
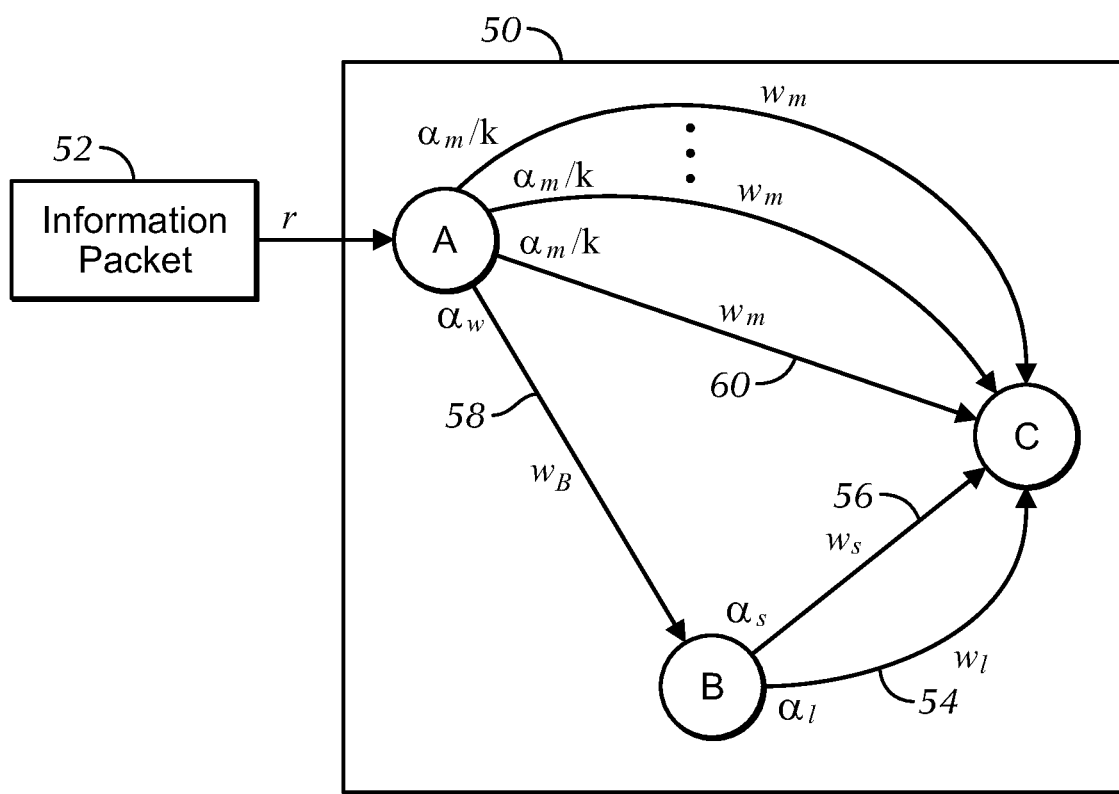
FIG. 51C illustrates another example of a network having three nodes according to the present invention.

The scenario illustrated in FIG. 51C is configured to exemplify why Equation 3 is not sufficient to decrease network cost along any trajectory. FIG. 51C illustrates k intermediate price links from router A to router C, each of which gets $\alpha_m/k$ fraction of the demand. The relationship between the link prices is the same as in the example illustrated in FIG. 51B. The shifting of traffic in an unrestricted fashion from the intermediate price links to router B with $\alpha_l = 1$, might result in an increase in the cost. The following calculation shows how the cost may increase.

$$\Phi = -k \times r \times \frac{\delta}{r} \times w_m + k \times r \times \frac{\delta}{r} \times (w_B + w_l) - r_B \times \frac{\delta}{r_B} \times w_l + r_B \times \frac{\delta}{r_B} \times w_s =$$
$$-k\delta w_m + \delta(k w_B - w_s) + (k-1)\delta w_l$$

which may be positive for k>1. Accordingly, to avoid increasing the cost, a weighting factor of the split ratio itself is added to the Equation below.

$$\dot{\alpha}_{u,v}^t = -\frac{\alpha_{u,v}^t \delta}{r_u^t} \quad (4)$$

where $(u, v) \in E$, but is not on the shortest path from u to destination t.

With the new rule (Equation 4), the cost derivative can be evaluated as follows:

$$= -k \times r \times \frac{\delta \alpha_m}{rk} \times w_m + kr \times \frac{\delta \alpha_m}{rk} \times (w_B + w_l) - r_B \times \frac{\delta}{r_B} \times w_l + r_B \times \frac{\delta}{r_B} \times w_s$$
$$= -\delta[\alpha_m w_m + (1 - \alpha_m)(w_B + w_l)] + \delta(w_B + w_l) - \delta w_l + \delta w_s$$
$$= -\delta[\alpha_m w_m + (1 - \alpha_m)(w_B + w_l)] + \delta(w_B + w_s) \le 0$$

Where the last inequality follows from the fact that the average prices from router A to router C, which is $\alpha_m w_m + (1-\alpha_m)(w_B+w_l)$ has to be at least as large as the price of the shortest path from A to C, which is $w_B+w_s$.

Figure 51D:
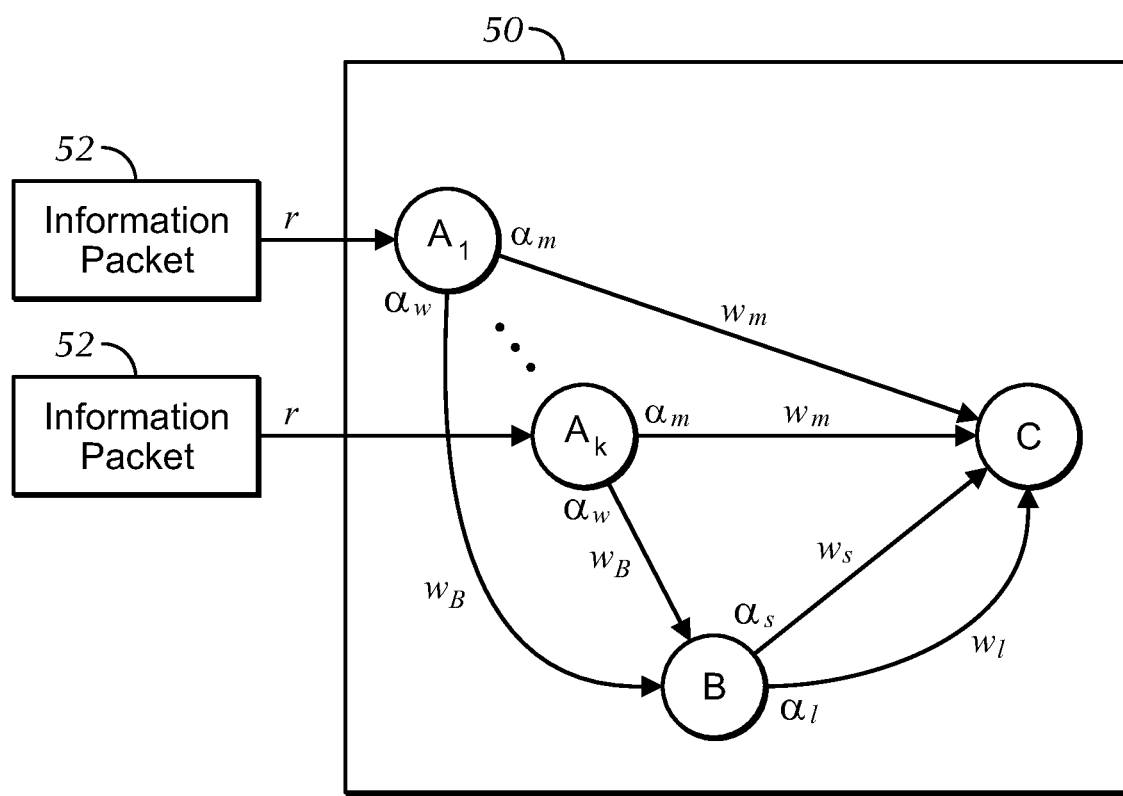
FIG. 51D illustrates an example of a network having a plurality of nodes according to the present invention.

Additional adaptations to the Equation 4 can be made to improve the likelihood that its application will result in a decrease in cost of the network. The scenario in FIG. 51D includes multiple inputs. The link weights as illustrated are $w_1 > w_m > w_s + w_B$. In the illustrated embodiment, there are k sources (e.g., demands $D(A_i, C)=r$, I=1, . . . , k) that have information packets to be sent to node C. Shifting traffic in an unrestricted manner from all the sources to router B with $\alpha_m=1$ may cause the total cost to increase as shown by the calculations below.

$$\Phi = -k \times r \times \frac{\delta \alpha_m}{r} \times w_m + k \times r \times \frac{\delta \alpha_m}{r} \times (w_B + w_l) - r_B \times \frac{\delta}{r_B} \times w_l$$
$$+ r_B \times \frac{\delta}{r_B} \times w_s$$
$$= -k\delta[\alpha_m w_m + (1 - \alpha_m)(w_B + w_l)] + (k-1)\delta w_l$$
$$+ \delta(k w_B) + w_s)$$

which may be positive for k>1.

Once again it is possible to modify the rule for the split ratios from $\delta\alpha_{u,v}^t/r_u^t$ to $\delta\alpha_{u,v}^t/\eta_u^t r_u^t$. In certain embodiments, the $\eta_u^t=k$ while for a general network, $\eta_u^t$ may be calculated according to a method specified later in this application. The calculation for determining the routing of information packets is updated to:

$$\dot{\alpha}_{u,v}^t = -\frac{\alpha_{u,v}^t \delta}{\eta_u^t r_u^t} \quad (5)$$

where $(u, v) \in E$, but is not on the shortest path from u to destination t.

Overall, embodiments of the present invention results in split ratios for all the links converging to a set where every element of the set achieves the global optimum to the MCF problem and accordingly achieves optimal traffic engineering for the network. To illustrate, a few more notations are defined below.

For a particular destination t at node s, $$r_s^t = \sum_{u:(u,s) \in E} f_{u,s}^t + D(s, t)$$

the inflow rate to a node s destined to t, which, because of node flow balance requirements is also the outflow at s to t. The character $\alpha$ is also used without indexing to represent the set of all the split ratios from all the routers in the network. At a router u, $\alpha_{u,v}^t$ controls the fraction of traffic to destination t that uses outgoing link (u, v) while satisfying $\alpha_{u,v}^t \ge 0$ and $\Sigma_{v:(u,v) \in E} \alpha_{u,v}^t = 1$.

Branch cardinality is used to make sure that nodes that are farther away from a destination node are more conservative in how much traffic they shift to the shortest path leading to the destination. As noted earlier, if nodes simply shifted a large percentage or all of their traffic to the shortest node, the performance of the network would be poor. OSPF is an example of the latter. The characters $\eta_u^t$, which represent the branch cardinality, are defined as the product of the number of branches encountered in traversing the shortest path tree (e.g., route) rooted at t from t to u. Being a link-state routing method, each node u has the link-state information to run Dijkstra's method to compute the shortest path tree to destination t. Every node has to independently determine the same shortest path tree to permit the method to proceed as desired. At any stage of Dijkstra's method, if there is ambiguity as to which node should be added next, tie-breaking based on node index is used. For the purposes of the present application, a "node index" is an identifier that uniquely describes each node in a network. Examples include a MAC address, IP address, etc.

An exemplary calculation of $\eta_u^t$ is illustrated in method steps below. More specifically, the method steps are configured to calculate $\eta_u^t\{w_e \; \forall_e \in E\}$.

1. Compute shortest path tree for destination t using Dijkstra's method with tie-breaking based on node index
2. Traverse the tree from t to u
3. Initialize $\eta_u^t \leftarrow 1$
4. At every junction, do $\eta_u^t \leftarrow \eta_u^t b$, where b is the number of branches from that junction The overall link-state routing method can be used to control the evolution of the destination specific split ratio $\alpha_{u,v}^t$ for any node u. Suppose that $(u, \bar{v}) \in E$ and $(u, \bar{v})$ is part of the shortest path to t from u. Then, certain embodiments of the present invention calculate the split ratios as follows.

if $r_u^t > 0$, $\quad \dot{\alpha}_{u,v}^t = -\frac{\alpha_{u,v}^t \delta}{\eta_u^t r_u^t}, v \ne \bar{v}$ (6)

$\dot{\alpha}_{u,\bar{v}}^t = -\sum_{v:(u,v) \in E, v \ne \bar{v}} \dot{\alpha}_{u,v}^t$ (7)

else if $r_u^t = 0$, $\quad \alpha_{u,v}^t = 0, v \ne \bar{v}$ (8)

$\alpha_{u,\bar{v}}^t = 1$ (9)

The equations above specify how to iteratively decide modifying packet forwarding at each router. First, each node checks to see whether it has traffic to a given destination. If it does not already have traffic going to a destination, it forwards all newly received packets to that destination along the shortest path to that destination. If it does already have traffic going to a destination, it adjusts what fraction of traffic it forwards along its different outgoing links according to the equations. As noted in the case studies earlier, it reduces the traffic along non-shortest paths and increases it along the outgoing link leading to the currently calculated shortest path. This procedure is iteratively followed until the optimal solution is obtained.

To prove the optimality of the above link-state hop-by-hop method, two lemmas will be analyzed. The first Lemma relates the node prices to the link weights for each destination t. More specifically, Lemma 1. $\sum_{u \in \mathbb{V}} D(u,t) q_u^t = \sum_{(u,v) \in \mathbb{E}} f_{u,v}^t w_{u,v}$ It analytically states the intuitive idea that the total price of sending traffic to meet the demand in the network, as defined by the sum of the products of the traffic demand rate and the node price for each demand node, is equal to the sum over all links of the price of sending traffic through each link. The second lemma describes how to calculate the time rate of change of network cost.

Lemma 2.

$$\sum_{(u,v) \in \mathbb{E}} \dot{f}_{u,v}^t w_{u,v} = \sum_{u \in \mathbb{V}} \sum_{(u,v) \in \mathbb{E}} r_u^t \dot{\alpha}_{u,v}^t [w_{u,v} + q_v^t]$$

The second Lemma captures the fact that the change in network cost can either be expressed in terms of the change in the link flow rates, i.e., how each link affects the network cost or in terms of the change in the split ratios at each node, i.e., how each node affects the network cost.

Next, certain method embodiments of the present invention are summarized in the following Theorem.

Theorem. In a network, at every node u, for every destination t, let the evolution of the split ratios be defined by equations (6)-(9). Then, starting from any initial conditions, $\alpha$ converges to the largest invariant set in $\{\alpha | \dot{\Phi}(f)=0\}$ and any element of this set yields an optimal solution to the MCF problem. This result is proved in three steps of the following proof.

Proof. First, it is shown that $\dot{\Phi}(f) \leq 0$. Then, this result invokes LaSalle's Invariance Principle for hybrid systems to assert that $\alpha$ converges to the largest invariant set in $\{\alpha | \dot{\Phi}(f)=0\}$. Third, it is shown that any element of this set is an optimal solution to the MCF problem.

First in this part of the method is step 1, in which the following is true.

$$\Phi(f) = \sum_{t \in \mathbb{V}} \sum_{(u,v) \in \mathbb{E}} f_{u,v}^t w_{u,v} = \sum_{t \in \mathbb{V}} \Phi^t(f)$$

where $\dot{\Phi}^t(f) = \sum_{(u,v) \in \mathbb{E}} \dot{f}_{u,v}^t w_{u,v}$ is the rate of change of the network cost as the flows to destination t change. Consequently, if $\dot{\Phi}^t(f) \leq 0$ for each destination t, then $\dot{\Phi}(f)$. From Lemma 2, $$\dot{\Phi}^t(f) = \sum_{(u,v) \in \mathbb{E}} \dot{f}_{u,v}^t w_{u,v} = \sum_{u \in \mathbb{V}} \sum_{(u,v) \in \mathbb{E}} r_u^t \dot{\alpha}_{u,v}^t [w_{u,v} + q_v^t]$$

This part of the step 1 method is configured to decompose the change in cost to a particular destination t, by grouping the terms from the summation derived in Lemma 2, using the branches of the shortest path tree rooted at that destination. More precisely, a branch (B) is defined as the set of nodes on the path from a leaf node on the shortest path tree to the destination node t. Given the definition, some intermediate nodes clearly will be shared among multiple branches. The change in cost contributed by these nodes is properly divided among the different branches that pass through these routers in the following way. Each node u has a corresponding $\eta_u^t$ value which appears in the denominator of the expression for the change in cost. When grouping terms, for a particular branch passing through an intermediate node, to only take a fraction, $1/\pi_u^\mathcal{B}$, of the change in cost contributed by the intermediate node, to be summed with that branch so that $\pi_u^\mathcal{B} \eta_u^t$ for that node u is the same as the branch cardinality of the leaf router which defines the branch. Consequently, $\pi_u^\mathcal{B} \eta_u^t$ will be the same for all routers u encountered in a traversal from the leaf router of the branch to the destination. Given the definition of $\eta_u^t$ and $\pi_u^\mathcal{B}$, one can check $\Sigma_B 1/\pi_u^\mathcal{B} = 1$, so the total contributing form node u is distributed over different branches. See the following equation.

$$\sum_{u \in \mathbb{V}} \sum_{(u,v) \in \mathbb{E}} r_u^t \dot{\alpha}_{u,v}^t [w_{u,v} + q_v^t] = \sum_{\forall \mathcal{B}} \sum_{u \in \mathcal{B}} \frac{1}{\pi_u^\mathcal{B}} \sum_{(u,v) \in \mathbb{E}} r_u^t \dot{\alpha}_{u,v}^t [w_{u,v} + q_v^t]$$

For a given branch B, with n nodes numbered 1, ..., n from the leaf node to the destination, as noted above, $1/\pi_u^\mathcal{B}$ is the fraction of the change in cost due to node u that it contributes to the branch summation. For ease of notation, in what follows, the character $\eta$ will be used to represent every router u that belongs to the branch B. For any $u \in \{1, 2, \ldots, n-1\}$, the following equation applies:

$$\frac{1}{\pi_u^\mathcal{B}} \sum_{(u,v) \in \mathbb{E}} r_u^t \dot{\alpha}_{u,v}^t [w_{u,v} + q_v^t] = -\frac{\delta}{\eta}(q_u^t - w_{u,u+1} - q_{u+1}^t) \quad (10)$$

If $r_u^t = 0$, following equations (8) and (9), the left hand side of (10) is zero because $\dot{\alpha}_{u,v}^t = 0$, the right hand side of (10) is also zero because $\alpha_{u,u+1}^t = 1$. If $r_u^t > 0$, (10) is still valid because of the following.

$$\frac{1}{\pi_u^\mathcal{B}} \sum_{(u,v) \in \mathbb{E}} r_u^t \dot{\alpha}_{u,v}^t [w_{u,v} + q_v^t] =$$

$$-\frac{\delta}{\eta}\left(\sum_{(u,v) \in \mathbb{E}} \alpha_{u,v}^t [w_{u,v} + q_v^t] - \sum_{(u,v) \in \mathbb{E}} \alpha_{u,v}^t [w_{u,u+1} + q_{u+1}^t]\right) =$$

$$-\frac{\delta}{\eta}(q_u^t - w_{u,u+1} - q_{u+1}^t)$$

Therefore $$\sum_{u \in \mathcal{B}} \frac{1}{\pi_u^\mathcal{B}} \sum_{(u,v) \in \mathbb{E}} r_u^t \dot{\alpha}_{u,v}^t [w_{u,v} + q_v^t] =$$

$$\sum_{u=1}^{n-1} -\frac{\delta}{\eta}(q_u^t - w_{u,u+1} - q_{u+1}^t) = -\frac{\delta}{\eta}[q_1^t - w_{1,2} - \ldots - w_{n-1,n}] \leq 0$$

The last inequality follows from the fact that the average price from the leaf router (node 1) to the destination (node n) which can be thought of as an average over paths from Equation (2), has to be no less than the price of the shortest path. Note that this relationship holds with equality only when the node price of the leaf node is the same as the price of the shortest path, which means that all the traffic from every node in the branch to the destination is along shortest paths to the destination.

Then, the result is as follows.

$$\dot{\Phi} = \sum_t \dot{\Phi}^t(f) = \sum_{(u,v) \in E} \dot{f}^t_{u,v} \Phi'(f_{u,v}) \le 0 \quad (11)$$

The next step is related to convergence. Given the control laws, it is clear that $\dot{\Phi}(f) \le 0$. In order to show convergence, the language of hybrid automata is used to model the dynamics of this system and methods. Specifically, embodiments of this invention are an example of a non-blocking, deterministic, and continuous hybrid automaton. Consequently, invoking a generalization of LaSalle's Invariance Principle to hybrid automata ensures that the set of split ratios converges to the largest invariant set within $\{\alpha | \dot{\Phi}(f) = 0\}$.

The subsequent step is related to optimality. For $\dot{\Phi}(f) = 0$ to be true, $\dot{\Phi}^t(f) = 0$ which implies that the change in cost along each branch is as follows.

$$\sum_{u \in \mathcal{B}} \frac{1}{\pi^{\mathcal{B}}_u} \sum_{\substack{(u,v) \in E \\ \text{such that } u \in \mathcal{B}}} r^t_u \alpha^t_{u,v} [w_{u,v} + q^t_v] = 0$$

for every t.

From the preceding analysis, the change in cost along a branch B is zero only when all the traffic from the nodes that belong to the branch is being routed to the destination through shortest paths with respect to the link prices. Since this is a necessary and sufficient condition for optimality in MCF, the proof is complete.

Figure 53:
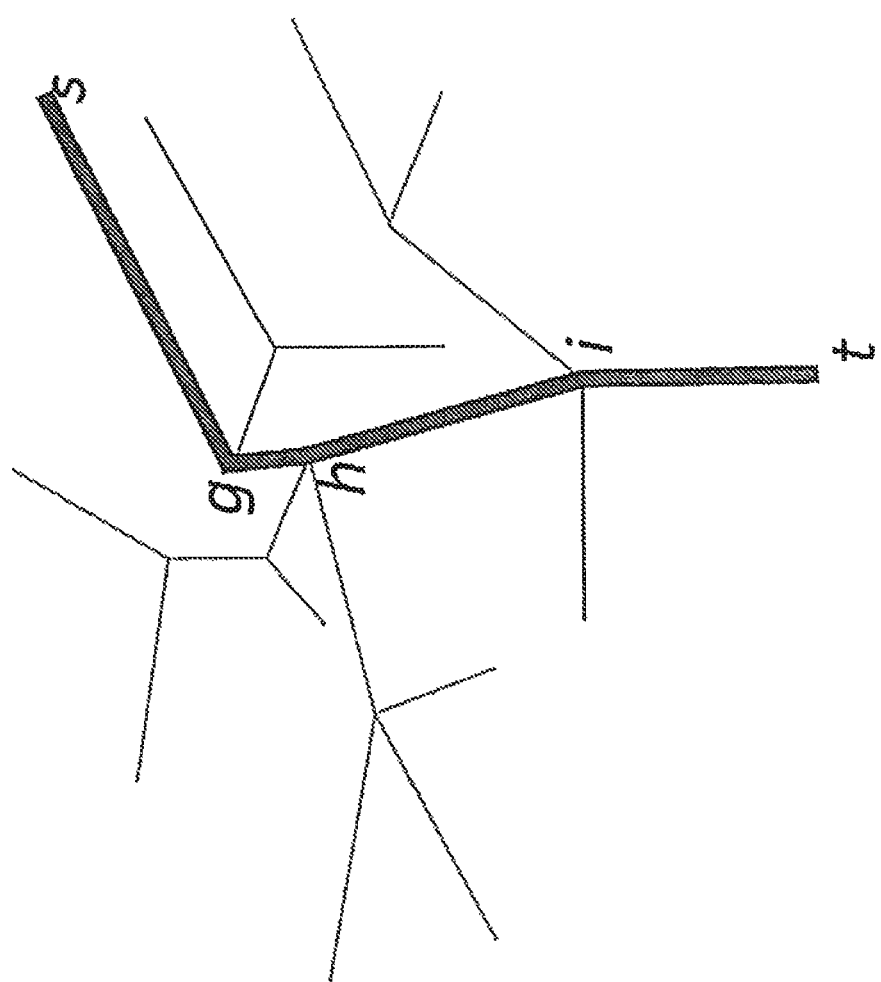
FIG. 53 illustrates a best (shortest) path tree in a network along with a branch of that tree highlighted.

Next, as an illustrative example to help understand the first step of the above proof, a sample shortest path tree is analyzed and the corresponding cost change calculations are identified explicitly. A shortest path tree is illustrated in FIG. 53. The number of branches that the tree is divided into is determined by the number of leaf nodes. In the illustrated example, the shortest path tree rooted at t has 12 leaf routers and, consequently, the summation is divided into 12 branches. Following the method for the calculation of $\eta$, then $\eta'_i = 1$, $\eta'_h = 3$, $\eta'_g = 9$ and $\eta'_s = 18$.

As noted in the proof, the change in the cost function due to the routers increasing traffic along the links in the shortest path tree can be calculated using Lemma 2. In order to evaluate it, the terms in the summation are divided and grouped per branch. For routers downstream to a leaf router in a branch, only a fraction of the change in the cost contributed by the downstream router is selected where the fraction is determined by the need to have the same $\eta$ for all routers in the summation for a branch. The contribution to the change in the cost by the routers for the highlighted branch can be calculated as follows, $$\sum_{u \in \mathcal{B}} \frac{1}{\pi^{\mathcal{B}}_u} \sum_{(u,v) \in E} r^t_u \alpha^t_{u,v} [w_{u,v} + q^t_v] =$$

$$-r^t_s \sum_{(s,v) \in E} \frac{\alpha^t_{s,v} \delta}{\eta^t_s r^t_s} [w_{s,v} + q^t_v] + r^t_s \sum_{(s,v) \in E} \frac{\alpha^t_{s,v} \delta}{\eta^t_s r^t_s} [w_{s,g} + q^t_q] -$$

$$r^t_g \sum_{(g,v) \in E} \frac{\alpha^t_{g,v} \delta}{2\eta^t_g r^t_g} [w_{g,v} + q^t_v] + r^t_g \sum_{(g,v) \in E} \frac{\alpha^t_{g,v} \delta}{2\eta^t_g r^t_g} [w_{g,h} + q^t_h] -$$

$$r^t_h \sum_{(h,v) \in E} \frac{\alpha^t_{h,v} \delta}{6\eta^t_h r^t_h} [w_{h,v} + q^t_v] + r^t_h \sum_{(h,v) \in E} \frac{\alpha^t_{h,v} \delta}{6\eta^t_h r^t_h} [w_{h,i} + q^t_i] -$$

$$r^t_i \sum_{(i,v) \in E} \frac{\alpha^t_{i,v} \delta}{18\eta^t_i r^t_i} [w_{i,v} + q^t_v] + r^t_i \sum_{(i,v) \in E} \frac{\alpha^t_{i,v} \delta}{18\eta^t_h r^t_i} [w_{i,t}] =$$

$$-\frac{\delta}{\eta^t_s} [q^t_s - w_{s,g} - w_{g,h} - w_{h,i} - w_{i,t}] \le 0$$

Figure 54A:
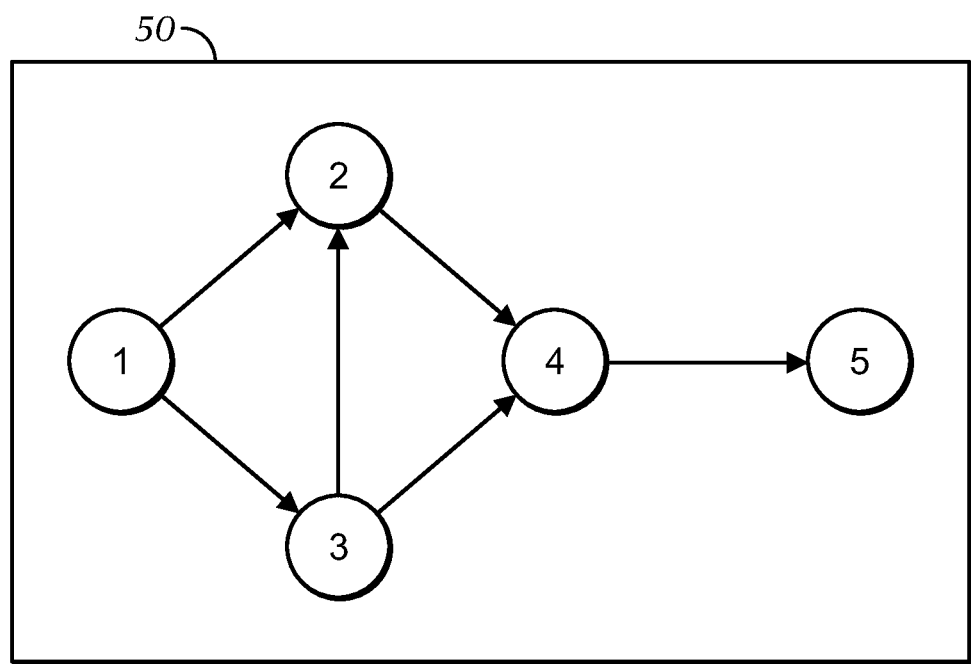
FIG. 54A illustrates an example of a network according to the present invention.
Figure 54B:
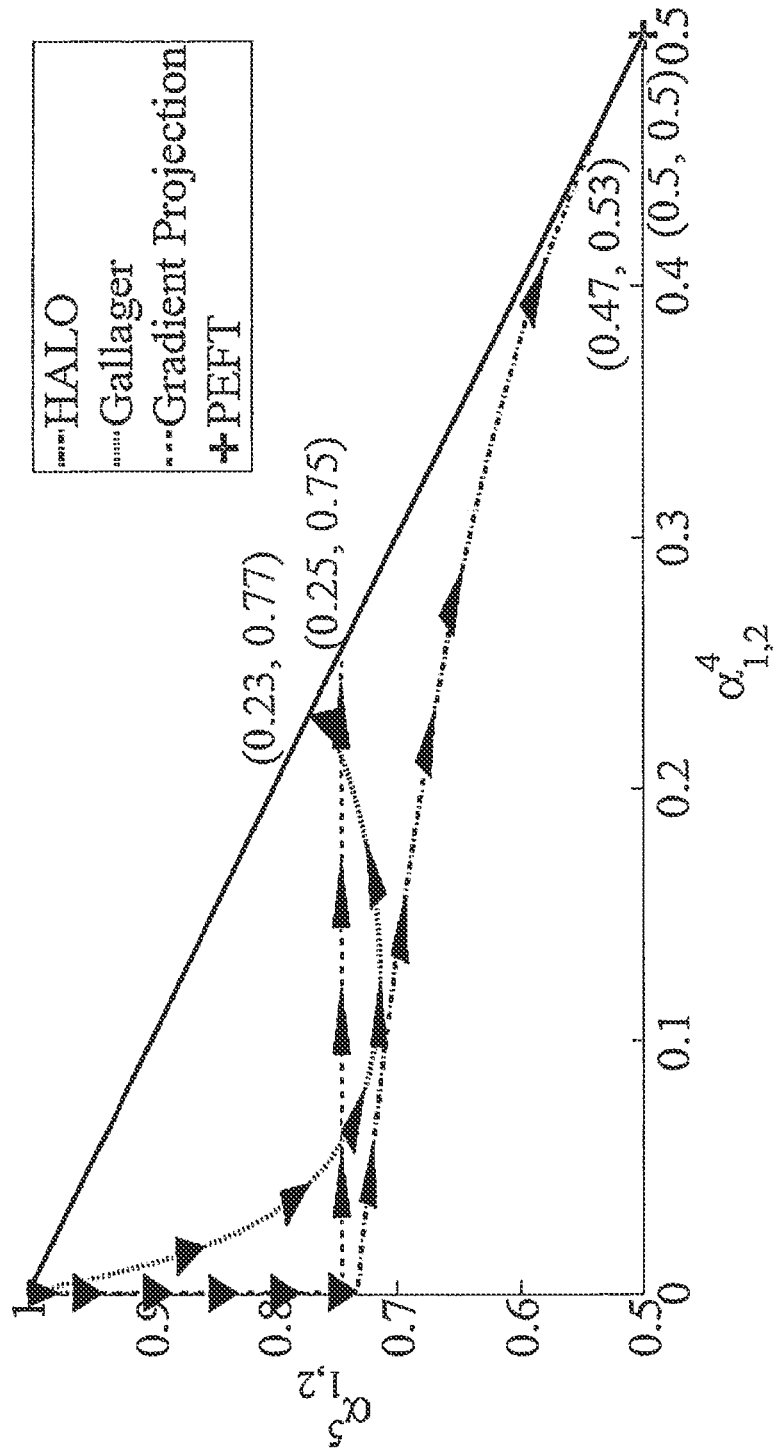
FIG. 54B illustrates a comparison of solutions provided by different procedures seeking to identify the optimal solution to a network routing problem.

As shown in FIG. 52, the present invention may follow a different trajectory from Gallager's method in searching for an optimal solution. But in that case, both methods converged to the same optimal solution. In general, because MCF problem is strictly convex in link rates ($f_{u,v}$) and only convex in flow rates ($f_{u,v}^t$), there can be multiple optimal solutions in terms of the flow rates. For example, FIG. 54A illustrates an example of a network topology. Each link in the network has capacity of 5 and there are two demands D(1, 4)=D(1, 5)=2. The initial routes supplied to the different methods are (1-3-2-4) and (1-2-4-5), i.e., $\alpha_{1,2}^4 = 0$ and $\alpha_{1,2}^5 = 1$. FIG. 54B includes a graph of solutions provided by an embodiment of the present invention—designated as "HALO". Clearly, each method generates a different optimal solution, all of which satisfy $\alpha_{1,2}^4 + \alpha_{1,2}^5 = 1$; an optimality condition which follows from the fact that at optimum, $f_{3,2} = 0$ and the resulting symmetry of the problem.

Before reviewing how embodiments of the present invention may interact with a single-path routing method, certain terms are defined. First, for the purposes of this application, a "single-path method used to make routing decisions" is a router that uses a set of link weights to calculate the shortest path to the destination and makes forwarding decisions based on that shortest path. Also, if the single-path router calculations are triggered as often as that in the present invention, examples can be illustrated in which the routes in the network will oscillate and not settle down. This is because the single-path method moves all the traffic from one path to another instead of just a fraction. Also, a notion of time-scale separation between how often the method of the present invention is triggered and the single-path method is triggered. In certain embodiments, the subset of routers running the present invention will execute the method in between slower single-path calculations. Given this set up, the two methods can work with either the same link weights or method-specific link weights. Since local optimization methods exist for calculating single-path method link weights, and because method-specific calculations can be triggered on the receipt of new method-specific link weights, the use of method-specific link weights generally broadcast by each router at different timescales. However, this assumption is more important from an implementation perspective than for the argument that follows.

Another useful assumption is that each router is aware of the method that the other routers in the network are using. With the time-scale separation and the assumption that every router is aware of the specific method running at every other router, for a given destination, the 'single-path' routers have a pruning effect on the network from the perspective of the routers running an embodiment of the present invention, i.e., the outgoing links that are not used by them are effectively not a part of the network topology. Assuming that every router is aware of the specific method running at every other router, the nodes running embodiments of the present invention will base their calculations on this reduced network and attain the optimal routing solution for this network. Essentially, the routers implementing an embodiment of the present invention increase the search space for finding a better routing solution and thus improve network performance.

Figure 55:
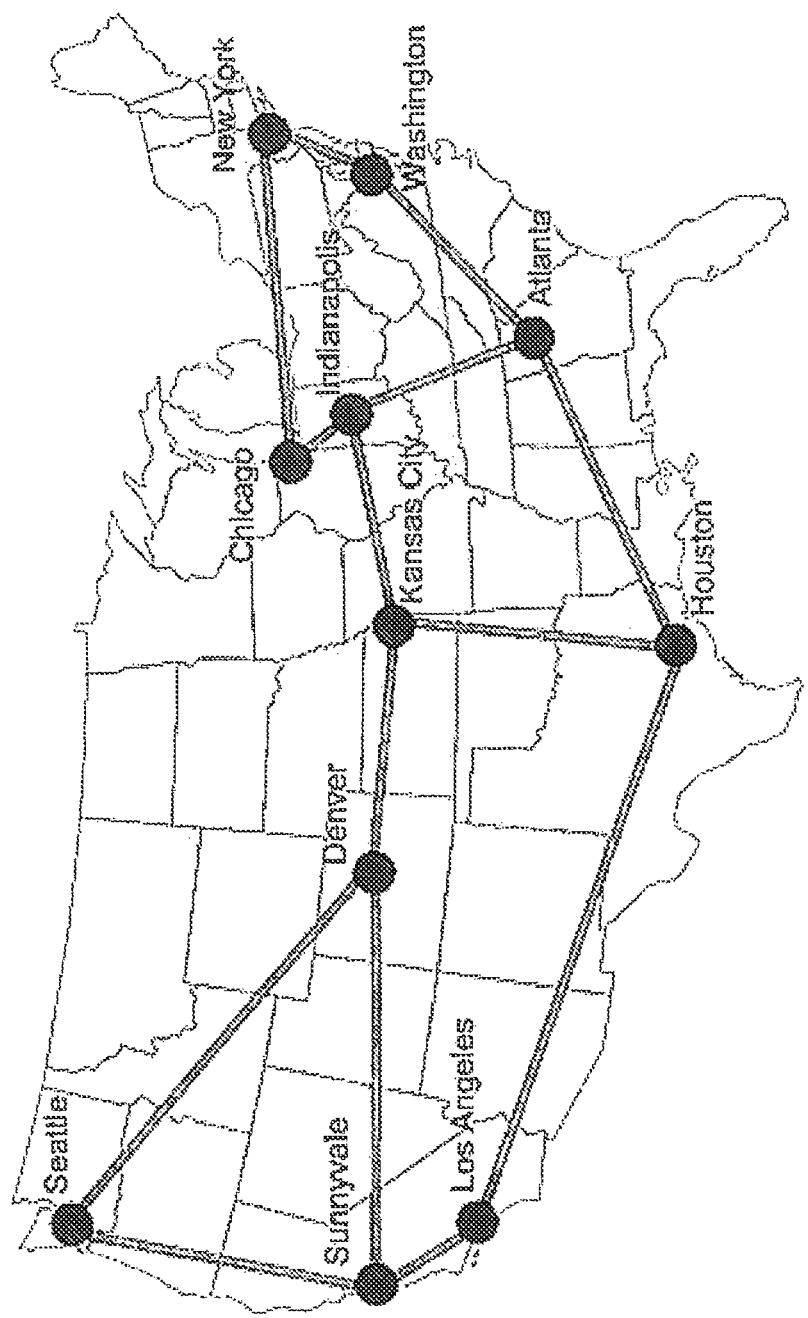
FIG. 55 illustrates an Abilene network.

Certain embodiments of the present invention can be evaluated for certain performance metrics, specifically, the optimality, rate of convergence to the optimal solution, adaptivity as the traffic changes, and asynchronous environments and its interaction with single path routing methods. The evaluations may be performed on three network topologies—the benchmark Abilene network (FIG. 55), a 4×4 Mesh network and a two-level hierarchical 50 node network. The 4×4 Mesh network may be selected to study the effects of intermediate routing loops on the optimality of the present invention as this topology is particularly prone to such loops while the hierarchical network may be selected to mimic larger networks with high capacity backbone links and lower capacity local links. An additional test may be performed on an even larger randomly generated 100 node network in order to confirm that the method converges quickly for large networks. Randomly generated traffic demands may be used for the mesh network and the hierarchical network while for the Abilene network uniform traffic demand is used. In any of the three cases, the demand may be scaled up until at least one link in the network is close to saturation at the optimal solution.

Regarding convergence, the speed of convergence depends on the step-size. In certain embodiments, the step size is the unit of time with which the changes in the split ratios calculated in Equations (6)-(9) are multiplied to determine how much to vary the split ratios from one time slot to the next. The metric network load is defined as the ratio of the total traffic on the network to its total capacity. In general, smaller step-sizes improve convergence of an embodiment of the present invention to the optimal solution at the expense of speed of convergence.

Figure 57A:
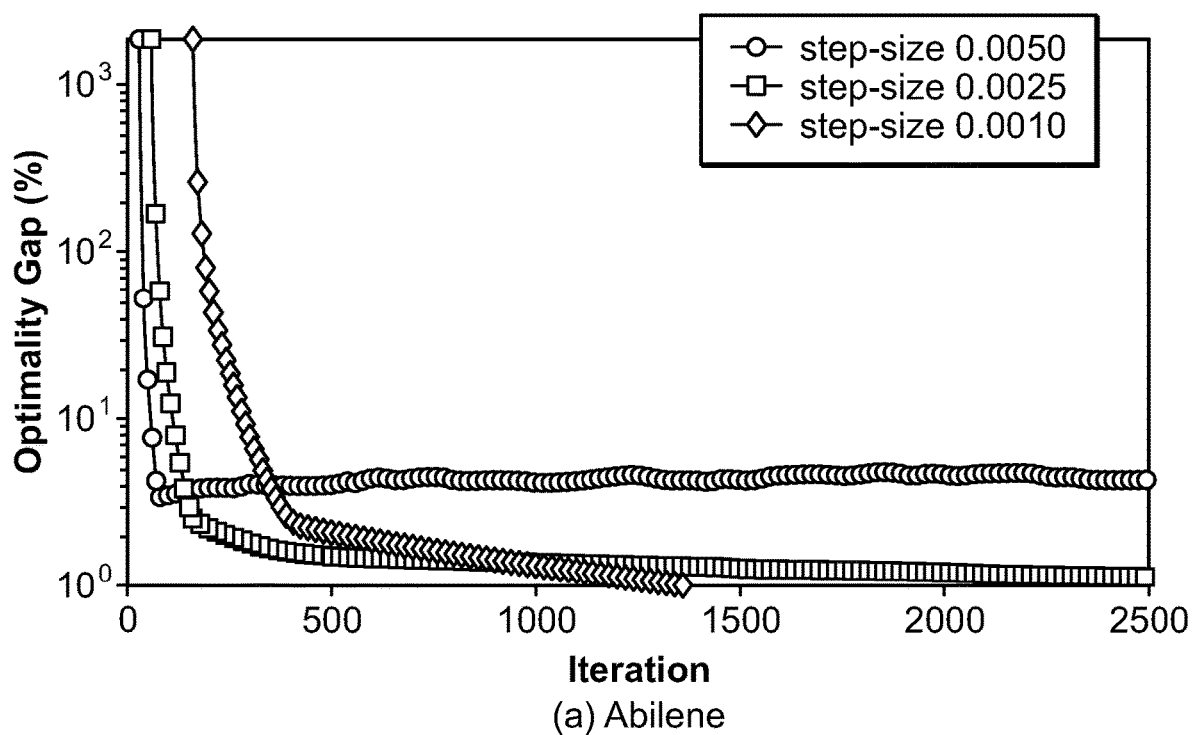
FIG. 57A illustrates a comparison of the optimality gap between an embodiment of the present invention over a number of iterations having different step-sizes in the Abilene network.
Figure 57B:
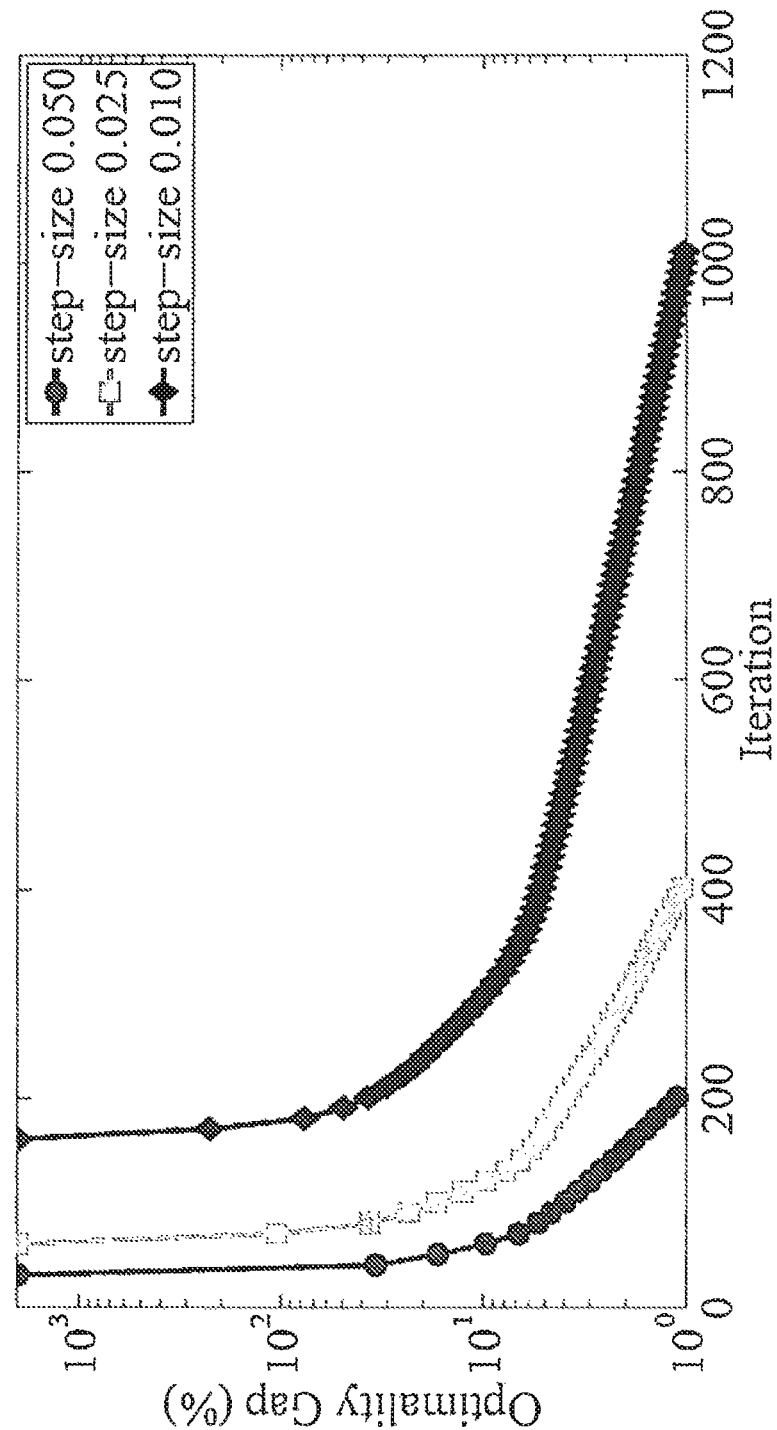
FIG. 57B illustrates a comparison of the optimality gap between an embodiment of the present invention over a number of iterations having different step-sizes in a 4×4 mesh network.
Figure 61:
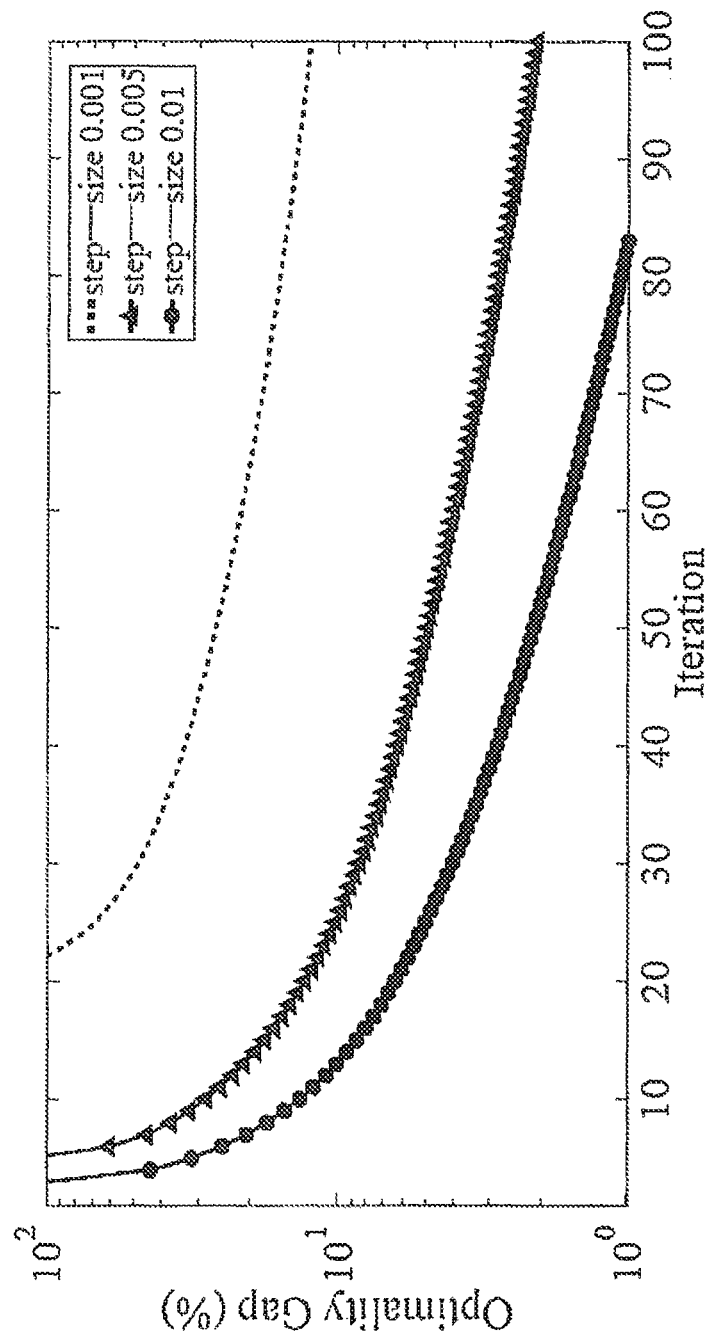
FIG. 61 illustrates evolution of the optimality gap for a randomly generated 100 node network with varying step-sizes.

This concept is illustrated in FIGS. 57A-57C. However, as illustrated in FIG. 57A and FIG. 57C, larger step-sizes quickly approach the optimal solution though they can be prone to oscillations which prevent convergence to optimality. Often, it is sufficient to come to some neighborhood of the optimal solution and small oscillations around the optimal solution are acceptable. In such situations, a larger step-size may be used. In certain embodiments, e.g., for the larger 100-node network (illustrated in FIG. 61) the system and method was fairly quick, converging to a small neighborhood of the optimal solution within a few hundred iterations.

Figure 56A:
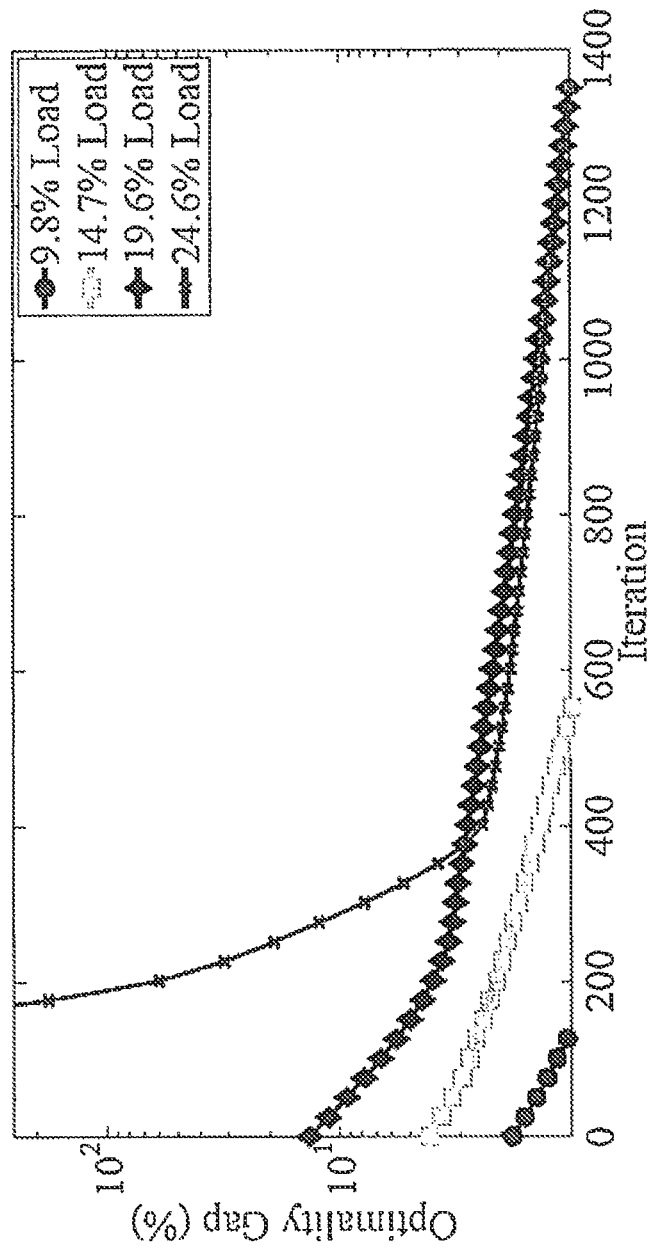
FIG. 56A illustrates a comparison of the optimality gap between an embodiment of the present invention over a number of iterations having different network loads in the Abilene network.
Figure 56:
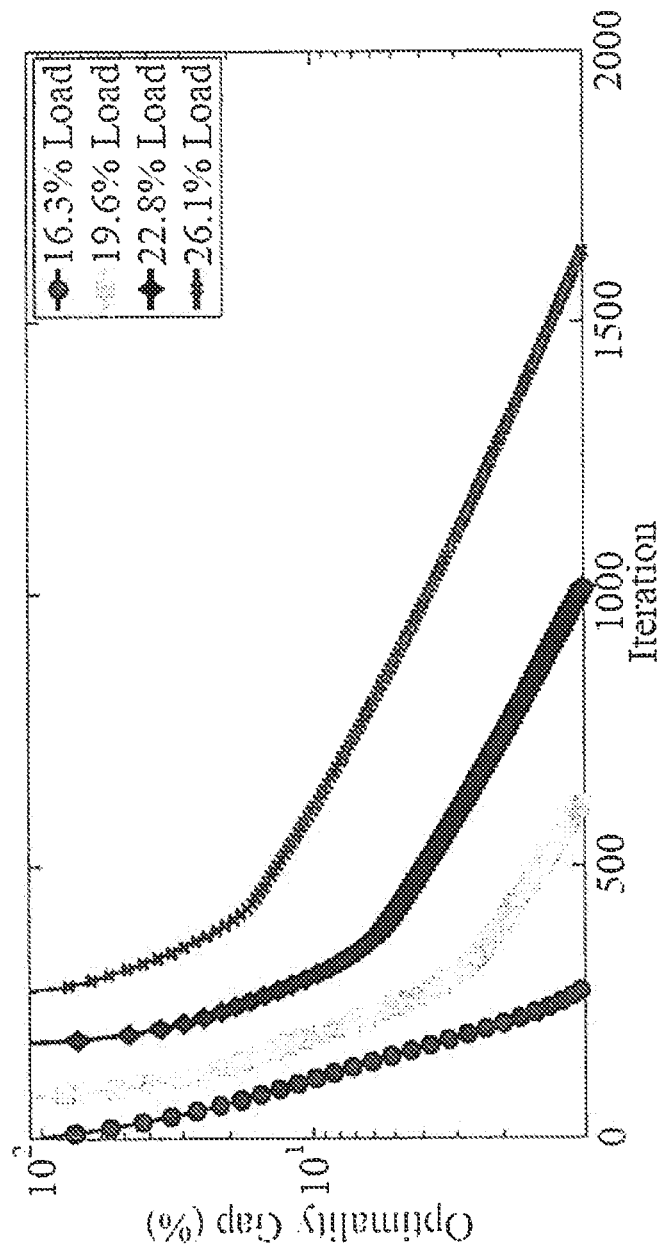
FIG. 56B illustrates a comparison of the optimality gap between an embodiment of the present invention over a number of iterations having different network loads in a 4×4 mesh network.
FIG. 56C illustrates a comparison of the optimality gap between an embodiment of the present invention over a number of iterations having different networkloads in a hierarchical 50 node network.
Figure 5C:
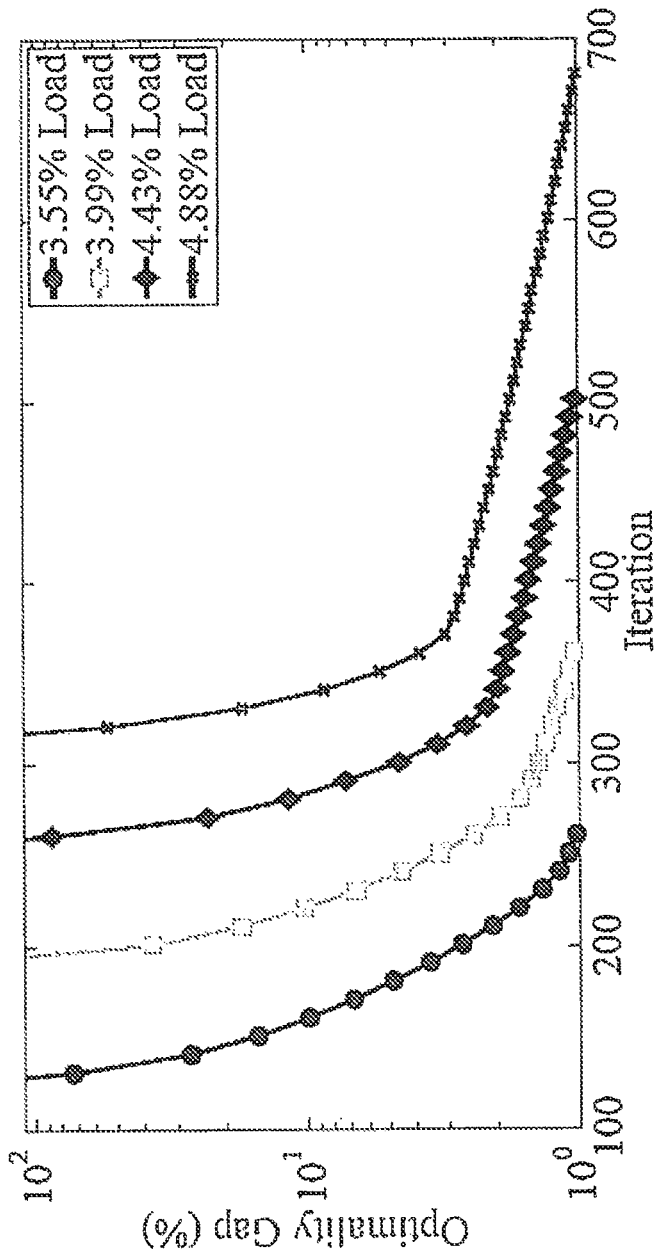

Another factor that affects the rate of convergence of the system and methods is the load on the network. The maximum network load for the Abilene network may be 24.6%, mesh network may be 26.1% and the hierarchical network may be 5.3%. These values indicate the point at which further scaling up the demand for the given traffic pattern would exceed the capacity of at least one link in the network, even with optimal routing. From FIG. 56, it is clear that the system and methods take more iterations to converge to the optimal solution for more heavily loaded networks. The present invention converges to the optimal solution on the order of a thousand iterations. Given that link-state advertisements can be broadcast on the order of milliseconds, the possibility of convergence times of less than a second to a few seconds for the method on networks where transmission/propagation delay of the link-state advertisements is not a limiting factor.

Figure 58A:
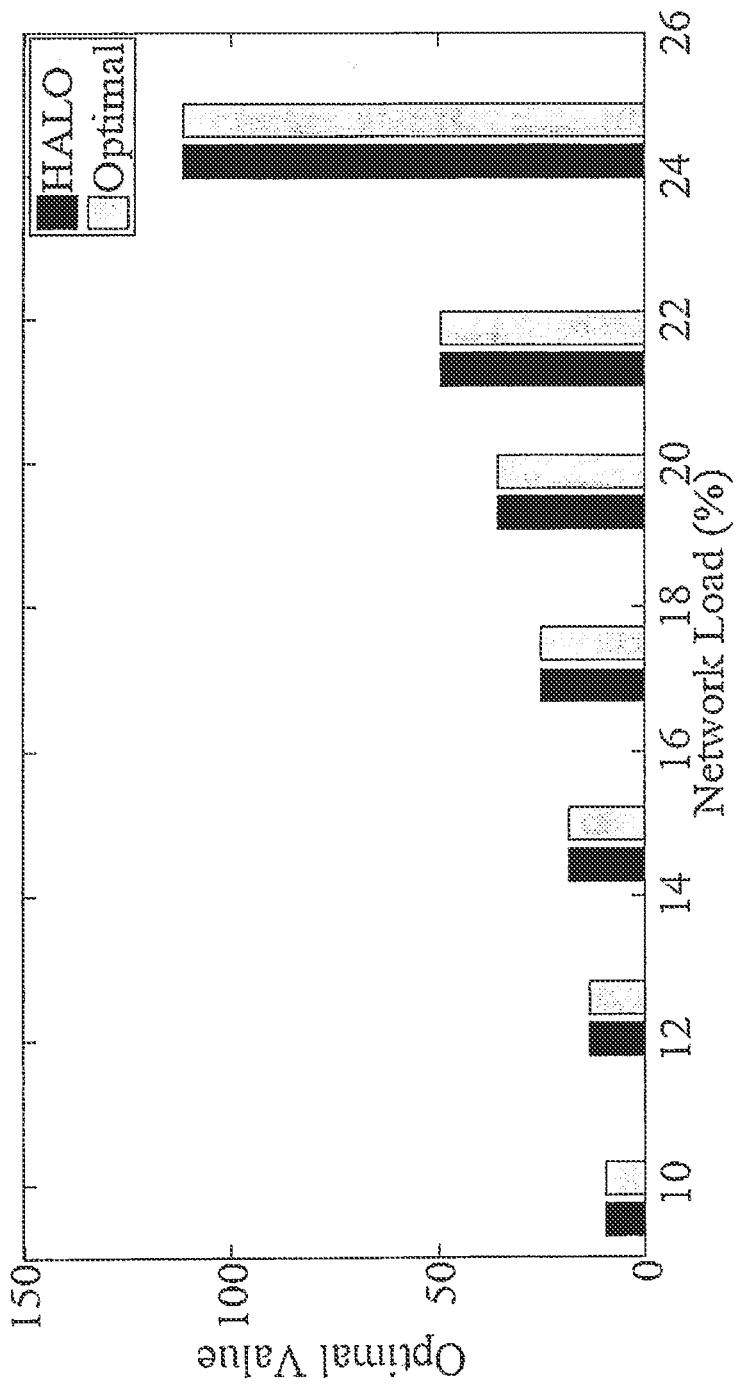
FIG. 58A illustrates a comparison of the optimal performance and an embodiment of the present invention in the Abilene network.
Figure 58B:
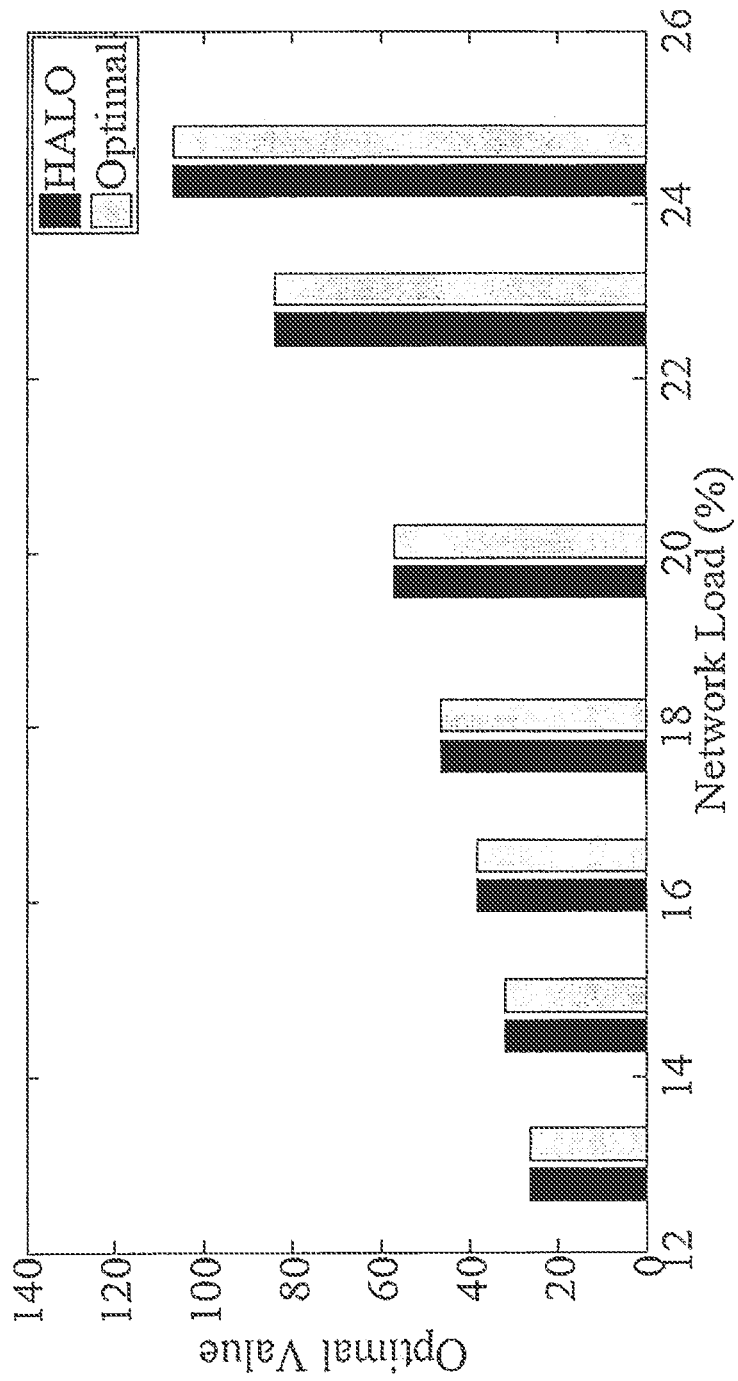
FIG. 58B illustrates a comparison of the optimal performance and an embodiment of the present invention in a 4×4 mesh network.

Regarding performance, the optimal solution may be calculated for the test networks by solving the corresponding MCF problem using CVX method known in the art or another method known in the art under different network load conditions. The objective value obtained by using the present invention matched the optimal solution for each test case as can be seen from FIGS. 58A-58C. Also, the intermediate routing loops produced while determining the optimal solution for the mesh network did not affect the optimality of the system and methods.

Figure 59A:
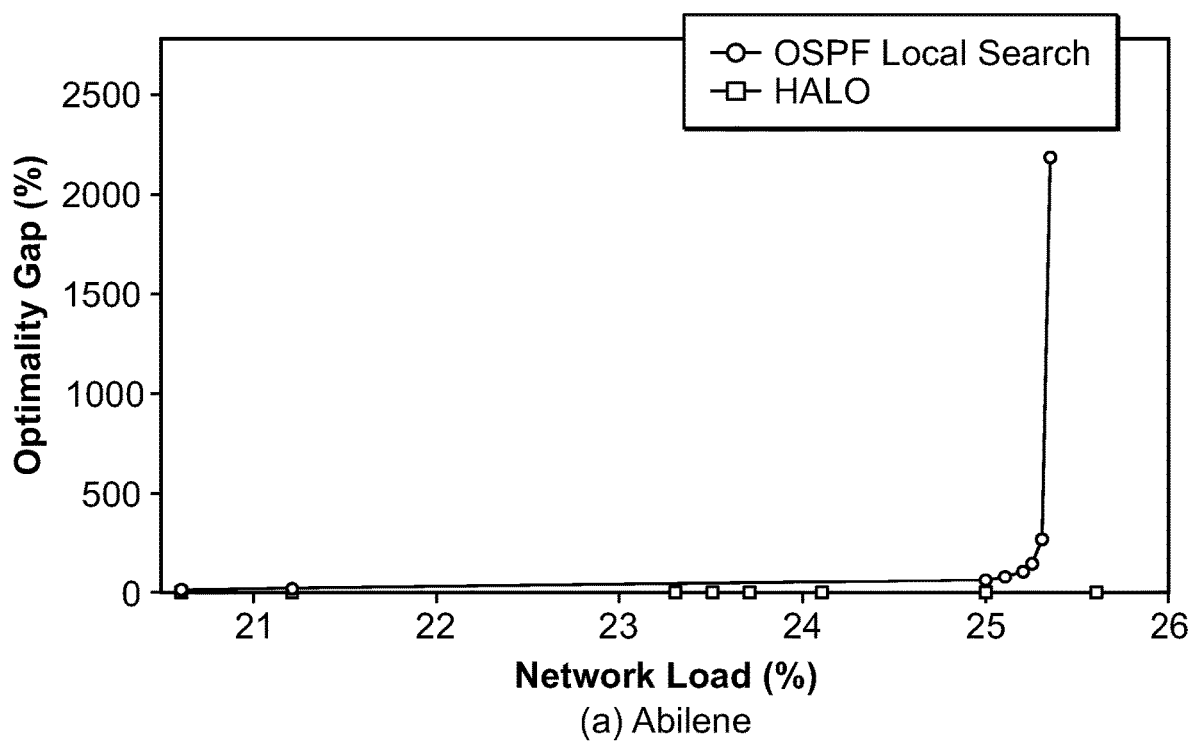
FIG. 59A illustrates a comparison of a known procedure (OSPF with optimized link weights) and an embodiment of the present invention in the Abilene network.
Figure 59B:
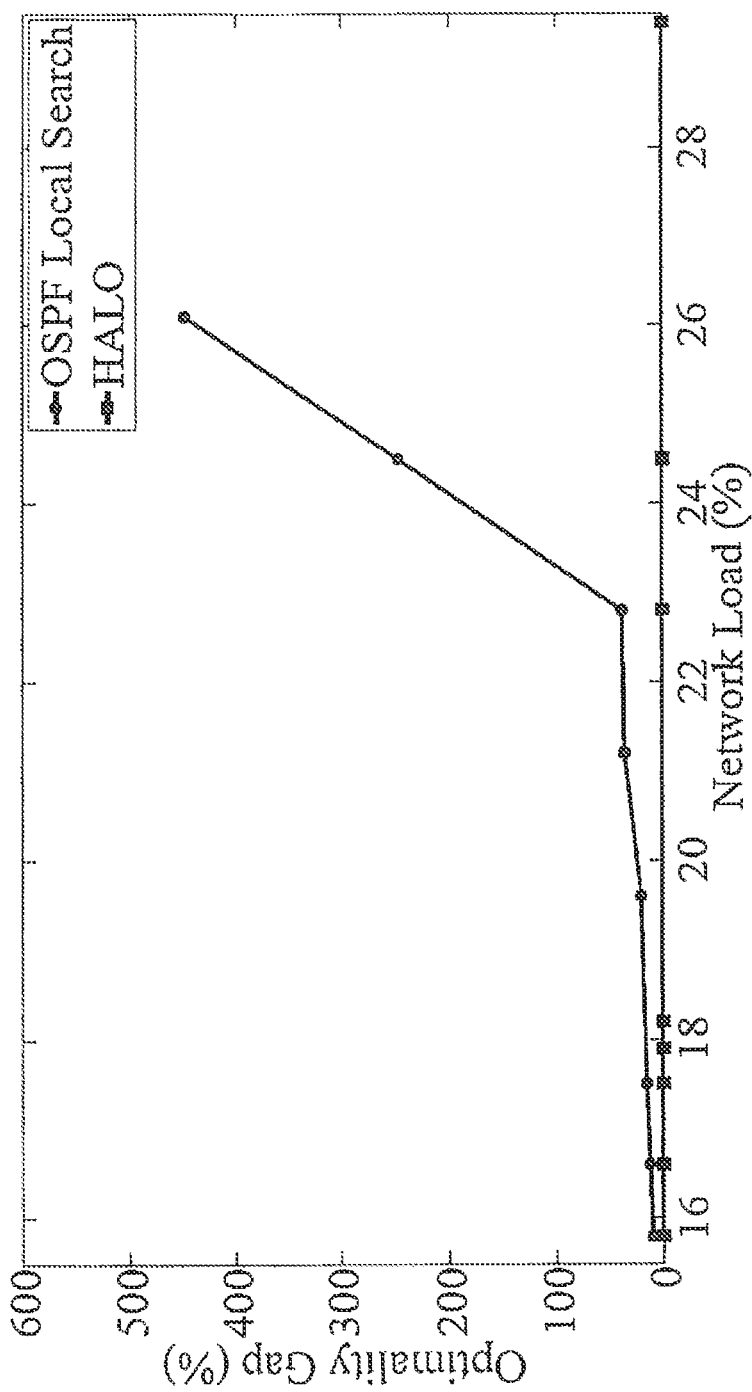
FIG. 59B illustrates a comparison of a known procedure (OSPF with optimized link weights) and an embodiment of the present invention in a 4×4 mesh network.
Figure 59C:
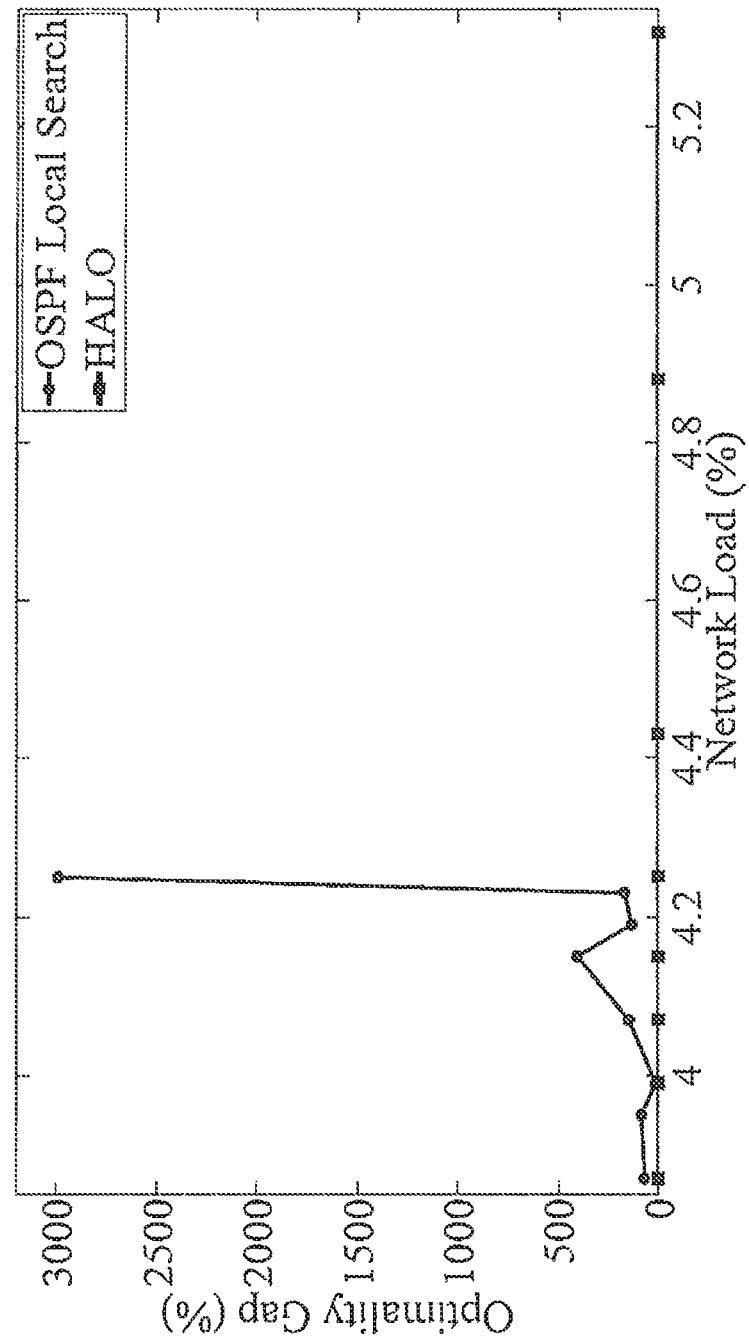
FIG. 59C illustrates a comparison of a known procedure (OSPF with optimized link weights) and an embodiment of the present invention in a hierarchical 50 node network.

In FIG. 59, the performance of an embodiment of the present invention is compared with OSPF boosted by better weight settings obtained from the methods of the TOTEM toolbox for demand matrices that placed increasing loads on the test networks. The local search method used by TOTEM minimizes a piecewise-linear approximation of the convex cost function. As described above, the power of optimality is demonstrated by the performance improvements on the order of 1000%.

Figure 60A:
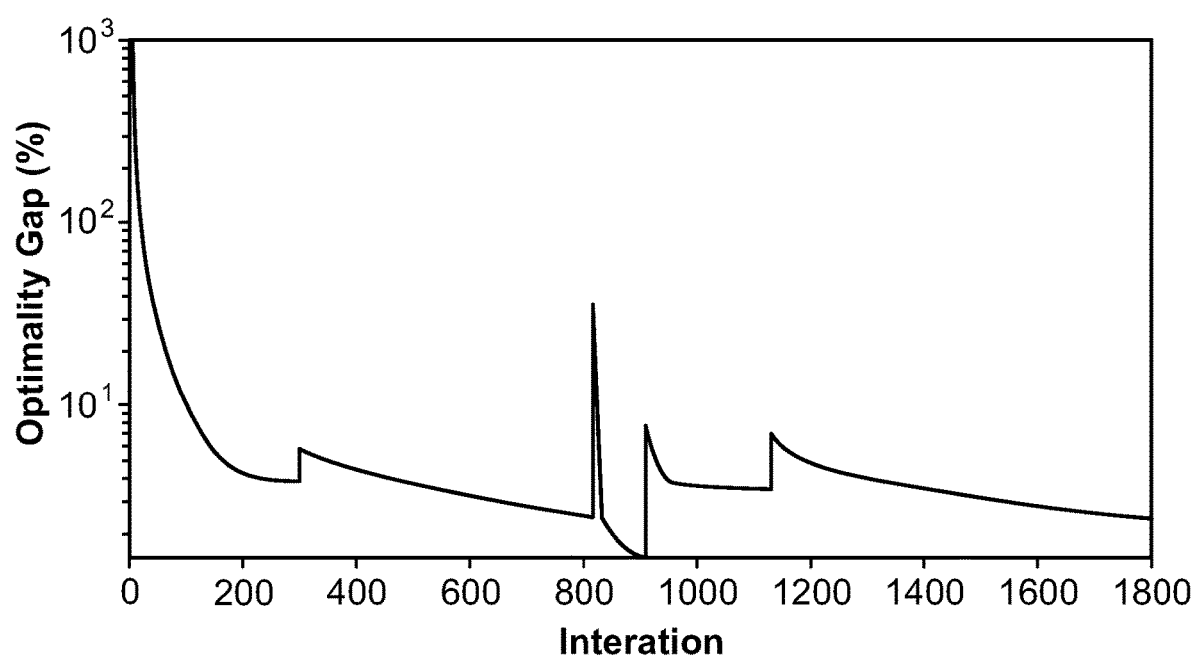
FIG. 60A illustrates the evolution of optimality gap for the Abilene network as the number of iterations increase with varying demand matrices.
Figure 6A:
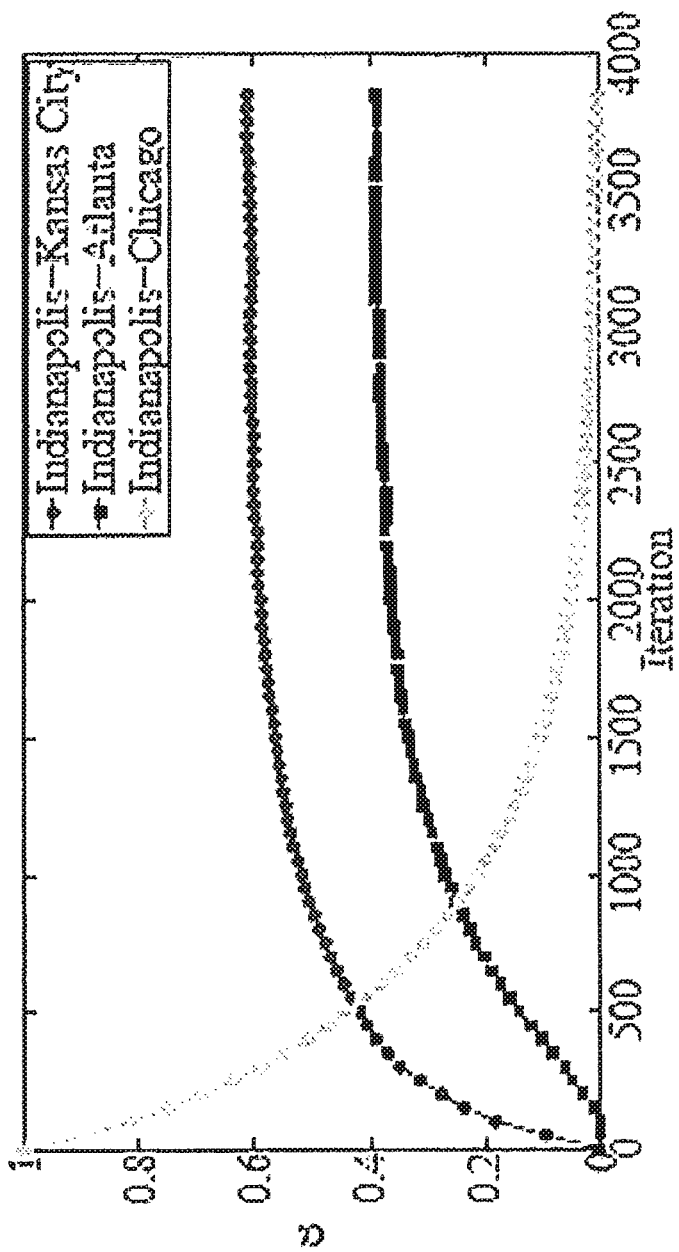

To illustrate how certain embodiments of the present invention are configured to dynamically adapt to changes in traffic on the network, FIG. 60 illustrates the evolution of the optimality gap as a traffic matrix undergoes changes under different network load conditions in the Abilene network. In this example, after around 300 iterations the network load is changed by changing 20% of the flows in the network. As can be seen, the method quickly adapts and the optimality gap increases very little before beginning to converge to the new optimal solution. The traffic pattern is again changed by varying 50% of the flows in the network after 800 iterations. This time the change in the optimality gap is greater but the convergence to the new optimal value is seen to be quicker. The traffic pattern in the network is changed two more times and as can be observed from the figure in both cases the method quickly converges to the new optimal solution.

A closely related concept to certain embodiments of the system and methods of the present invention is the evolution of the split ratios at individual routers. A plot of the evolution of the split ratios from Indianapolis to Los Angeles is illustrated in FIG. 60B. For the test traffic, the initial sub-optimal allocation of split ratios is quickly corrected as the present invention reduces traffic sent to Chicago and increases traffic sent to Kansas City and Atlanta.

Figure 62A:
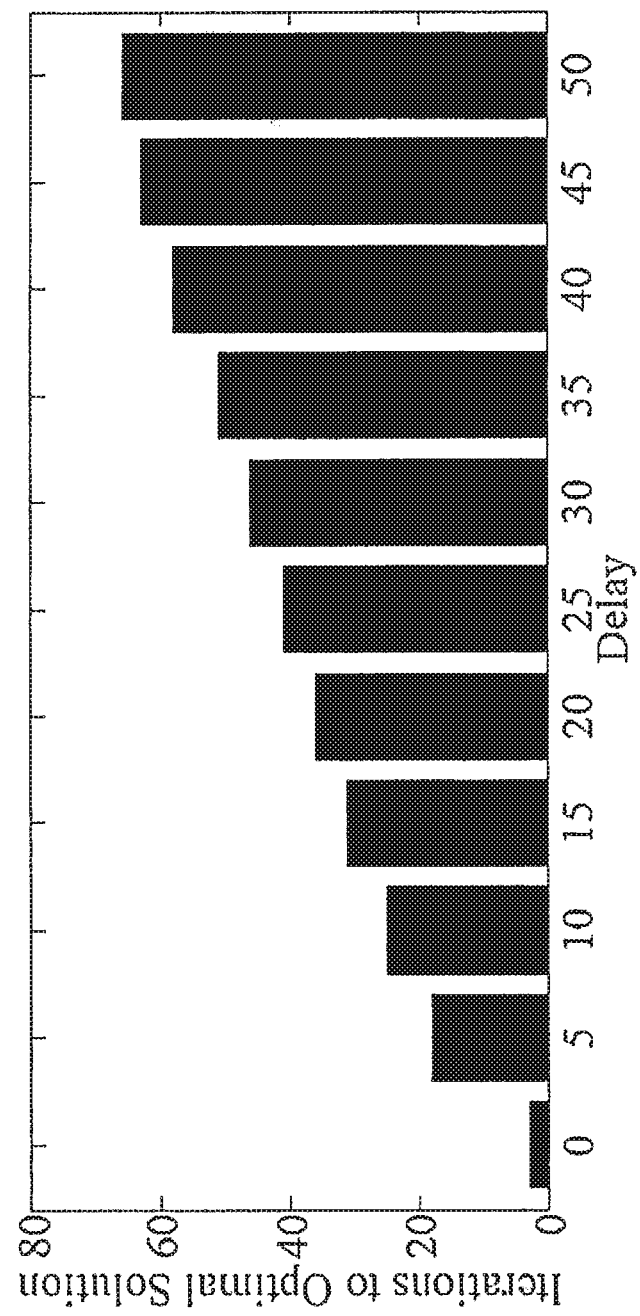
FIG. 62A illustrates iterations required to converge increase with increasing delay at step-size=0.1.
Figure 62B:
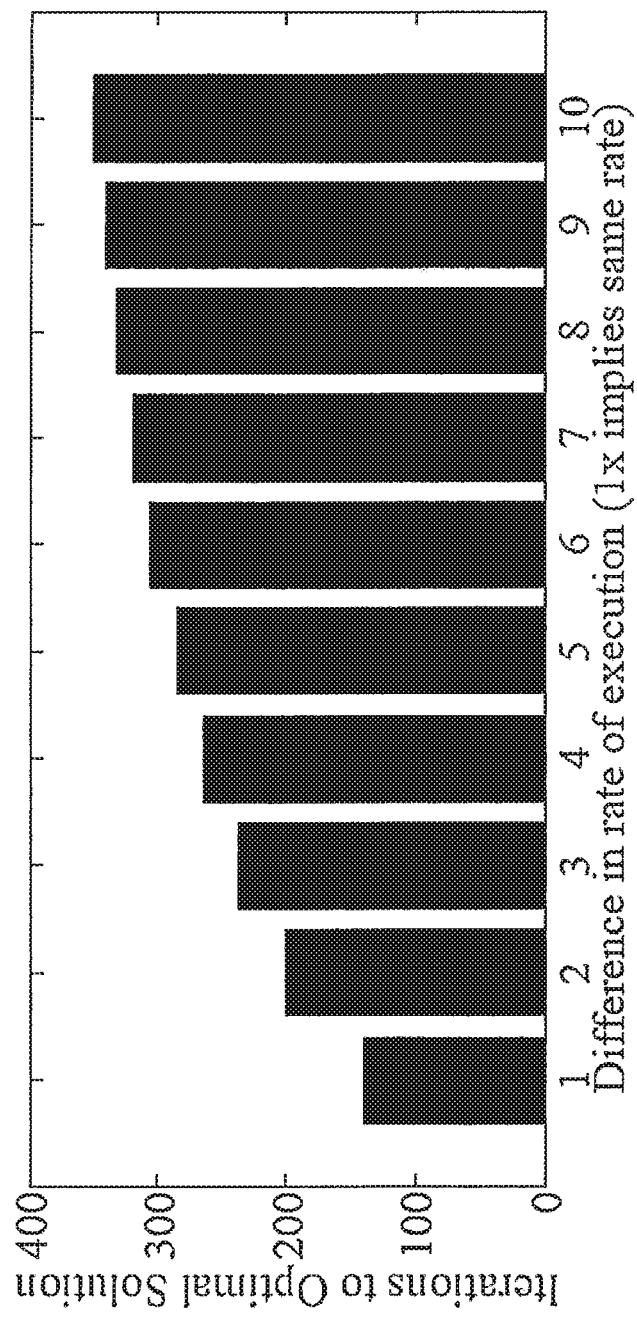
FIG. 62B illustrates iterations required to converge increase with increasing difference in rate of execution at step-size=0.001).

In dynamic network environments, random delays can affect the time it takes for link-state information to reach every node in the network as required by certain embodiments of the method. Note that without synchronized link-state updates, facets of the present invention, e.g., calculating the shortest path tree and $\eta_u^t$ may be affected. There are at least two ways to approach this problem. The first is to allow enough time between successive iterations of the running method so that every node has access to the most up-to-date link-state information. The second is to let the nodes execute the steps of the present invention despite asynchronous link-state updates. It is also possible for asynchronous behavior to arise despite synchronized link-state updates due to some subset of the nodes executing the steps faster than the other nodes. FIG. 62A illustrates data regarding how the present invention may operate in the presence of asynchronous link-state updates and asynchronous executions, using uniform traffic on the Abilene network. In order to simulate asynchronous behavior, the nodes in the network could be numbered and divided into two groups. For asynchronous link-state updates, at every iteration, the even numbered nodes may receive link-states without any delay while the odd numbered nodes may receive link-states from the even numbered nodes after a fixed delay. Consequently, at each execution of the method, the two sets of nodes could have different views of the network link-states. The fixed delay could then be varied to generate the results reported in FIG. 62A. For asynchronous execution of an embodiment of the present invention, the odd numbered nodes could be forced to execute the steps of the present invention slower than the even numbered nodes. The difference in the rate of execution was varied in order to obtain the results reported in FIG. 62B. Different stepsizes could be used to prevent oscillations in the two cases. Despite the asynchronous implementation, the embodiment of the present invention still converges to within 1% of the optimal solution. Additionally, there may be a steady increase in the number of iterations required by the embodiments of the present invention as the delay in propagating the link-states or the difference in the rate of executing the present invention increases.

Figure 63:
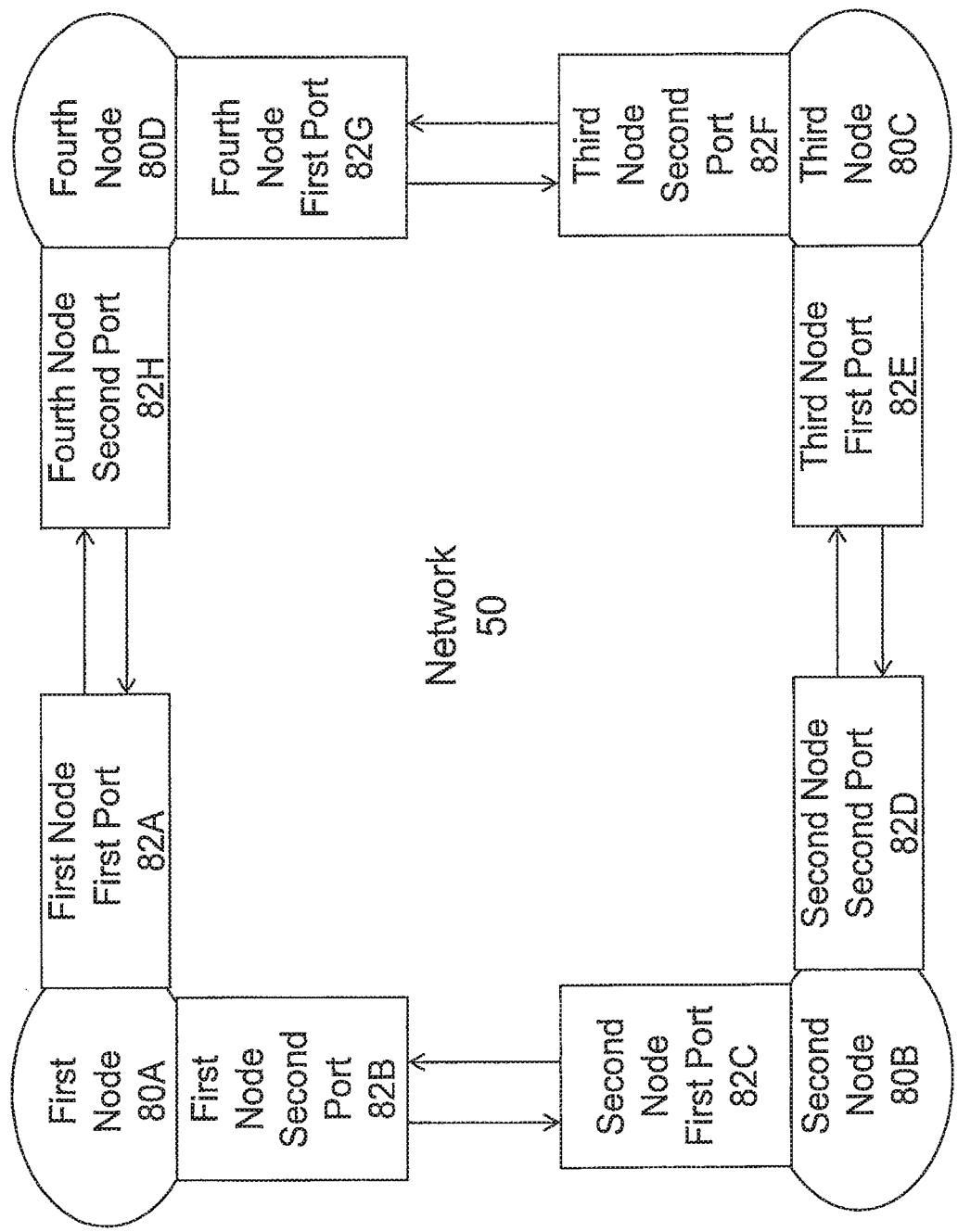
FIG. 63 illustrates a network embodiment of the present invention.

FIG. 63 illustrates the topology of an embodiment of the present invention. More specifically, the illustrated network includes a first node 80A (also called node A), a second node 80B (also called node B), a third node 80C (also called node C), and a fourth node 80D (also called node D), however, a network 50 may include any number of nodes 80. Each network node 80 has two ports 82. Each node 80 may be connected to a NetFPGA 1G platform configured to act as a router.

The NetFPGA is a generally reconfigurable hardware platform configured for high speed networking. A NetFPGA platform includes all of the logic resources, memory and Gigabit Ethernet interfaces to build a complete switch, router, and/or security device. Because the entire datapath may be implemented in hardware, the NetFPGA platform may support back-to-back packets at full Gigabit line rates and has a processing latency measured in only a few clock cycles. An exemplary embodiment of a NetFPGA includes a field programmable gate array logic, Gigabit Ethernet networking ports, static random access memory, double-date rate random access memory, Multi-gigabit I/O, standard PCI form factor, hardware debugging ports, and flexible code.

To quickly achieve multipath functionality in the network 50, packet forwarding decisions may be transferred from the firmware to higher level software, which could be easily modified via SCONE (Software Component of NetFPGA). A new table may be added to the software to store the split ratios in addition to the routing table provided in the reference router implementation for the NetFPGA platform. Then a random number generator may be used in conjunction with the routing table and the split ratios table to forward traffic as needed.

Then, the link-state update packets are modified to be broadcast frequently enough to ensure relatively quick convergence of the method and to modify their payload to transmit the link rates. For example, the link-states may be set to broadcast every 250 milliseconds. The network cost function may be represented as $\sum_{u,v \in E} f_{u,v}^2$ which results in $2f_{u,v}$ as the price of each link. Other components of the method such as retrieving the incoming rate into each board and the outgoing rate on each link can be easily obtained from the NetFPGA registers. Also, Dijkstra's method is changed to run with the new link weights instead of hopcount as it was doing in the Reference Router implementation in SCONE.

Figure 65:
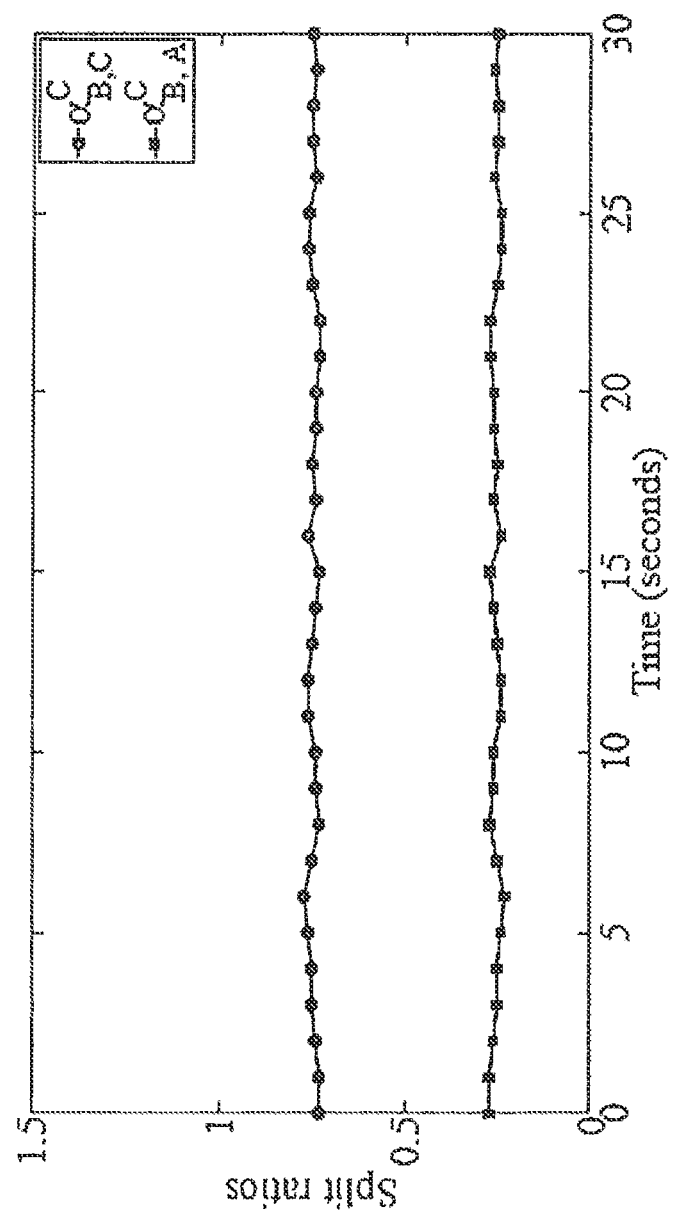
FIG. 65 illustrates the evolution of the split ratios at a node in the network.

To further test the system and methods, video traffic may be sent using, for example, a VLC Media Player as a video server from node B to node C. As described above, the KKT conditions of the multi-commodity flow problem are what permit focusing on shortest paths based on the price and use that to claim optimality of the method. From the KKT conditions of the MCF problem, for the given cost function, it is easy to see that the values of the split ratios at optimality should be $\alpha_{B,A}^C = 0.25$ and $\alpha_{B,C}^C = 0.75$. The evolution of the split ratios in such an embodiment as captured using SCONE, which comes with the NetFPGA platform, is presented in FIG. 65. Clearly, about 25% of the traffic is sent along the longer path through Port 2 while the rest is sent along the shorter path via Port 1.

Figure 64:
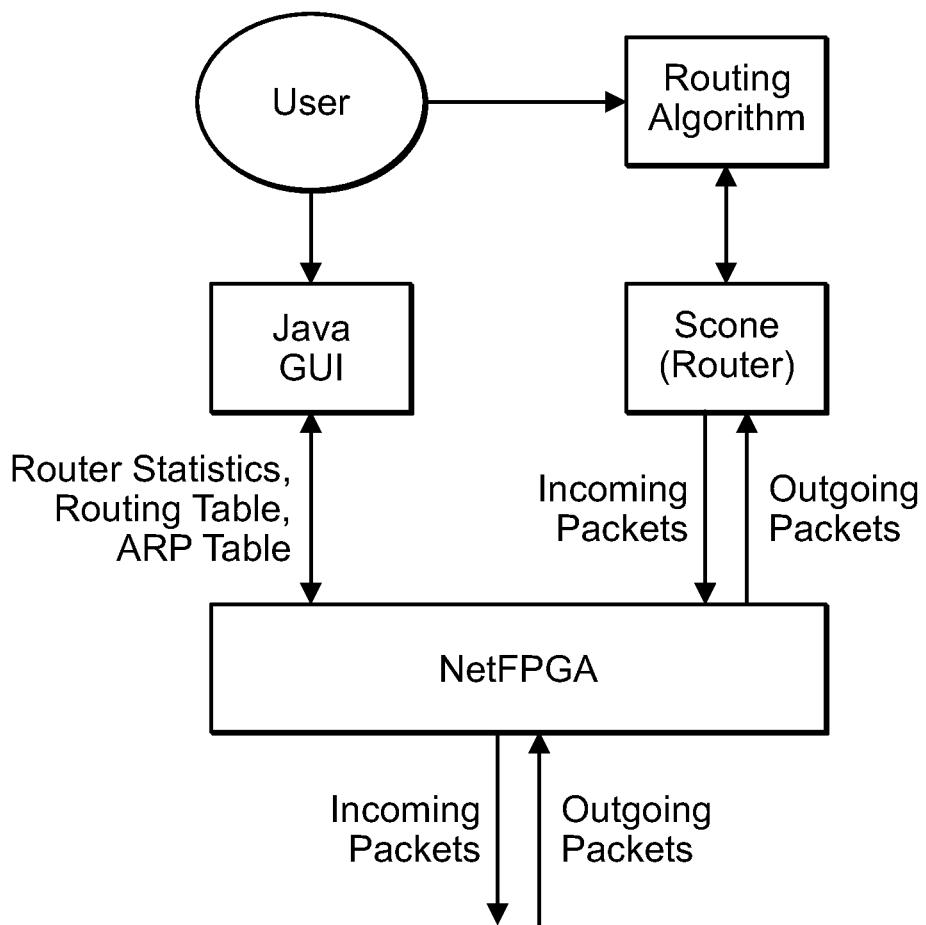
FIG. 64 illustrates another network embodiment of the present invention.
Figure 66:
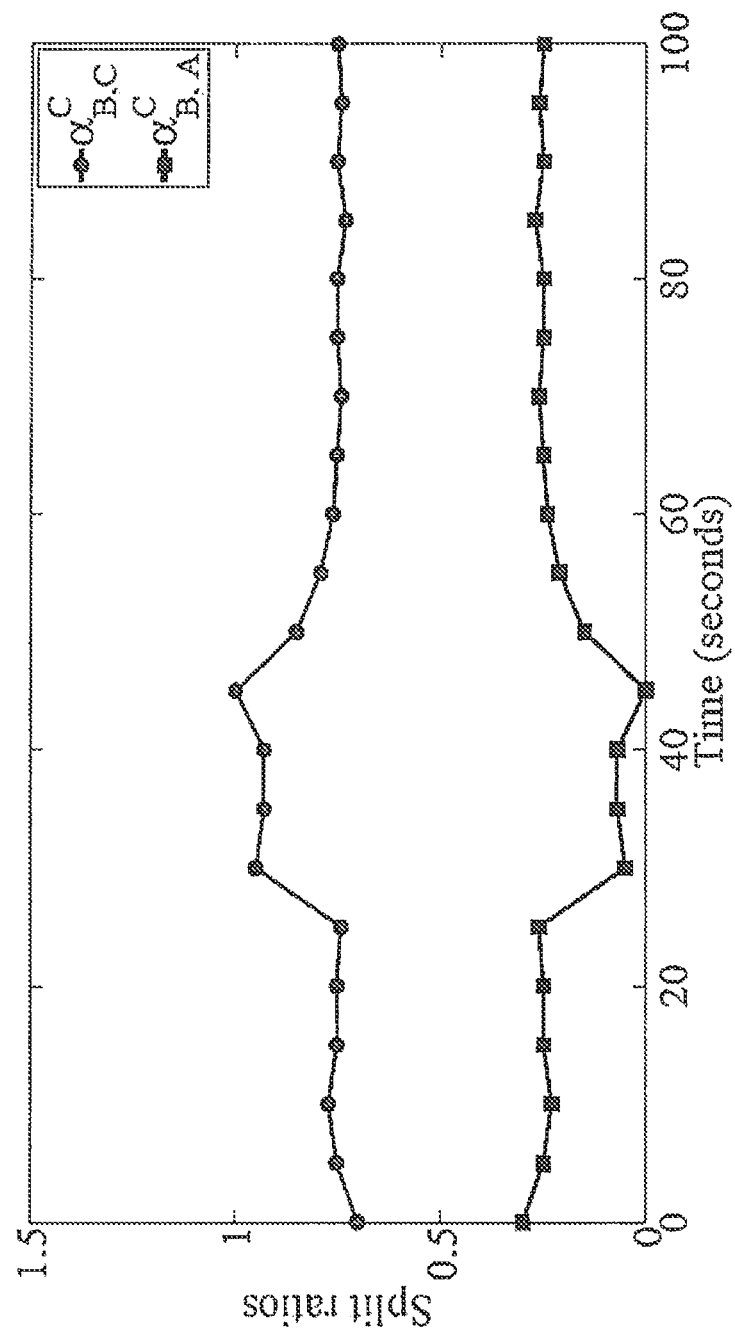
FIG. 66 illustrates the evolution of the split ratios at a node in the network in presence of additional short-term traffic variations.

In the same network 50 embodiment illustrated in FIG. 64, a flow resulted in a clogged link between node A and node D for about 15 seconds (e.g., using the JPerf tool). The evolution of the split ratios from node B to node C when the heavy flow between node A and node D came online and then stopped is presented in FIG. 66. Initially, $\alpha_{B,C}^C$ increases to 1 before dropping back down to 0.75 once the large flow stops. The extra traffic that can be seen while the flow from node A to node D is in progress is because some of the traffic is routed via (A,B)→(B,C)→(C,D). However, most of the traffic from node B to node C is clearly routed via Port 1.

As stated above, certain embodiments of the present invention include an optimal, link-state, hop-by-hop routing method. Advantageously, certain embodiments of the present invention may facilitate capital savings for ISPs by reducing investments in infrastructure to keep utilization of the networks manageable by current suboptimal procedures). In addition, the present invention may facilitate performance benefits for consumers.

Figure 67:
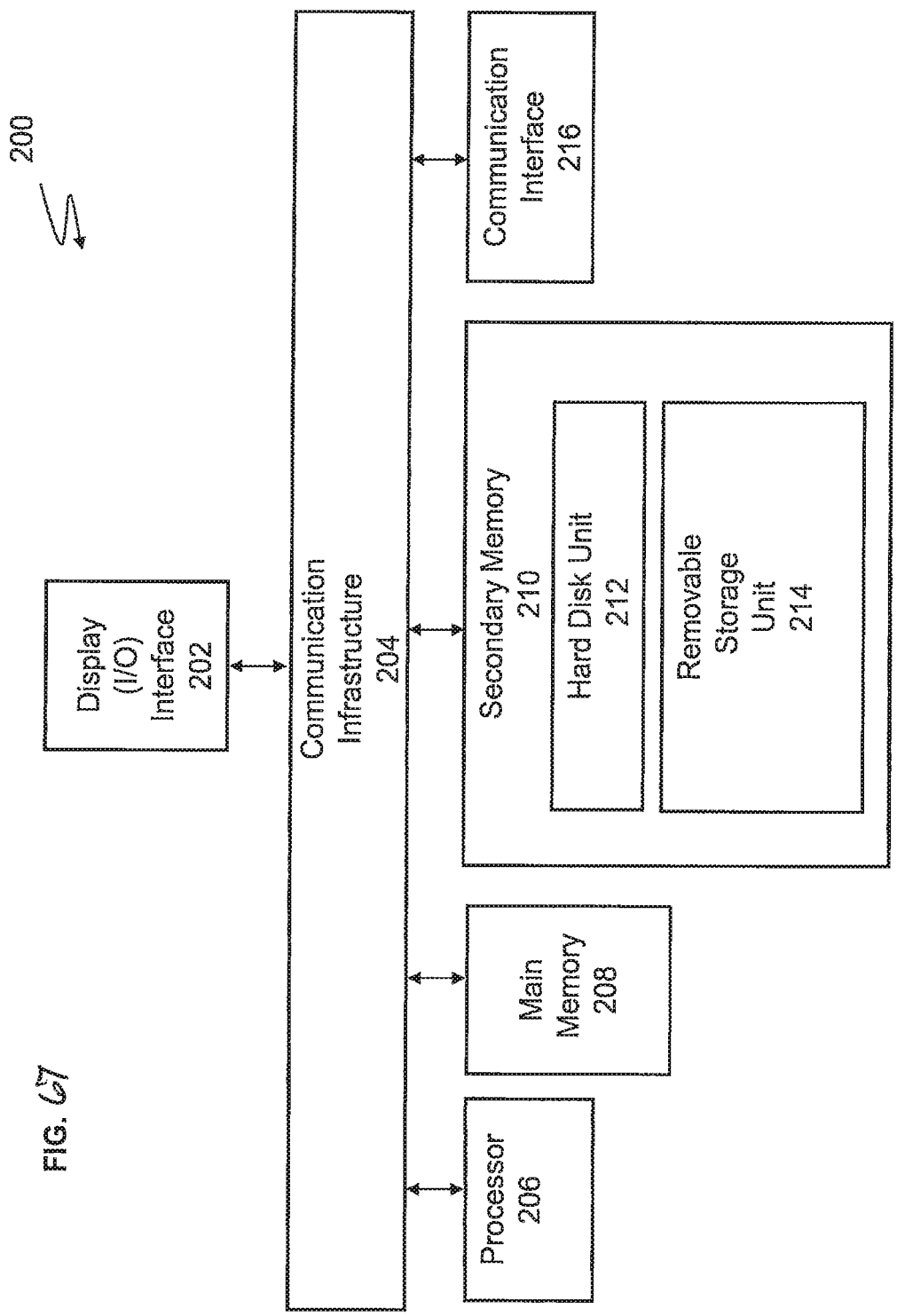
FIG. 67 illustrates an exemplary computer system.

Throughout this application, certain systems and methods have been described. Certain embodiments of the systems include a computer system and certain of the method steps may be implemented by a computer system. FIG. 67 illustrates such an exemplary computer system 200. One or more computer systems 200 may carry out the methods presented herein as computer code.

Computer system 200 includes an input/output display interface 202 connected to communication infrastructure 204—such as a bus→, which forwards data such as graphics, text, and information, from the communication infrastructure 204 or from a frame buffer (not shown) to other components of the computer system 200. The input/output display interface 202 may be, for example, a keyboard, touch screen, joystick, trackball, mouse, monitor, speaker, printer, Google Glass® unit, web camera, any other computer peripheral device, or any combination thereof, capable of entering and/or viewing data.

Computer system 200 includes one or more processors 206, which may be a special purpose or a general-purpose digital signal processor that processes certain information. Computer system 200 also includes a main memory 208, for example random access memory ("RAM"), read-only memory ("ROM"), mass storage device, or any combination thereof. Computer system 200 may also include a secondary memory 210 such as a hard disk unit 212, a removable storage unit 214, or any combination thereof. Computer system 200 may also include a communication interface 216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 208, secondary memory 210, communication interface 216, or a combination thereof, function as a computer usable storage medium, otherwise referred to as a computer readable storage medium, to store and/or access computer software including computer instructions. Certain embodiments of a computer readable storage medium do not include any transitory signals or waves. For example, computer programs or other instructions may be loaded into the computer system 200 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 214 or hard disc unit 212 to the secondary memory 210 or through the communication infrastructure 204 to the main memory 208 of the computer system 200.

Communication interface 216 allows software, instructions and data to be transferred between the computer system 200 and external devices or external networks. Software, instructions, and/or data transferred by the communication interface 216 are typically in the form of signals that may be electronic, electromagnetic, optical or other signals capable of being sent and received by the communication interface 216. Signals may be sent and received using wire or cable, fiber optics, a phone line, a cellular phone link, a Radio Frequency ("RF") link, wireless link, or other communication channels.

Computer programs, when executed, enable the computer system 200, particularly the processor 206, to implement the methods of the invention according to computer software including instructions.

The computer system 200 described herein may perform any one of, or any combination of, the steps of any of the methods presented herein. It is also contemplated that the methods according to the invention may be performed automatically, or may be invoked by some form of manual intervention.

The computer system 200 of FIG. 67 is provided only for the purposes of illustration, such that the invention is not limited to this specific embodiment. It is appreciated that a person skilled in the relevant art knows how to program and implement the invention using any computer system.

The computer system 200 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Figure 68:
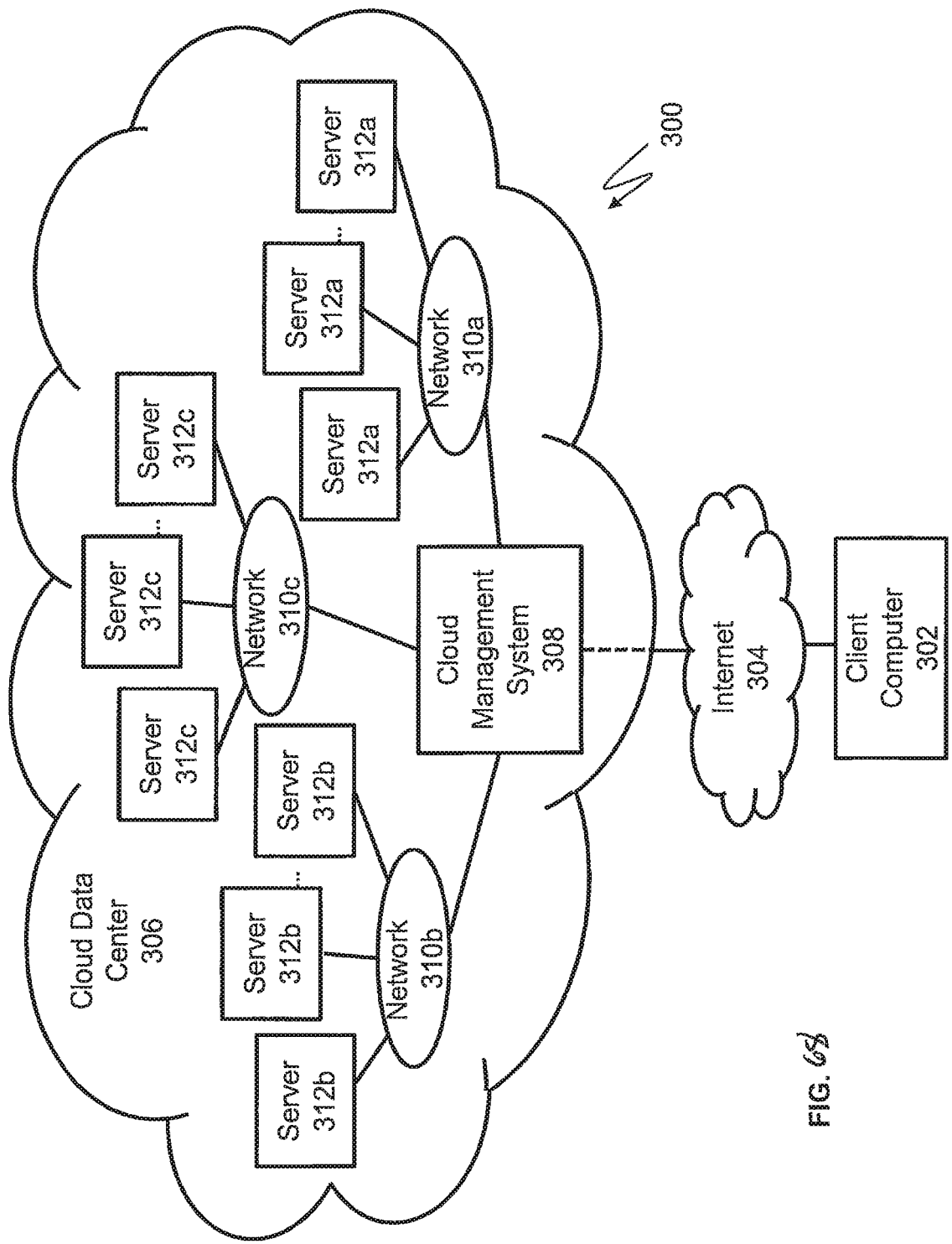
FIG. 68 illustrates an exemplary cloud computing system.

FIG. 68 illustrates an exemplary cloud computing system 300 that may be used to implement the methods according to the present invention. The cloud computing system 300 includes a plurality of interconnected computing environments. The cloud computing system 300 utilizes the resources from various networks as a collective virtual computer, where the services and applications can run independently from a particular computer or server configuration making hardware less important.

Specifically, the cloud computing system 300 includes at least one client computer 302. The client computer 302 may be any device through the use of which a distributed computing environment may be accessed to perform the methods disclosed herein, for example, a traditional computer, portable computer, mobile phone, personal digital assistant, tablet to name a few. The client computer 302 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 302 also includes a communications interface, for example, a modem, a network interface (such as an Ethernet card), a communications port, a PCMCIA slot and card, wired or wireless systems, etc. The communications interface allows communication through transferred signals between the client computer 302 and external devices including networks such as the Internet 304 and cloud data center 306. Communication may be implemented using wireless or wired capability such as cable, fiber optics, a phone line, a cellular phone link, radio waves or other communication channels.

The client computer 302 establishes communication with the Internet 304—specifically to one or more servers—to, in turn, establish communication with one or more cloud data centers 306. A cloud data center 306 includes one or more networks 310*a*, 310*b*, 310*c* managed through a cloud management system 308. Each network 310*a*, 310*b*, 310*c* includes resource servers 312*a*, 312*b*, 312*c*, respectively. Servers 312*a*, 312*b*, 312*c* permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 308 can comprise a dedicated or centralized server and/or other software, hardware, and network tools to communicate with one or more networks 310*a*, 310*b*, 310*c*, such as the Internet or other public or private network, with all sets of resource servers 312*a*, 312*b*, 312*c*. The cloud management system 308 may be configured to query and identify the computing resources and components managed by the set of resource servers 312*a*, 312*b*, 312*c* needed and available for use in the cloud data center 306. Specifically, the cloud management system 308 may be configured to identify the hardware resources and components such as type and amount of processing power, type and amount of memory, type and amount of storage, type and amount of network bandwidth and the like, of the set of resource servers 312*a*, 312*b*, 312*c* needed and available for use in the cloud data center 306. Likewise, the cloud management system 308 can be configured to identify the software resources and components, such as type of Operating System ("OS"), application programs, and the like, of the set of resource servers 312*a*, 312*b*, 312*c* needed and available for use in the cloud data center 306.

The present invention is also directed to computer products, otherwise referred to as computer program products, to provide software to the cloud computing system 300. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 300 of FIG. 68 is provided only for the purposes of illustration and does not limit the invention to this specific embodiment. It is appreciated that a person skilled in the relevant art knows how to program and implement the invention using any computer system or network architecture.

Embodiments include a system comprising a plurality of nodes configured to form a network including a plurality of virtual links in an overlay network provisioned over an underlay network. The system includes at least one virtual machine (VM) at each node. The at least one VM is coupled to the network and configured as a tenant VM to correspond to at least one tenant of a plurality of tenants of the network. A tenant network includes the tenant VM at each node. The system includes a plurality of control planes, and each control plane is created by the at least one VM of a corresponding tenant network and configured as a tenant control plane for routing of traffic flows of a corresponding tenant. The system includes a plurality of data planes. Each data plane is created by the at least one VM and configured as a tenant data plane for traffic flows of a corresponding tenant.

Embodiments include a system comprising: a plurality of nodes configured to form a network including a plurality of virtual links in an overlay network provisioned over an underlay network; at least one virtual machine (VM) at each node, wherein the at least one VM is coupled to the network and configured as a tenant VM to correspond to at least one tenant of a plurality of tenants of the network, wherein a tenant network includes the tenant VM at each node; a plurality of control planes, wherein each control plane is created by the at least one VM of a corresponding tenant network and configured as a tenant control plane for routing of traffic flows of a corresponding tenant; and a plurality of data planes, wherein each data plane is created by the at least one VM and configured as a tenant data plane for traffic flows of a corresponding tenant.

Each tenant control plane is dedicated to the tenant and isolated from others of the plurality of control planes, and each tenant data plane is isolated from the corresponding tenant control plane.

The underlay network includes servers of a public network.

Each tenant data plane is isolated from others of the plurality of data planes.

The plurality of virtual links is a component of the overlay network and utilizes the underlay network for delivery of the tenant traffic flow.

The plurality of virtual links comprises a plurality of single-hop virtual links coupled between each node of the plurality of nodes.

The tenant network corresponds to the tenant, and includes a set of virtual links of the plurality of virtual links.

The network includes a plurality of tenant networks corresponding to the plurality of tenants, wherein each tenant network is isolated from each other tenant network of the plurality of tenant networks.

The plurality of tenant networks is configured to maintain separation of multi-tenant traffic flows throughout the network.

The tenant network is configured with a tenant configuration of a corresponding tenant to control routing of tenant traffic flows of the tenant.

The tenant VM includes a virtual router (VR), wherein the VR is coupled to the network and to the corresponding tenant of the VM.

At least one VR of the tenant network is configured to receive feedback data from the at least one VM, and to characterize the network using the feedback data.

The VR includes at least one objective function.

The VR is configured to characterize the network by applying the at least one objective function to the feedback data.

The feedback data includes link state data of the plurality of virtual links.

The link state data of each link represents at least one link metric of the link, wherein the at least one link metric includes at least one of latency, jitter, packet loss, throughput, utilization, link state, and link status.

The VR is configured to determine a best route of the network using the network characterization, and control routing of a tenant traffic flow of the corresponding tenant according to the best route.

The control of the routing of the tenant traffic comprises the VR separately controlling routing of each tenant traffic flow to at least one next node of the best route.

The VR comprises a plurality of routing control algorithms representing a plurality of routing behaviors, wherein each routing control algorithm is configured to determine at least one best route through the network for routing the tenant traffic flow from an ingress node of the plurality of nodes to an egress node of the plurality of nodes.

Each routing behavior corresponds to a traffic classification of a corresponding tenant traffic flow.

Each routing behavior is defined by an objective function of the plurality of objective functions, wherein the plurality of objective functions include the at least one objective function.

The VR is configured to apply a corresponding objective function to the link state data and generate a link weight for each link of the set of links.

The VR is configured to determine the at least one best route of the tenant traffic flow according to link weights of the set of links.

The control of the routing of the tenant traffic flow comprises continually adapting the at least one best route in response to changes in the link state data as determined with the corresponding objective function.

The VR is configured to periodically receive link state updates that include updated link state data of the set of virtual links.

The continually adapting of the at least one best route comprises applying the corresponding objective function to the updated link state data.

The VR is configured to apply the corresponding objective function to the updated link state data and generate an updated link weight for each link of the set of links.

The VR is configured to determine an updated best route of the tenant traffic flow according to updated link weights of the set of links.

Each VR of a set of VRs corresponding to the tenant includes the plurality of objective functions that characterize the network.

The at least one VM includes a plurality of VMs, wherein each VM includes a VR, wherein each VR of the plurality of VRs includes the plurality of objective functions that characterize the network.

The plurality of routing behaviors includes at least one routing behavior configured to route the tenant traffic flow via multiple paths of the network.

The plurality of routing behaviors includes at least one routing behavior configured to route the tenant traffic flow directly via a shortest path of the network.

The plurality of routing behaviors includes at least one routing behavior configured to route the tenant traffic flow on a path and maintain the tenant traffic flow on the path until detection of a network event.

The network event includes at least one of a network topology change and a variation in the link state data.

The variation in the link state data comprises a variation exceeding a pre-specified threshold.

The VR is configured to maintain configuration data of the tenant configuration, and to use the configuration data in the control of the routing of the tenant traffic flow.

The configuration data includes traffic class configuration data, wherein the traffic class configuration data identifies traffic classes.

The configuration data includes route configuration data, wherein the route configuration data includes data of a service that is a recipient of the tenant traffic flow.

The VR is configured to maintain topology data including a logical view of the tenant network for the corresponding tenant, and to use the topology data in the control of the routing of the tenant traffic flow.

The VM includes a monitoring agent coupled to the VR, wherein the monitoring agent is configured to collect the feedback data of the set of virtual links.

Each monitoring agent is configured to collect the feedback data from at least one of a plurality of monitoring agents and at least one other VR of at least one other VM.

Each monitoring agent is configured to collect the feedback data using probe signals exchanged with others of the at least one VM.

The VM is configured to send the feedback data to the monitoring agent transmitting the probe signals in response to receipt of the probe signals.

The monitoring agent is configured to generate the link state data of the set of virtual links by processing the feedback data.

The VR is configured to receive from the monitoring agent the link state data of the set of virtual links.

The at least one VM includes a plurality of VMs, wherein each VM includes a VR, wherein each VR is configured to receive the link state data of others of the plurality of links from others of a plurality of VRs.

Each VM includes a virtual gateway coupled to the corresponding tenant and the corresponding VR, wherein the virtual gateway is configured to control tenant traffic flows incoming to the VM from the corresponding tenant.

The virtual gateway is coupled to the monitoring agent.

The virtual gateway is configured to attract tenant traffic flows of the corresponding tenant, and to reject traffic flows arriving from sources other than the corresponding tenant.

The at least one VM includes a set of public IP addresses, wherein the set of public IP addresses is dedicated to the corresponding tenant, wherein the corresponding tenant accesses the virtual gateway of the VM using the set of public IP addresses.

The VR is configured to generate at least one set of flow rules configured to control the routing of the tenant traffic flow through the overlay network.

The at least one set of flow rules corresponds to the at least one objective function.

The system includes at least one virtual switch coupled to the VR and the virtual gateway of each VM.

The at least one virtual switch includes a set of routing tables representing the at least one set of flow rules, wherein the set of routing tables is configured to manage the control of the routing of the tenant traffic flow through the network.

The at least one virtual switch is configured to transfer the tenant traffic flow between the virtual gateway and the VR.

Each node includes at least one aggregator coupled to the at least one virtual switch and the network.

The aggregator is configured to route via the network the tenant traffic flows of the plurality of tenants corresponding to the node.

The system includes an aggregator coupled to the at least one virtual switch.

The aggregator is configured to route via the network the tenant traffic flow received at the virtual gateway from the corresponding tenant.

The aggregator is configured to route to the corresponding tenant the tenant traffic flow received at the node via the network.

The tenant traffic flow arriving at the aggregator via the network is routed to the corresponding tenant via at least one of the corresponding VR and the virtual gateway.

The virtual gateway routes the tenant traffic flow arriving at the aggregator via the network to the tenant via a coupling over a public network.

Each node includes a hypervisor, wherein the hypervisor is configured as an operating system of the at least one VM of the node.

The hypervisor is configured to include at least one of the aggregator and the at least one virtual switch.

The system includes a provisioner coupled to the at least one VM of the plurality of nodes, wherein the provisioner is configured to control provisioning of at least one of the overlay network and the underlay network.

The provisioner is configured to control configuration of the at least one VM of the plurality of nodes.

The provisioner is configured to control configuration of components of the at least one VM using a tenant configuration of the corresponding tenant, wherein the components include at least one of the VR and the virtual gateway.

The provisioner is configured to maintain network data of at least one of the overlay network and the underlay network, wherein the network data includes data representing the overlay network, the underlay network, route configurations, topology data of the network including the plurality of virtual links, and tenant configurations of the plurality of tenants.

The at least one VM at each node includes a plurality of VMs at each node, wherein each VM at each node is configured as the tenant VM to correspond to a tenant of the plurality of tenants.

A tenant set of VMs includes the tenant VM of the corresponding tenant at each node, and the tenant network comprises the tenant set of VMs.

At least one VM of the plurality of VMs at each node includes the VR.

Each VM of the plurality of VMs includes a VR.

Embodiments include a system comprising a plurality of nodes configured to form a network comprising a plurality of virtual links in an overlay network provisioned over an underlay network including servers of a public network. The system includes a plurality of virtual routers (VRs) at each node. Each VR is coupled to the network and to a tenant of a plurality of tenants of the node. At least one VR is configured to receive network data of a set of virtual links in real time during operation of the network, and determine and dynamically adapt an optimal route through the network using the network data. The VR is configured to control routing of traffic flows through the network according to the optimal route, obviating routing based on pre-assigned link weights.

Embodiments include a system comprising: a plurality of nodes configured to form a network comprising a plurality of virtual links in an overlay network provisioned over an underlay network including servers of a public network; and a plurality of virtual routers (VRs) at each node, wherein each VR is coupled to the network and to a tenant of a plurality of tenants of the node, wherein at least one VR is configured to receive network data of a set of virtual links in real time during operation of the network, and determine and dynamically adapt an optimal route through the network using the network data, wherein the at least one VR is configured to control routing of traffic flows through the network according to the optimal route, obviating routing based on pre-assigned link weights.

Each VR is configured to form in the network the set of virtual links to correspond to the tenant, wherein the set of virtual links is a component of the overlay network and utilizes the underlay network for delivery of a tenant traffic flow of the tenant.

The at least one VR includes at least one objective function.

The VR is configured to characterize the network by applying the at least one objective function to the network data during each iteration of a plurality of iterations, wherein the optimal route is determined by minimizing the at least one objective function using the network data.

The VR is configured to use the network data to adaptively characterize the network, and iteratively determine the optimal route based on the adaptive characterization.

The network data includes link state data, wherein the characterization of the network comprises recognizing changes in the link state data based on feedback of the link state data from others of the plurality of VRs, and adapting the optimal route in response to the changes.

The link state data of each link represents at least one link metric of the link, wherein the at least one link metric includes at least one of latency, jitter, packet loss, throughput, utilization, link state, and link status.

The at least one objective function and the corresponding at least one link metric is configured to control quality of service (QoS) of the network, wherein the optimal route is configured to provide the QoS.

The network data is received in real time during each iteration.

An output of the objective function at each iteration adapts the optimal route through the network for the iteration.

An output of the objective function at each iteration comprises link weights of the set of virtual links.

The VR is configured to assign the link weights to the set of virtual links, and control routing of data traffic via the optimal route based on the link weights.

The control of the routing of the tenant traffic comprises each VR separately controlling routing of each tenant traffic flow to at least one next node of the optimal route.

The set of virtual links forms a private tenant network of the tenant, wherein the private tenant network is isolated from each other private tenant network corresponding to each other VR.

The private tenant network is configured with a tenant configuration of the tenant to control routing of tenant traffic flows of the tenant, wherein the tenant configuration includes traffic classification data, route data, and bandwidth.

The private tenant network includes a tenant control plane and a tenant data plane.

The VR is a component of the tenant control plane, wherein the tenant control plane is isolated from others of a plurality of control planes corresponding to other tenants of the plurality of tenants.

The tenant data plane is isolated from others of a plurality of data planes corresponding to other tenants of the plurality of tenants.

The control plane is separate and distinct from the data plane, wherein each of the control plane and the data plane comprises at least one of software and hardware.

Each VR comprises a plurality of routing control algorithms representing a plurality of routing behaviors, wherein each routing behavior corresponds to a traffic classification of the tenant traffic flow.

Each routing control algorithm is configured to determine at least one path through the network for routing the tenant traffic flow from an ingress node of the plurality of nodes to an egress node of the plurality of nodes.

Each routing behavior is defined by an objective function of a plurality of objective functions, wherein the plurality of objective functions include the at least one objective function.

The VR is configured to apply a corresponding objective function to the network data and generate a link weight for each link of the set of links.

The VR is configured to determine the best route of the tenant traffic flow according to link weights of the set of links.

The control of the routing of the tenant traffic flow comprises continually adapting the at least one route in response to changes in an output of the corresponding objective function resulting from changes in the network data.

The VR is configured to periodically receive link state updates that include updated link state data of the set of virtual links.

The continually adapting of the at least one route comprises applying the corresponding objective function to the updated link state data.

The VR is configured to apply the corresponding objective function to the updated link state data and generate an updated link weight for each link of the set of links, and to determine an updated optimal route of the tenant traffic flow according to updated link weights of the set of links.

The plurality of routing behaviors includes routing a tenant traffic flow via multiple paths of the network.

The plurality of routing behaviors includes routing a tenant traffic flow directly via a shortest path of the network.

The plurality of routing behaviors includes routing a tenant traffic flow on a path and maintaining the tenant traffic flow on the path until detection of an network event.

The network event includes at least one of a network topology change and a variation in the link state data exceeding a pre-specified threshold.

The optimal route includes at least one lowest cost path based on the link state data.

Each VR is configured to maintain configuration data for the corresponding tenant, and to use the configuration data in the control of the routing of the tenant traffic flow.

The configuration data includes traffic class configuration data, wherein the traffic class configuration data identifies traffic classes, and configures behavior of the network corresponding to each traffic class.

The configuration data includes route configuration data, wherein the route configuration data includes data of a destination of the tenant traffic flow.

Each VR is configured to maintain topology data including a logical view of the overlay network for the corresponding tenant, and to use the topology data in the control of the routing of the tenant traffic flow.

The at least one VR includes a single VR at a single node of the network.

The at least one VR includes a plurality of VRs at one or more nodes of the network.

Each VR is configured to asynchronously receive the network data relative to any other VR of the plurality of VRs.

The each VR is configured to asynchronously determine and adapt an optimal route relative to any other VR of the plurality of VRs.

The control of the routing comprises controlling routing of a traffic flow to a next node of the optimal route via a single path.

The control of the routing comprises controlling routing of a traffic flow to a next node of the optimal route via a plurality of paths.

Each VR is configured to control the routing independent of routing decisions of any other VR of the plurality of VRs.

Each VR is configured to operate in conjunction with a plurality of routing systems of other nodes of the plurality of nodes.

Each node includes a plurality of virtual machines (VMs), wherein each VM includes a VR of the plurality of VRs and corresponds to the tenant.

Each VM includes a monitoring agent coupled to the VR, wherein the monitoring agent is configured to collect the network data of the set of virtual links of the overlay network.

Each monitoring agent is configured to collect the network data from at least one of a plurality of monitoring agents and a plurality of VRs of the plurality of VMs.

The monitoring agent is configured to generate the link state data of the set of virtual links by processing the network data, wherein the VR is configured to receive from the monitoring agent the link state data of the set of virtual links.

Each VR is configured to receive the link state data of others of the plurality of links from others of the plurality of VRs.

Each VM includes a virtual gateway coupled to the corresponding tenant and the corresponding VR, wherein the virtual gateway is configured to control tenant traffic flows incoming to the VM from the corresponding tenant.

The VR is configured to generate at least one set of flow rules configured to control the routing of the tenant traffic flow through the overlay network, wherein the at least one set of flow rules corresponds to the at least one objective function.

The system comprises at least one virtual switch coupled to the VR and the virtual gateway of each VM, wherein the at least one virtual switch includes a set of routing tables representing the at least one set of flow rules, wherein the set of routing tables is configured to manage the control of the routing of the tenant traffic flow through the network.

The at least one virtual switch is configured to transfer the tenant traffic flow between the virtual gateway and the VR.

The system includes an aggregator coupled to the at least one virtual switch, wherein the aggregator is configured to route via the set of virtual links the tenant traffic flow received at the virtual gateway from the corresponding tenant.

The aggregator is configured to route to the corresponding tenant the tenant traffic flow received at the node via the network, wherein the tenant traffic flow arriving at the aggregator via the network is routed to the corresponding tenant via at least one of the corresponding VR and the virtual gateway.

Each node includes an aggregator coupled to the at least one virtual switch and the network, wherein the aggregator is configured to route via the network the tenant traffic flows of the plurality of tenants corresponding to the node.

Each node includes a hypervisor, wherein the hypervisor is configured as an operating system of the plurality of VMs of the node, wherein the hypervisor is configured to include at least one of the at least one virtual switch and the aggregator.

The system includes a provisioner coupled to the plurality of VMs of the plurality of nodes, wherein the provisioner is configured to control provisioning of at least one of the overlay network and the underlay network.

The provisioner is configured to control configuration of components of each VM of the plurality of VMs using a tenant configuration of the corresponding tenant.

Embodiments include a system comprising a plurality of nodes configured to form a network comprising a plurality of virtual links in an overlay network provisioned over an underlay network including servers of a public network. The system includes a plurality of virtual routers (VRs) at each node. Each VR is coupled to the network and to a tenant of a plurality of tenants of the node, and configured to form in the network a set of virtual links corresponding to the tenant. At least one VR includes a feedback control system comprising at least one objective function that characterizes the network. The VR is configured to receive link state data of the set of virtual links and control routing of a tenant traffic flow of each tenant according to a best route of the network determined by the at least one objective function using the link state data.

Embodiments include a system comprising: a plurality of nodes configured to form a network comprising a plurality of virtual links in an overlay network provisioned over an underlay network including servers of a public network; and a plurality of virtual routers (VRs) at each node, wherein each VR is coupled to the network and to a tenant of a plurality of tenants of the node, and configured to form in the network a set of virtual links corresponding to the tenant, wherein at least one VR includes a feedback control system comprising at least one objective function that characterizes the network, wherein the at least one VR is configured to receive link state data of the set of virtual links and control routing of a tenant traffic flow of each tenant according to a best route of the network determined by the at least one objective function using the link state data.

Each node includes a plurality of virtual machines (VMs), wherein each VM includes a VR of the plurality of VRs and corresponds to the tenant.

Each VM is configured to isolate at least one of a control plane and a data plane of each tenant from each other tenant of the plurality of tenants.

The control of the routing of the tenant traffic flow comprises routing the tenant traffic flow from an ingress note to an egress node of the plurality of nodes.

The control of the routing of the tenant traffic comprises each VR separately controlling routing of each tenant traffic flow to at least one next node of the best route.

The plurality of virtual links is a component of the overlay network and utilizes the underlay network for delivery of the tenant traffic flow.

The set of virtual links are configured to form a private tenant network corresponding to the tenant.

The plurality of virtual links comprises a plurality of single-hop virtual links coupled between each node of the plurality of nodes.

The plurality of virtual links include a plurality of sets of virtual links, wherein each set of virtual links forms a private tenant network of a corresponding tenant of the plurality of tenants.

The network includes a plurality of private tenant networks corresponding to the plurality of tenants, wherein each private tenant network is isolated from each other private tenant network of the plurality of private tenant networks.

The plurality of private tenant networks is configured to maintain separation of multi-tenant traffic flows throughout the network.

Each private tenant network is configured with a tenant configuration of a corresponding tenant to control routing of tenant traffic flows of the tenant.

The tenant configuration includes traffic classification data, route data, and bandwidth.

Each VR comprises a plurality of routing control algorithms representing a plurality of routing behaviors.

Each routing control algorithm is configured to determine at least one path through the network for routing the tenant traffic flow from an ingress node of the plurality of nodes to an egress node of the plurality of nodes.

Each routing behavior corresponds to a traffic classification of the tenant traffic flow.

Each routing behavior is defined by an objective function of a plurality of objective functions, wherein the plurality of objective functions include the at least one objective function.

The VR is configured to apply a corresponding objective function to the link state data and generate a link weight for each link of the set of links.

The VR is configured to determine the best route of the tenant traffic flow according to link weights of the set of links.

The control of the routing of the tenant traffic flow comprises continually adapting the at least one route in response to changes in the link state data as processed by the corresponding objective function.

The VR is configured to periodically receive link state updates that include updated link state data of the set of virtual links.

The continually adapting of the at least one route comprises applying the corresponding objective function to the updated link state data.

The VR is configured to apply the corresponding objective function to the updated link state data and generate an updated link weight for each link of the set of links.

The VR is configured to determine an updated best route of the tenant traffic flow according to updated link weights of the set of links.

Each VR of a set of VRs each includes the feedback control system comprising the at least one objective function that characterizes the network.

Each VR of the plurality of VRs includes the feedback control system comprising the at least one objective function that characterizes the network.

The plurality of routing behaviors includes routing a tenant traffic flow via multiple paths of the network.

The plurality of routing behaviors includes routing a tenant traffic flow directly via a shortest path of the network.

The plurality of routing behaviors includes routing a tenant traffic flow on a path and maintaining the tenant traffic flow on the path until detection of an network event.

The network event includes at least one of a network topology change and a variation in the link state data exceeding a pre-specified threshold.

The best route includes at least one lowest cost path based on the link state data.

The link state data of each link represents at least one link metric of the link.

The at least one link metric includes at least one of latency, jitter, packet loss, throughput, utilization, link state, and link status.

Each VR is configured to maintain configuration data for the corresponding tenant, and to use the configuration data in the control of the routing of the tenant traffic flow.

The configuration data includes traffic class configuration data.

The traffic class configuration data identifies traffic classes, and configures MCN behavior corresponding to each traffic class.

The configuration data includes route configuration data.

The route configuration data includes data of a service that is a recipient of the tenant traffic flow.

Each VR is configured to maintain topology data including a logical view of the overlay network for the corresponding tenant, and to use the topology data in the control of the routing of the tenant traffic flow.

Each VM includes a monitoring agent coupled to the VR, wherein the monitoring agent is configured to collect data representing the link state data of the set of virtual links of the overlay network.

The data representing the link state data of the set of virtual links includes at least one link metric of the set of virtual links.

The at least one link metric includes at least one of latency, jitter, packet loss, throughput, utilization, link state, and link status.

Each monitoring agent is configured to collect the at least one link metric from at least one of a plurality of monitoring agents and a plurality of VRs of the plurality of VMs.

The VR is configured to configure the set of virtual links for use by the monitoring agent.

Each monitoring agent is configured to collect the at least one link metric using probe signals exchanged with others of the plurality of VMs.

Each VM is configured to send the at least one link metric to the monitoring agent transmitting the probe signals in response to receipt of the probe signals.

The monitoring agent is configured to generate the link state data of the set of virtual links by processing the at least one link metric.

The VR is configured to receive from the monitoring agent the link state data of the set of virtual links.

Each VR is configured to receive the link state data of others of the plurality of links from others of the plurality of VRs.

Each VM includes a virtual gateway coupled to the corresponding tenant and the corresponding VR, wherein the virtual gateway is configured to control tenant traffic flows incoming to the VM from the corresponding tenant.

The virtual gateway is coupled to the monitoring agent.

The VR is configured to generate at least one set of flow rules configured to control the routing of the tenant traffic flow through the overlay network.

The at least one set of flow rules corresponds to the at least one objective function.

The virtual gateway is configured to attract tenant traffic flows of the corresponding tenant.

The virtual gateway is configured to reject traffic flows arriving from sources other than the corresponding tenant.

Each VM includes a set of public IP addresses, wherein the set of public IP addresses is dedicated to the corresponding tenant, wherein the corresponding tenant accesses the virtual gateway of the VM using the set of public IP addresses.

The system comprises at least one virtual switch coupled to the VR and the virtual gateway of each VM.

The at least one virtual switch includes a set of routing tables representing the at least one set of flow rules.

The set of routing tables is configured to manage the control of the routing of the tenant traffic flow through the network.

The at least one virtual switch is configured to transfer the tenant traffic flow between the virtual gateway and the VR.

At least one of the virtual gateway, the VR, and the at least one virtual switch are configured to form the set of virtual links.

The system comprises an aggregator coupled to the at least one virtual switch.

The aggregator is configured to route via the set of virtual links the tenant traffic flow received at the virtual gateway from the corresponding tenant.

The aggregator is configured to route to the corresponding tenant the tenant traffic flow received at the node via the network.

The tenant traffic flow arriving at the aggregator via the network is routed to the corresponding tenant via at least one of the corresponding VR and the virtual gateway.

The virtual gateway routes the tenant traffic flow arriving at the aggregator to the tenant via a coupling over a public network.

Each node includes an aggregator coupled to the at least one virtual switch and the network.

The aggregator is configured to route via the network the tenant traffic flows of the plurality of tenants corresponding to the node.

Each node includes a hypervisor, wherein the hypervisor is configured as an operating system of the plurality of VMs of the node.

The hypervisor is configured to include the at least one virtual switch.

The hypervisor is configured to include the aggregator.

The system comprises a provisioner coupled to the plurality of VMs of the plurality of nodes, wherein the provisioner is configured to control provisioning of at least one of the overlay network and the underlay network.

The provisioner is coupled to a queue comprising at least one pre-provisioned network, wherein the control of the provisioning of the underlay network includes use of a pre-provisioned network of the queue as the underlay network.

The provisioner is configured to control configuration of the plurality of VMs of the plurality of nodes.

The provisioner is configured to control configuration of components of each VM of the plurality of VMs using a tenant configuration of the corresponding tenant.

The provisioner is configured to generate routes corresponding to each of the plurality of tenants.

The provisioner is configured to maintain network data of at least one of the overlay network and the underlay network, wherein the network data includes data representing the overlay network, the underlay network, route configurations, topology data of the network including the plurality of virtual links, and tenant configurations of the plurality of tenants.

The system comprises a web application coupled to the provisioner, wherein the web application is configured to generate a user interface configured to generate for presentation prompts for data representing the tenant configuration, and to receive data input of the tenant.

The web application is configured to maintain link state data of the plurality of virtual links, and link metrics represented by the link state data.

The web application includes an alerts engine configured to generate and manage alerts and notifications, wherein the alerts and notifications correspond to at least one of the link state data and the link metrics.

Embodiments include a system comprising a plurality of nodes configured to form a network comprising virtual links. The system includes a plurality of virtual machines (VMs) at each node. Each VM is coupled to the network and to a tenant of a plurality of tenants of the node. The system includes a feedback control system in at least one VM, comprising a plurality of objective functions representing a plurality of routing behaviors. Each objective function is configured to continually characterize the network per traffic flow based on link state data of the virtual links received from a set of the VMs. The feedback control system determines based on the characterization a best route through the network, and controls routing of each traffic flow to at least one next node of the best route.

Embodiments include a system comprising: a plurality of nodes configured to form a network comprising virtual links; a plurality of virtual machines (VMs) at each node, wherein each VM is coupled to the network and to a tenant of a plurality of tenants of the node; and a feedback control system in at least one VM, comprising a plurality of objective functions representing a plurality of routing behaviors, wherein each objective function is configured to continually characterize the network per traffic flow based on link state data of the virtual links received from a set of the VMs, wherein the feedback control system determines based on the characterization a best route through the network, and controls routing of each traffic flow to at least one next node of the best route.

Embodiments include a system comprising a plurality of nodes configured to form a network comprising a plurality of virtual links in an overlay network provisioned over an underlay network. The system includes at least one virtual machine (VM) at each node. The at least one VM is coupled to the network and to a tenant of a plurality of tenants of the node. The at least one VM includes a plurality of routing algorithms representing a plurality of routing behaviors. At least one routing algorithm is configured to use feedback data of a set of virtual links to determine and continually adapt an optimal route through the network. The VM is configured to control routing of traffic flows according to the optimal route.

Embodiments include a system comprising a plurality of nodes configured to form a network comprising a plurality of virtual links in an overlay network provisioned over an underlay network, and at least one virtual machine (VM) at each node, wherein the at least one VM is coupled to the network and to a tenant of a plurality of tenants of the node, wherein the at least one VM includes a plurality of routing algorithms representing a plurality of routing behaviors, wherein at least one routing algorithm is configured to use feedback data of a set of virtual links to determine and continually adapt an optimal route through the network, wherein the VM is configured to control routing of traffic flows according to the optimal route.

Each routing algorithm is configured to determine at least one best route through the network for routing the tenant traffic flow from an ingress node of the plurality of nodes to an egress node of the plurality of nodes.

Each routing behavior corresponds to a traffic classification of a corresponding tenant traffic flow.

Each routing behavior is defined by an objective function.

The at least one VM of the tenant network is configured to characterize the network using the feedback data.

The at least one VM is configured to characterize the network by applying the corresponding objective function to the feedback data.

The feedback data includes link state data of the plurality of virtual links.

The link state data of each link represents at least one link metric of the link, wherein the at least one link metric includes at least one of latency, jitter, packet loss, throughput, utilization, link state, and link status.

The at least one VM is configured to determine a best route of the network using the network characterization, and control routing of a tenant traffic flow of the corresponding tenant according to the best route.

The control of the routing of the tenant traffic flow comprises the VM separately controlling routing of each tenant traffic flow to at least one next node of the best route.

The at least one VM is configured to characterize the network by applying the at least on objective function to the link state data and generating a link weight for each link of the set of links.

The at least one VM is configured to determine the at least one best route of the tenant traffic flow according to link weights of the set of links.

The control of the routing of the tenant traffic flow comprises continually adapting the at least one best route in response to changes in the link state data as determined with the corresponding objective function.

The at least one VM is configured to periodically receive link state updates that include updated link state data of the set of virtual links.

The continually adapting of the at least one best route comprises applying the at least one objective function to the updated link state data.

The at least one VM is configured to apply the corresponding objective function to the updated link state data and generate an updated link weight for each link of the set of links.

The at least one VM is configured to determine an updated best route of the tenant traffic flow according to updated link weights of the set of links.

The plurality of routing behaviors includes at least one routing behavior configured to route the tenant traffic flow via multiple paths of the network.

The plurality of routing behaviors includes at least one routing behavior configured to route the tenant traffic flow directly via a shortest path of the network.

The plurality of routing behaviors includes at least one routing behavior configured to route the tenant traffic flow on a path and maintain the tenant traffic flow on the path until detection of a network event.

The network event includes at least one of a network topology change and a variation in the link state data.

The variation in the link state data comprises a variation exceeding a pre-specified threshold.

The at least one VM is configured to maintain configuration data of the tenant configuration, and to use the configuration data in the control of the routing of the tenant traffic flow.

The configuration data includes traffic class configuration data, wherein the traffic class configuration data identifies traffic classes.

The configuration data includes route configuration data, wherein the route configuration data includes data of a service that is a recipient of the tenant traffic flow.

The at least one VM is configured to maintain topology data including a logical view of the tenant network for the corresponding tenant, and to use the topology data in the control of the routing of the tenant traffic flow.

The at least one VM is configured as a tenant VM to correspond to the tenant.

The tenant network includes a set of tenant VMs comprising the tenant VM corresponding to the tenant at each node, and a set of virtual links of the plurality of virtual links, wherein the plurality of virtual links is a component of the overlay network and utilizes the underlay network for delivery of the tenant traffic flow.

The at least one VM is configured to generate a tenant control plane for routing traffic flows of the tenant, wherein the network includes a plurality of control planes corresponding to the plurality of tenants.

The at least one VM is configured to generate a tenant data plane for traffic flows of the tenant, wherein the network includes a plurality of data planes corresponding to the plurality of tenants.

The at least one VM is configured to instantiate a plurality of components, wherein the plurality of components is configured to manage the traffic flows of the tenant.

The plurality of components includes a virtual router (VR) coupled to the network and to the tenant.

The VR is configured as a component of the tenant control plane.

The VR is configured to include the plurality of routing algorithms, and receive the feedback data and determine and adapt the optimal route.

The VR includes the objective function, wherein the VR is configured to characterize the network by applying the corresponding objective function to the feedback data.

The plurality of components includes a monitoring agent, wherein the monitoring agent is coupled to the VR and configured to collect the feedback data of the set of virtual links.

Each monitoring agent is configured to collect the feedback data from at least one other monitoring agent and at least one other VR of at least one other VM.

Each monitoring agent is configured to collect the feedback data using probe signals exchanged with others of the at least one VM.

The VM is configured to send the feedback data to the monitoring agent transmitting the probe signals in response to receipt of the probe signals.

The monitoring agent is configured to generate the link state data of the set of virtual links by processing the feedback data.

The VR is configured to receive from the monitoring agent the link state data of the set of virtual links.

The at least one VM includes a plurality of VMs, wherein each VM includes a VR, wherein each VR is configured to receive the link state data of others of the plurality of links from others of a plurality of VRs.

The plurality of components includes a virtual gateway coupled to the corresponding tenant and the corresponding VR, wherein the virtual gateway is configured to control tenant traffic flows between the at least one VM and the corresponding tenant.

The virtual gateway is configured as a component of the tenant control plane.

The virtual gateway is coupled to the monitoring agent.

The virtual gateway is configured to attract tenant traffic flows of the corresponding tenant, and to reject traffic flows arriving from sources other than the corresponding tenant.

The at least one VM includes a set of public IP addresses, wherein the set of public IP addresses is dedicated to the corresponding tenant, wherein the corresponding tenant accesses the virtual gateway of the VM using the set of public IP addresses.

The VR is configured to generate at least one set of flow rules configured to control the routing of the tenant traffic flow through the overlay network.

The at least one set of flow rules corresponds to the at least one objective function.

The system comprises at least one virtual switch coupled to the VR and the virtual gateway of each VM.

The at least one virtual switch includes a set of routing tables representing the at least one set of flow rules, wherein the set of routing tables is configured to manage the control of the routing of the tenant traffic flow through the network.

The at least one virtual switch is configured to transfer the tenant traffic flow between the virtual gateway and the VR.

Each node includes at least one aggregator coupled to the at least one virtual switch and the network.

The aggregator is configured to route via the network the tenant traffic flows of the plurality of tenants corresponding to the node.

The system comprises an aggregator coupled to the at least one virtual switch.

The aggregator is configured to route via the network the tenant traffic flow received at the virtual gateway from the corresponding tenant.

The aggregator is configured to route to the corresponding tenant the tenant traffic flow received at the node via the network.

The tenant traffic flow arriving at the aggregator via the network is routed to the corresponding tenant via at least one of the corresponding VR and the virtual gateway.

The virtual gateway routes the tenant traffic flow arriving at the aggregator via the network to the tenant via a coupling over a public network.

Each node includes a hypervisor, wherein the hypervisor is configured as an operating system of the at least one VM of the node.

The hypervisor is configured to include at least one of the aggregator and the at least one virtual switch.

The system comprises a provisioner coupled to the at least one VM of the plurality of nodes, wherein the provisioner is configured to control provisioning of the plurality of components of the VM.

The provisioner is configured to control the provisioning using a tenant configuration of the corresponding tenant of the at least one VM.

The provisioner is configured to maintain network data of at least one of the plurality of components, wherein the network data includes data representing the overlay network, the underlay network, route configurations, topology data of the network including the plurality of virtual links, and tenant configurations of the plurality of tenants.

Embodiments include a system comprising a plurality of nodes configured to form a network including a plurality of virtual links in an overlay network provisioned over an underlay network. The system includes a plurality of tenant networks formed in the network. Each tenant network corresponds to a tenant of a plurality of tenants of the network. The system includes a plurality of control planes. Each control plane is a component of a tenant network and includes a plurality of routing algorithms corresponding to a plurality of traffic classes. The tenant network is configured to use feedback data of link conditions of the tenant network with at least one routing algorithm to control routing of tenant traffic of a corresponding traffic class.

Embodiments include a system comprising: a plurality of nodes configured to form a network including a plurality of virtual links in an overlay network provisioned over an underlay network; a plurality of tenant networks formed in the network, wherein each tenant network corresponds to a tenant of a plurality of tenants of the network; and a plurality of control planes, wherein each control plane is a component of a tenant network and includes a plurality of routing algorithms corresponding to a plurality of traffic classes, wherein the tenant network is configured to use feedback data of link conditions of the tenant network with at least one routing algorithm to control routing of tenant traffic of a corresponding traffic class.

Each tenant network is coupled to the network and to the corresponding tenant of a plurality of tenants of the network, wherein each tenant network is configured with a tenant configuration of the corresponding tenant to control the routing.

Each tenant network includes a set of virtual links of the plurality of virtual links.

Each tenant network is isolated from each other tenant network of the plurality of tenant networks, and configured to maintain separation of multi-tenant traffic flows throughout the network.

The system comprises a plurality of data planes, wherein each data plane corresponds to a tenant network.

Each data plane is isolated from others of the plurality of data planes, and others of the plurality of control planes.

The plurality of routing algorithms represents a plurality of routing behaviors corresponding to the plurality of traffic classes.

At least one routing algorithm is configured to use the feedback data of a set of virtual links of the plurality of links to determine and continually adapt at least one optimal route through the network.

The at least one routing algorithm is configured to control the routing of the tenant traffic according to the at least one optimal route.

Each routing algorithm is configured to determine at least one optimal route through the network for routing the tenant traffic from an ingress node of the plurality of nodes to an egress node of the plurality of nodes.

Each routing behavior is defined by an objective function.

Each routing algorithm includes the objective function of a corresponding routing behavior.

The routing algorithm is configured to characterize the network by applying the objective function to the feedback data.

The feedback data includes link state data of the plurality of virtual links.

The link state data of each link represents at least one link metric of the link, wherein the at least one link metric includes at least one of latency, jitter, packet loss, throughput, utilization, link state, and link status.

The routing algorithm is configured to determine the at least one optimal route of the network using the network characterization, and control routing of a tenant traffic flow of the corresponding tenant according to the at least one optimal route.

The control of the routing of the tenant traffic comprises the tenant network separately controlling routing of each tenant traffic flow of the tenant traffic to at least one next node of the at least one optimal route.

The routing algorithm is configured to characterize the network by applying the at least one objective function to the link state data and generating a link weight for each link of the set of links.

The routing algorithm is configured to determine the at least one optimal route of the tenant traffic flow according to the link weights of the set of links.

The control of the routing of the tenant traffic flow comprises continually adapting the at least one optimal route in response to changes in the link state data as determined with the corresponding objective function.

The routing algorithm is configured to adapt the at least one optimal route by continually applying the at least one objective function to updated link state data of the set of virtual links.

The routing algorithm is configured to generate an updated link weight for each link of the set of links.

The routing algorithm is configured to determine an updated optimal route of the tenant traffic flow according to the updated link weights of the set of links.

The plurality of routing behaviors includes at least one routing behavior configured to route the tenant traffic flow via multiple paths of the network.

The plurality of routing behaviors includes at least one routing behavior configured to route the tenant traffic flow directly via a shortest path of the network.

The plurality of routing behaviors includes at least one routing behavior configured to route the tenant traffic flow on a path and maintain the tenant traffic flow on the path until detection of a network event.

The network event includes at least one of a network topology change and a variation in the link state data.

The variation in the link state data comprises a variation exceeding a pre-specified threshold.

Each tenant network is configured to include configuration data of the tenant configuration, and to use the configuration data in the control of the routing of the tenant traffic flow.

The configuration data includes traffic class configuration data, wherein the traffic class configuration data identifies traffic classes.

The configuration data includes route configuration data, wherein the route configuration data includes data of a service that is a recipient of the tenant traffic flow.

Each tenant network is configured to include topology data including a logical view of the tenant network for the corresponding tenant, and to use the topology data in the control of the routing of the tenant traffic flow.

Each tenant network includes a tenant virtual machine (VM) at each node of the plurality of nodes, wherein each tenant virtual machine is coupled to the network and to the corresponding tenant.

Each tenant VM is coupled to the control plane and data plane of the corresponding tenant, and configured as a tenant VM to correspond to the tenant.

The tenant VM includes the plurality of routing algorithms.

At least one routing algorithm is configured to use the feedback data of a set of virtual links of the plurality of links to determine and continually adapt an optimal route through the network.

The tenant VM is configured to control the routing of the tenant traffic according to the optimal route.

The tenant VM is configured to instantiate a plurality of components, wherein the plurality of components is configured to manage the traffic flows of the tenant.

The plurality of components includes a virtual router (VR) coupled to the network and to the tenant.

The VR is configured as a component of the control plane.

The VR is configured to include the plurality of routing algorithms, and receive the feedback data and determine and adapt the optimal route.

The VR includes the objective function, wherein the VR is configured to characterize the network by applying the corresponding objective function to the feedback data.

The plurality of components includes a monitoring agent, wherein the monitoring agent is coupled to the VR and configured to collect the feedback data of the set of virtual links.

Each monitoring agent is configured to collect the feedback data from at least one other monitoring agent and at least one other VR of at least one other VM.

Each monitoring agent is configured to collect the feedback data using probe signals exchanged with others of the at least one VM.

The VM is configured to send the feedback data to the monitoring agent transmitting the probe signals in response to receipt of the probe signals.

The monitoring agent is configured to generate the link state data of the set of virtual links by processing the feedback data.

The VR is configured to receive from the monitoring agent the link state data of the set of virtual links.

The plurality of components includes a virtual gateway coupled to the corresponding tenant and the corresponding VR, wherein the virtual gateway is configured to control tenant traffic flows between the at least one VM and the corresponding tenant.

The virtual gateway is coupled to the monitoring agent.

The virtual gateway is configured to attract tenant traffic flows of the corresponding tenant, and to reject traffic flows arriving from sources other than the corresponding tenant.

The at least one VM includes a set of public IP addresses, wherein the set of public IP addresses is dedicated to the corresponding tenant, wherein the corresponding tenant accesses the virtual gateway of the VM using the set of public IP addresses.

The VR is configured to generate at least one set of flow rules configured to control the routing of the tenant traffic flow through the overlay network.

The at least one set of flow rules corresponds to the at least one objective function.

The system comprises at least one virtual switch coupled to the VR and the virtual gateway of each VM.

The at least one virtual switch includes a set of routing tables representing the at least one set of flow rules, wherein the set of routing tables is configured to manage the control of the routing of the tenant traffic flow through the network.

The at least one virtual switch is configured to transfer the tenant traffic flow between the virtual gateway and the VR.

Each node includes at least one aggregator coupled to the at least one virtual switch and the network.

The aggregator is configured to route via the network the tenant traffic flows of the plurality of tenants corresponding to the node.

The system comprises an aggregator coupled to the at least one virtual switch.

The aggregator is configured to route via the network the tenant traffic flow received at the virtual gateway from the corresponding tenant.

The aggregator is configured to route to the corresponding tenant the tenant traffic flow received at the node via the network.

The tenant traffic flow arriving at the aggregator via the network is routed to the corresponding tenant via at least one of the corresponding VR and the virtual gateway.

The virtual gateway routes the tenant traffic flow arriving at the aggregator via the network to the tenant via a coupling over a public network.

Each node includes a hypervisor, wherein the hypervisor is configured as an operating system of the at least one VM of the node.

The hypervisor is configured to include at least one of the aggregator and the at least one virtual switch.

The system comprises a provisioner coupled to the at least one VM of the plurality of nodes, wherein the provisioner is configured to control provisioning of the plurality of components of the VM.

The provisioner is configured to control the provisioning using a tenant configuration of the corresponding tenant of the at least one VM.

The provisioner is configured to maintain network data of at least one of the plurality of components, wherein the network data includes data representing the overlay network, the underlay network, route configurations, topology data of the network including the plurality of virtual links, and tenant configurations of the plurality of tenants.

Embodiments include a system comprising a plurality of nodes configured to form a network including a plurality of virtual links in an overlay network provisioned over an underlay network. The system includes a plurality of tenant networks in the network. Each tenant network corresponds to a tenant of a plurality of tenants of the network. The system includes a plurality of control planes, and each control plane is a component of a tenant network and includes at least one routing algorithm configured to optimize a cost function using feedback data of link conditions of the tenant network. Each tenant network is configured to determine and adapt at least one optimal route through the tenant network, and route traffic flows of the tenant, based on an output of the cost function.

Embodiments include a system comprising: a plurality of nodes configured to form a network including a plurality of virtual links in an overlay network provisioned over an underlay network; a plurality of tenant networks in the network, wherein each tenant network corresponds to a tenant of a plurality of tenants of the network; and a plurality of control planes, wherein each control plane is a component of a tenant network and includes at least one routing algorithm configured to optimize a cost function using feedback data of link conditions of the tenant network, wherein each tenant network is configured to determine and adapt at least one optimal route through the tenant network, and route traffic flows of the tenant, based on an output of the cost function.

Each tenant network is coupled to the network and to the corresponding tenant of the plurality of tenants, wherein each tenant network is configured with a tenant configuration of the corresponding tenant to control routing of the traffic flows.

Each tenant network includes a set of virtual links of the plurality of virtual links.

Each tenant network is isolated from each other tenant network of the plurality of tenant networks, and configured to maintain separation of multi-tenant traffic flows throughout the network.

Each control plane is isolated from others of the plurality of control planes.

The system comprises a plurality of data planes, wherein each data plane corresponds to the tenant network and is isolated from others of the plurality of data planes.

The at least one routing algorithm includes a plurality of routing algorithms configured to represent a plurality of routing behaviors corresponding to a plurality of traffic classes.

Each routing algorithm is configured to use the feedback data of a set of virtual links of the plurality of links to determine and continually adapt the at least one optimal route through the network.

Each routing algorithm is configured to control the routing of the traffic flows having a corresponding traffic classification according to the at least one optimal route.

Each routing algorithm is configured to determine the at least one optimal route through the network for routing the traffic flows from an ingress node of the plurality of nodes to an egress node of the plurality of nodes.

Each routing behavior is defined by a cost function.

Each routing algorithm includes the cost function of a corresponding routing behavior.

Each routing algorithm is configured to characterize the network by applying the cost function to the feedback data.

The feedback data includes link state data of the plurality of virtual links.

The link state data of each link represents at least one link metric of the link, wherein the at least one link metric includes at least one of latency, jitter, packet loss, throughput, utilization, link state, and link status.

Each routing algorithm is configured to determine the at least one optimal route using the network characterization, and control routing of the traffic flows of the corresponding tenant according to the at least one optimal route.

The control of the routing of the traffic flows comprises the tenant network separately controlling routing of each traffic flow of the tenant to at least one next node of the at least one optimal route.

Each routing algorithm is configured to characterize the network by applying the cost function to the link state data and generating a link weight for each link of the set of links.

Each routing algorithm is configured to determine the at least one optimal route of the traffic flows according to the link weights of the set of links.

The control of the routing of the traffic flows comprises continually adapting the at least one optimal route in response to changes in the link state data as determined with the corresponding cost function.

Each routing algorithm is configured to adapt the at least one optimal route by continually applying the cost function to updated link state data of the set of virtual links.

Each routing algorithm is configured to generate an updated link weight for each link of the set of links.

Each routing algorithm is configured to determine an updated optimal route of the traffic flows according to the updated link weights of the set of links.

The plurality of routing behaviors includes at least one routing behavior configured to route the traffic flows via multiple paths of the network.

The plurality of routing behaviors includes at least one routing behavior configured to route the traffic flows directly via a shortest path of the network.

The plurality of routing behaviors includes at least one routing behavior configured to route the traffic flows on a path and maintain the traffic flows on the path until detection of a network event.

The network event includes at least one of a network topology change and a variation in the link state data.

The variation in the link state data comprises a variation exceeding a pre-specified threshold.

Each tenant network is configured to include configuration data of the tenant configuration, and to use the configuration data in the control of the routing of the traffic flow.

The configuration data includes traffic class configuration data, wherein the traffic class configuration data identifies traffic classes.

The configuration data includes route configuration data, wherein the route configuration data includes data of a service that is a recipient of the traffic flows.

Each tenant network is configured to include topology data including a logical view of the tenant network for the corresponding tenant, and to use the topology data in the control of the routing of the traffic flows.

Each tenant network includes a tenant virtual machine (VM) at each node of the plurality of nodes, wherein each tenant virtual machine is coupled to the network and to the corresponding tenant.

Each tenant VM is coupled to the control plane and data plane of the corresponding tenant, and configured as a tenant VM to correspond to the tenant.

The tenant VM includes the plurality of routing algorithms.

At least one routing algorithm is configured to use the feedback data of a set of virtual links of the plurality of links to determine and continually adapt an optimal route through the network for traffic having a corresponding traffic classification.

The tenant VM is configured to control the routing of the tenant traffic according to the optimal route.

The tenant VM is configured to instantiate a plurality of components, wherein the plurality of components is configured to manage the traffic flows of the tenant.

The plurality of components includes a virtual router (VR) coupled to the network and to the tenant.

The VR is configured as a component of a corresponding control plane.

The VR is configured to include the plurality of routing algorithms, and receive the feedback data and determine and adapt the optimal route.

The VR includes the cost functions corresponding to the plurality of routing algorithms, wherein the VR is configured to characterize the network by applying the corresponding cost function to the feedback data.

The plurality of components includes a monitoring agent, wherein the monitoring agent is coupled to the VR and configured to collect the feedback data of the set of virtual links.

Each monitoring agent is configured to collect the feedback data from at least one other monitoring agent and at least one other VR of at least one other VM.

Each monitoring agent is configured to collect the feedback data using probe signals exchanged with others of the at least one VM.

The VM is configured to send the feedback data to the monitoring agent transmitting the probe signals in response to receipt of the probe signals.

The monitoring agent is configured to generate the link state data of the set of virtual links by processing the feedback data.

The VR is configured to receive from the monitoring agent the link state data of the set of virtual links.

The plurality of components includes a virtual gateway coupled to the corresponding tenant and the corresponding VR, wherein the virtual gateway is configured to control the traffic flows between the at least one VM and the corresponding tenant.

The virtual gateway is configured as a component of a corresponding control plane.

The virtual gateway is coupled to the monitoring agent.

The virtual gateway is configured to attract tenant traffic flows of the corresponding tenant, and to reject traffic flows arriving from sources other than the corresponding tenant.

The at least one VM includes a set of public IP addresses, wherein the set of public IP addresses is dedicated to the corresponding tenant, wherein the corresponding tenant accesses the virtual gateway of the VM using the set of public IP addresses.

The VR is configured to generate at least one set of flow rules configured to control the routing of the traffic flows of the corresponding tenant through the overlay network.

Each set of flow rules corresponds to the cost function of a corresponding routing behavior.

The system comprises at least one virtual switch coupled to the VR and the virtual gateway of each VM.

The at least one virtual switch includes a set of routing tables representing the at least one set of flow rules, wherein the set of routing tables is configured to manage the control of the routing.

The at least one virtual switch is configured to transfer the traffic flows between the virtual gateway and the VR.

Each node includes at least one aggregator coupled to the at least one virtual switch and the network.

The aggregator is configured to route via the network the traffic flows of the plurality of tenants corresponding to the node.

The system comprises an aggregator coupled to the at least one virtual switch.

The aggregator is configured to route via the network the traffic flows received at the virtual gateway from the corresponding tenant.

The aggregator is configured to route to the corresponding tenant the traffic flows received at the node via the network.

The traffic flows of the corresponding tenant arriving at the aggregator via the network are routed to the corresponding tenant via at least one of the corresponding VR and the virtual gateway.

The virtual gateway routes the traffic flows arriving at the aggregator via the network to the tenant via a coupling over a public network.

Each node includes a hypervisor, wherein the hypervisor is configured as an operating system of the at least one VM of the node.

The hypervisor is configured to include at least one of the aggregator and the at least one virtual switch.

The system comprises a provisioner coupled to a plurality of tenant VMs of the plurality of nodes, wherein the provisioner is configured to control provisioning of at least one of the overlay network and the underlay network.

The provisioner is coupled to a queue comprising at least one pre-provisioned network, wherein the control of the provisioning of the underlay network includes use of a pre-provisioned network of the queue as the underlay network.

The provisioner is configured to control configuration of the plurality of tenant VMs of the plurality of nodes.

The provisioner is configured to control configuration of components of each VM of the plurality of tenant VMs using a tenant configuration of the corresponding tenant.

The provisioner is configured to generate routes corresponding to each of the plurality of tenants.

The provisioner is configured to maintain network data of at least one of the overlay network and the underlay network, wherein the network data includes data representing the overlay network, the underlay network, route configurations, topology data of the network including the plurality of virtual links, and tenant configurations of the plurality of tenants.

The system comprises a web application coupled to the provisioner, wherein the web application is configured to generate a user interface configured to generate for presentation prompts for data representing the tenant configuration, and to receive data input of each tenant.

The web application is configured to maintain link state data of the plurality of virtual links, and link metrics represented by the link state data.

The web application includes an alerts engine configured to generate and manage alerts and notifications, wherein the alerts and notifications correspond to at least one of the link state data and the link metrics.

Embodiments include a system comprising a plurality of nodes configured to form a network comprising virtual links in an overlay network provisioned over an underlay network. The system includes a plurality of virtual machines (VMs), and each node includes at least one VM coupled to the network and to a tenant of a plurality of tenants of the node. The system includes a feedback control system in each VM. The feedback control system is configured to receive real time feedback data of the virtual links and, in response, dynamically adjust routing of traffic flows through the network to maintain the traffic flow on an optimal route.

Embodiments include a system comprising: a plurality of nodes configured to form a network comprising virtual links in an overlay network provisioned over an underlay network; a plurality of virtual machines (VMs), wherein each node includes at least one VM coupled to the network and to a tenant of a plurality of tenants of the node; a feedback control system in each VM, wherein the feedback control system is configured to receive real time feedback data of the virtual links and, in response, dynamically adjust routing of traffic flows through the network to maintain the traffic flow on an optimal route.

The feedback control system comprises at least one objective function that characterizes the network.

The feedback control system comprises a plurality of objective functions representing a plurality of routing behaviors.

The feedback data comprises link state data of a set of virtual links.

Each objective function is configured to continually characterize the network per traffic flow based on the link state data.

The feedback control system determines based on the characterization the optimal route through the network, and controls routing of each traffic flow to at least one next node of the optimal route.

The feedback control system is configured to characterize the network for each traffic flow by applying a corresponding objective function to the link state data and generating a link weight for each link of the set of links.

The feedback control system is configured to determine the optimal route of the traffic flow according to link weights of the set of links.

At least one VM includes a plurality of routing algorithms representing a plurality of routing behaviors.

At least one routing algorithm is configured to use the feedback data of a set of virtual links to determine and continually adapt the optimal route through the network, wherein each VM is configured to control routing of traffic flows according to the optimal route.

Each routing algorithm is configured to determine at least one optimal route through the network for routing the traffic flows from an ingress node of the plurality of nodes to an egress node of the plurality of nodes.

Each routing behavior corresponds to a traffic classification of a corresponding traffic flows.

Each routing behavior is defined by an objective function.

Each VM is configured to characterize the network.

Each VM is configured to characterize the network by applying the corresponding objective function to the feedback data.

The feedback data includes link state data of the plurality of virtual links.

The link state data of each link represents at least one link metric of the link, wherein the at least one link metric includes at least one of latency, jitter, packet loss, throughput, utilization, link state, and link status.

Each VM is configured to determine the optimal route of the network using the network characterization, and control routing of the traffic flows of the corresponding tenant according to the optimal route.

The control of the routing of the traffic flow comprises each VM separately controlling routing of each traffic flow to at least one next node of the optimal route.

Each VM is configured to characterize the network by applying the at least on objective function to the link state data and generating a link weight for each link of the set of links.

Each VM is configured to determine the optimal route of the traffic flow according to link weights of the set of links.

The control of the routing of the traffic flow comprises continually adapting the optimal route in response to changes in the link state data as determined with the corresponding objective function.

Each VM is configured to periodically receive link state updates that include updated link state data of the set of virtual links.

The continually adapting of the optimal route comprises applying the at least one objective function to the updated link state data.

Each VM is configured to apply the corresponding objective function to the updated link state data and generate an updated link weight for each link of the set of links.

Each VM is configured to determine an updated optimal route of the traffic flow according to updated link weights of the set of links.

The plurality of routing behaviors includes at least one routing behavior configured to route the traffic flow via multiple paths of the network.

The plurality of routing behaviors includes at least one routing behavior configured to route the traffic flow directly via a shortest path of the network.

The plurality of routing behaviors includes at least one routing behavior configured to route the traffic flow on a path and maintain the traffic flow on the path until detection of a network event.

The network event includes at least one of a network topology change and a variation in the link state data.

The variation in the link state data comprises a variation exceeding a pre-specified threshold.

Each VM is configured to maintain configuration data of a tenant configuration, and to use the configuration data in the control of the routing of the traffic flow.

The configuration data includes traffic class configuration data, wherein the traffic class configuration data identifies traffic classes.

The configuration data includes route configuration data, wherein the route configuration data includes data of a service that is a recipient of the traffic flow.

Each VM is configured to maintain topology data including a logical view of the tenant network for the corresponding tenant, and to use the topology data in the control of the routing of the traffic flow.

A tenant network includes a tenant VM at each node, wherein the tenant VM is configured with a tenant configuration of a corresponding tenant.

The tenant network includes a set of tenant VMs comprising the tenant VM corresponding to the tenant at each node, and a set of virtual links of the plurality of virtual links, wherein the plurality of virtual links is a component of the overlay network and utilizes the underlay network for delivery of the traffic flow.

The system includes a plurality of control planes corresponding to the plurality of tenants, wherein each control plane is a component of a tenant network and configured as a tenant control plane for routing of traffic flows of a corresponding tenant.

The system includes a plurality of data planes, wherein each data plane is a component of a tenant network and configured as a tenant data plane for traffic flows of a corresponding tenant.

Each tenant control plane is dedicated to the tenant and isolated from others of the plurality of control planes, and each tenant data plane is isolated from others of the plurality of data planes.

The set of virtual links is a component of the overlay network and utilizes the underlay network for delivery of the traffic flow.

The set of virtual links comprises a plurality of single-hop virtual links coupled between each node of the plurality of nodes.

The network includes a plurality of tenant networks corresponding to the plurality of tenants, wherein each tenant network is configured to be isolated from each other tenant network of the plurality of tenant networks to maintain separation of multi-tenant traffic flows throughout the network.

Each VM is configured to instantiate a plurality of components, wherein the plurality of components is configured to manage the traffic flows of the tenant.

The plurality of components includes a virtual router (VR) coupled to the network and to the tenant.

The VR is configured as a component of the tenant control plane.

The VR is configured to include the plurality of routing algorithms, and receive the feedback data and determine and adapt the optimal route.

The VR includes the objective function, wherein the VR is configured to characterize the network by applying the corresponding objective function to the feedback data.

The plurality of components includes a monitoring agent, wherein the monitoring agent is coupled to the VR and configured to collect the feedback data of the set of virtual links.

Each monitoring agent is configured to collect the feedback data from at least one other monitoring agent and at least one other VR of at least one other VM.

Each monitoring agent is configured to collect the feedback data using probe signals exchanged with others of each VM.

The VM is configured to send the feedback data to the monitoring agent transmitting the probe signals in response to receipt of the probe signals.

The monitoring agent is configured to generate the link state data of the set of virtual links by processing the feedback data.

The VR is configured to receive from the monitoring agent the link state data of the set of virtual links.

Each VM of the plurality of VMs includes a VR, wherein each VR is configured to receive the link state data of others of the plurality of links from others of a plurality of VRs.

The plurality of components includes a virtual gateway coupled to the corresponding tenant and the corresponding VR, wherein the virtual gateway is configured to control traffic flows between each VM and the corresponding tenant.

The virtual gateway is configured as a component of the tenant control plane.

The virtual gateway is coupled to the monitoring agent.

The virtual gateway is configured to attract traffic flows of the corresponding tenant, and to reject traffic flows arriving from sources other than the corresponding tenant.

Each VM includes a set of public IP addresses, wherein the set of public IP addresses is dedicated to the corresponding tenant, wherein the corresponding tenant accesses the virtual gateway of the VM using the set of public IP addresses.

The VR is configured to generate at least one set of flow rules configured to control the routing of the traffic flow through the overlay network.

The at least one set of flow rules corresponds to the at least one objective function.

The system includes at least one virtual switch coupled to the VR and the virtual gateway of each VM.

The at least one virtual switch includes a set of routing tables representing the at least one set of flow rules, wherein the set of routing tables is configured to manage the control of the routing of the traffic flow through the network.

The at least one virtual switch is configured to transfer the traffic flow between the virtual gateway and the VR.

Each node includes at least one aggregator coupled to the at least one virtual switch and the network.

The aggregator is configured to route via the network the traffic flows of the plurality of tenants corresponding to the node.

The system includes an aggregator coupled to the at least one virtual switch.

The aggregator is configured to route via the network the traffic flow received at the virtual gateway from the corresponding tenant.

The aggregator is configured to route to the corresponding tenant the traffic flow received at the node via the network.

The traffic flow arriving at the aggregator via the network is routed to the corresponding tenant via at least one of the corresponding VR and the virtual gateway.

The virtual gateway routes the traffic flow arriving at the aggregator via the network to the tenant via a coupling over a public network.

Each node includes a hypervisor, wherein the hypervisor is configured as an operating system of each VM of the node.

The hypervisor is configured to include at least one of the aggregator and the at least one virtual switch.

The system includes a provisioner coupled to the plurality of VMs of the plurality of nodes, wherein the provisioner is configured to control provisioning of at least one of the overlay network and the underlay network.

The provisioner is coupled to a queue comprising at least one pre-provisioned network, wherein the control of the provisioning of the underlay network includes use of a pre-provisioned network of the queue as the underlay network.

The provisioner is configured to control configuration of the plurality of VMs of the plurality of nodes.

The provisioner is configured to control configuration of components of each VM of the plurality of VMs using a tenant configuration of the corresponding tenant.

The provisioner is configured to generate routes corresponding to each of the plurality of tenants.

The provisioner is configured to maintain network data of at least one of the overlay network and the underlay network, wherein the network data includes data representing the overlay network, the underlay network, route configurations, topology data of the network including the plurality of virtual links, and tenant configurations of the plurality of tenants.

The system includes a web application coupled to the provisioner, wherein the web application is configured to generate a user interface configured to generate for presentation prompts for data representing the tenant configuration, and to receive data input of the tenant.

The web application is configured to maintain link state data of the plurality of virtual links, and link metrics represented by the link state data.

The web application includes an alerts engine configured to generate and manage alerts and notifications, wherein the alerts and notifications correspond to at least one of the link state data and the link metrics.

Embodiments include a system comprising a plurality of nodes coupled to a network including a plurality of virtual links in an overlay network provisioned over an underlay network. The system includes a virtual machine (VM) provisioned at a node of the plurality of nodes and coupled to the network. The VM is configured to receive feedback data of link conditions, and use the feedback data to dynamically determine and adapt an optimal route through the network. The VM is configured to control routing of traffic flows using the optimal route. The routing includes split routing of a traffic flow from the node via two or more of the virtual links.

Embodiments include a system comprising: a plurality of nodes coupled to a network comprising a plurality of virtual links in an overlay network provisioned over an underlay network; and a virtual machine (VM) provisioned at a node of the plurality of nodes and coupled to the network, wherein the VM is configured to receive feedback data of link conditions, and use the feedback data to dynamically determine and adapt an optimal route through the network, wherein the VM is configured to control routing of traffic flows using the optimal route, wherein the routing includes split routing of a traffic flow from the node via two or more of the virtual links.

The traffic flows comprise packets, wherein the split routing comprises calculating a split ratio at each node on an ongoing basis, wherein the split ratio comprises a selection of a node-to-next node route each packet takes to go from a source destination node to a destination node.

The calculating the split ratio comprises using the feedback data at a node to determine a shortest path to a destination node for a packet.

The calculating the split ratio comprises decreasing a number of packets forwarded to a node that is not in a shortest path to the destination node, wherein the rate of decrease is proportional to a value including a current split ratio.

The calculating the split ratio includes calculating a weighting factor for the split ratio at each node for each possible next node.

The split routing comprises iteratively modifying packet forwarding at each node.

The iteratively modifying the packet forwarding comprises the node determining whether there are packets currently destined for a given destination node, and forwarding newly received packets to the given destination node along a shortest path if there are no packets currently destined for the given destination node.

The iteratively modifying the packet forwarding comprises the node adjusting a number of packets forwarded to the given destination node if there are packets currently destined for the given destination node.

The adjusting includes reducing a number of packets along non-shortest routes and increasing the number of packets along currently calculated shortest paths, and is performed iteratively until the optimal route is obtained.

The VM is coupled to a tenant of a plurality of tenants of the network, and includes a plurality of routing algorithms representing a plurality of routing behaviors, wherein at least one routing algorithm is configured to use the feedback data to determine and continually adapt the optimal route.

Each routing behavior corresponds to a traffic classification of a corresponding tenant, and is defined by an objective function.

The VM is configured to characterize the network using the feedback data.

The feedback data includes link state data of the plurality of links, wherein the VM is configured to characterize the network by applying the corresponding objective function to the feedback data, and determine the optimal route based on the characterization.

The characterization comprises recognizing changes in parameters of the network based on the feedback data, and adapting the characterization of the network in response to the changes in the parameters.

The parameters include at least one of the link state data, changes in network topology, and variations in network traffic.

The link state data comprises at least one of a numerical description of a state of a corresponding link, a valuation of an amount of traffic on a corresponding link, a number of packets between nodes, and a number of packets per unit of distance between nodes.

The adaptive characterization of the network using the feedback data obviates pre-assigned network traffic information to at least one of compute link weights and begin routing the traffic flows.

The control of the routing by the at least one routing algorithm based on the adaptive characterization obviates routing based on coordination of the at least one node with others of the plurality of nodes.

The link state data of each link is received and processed at the VM asynchronously relative to link state data of any other link.

The link state data includes updated link state data, wherein the determination of the optimal route includes dynamically adjusting the optimal route at the at least one node in response to the updated link state data.

The dynamic adjusting is performed iteratively until an optimal route is obtained, wherein the optimal route is a route that minimizes the objective function.

The dynamic adjusting of an iteration includes applying the at least one objective function to the updated link state data received during the iteration.

The dynamic adjusting comprises at least one of reducing a number of packets along non-shortest routes and increasing a number of packets along shortest routes.

The dynamic adjusting comprises, for each packet during each iteration, calculating a split ratio comprising a selection of a route each packet takes through the network to a destination node.

The calculating of the split ratio comprises taking into account a shortest path to a destination node for a packet during each iteration, and decreasing a number of packets forwarded to a node that is not in a shortest path to the destination node, wherein the rate of decrease is proportional to a value of a current split ratio.

The VM is configured to operate in conjunction with a plurality of routing systems of other nodes of the plurality of nodes.

The at least one routing algorithm includes a software-defined algorithm executing in the at least one node, wherein the at least one routing algorithm is configured to interoperate with other network components of the at least one node, wherein the other network components of the at least one node include one or more of logic components, interconnect components, ports, memory components, input/output components, and algorithms.

The link state data of each link represents at least one link metric of the link, wherein the at least one link metric includes at least one of latency, jitter, packet loss, throughput, utilization, link state, and link status.

The VM is configured to characterize the network by applying the at least on objective function to the link state data and generating a link weight for each link of the set of links.

The VM is configured to determine the optimal route of the tenant traffic flow according to link weights of the set of links.

The control of the routing of the tenant traffic flow comprises continually adapting the optimal route in response to changes in the link state data as determined with the corresponding objective function.

The VM is configured to periodically receive link state updates that include updated link state data of the set of virtual links.

The continually adapting of the at least one best route comprises applying the at least one objective function to the updated link state data.

The VM is configured to apply the corresponding objective function to the updated link state data and generate an updated link weight for each link of the set of links, wherein the at least one VM is configured to determine an updated optimal route of the tenant traffic flow according to updated link weights of the set of links.

The plurality of routing behaviors includes at least one routing behavior configured to route the tenant traffic flow on a path and maintain the tenant traffic flow on the path until detection of a network event.

The network event includes at least one of a network topology change and a variation in the link state data exceeding a pre-specified threshold.

The VM is configured to maintain configuration data of the tenant configuration, and to use the configuration data in the control of the routing of the tenant traffic flow.

The configuration data includes traffic class configuration data, wherein the traffic class configuration data identifies traffic classes.

The configuration data includes route configuration data, wherein the route configuration data includes data of a service that is a recipient of the tenant traffic flow.

The VM is configured to maintain topology data including a logical view of the tenant network for the corresponding tenant, and to use the topology data in the control of the routing of the tenant traffic flow.

The VM is configured as a tenant VM to correspond to a tenant.

The tenant network includes a set of tenant VMs comprising the tenant VM corresponding to the tenant at each node, and a set of virtual links of the plurality of virtual links, wherein the plurality of virtual links is a component of the overlay network and utilizes the underlay network for delivery of the traffic flow.

The VM is configured to generate a tenant control plane for routing the traffic flow of the tenant, wherein the network includes a plurality of control planes corresponding to the plurality of tenants.

The VM is configured to generate a tenant data plane for the traffic flow of the tenant, wherein the network includes a plurality of data planes corresponding to the plurality of tenants.

The VM is configured to instantiate a plurality of components, wherein the plurality of components is configured to manage the traffic flow of the tenant.

The plurality of components includes a virtual router (VR) coupled to the network and to the tenant.

The VR is configured as a component of the tenant control plane.

The VR is configured to include the plurality of routing algorithms, and receive the feedback data and determine and adapt the optimal route.

The VR includes the objective functions of the plurality of routing algorithms, wherein the VR is configured to characterize the network by applying the corresponding objective function to the feedback data.

The plurality of components includes a monitoring agent, wherein the monitoring agent is coupled to the VR and configured to collect the feedback data.

The monitoring agent is configured to collect the feedback data using probe signals exchanged with at least one node.

The monitoring agent is configured to generate the link state data of the set of virtual links by processing the feedback data.

The VR is configured to receive from the monitoring agent the link state data of the set of virtual links.

The plurality of components includes a virtual gateway coupled to the corresponding tenant and the corresponding VR, wherein the virtual gateway is configured to control the traffic flow between the VM and the corresponding tenant.

The virtual gateway is configured as a component of the tenant control plane.

The virtual gateway is coupled to the monitoring agent.

The virtual gateway is configured to attract the traffic flow of the corresponding tenant, and to reject traffic flows arriving from sources other than the corresponding tenant.

The VR is configured to generate at least one set of flow rules configured to control the routing of the traffic flow through the overlay network.

The at least one set of flow rules corresponds to the at least one objective function.

The system includes at least one virtual switch coupled to the VR and the virtual gateway of the VM.

The at least one virtual switch includes a set of routing tables representing the at least one set of flow rules, wherein the set of routing tables is configured to manage the control of the routing of the traffic flow through the network.

The at least one virtual switch is configured to transfer the traffic flow between the virtual gateway and the VR.

The system includes an aggregator coupled to the at least one virtual switch and the network.

The aggregator is configured to route via the network the traffic flow received at the virtual gateway from the corresponding tenant.

The aggregator is configured to route to the corresponding tenant the traffic flow received at the node via the network.

The traffic flow arriving at the aggregator via the network is routed to the corresponding tenant via at least one of the corresponding VR and the virtual gateway.

The virtual gateway routes the traffic flow arriving at the aggregator via the network to the tenant via a coupling over a public network.

The node includes a hypervisor configured as an operating system of the VM.

The hypervisor is configured to include at least one of the aggregator and the at least one virtual switch.

The system includes a provisioner coupled to the VM, wherein the provisioner is configured to control provisioning of the plurality of components of the VM.

The provisioner is configured to control the provisioning using a tenant configuration of the corresponding tenant of the at least one VM.

The provisioner is configured to maintain network data of at least one of the plurality of components, wherein the network data includes data representing the overlay network, the underlay network, route configurations, topology data of the network including the plurality of virtual links, and tenant configurations of the plurality of tenants.

While there have been shown and described illustrative embodiments that provide for a software-defined core network, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of network configurations. In addition, while certain protocols are shown, other suitable protocols may be used, accordingly.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a plurality of nodes configured to form a plurality of overlay networks for a plurality of tenants, each overlay network comprising a set of virtual links and provisioned over an underlay network including servers of one or more public networks; and
a plurality of virtual routers (VRs) at each node, wherein each VR is deployed for a tenant of the plurality of tenants and configured to form the virtual links in the set of virtual links of the overlay network of the tenant, wherein at least one particular VR for at least one particular tenant includes a feedback control system comprising at least one objective function that characterizes the overlay network for the particular tenant, wherein the particular VR is configured to receive link state data of the set of virtual links of the overlay network of the particular tenant and to use the received link state data in the at least one objective function to define routes for traffic flows of the particular tenant.

2. The system of claim 1, wherein:
each node includes a plurality of virtual machines (VMs);
each VM includes a VR of the plurality of VRs and corresponds to the tenant; and
each VR separately controls routing of traffic flows of the corresponding tenant to at least one next node along a routing path.

3. The system of claim 2, wherein each VM is configured to isolate at least one of a control plane and a data plane of each tenant from the control or data plane of other tenants in the plurality of tenants.

4. The system of claim 2, wherein the control of the routing of the tenant traffic flows comprises routing at least one traffic flow from an ingress node to an egress node of the plurality of nodes.

5. The system of claim 1, wherein:
the set of virtual links associated with each VR utilizes the underlay network for delivery of the traffic flows of the VR's tenant; and
the set of virtual links of each VR is configured to form a private tenant network for the VR's tenant that is isolated from private networks defined for other tenants by other VRs in order to maintain the separation of the traffic flows of the different tenants through the underlay network.

6. The system of claim 1, wherein the particular VR is configured (i) to apply the objective function to the link state data and generate a link weight for each link of the set of links and (ii) to use the link weights to identify routes for the traffic flows of the VR's tenant.

7. The system of claim 6, wherein the particular VR periodically receives update link state data and continually adapts the routes that it defines based on changes in the link state data as processed by the objective function.

8. The system of claim 1, wherein each VR of a plurality of VRs includes the feedback control system comprising the at least one objective function that is used to define routes through the VR's corresponding overlay network.

9. The system of claim 1, wherein the defined routes include (i) at least multiple paths to the same destination in the overlay network for the VR's tenant and (ii) at least one shortest path to another destination in the overlay network for the VR's tenant.

10. The system of claim 1, wherein the links state data includes at least one of latency, jitter, packet loss, throughput, utilization, link state, and link status.

11. The system of claim 1, wherein
each VR is configured to maintain configuration data for the VR's corresponding tenant and to use the configuration data to define routes for traffic flows of the VR's corresponding tenant; and
the configuration data includes traffic class configuration data that identifies traffic classes, and configures routing behavior corresponding to each traffic class.

12. The system of claim 1, wherein:
each node includes a plurality of virtual machines (VMs);
each VM includes a VR of the plurality of VRs and corresponds to the tenant; and
each VM includes a monitoring agent coupled to the VR, wherein the monitoring agent is configured to collect data representing the link state data of the set of virtual links of the overlay network.

13. The system of claim 12, wherein each monitoring agent is configured to collect link state data from at least one of a plurality of monitoring agents and a plurality of VRs of the plurality of VMs.

14. The system of claim 12, wherein each monitoring agent is configured to collect the link state data using probe signals exchanged with monitoring agents of other VMs in the plurality of VMs.

15. A method comprising:
deploying a plurality of virtual routers (VRs) at each node of a plurality of nodes that form a plurality of overlay networks for a plurality of tenants, wherein each VR is deployed for a tenant of the plurality of tenants, each overlay network comprising a set of virtual links and provisioned over an underlay network including servers of a public network; and
configuring each VR to use the virtual links in the set of virtual links of the overlay network of the tenant, wherein at least one particular VR for at least one particular tenant includes a feedback control system comprising at least one objective function that characterizes the overlay network for the particular tenant,
wherein configuring each VR comprises configuring the particular VR to receive link state data of the set of virtual links of the overlay network of the particular tenant and to use the received link state data in the at least one objective function to define routes for traffic flows of the particular tenant.

16. The method of claim 15, wherein each node includes a plurality of virtual machines (VMs), each VM includes a VR of the plurality of VRs and corresponds to the tenant, and each VR separately controls routing of traffic flows of the corresponding tenant to at least one next node along a routing path.

17. The method of claim 15, wherein the set of virtual links associated with each VR utilizes the underlay network for delivery of the traffic flows of the VR's tenant, the method further comprising configuring the set of virtual links of each VR to form a private tenant network for the VR's tenant that is isolated from private networks defined for other tenants by other VRs in order to maintain the separation of the traffic flows of the different tenants through the underlay network.

18. The method of claim 15, wherein configuring each VR further comprises configuring the VR to maintain configuration data for the VR's corresponding tenant and to use the configuration data to define routes for traffic flows of the VR's corresponding tenant, the configuration data including traffic class configuration data that identifies traffic classes, and configures routing behavior corresponding to each traffic class.

19. The system of claim 15, wherein each node includes a plurality of virtual machines (VMs), each VM includes a VR of the plurality of VRs and corresponds to the tenant, each VM includes a monitoring agent coupled to the VR, and the monitoring agent is configured to collect data representing the link state data of the set of virtual links of the overlay network.

20. The system of claim 19, wherein each monitoring agent is configured to collect link state data from at least one of a plurality of monitoring agents and a plurality of VRs of the plurality of VMs.

* * * * *